United States Patent
Niedzwiecki et al.

(10) Patent No.: US 12,278,357 B2
(45) Date of Patent: Apr. 15, 2025

(54) BATTERY MODULE WITH MULTIPLEXING AND ASSOCIATED SYSTEMS AND METHODS

(71) Applicant: Sion Power Corporation, Tucson, AZ (US)

(72) Inventors: Mark Niedzwiecki, Tucson, AZ (US); Jared M. Jennings, Tucson, AZ (US); Ryan Michael Niccum, Tucson, AZ (US); David Warren Ribblett, Vail, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 18/291,213

(22) PCT Filed: Jul. 21, 2022

(86) PCT No.: PCT/US2022/037818
§ 371 (c)(1),
(2) Date: Jan. 22, 2024

(87) PCT Pub. No.: WO2023/004006
PCT Pub. Date: Jan. 26, 2023

(65) Prior Publication Data
US 2024/0266639 A1    Aug. 8, 2024

Related U.S. Application Data

(60) Provisional application No. 63/224,930, filed on Jul. 23, 2021.

(51) Int. Cl.
*H01M 10/659* (2014.01)
*H01M 10/625* (2014.01)
(Continued)

(52) U.S. Cl.
CPC ....... *H01M 10/659* (2015.04); *H01M 10/625* (2015.04); *H01M 10/653* (2015.04);
(Continued)

(58) Field of Classification Search
CPC ............ H01M 10/659; H01M 10/625; H01M 10/653; H01M 10/6551; H01M 10/658; H01M 50/249
See application file for complete search history.

(56) References Cited

U.S. PATENT DOCUMENTS

| 4,664,991 A | 5/1987 | Perichaud et al. |
| 4,739,018 A | 4/1988 | Armand et al. |

(Continued)

FOREIGN PATENT DOCUMENTS

| JP | 5691932 B2 | 4/2015 |
| KR | 101449103 B1 | 10/2014 |

(Continued)

OTHER PUBLICATIONS

WO 2018170413 English Translation (Year: 2018).*

(Continued)

*Primary Examiner* — Jimmy Vo
(74) *Attorney, Agent, or Firm* — Wolf, Greenfield & Sacks, P.C.

(57) ABSTRACT

Batteries including electrochemical cells, associated components, and arrangements thereof are generally described. In some aspects, batteries with phase change materials that can facilitate heat transfer within the battery (e.g., from an electrochemical cell to a component of a housing of the battery) are described. In some instances, the phase change material is in thermal communication with a thermally conductive solid article portion (e.g., a cooling fin). In some embodiments, the batteries include a multiplexing switch apparatus. Such a multiplexing switch apparatus may be (Continued)

used to selectively discharge one or more electrochemical cells of the battery.

24 Claims, 74 Drawing Sheets

(51) Int. Cl.
*H01M 10/653* (2014.01)
*H01M 10/6551* (2014.01)
*H01M 10/658* (2014.01)
*H01M 50/249* (2021.01)

(52) U.S. Cl.
CPC ..... *H01M 10/6551* (2015.04); *H01M 10/658* (2015.04); *H01M 50/249* (2021.01)

(56) References Cited

U.S. PATENT DOCUMENTS

| | | | |
|---|---|---|---|
| 4,833,048 A | 5/1989 | Dejonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,238,821 B1 | 5/2001 | Mukherjee et al. |
| 6,306,545 B1 | 10/2001 | Carlson et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,024,923 B2 | 6/2021 | Liao et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 11,228,055 B2 | 1/2022 | Liao et al. |
| 11,233,243 B2 | 1/2022 | Affinito et al. |
| 11,239,504 B2 | 2/2022 | Laramie et al. |
| 11,245,103 B2 | 2/2022 | Mikhaylik et al. |
| 11,251,501 B2 | 2/2022 | Schneider et al. |
| 11,316,204 B2 | 4/2022 | Mikhaylik et al. |
| 11,322,804 B2 | 5/2022 | Laramie et al. |
| 11,367,892 B2 | 6/2022 | Laramie et al. |
| 11,424,492 B2 | 8/2022 | Mikhaylik et al. |
| 11,456,459 B2 | 9/2022 | Affinito et al. |
| 11,489,348 B2 | 11/2022 | Mikhaylik et al. |
| 11,502,334 B2 | 11/2022 | Liao et al. |
| 11,557,753 B2 | 1/2023 | Kovalev et al. |
| 11,569,531 B2 | 1/2023 | Mikhaylik et al. |
| 11,575,124 B2 | 2/2023 | Affinito et al. |
| 11,581,530 B2 | 2/2023 | Laramie et al. |
| 11,637,353 B2 | 4/2023 | Laramie |
| 11,658,352 B2 | 5/2023 | Mikhaylik et al. |

(56) References Cited

U.S. PATENT DOCUMENTS

| | | |
|---|---|---|
| 11,664,527 B2 | 5/2023 | Liao et al. |
| 11,699,780 B2 | 7/2023 | Milobar et al. |
| 11,705,554 B2 | 7/2023 | Kovalev et al. |
| 11,705,555 B2 | 7/2023 | Mikhaylik et al. |
| 11,710,828 B2 | 7/2023 | Wang et al. |
| 11,710,847 B2 | 7/2023 | Laramie et al. |
| 11,728,528 B2 | 8/2023 | Laramie et al. |
| 11,735,761 B2 | 8/2023 | Scordilis-Kelley et al. |
| 11,742,477 B2 | 8/2023 | Laramie et al. |
| 11,784,297 B2 | 10/2023 | Liao et al. |
| 11,791,511 B2 | 10/2023 | Shayan et al. |
| 11,824,228 B2 | 11/2023 | Shayan et al. |
| 11,828,861 B1 | 11/2023 | Lattin |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2007/0257638 A1* | 11/2007 | Amend ............... H01M 50/296 320/112 |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0035128 A1 | 2/2010 | Scordilis-Kelley et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0316072 A1 | 11/2013 | Scordilis-Kelley et al. |
| 2014/0272594 A1 | 9/2014 | Safont Sempere et al. |
| 2014/0272595 A1 | 9/2014 | Cristadoro et al. |
| 2015/0162586 A1 | 6/2015 | Fleischmann et al. |
| 2015/0188194 A1 | 7/2015 | Mikhaylik et al. |
| 2015/0287986 A1 | 10/2015 | Affinito et al. |
| 2016/0118638 A1 | 4/2016 | Gronwald et al. |
| 2016/0254578 A1* | 9/2016 | Liu ..................... H01M 50/289 429/120 |
| 2017/0141385 A1 | 5/2017 | Scordilis-Kelley et al. |
| 2018/0254516 A1 | 9/2018 | Han et al. |
| 2018/0261820 A1 | 9/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0280265 A1* | 9/2019 | Jansen ............... H01M 50/293 |
| 2019/0386359 A1 | 12/2019 | Lokhorst |
| 2020/0220197 A1 | 7/2020 | Laramie et al. |
| 2020/0220205 A1 | 7/2020 | Affinito et al. |
| 2020/0395585 A1 | 12/2020 | Laramie et al. |
| 2021/0057753 A1 | 2/2021 | Viner et al. |
| 2021/0135192 A1 | 5/2021 | Gronwald et al. |
| 2021/0138673 A1 | 5/2021 | Shannon et al. |
| 2021/0151815 A1 | 5/2021 | Milobar et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151841 A1 | 5/2021 | Johnson et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0408550 A1 | 12/2021 | Liao et al. |
| 2022/0048121 A1 | 2/2022 | Child et al. |
| 2022/0069593 A1 | 3/2022 | Hamblin et al. |
| 2022/0115704 A1 | 4/2022 | Mikhaylik et al. |
| 2022/0115705 A1 | 4/2022 | Kovalev et al. |
| 2022/0115715 A1 | 4/2022 | Kovalev et al. |
| 2022/0199968 A1 | 6/2022 | Child et al. |
| 2022/0209327 A1 | 6/2022 | Hamblin et al. |
| 2022/0255188 A1 | 8/2022 | Schneider et al. |
| 2022/0271537 A1 | 8/2022 | Mikhaylik et al. |
| 2022/0278354 A1 | 9/2022 | Laramie et al. |
| 2022/0311081 A1 | 9/2022 | Niedzwiecki et al. |
| 2022/0320586 A1 | 10/2022 | Liao et al. |
| 2022/0328880 A1 | 10/2022 | Mikhaylik et al. |
| 2022/0336872 A1 | 10/2022 | Mikhaylik et al. |
| 2022/0352521 A1 | 11/2022 | Mikhaylik et al. |
| 2022/0359882 A1 | 11/2022 | Affinito et al. |
| 2022/0359902 A1 | 11/2022 | Milobar |
| 2022/0407127 A1 | 12/2022 | Mikhaylik et al. |
| 2023/0006185 A1 | 1/2023 | Laramie et al. |
| 2023/0069989 A1 | 3/2023 | Laramie et al. |
| 2023/0106718 A1 | 4/2023 | Mikhaylik et al. |
| 2023/0111336 A1 | 4/2023 | Scordilis-Kelley et al. |
| 2023/0112241 A1 | 4/2023 | Laramie et al. |
| 2023/0118071 A1 | 4/2023 | Laramie et al. |
| 2023/0120877 A1 | 4/2023 | Mikhaylik et al. |
| 2023/0207908 A1 | 6/2023 | Laramie et al. |
| 2023/0261182 A1 | 8/2023 | Kovalev et al. |
| 2023/0275256 A1 | 8/2023 | Harrel et al. |
| 2023/0317959 A1 | 10/2023 | Kovalev et al. |

FOREIGN PATENT DOCUMENTS

| | | | |
|---|---|---|---|
| KR | 20150015216 A | 2/2015 | |
| KR | 20190049682 A | 5/2019 | |
| WO | WO 99/33125 A1 | 7/1999 | |
| WO | WO 99/33130 A1 | 7/1999 | |
| WO | WO-2018170413 A1 * | 9/2018 | .......... H01M 10/052 |
| WO | WO 2020/237015 A1 | 11/2020 | |
| WO | WO 2020/257414 A1 | 12/2020 | |
| WO | WO 2021/102071 A1 | 5/2021 | |

OTHER PUBLICATIONS

Paraffin—Wax-Emulsions.com (Year: 2017).*
International Search Report and Written Opinion for International Application No. PCT/US2022/037818 dated Nov. 11, 2022.
Cabeza et al., Report C2 of Subtask C. Inventory of Phase Change Materials (PCM). Feb. 2005: 33 pages.
[No Author Listed], Physics explanation of Thermal Conductivity of Metals. Thermtest Instruments. May 22, 2020. https://thermtest.com/physics-explanation-of-thermal;-conductivity-of-metals [last accessed Aug. 27, 2024]: 8 pages.

* cited by examiner

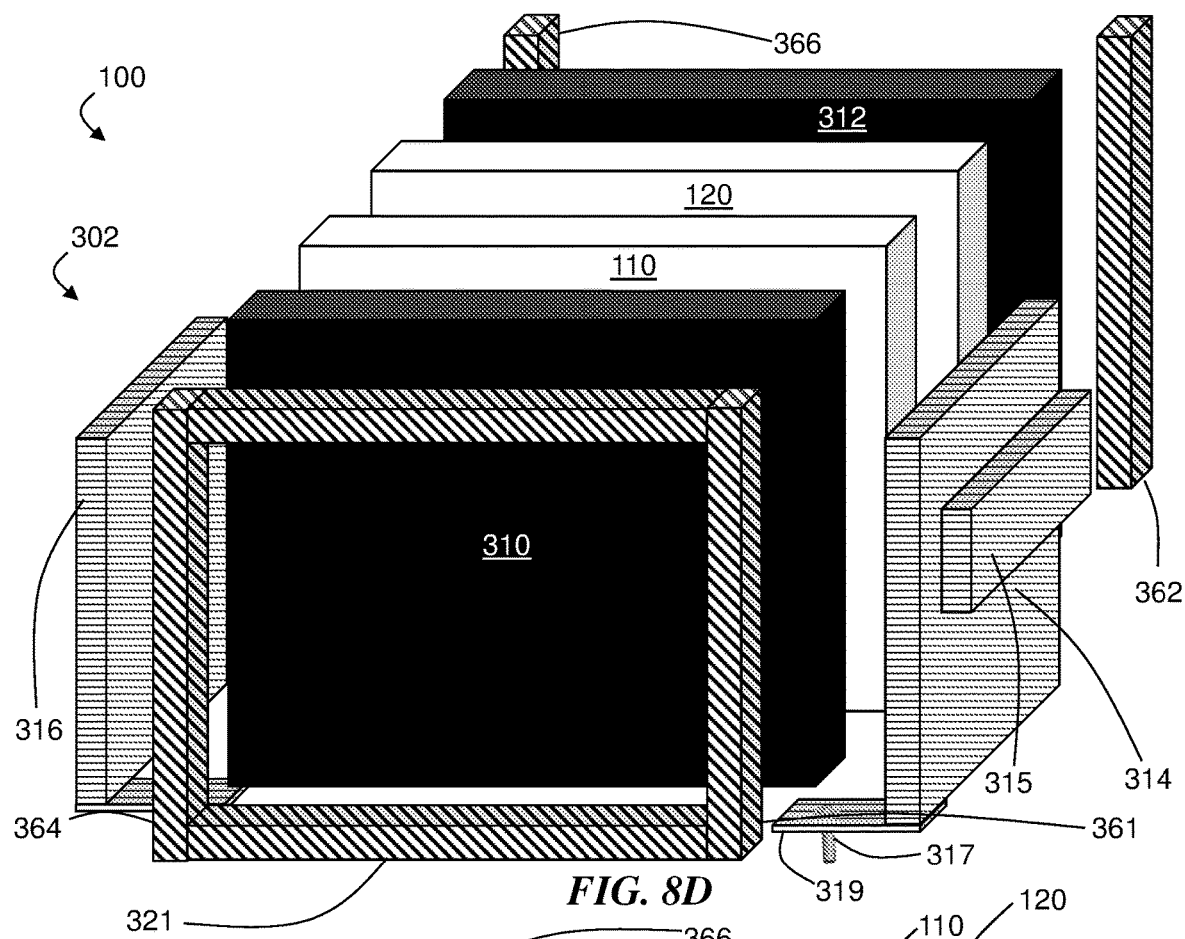
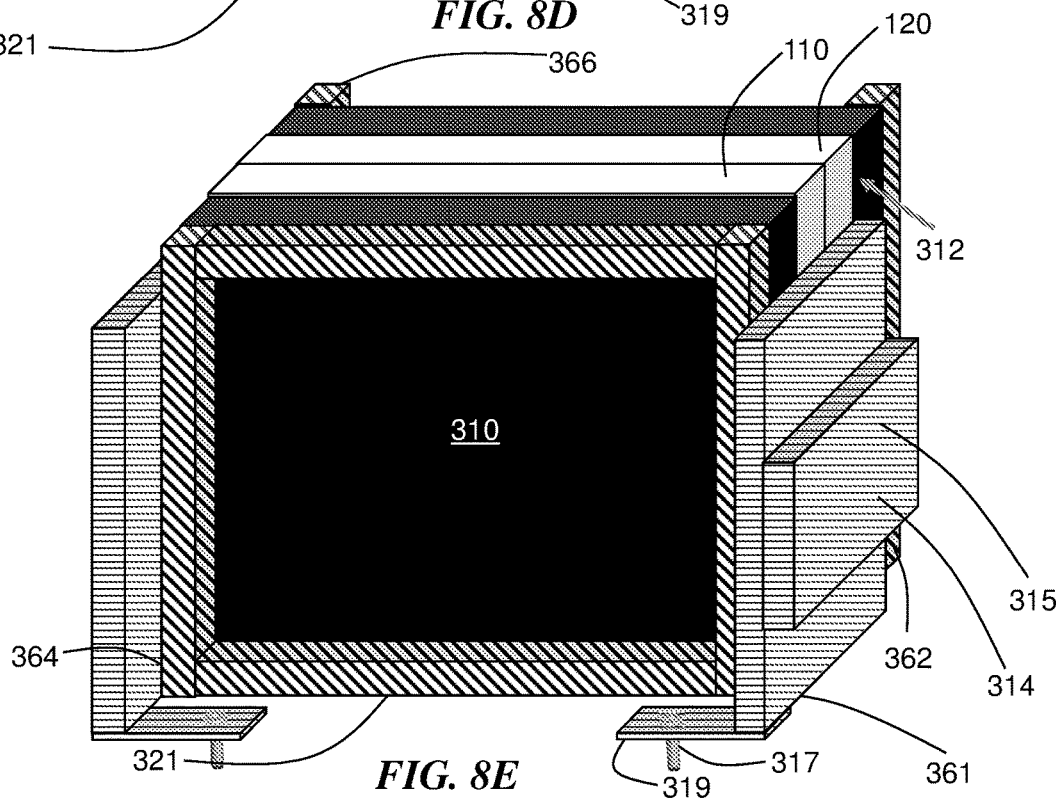

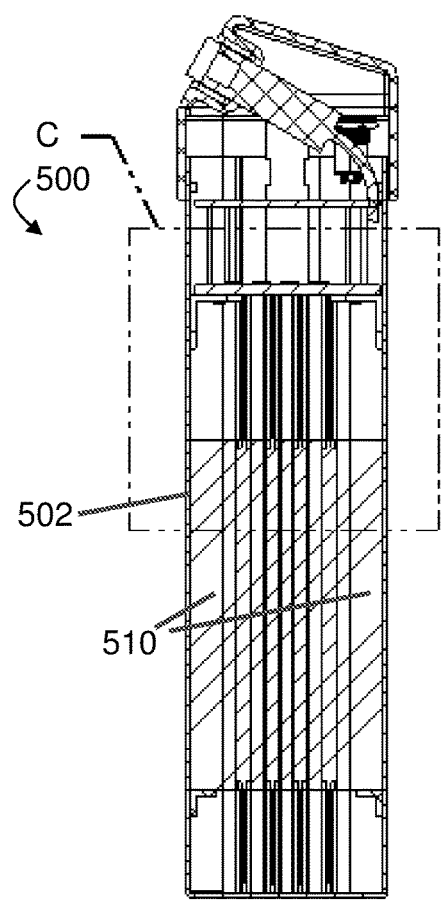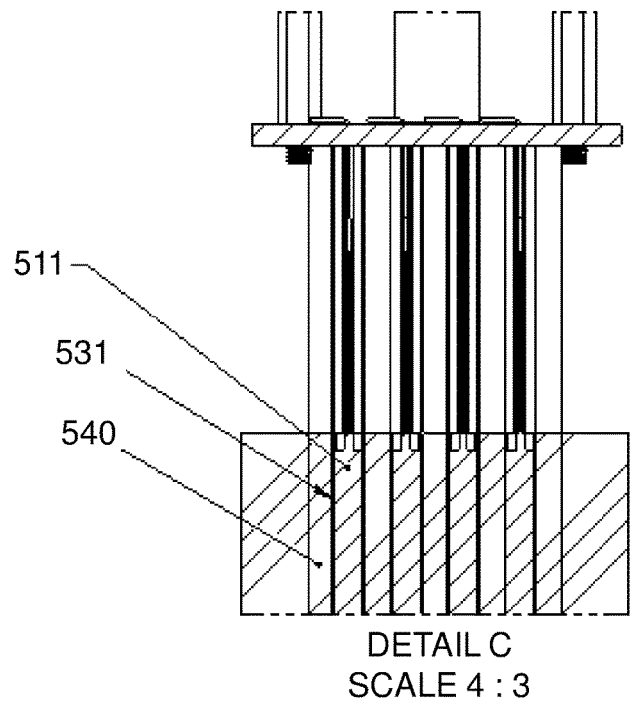
DETAIL C
SCALE 4 : 3
FIG. 37D
SECTION B-B
FIG. 37C

BATTERY MODULE WITH MULTIPLEXING AND ASSOCIATED SYSTEMS AND METHODS

RELATED APPLICATIONS

This application is a national stage filing under 35 U.S.C. § 371 of International Patent Application No. PCT/US2022/037818, filed Jul. 21, 2022, and entitled, "Battery Module with Multiplexing and Associated Systems and Methods," which claims priority under 35 U.S.C. § 119 (e) to U.S. Provisional Patent Application No. 63/224,930, filed Jul. 23, 2021, and entitled, "Battery Module with Multiplexing and Associated Systems and Methods," each of which is incorporated herein by reference in its entirety for all purposes.

TECHNICAL FIELD

Batteries including electrochemical cells, associated components, and arrangements and operation thereof are generally described.

BACKGROUND

Batteries typically include cells that undergo electrochemical reactions to produce electric current. Heat may be produced during cycling of the cell, which may affect the performance of the battery. Applying a force to at least a portion of an electrochemical cell (e.g., during cycling of the cell) can improve the performance of the electrochemical cell. Certain embodiments of the present disclosure are directed to inventive articles, systems, and methods relating to the handling of heat transfer, cell charging/discharging, and/or compressive force in batteries.

SUMMARY

Batteries including electrochemical cells, associated components, and arrangements thereof are generally described. In some aspects, batteries with phase change materials that can facilitate heat transfer within the battery (e.g., from an electrochemical cell to a component of a housing of the battery) are described. In some instances, the phase change material is in thermal communication with a thermally conductive solid article portion (e.g., a cooling fin). In some embodiments, the batteries include a multiplexing switch apparatus. Such a multiplexing switch apparatus may be used to selectively discharge one or more electrochemical cells of the battery. The subject matter of the present invention involves, in some cases, interrelated products, alternative solutions to a particular problem, and/or a plurality of different uses of one or more systems and/or articles.

In one aspect, batteries are provided. In some embodiments, a battery comprises a stack comprising a first electrochemical cell, a second electrochemical cell, and a thermally conductive solid article portion at least partially between the first electrochemical cell and the second electrochemical cell, the stack having a first end, a second end, and a side; a phase change material portion in thermal communication with the thermally conductive solid article portion, wherein the phase change material has a melting point, at 1 atm of pressure, of greater than or equal to 30° C. and less than or equal to 80° C. and a latent heat of fusion, at 1 atm of pressure, of greater than or equal to 100,000 J $kg^{-1}$; and a housing at least partially enclosing the stack, the housing comprising: a first solid housing component covering at least a portion of the first end of the stack and having a portion along at least some of the side of the stack; a second solid housing component covering at least a portion of the second end of the stack and having a portion along at least some of the side of the stack; and a point of attachment between the first solid housing component and the second solid housing component at a region of overlap between the first solid housing component and the second solid housing component along the side of the stack; wherein the housing is configured to apply, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 $kg_f/cm^2$.

In another aspect, stacks of electrochemical cells are provided. In some embodiments, a stack of electrochemical cells comprises a first electrochemical cell; a second electrochemical cell; a thermally conductive solid article portion at least partially between the first electrochemical cell and the second electrochemical cell; and a phase change material portion in thermal communication with the thermally conductive solid article portion, wherein the phase change material has a melting point, at 1 atm of pressure, of greater than or equal to 30° C. and less than or equal to 80° C. and a latent heat of fusion, at 1 atm of pressure, of greater than or equal to 100,000 J $kg^{-1}$. In another aspect batteries are provided. In some embodiments, a battery comprises a housing at least partially enclosing an electrochemical cell; and a phase change material portion in thermal communication with the electrochemical cell; wherein: the phase change material has a melting point, at 1 atm of pressure, of greater than or equal to 30° C. and less than or equal to 80° C. and a latent heat of fusion, at 1 atm of pressure, of greater than or equal to 100,000 J $kg^{-1}$; the housing is configured to apply, during at least one period of time during charge and/or discharge of the electrochemical cell, an anisotropic force with a component normal to an electrode active surface of the electrochemical cell defining a pressure of at least 10 $kg_f/cm^2$; and the phase change material portion is located such that during at least some of the at least one period of time during which the housing applies the anisotropic force, some or all of the phase change material portion experiences a pressure defined by the anisotropic force that is zero or at least 50% lower than an average pressure defined by the anisotropic force experienced by the electrode active surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 8D shows an exploded perspective schematic diagram of an exemplary battery comprising a stack comprising electrochemical cells, and a housing that comprises a solid plate, a solid housing component, and a housing stop portion, according to some embodiments;

FIG. 8E shows a perspective schematic diagram of an exemplary battery comprising a stack comprising electrochemical cells, and a housing that comprises a solid plate, a solid housing component, and a housing stop portion, according to some embodiments;

FIG. 37C shows section BB from FIG. 37B, according to some embodiments;

FIG. 37D shows detail C from FIG. 37C, according to some embodiments;

DETAILED DESCRIPTION

Figure 1A:
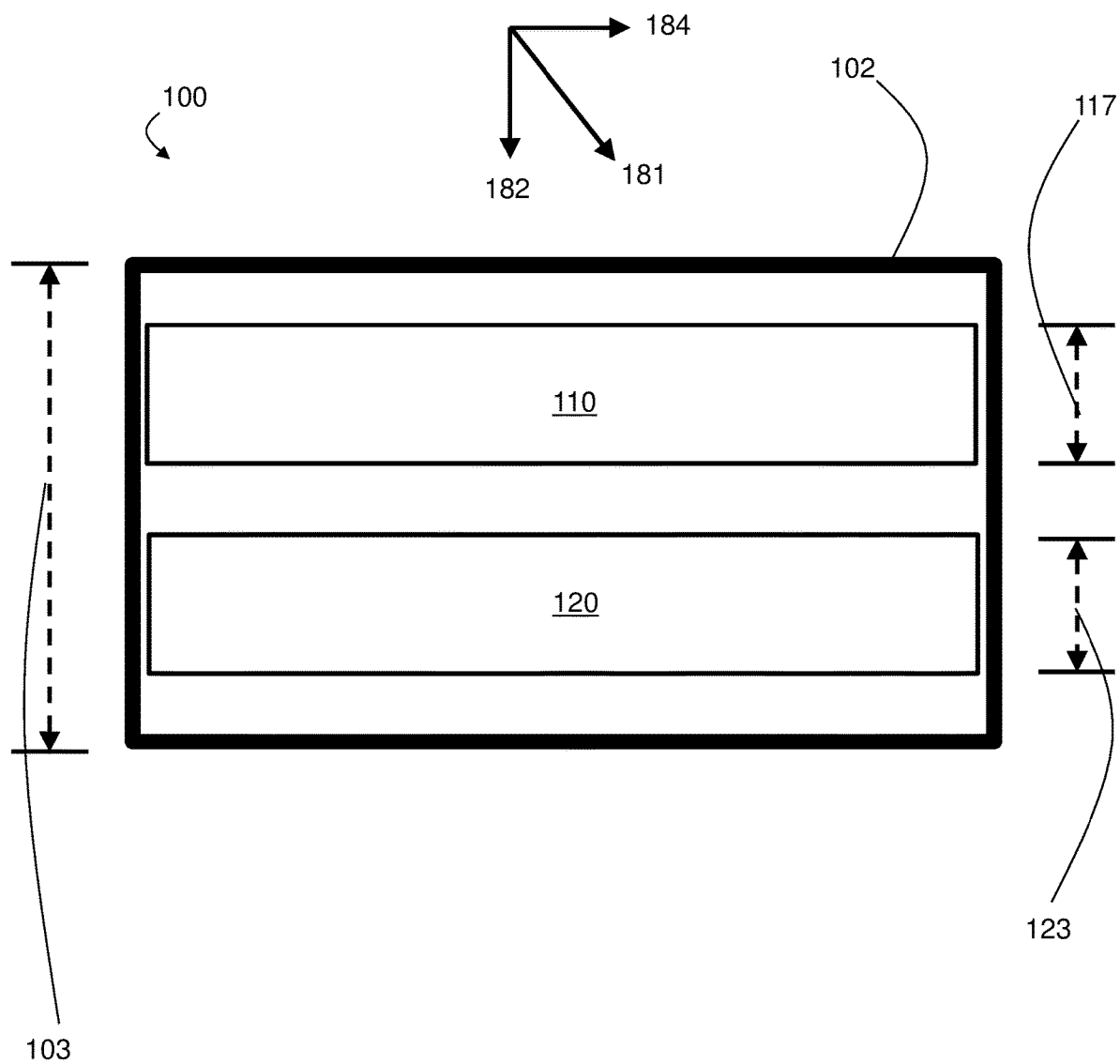
FIGS. 1A-1B show cross-sectional schematic diagrams of exemplary batteries comprising electrochemical cells and an optional housing, according to some embodiments.

Batteries including electrochemical cells, associated components, and arrangements thereof are generally described. In some aspects, batteries with phase change materials that can facilitate heat transfer within the battery (e.g., from an electrochemical cell to a component of a housing of the battery) are described. In some instances, the phase change material is in thermal communication with a thermally conductive solid article portion (e.g., a cooling fin). In some embodiments, the batteries include a multiplexing switch apparatus. Such a multiplexing switch apparatus may be used to selectively discharge one or more electrochemical cells of the battery.

In some aspects, batteries with housings that undergo relatively little expansion and contraction even in cases where electrochemical cells in the battery undergo a relatively high degree of expansion and contraction during charging and discharging are provided. Batteries configured to apply relatively high magnitudes and uniform force to electrochemical cells in the battery, while in some cases having high energy densities and a relatively low pack burden, are also provided. In certain aspects, arrangements of electrochemical cells and associated components are generally described. In some aspects, thermally conductive solid articles that can be used for aligning components of the battery are described. In some aspects, thermally insulating and compressible components for battery packs are generally described. The present disclosure describes multiple inventive aspects relating to battery components and arrangements thereof, application of force to multiple electrochemical cells in battery packs, and thermal management. These inventive aspects can, alone or in combination, lead to the manufacture of batteries with unexpected properties such as unexpectedly high energy densities and durability.

In some cases, it may be beneficial to apply force to electrochemical cells in a battery. For example, in some cases applying an anisotropic force with a component normal to at least one of the electrochemical cells can improve performance during charging and/or discharging by reducing problems such as dendrite formation and surface roughening of the electrode while improving current density. One such example is the case where at least one of the electrochemical cells of the battery comprises lithium metal or a lithium metal alloy as an electrode active material. Lithium metal may undergo dendrite growth, for example, which can in certain cases lead to failure of the electrochemical cell and safety hazards. Application of relatively high magnitudes of anisotropic force to electrodes comprising lithium metal may mitigate lithium dendrite formation and other deleterious phenomena. However, it has been realized in the context of the present disclosure that numerous challenges may emerge when applying force within batteries comprising multiple electrochemical cells (e.g., comprising lithium and/or lithium alloy as an electrode active material). For example, application of a relatively uniform force such that each of the electrochemical cells experiences a relatively similar pressure distribution can be important for performance and durability, and managing pressure on multiple cells must be accomplished simultaneously. Further, certain types of electrochemical cells may undergo relatively large dimensional changes during cycling. As one example, an electrode comprising lithium and/or lithium metal alloy may expand significantly due to lithium deposition during charging and contract significantly upon lithium ion release during discharging. Such dimensional changes of the electrochemical cells may lead to uneven pressure distributions and problematic battery pack dimensional changes.

The present disclosure provides methods, articles, and devices that can, in some cases, be used to mitigate such dimensional changes of the overall battery (e.g., the housing) even in situations where electrochemical cells may expand and contract. For example, relatively high magnitudes of force (e.g., defining a pressure of greater than or equal to 10 kg/cm$^2$ and up to 40 kg/cm$^2$, or greater than or equal to 10 kg/cm$^2$ and up to 25 kg/cm$^2$) may be applied. For example, it has been realized that relatively high magnitudes of force may be applied relatively uniformly using certain housing components (e.g., solid plates) having relatively high stiffness while being lightweight (e.g., certain types of carbon fiber having certain weaves and thicknesses). Further, certain articles in the battery may compensate for dimensional changes of the electrochemical cells (e.g., thermally insulating compressible solid article portions such as microcellular elastomeric foams). It has been discovered that certain types of components can have suitable mechanical properties for use in batteries under compressive force (e.g., relatively low compression set, relatively high resilience) while being thermally insulating. Some such thermally insulating compressible solid article portions may then be capable of serving multiple roles: compensating for dimensional changes in electrochemical cells and mitigating heat transfer between electrochemical cells. It has also been discovered that aligning components (e.g., electrochemical active regions of the electrochemical cells) of the battery can lead to improved performance and durability (e.g., by increasing the uniformity of the pressure distribution experienced by the electrochemical active regions).

Certain aspects of the present disclosure are related to thermally conductive solid article portions that can be used to align electrochemical active regions of the battery while also performing other functions, such as facilitating heat transfer away from the electrochemical cells (e.g., laterally). The use of articles capable of alignment and thermal transfer may reduce the number of components needed for the battery, which may reduce complexity, pack burden, and/or costs. Certain aspects also relate to unconventional arrangements of components that can simultaneously mitigate multiple potentially deleterious phenomena associated with batteries comprising multiple electrochemical cells, while using relatively few components, which may allow for relatively high energy densities while also allowing for good durability. For example, certain arrangements of electrochemical cells, thermally conductive solid article portions, and thermally insulating compressible solid article portions may promote unexpectedly efficient heat transfer away from the electrochemical cells while also facilitating compensation for applied forces and cell breathing and facilitating relatively uniform pressure distributions (e.g., within ±2.5 $kg_f$/$cm^2$ or within ±2 $kg_f/cm^2$ across an electrochemical active region).

In one aspect, batteries are generally described. The battery may include, in some embodiments, one or more rechargeable electrochemical cells. In some embodiments, the battery comprises one or more rechargeable lithium-ion electrochemical cells.

Figure 1B:
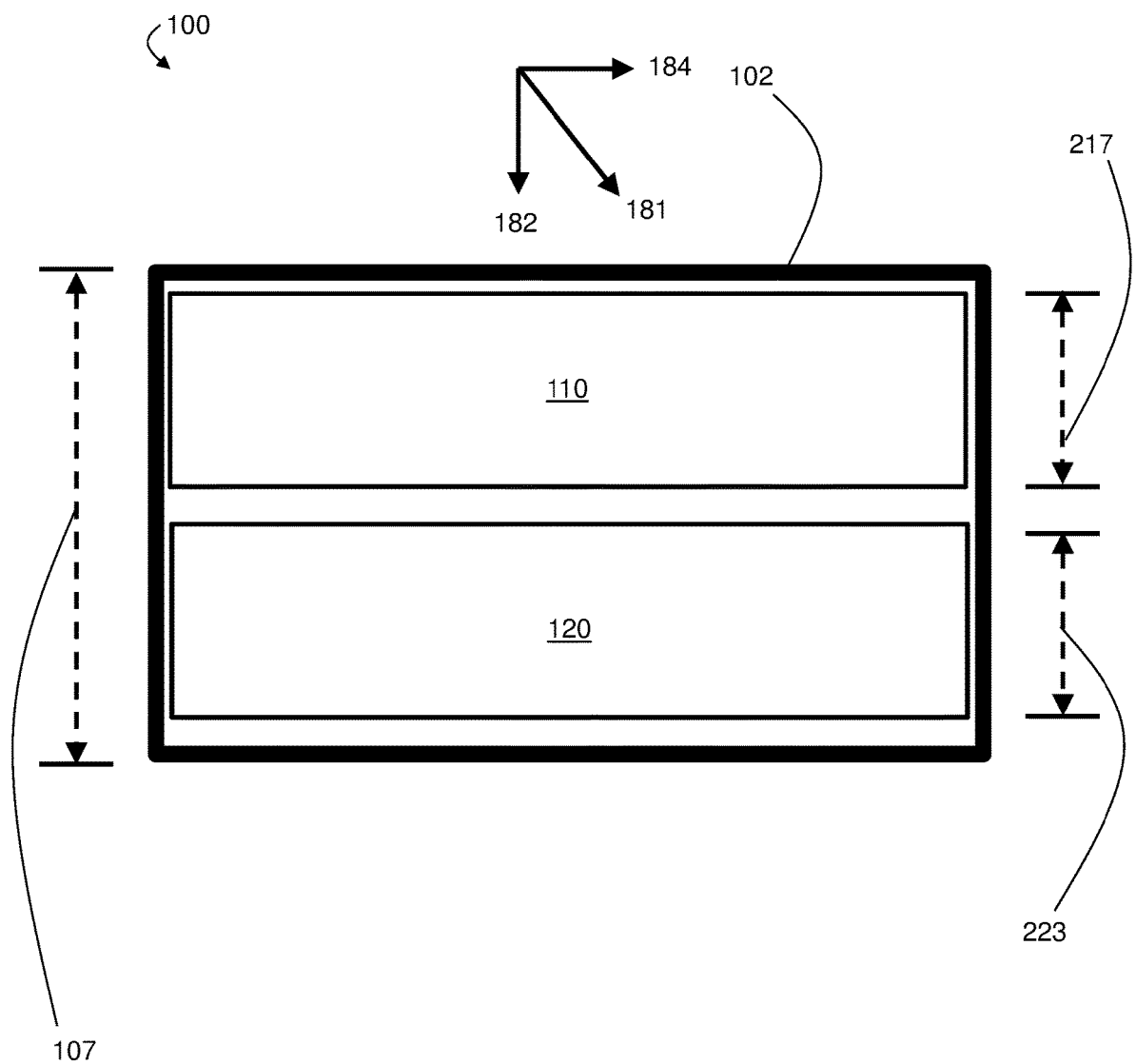

FIGS. 1A-1B are cross-sectional schematic diagrams of a non-limiting embodiment of battery 100. The battery may comprise one or more electrochemical cells as well as one or more other components (e.g., articles stacked with the electrochemical cells, housings, electrical and thermal management equipment, etc.). In some embodiments, the battery comprises multiple electrochemical cells, including a first electrochemical cell and a second electrochemical cell. For example, battery 100 in FIGS. 1A-1B comprises first electrochemical cell 110 and second electrochemical cell 120 at least partially enclosed by optional housing 102. The battery may have any of a variety of suitable configurations including, but not limited to, a stacked configuration, a folded configuration, or a wound configuration. In some embodiments, at least one electrochemical cell of the battery (e.g., first electrochemical cell, second electrochemical cell) comprises lithium and/or a lithium metal alloy as an electrode active material.

Figure 2:
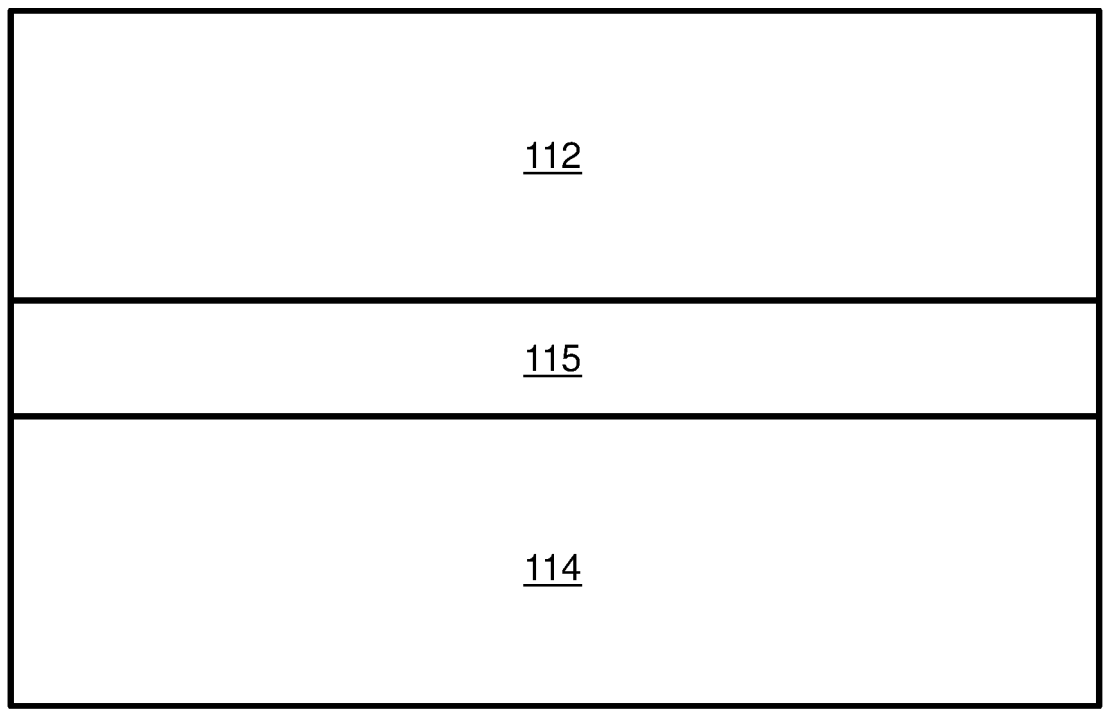
FIG. 2 shows a cross-sectional schematic diagram of an exemplary electrochemical cell, according to some embodiments.

In some embodiments, electrochemical cells in the battery (e.g., the first electrochemical cell, the second electrochemical cell) comprise at least one anode. FIG. 2 shows a schematic diagram of one exemplary embodiment of first electrochemical cell 110 comprising anode 112. In some cases, the anode comprises an anode active material. As used herein, an "anode active material" refers to any electrochemically active species associated with an anode. In some embodiments, the anode comprises lithium metal and/or a lithium metal alloy as an anode active material. For example, referring again to FIG. 2, anode 112 comprises lithium metal and/or a lithium metal alloy as an anode active material in some embodiments. An electrode such as an anode can comprise, in accordance with certain embodiments, lithium metal and/or a lithium metal alloy as an electrode active material during at least a portion of or during all of a charging and/or discharging process of the electrochemical cell. In certain cases, the anode is or comprises vapor-deposited lithium (e.g., a vapor-deposited lithium film). Additional suitable anode active materials are described in more detail below. Certain embodiments described herein may be directed to systems, devices, and methods that may allow for improved performance (e.g., magnitude and uniformity of applied force, thermal management, alignment of electrochemical active regions to promote uniformity of lithium deposition during charging) of electrochemical devices comprising certain anodes, such as lithium metal-containing anodes.

In some embodiments, electrochemical cells in the battery (e.g., the first electrochemical cell, the second electrochemical cell) comprise at least one cathode. For example, referring again to FIG. 2, first electrochemical cell 110 comprises cathode 114. The cathode can comprise a cathode active material. As used herein, a "cathode active material" refers to any electrochemically active species associated with a cathode. In certain cases, the cathode active material may be or comprise a lithium intercalation compound (e.g., a metal oxide lithium intercalation compound). As one non-limiting example, in some embodiments, cathode 114 in FIG. 2 comprises a nickel-cobalt-manganese lithium intercalation compound. Suitable cathode materials are described in more detail below.

As used herein, "cathode" refers to the electrode in which an electrode active material is oxidized during charging and reduced during discharging, and "anode" refers to the electrode in which an electrode active material is reduced during charging and oxidized during discharging.

In some embodiments, electrochemical cells in the battery (e.g., the first electrochemical cell, the second electrochemical cell) comprise a separator between the anode and the cathode. FIG. 2 shows exemplary separator 115 between anode 112 and cathode 114, according to certain embodiments. The separator may be a solid electronically non-conductive or insulative material that separates or insulates the anode and the cathode from each other, preventing short circuiting, and that permits the transport of ions between the anode and the cathode. In some embodiments, the separator is porous and may be permeable to an electrolyte.

It should be understood that while in some embodiments the first electrochemical cell and the second electrochemical cell have the same types of components (e.g., same anode active material, same cathode active material, same type of separator), in other embodiments the first electrochemical cell has one or more different components than the second electrochemical cell (e.g., a different anode active material, a different cathode active material, a different type of separator). In some embodiments, the first electrochemical cell and the second electrochemical cell are identical in composition and/or dimensions.

In some embodiments, the battery comprises a phase change material portion. A phase change material portion generally refers to an object comprising a substance that releases/absorbs sufficient thermal energy at a phase transition (e.g., from a solid to a liquid and vice versa) to facilitate cooling and/or heating. The amount of thermal energy released/absorbed depends on the latent heat associated with the substance from which the phase transition material is made, which can readily be determined by those of ordinary skill in the art. It has been realized in the context of the present disclosure that incorporation of phase change material portions into batteries (e.g., comprising one or more electrochemical cells, such as in stacks) can facilitate relatively rapid removal of relatively large amounts heat from components of the batteries (e.g., electrochemical cells) during operation (e.g., charging and/or discharging). Such cooling may, in some instances, reduce deleterious phenomena associated with over-heating of certain electrochemical cells (e.g., cells comprising lithium as an electrode active material), such as reduced durability, cycle life, capacity, and even safety concerns such as thermal runaway.

Figure 3:
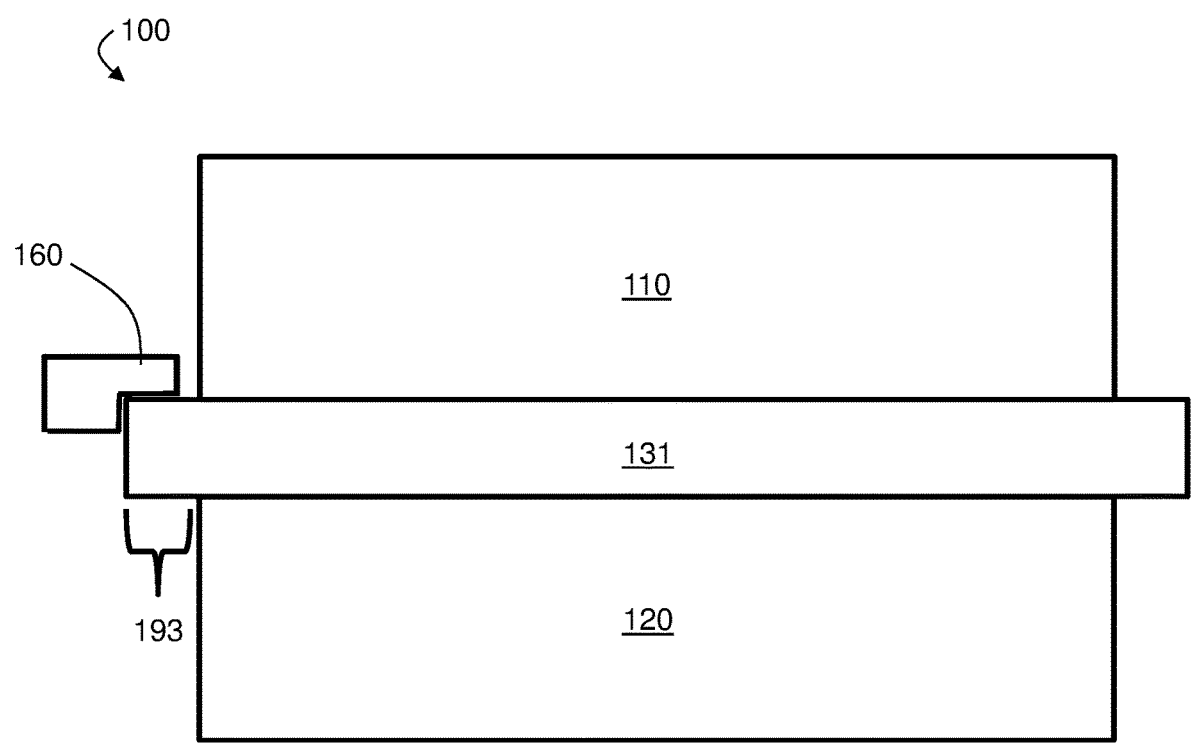
FIG. 3 shows a cross-sectional schematic diagram of an exemplary battery comprising a phase change material portion, according to some embodiments.

As an illustrative example, FIG. 3 shows a cross-sectional schematic of a stack 100 of electrochemical cells comprising first electrochemical cell 110, second electrochemical cell 120, and phase change material portion 160. Stack of electrochemical cells 100 may be part of a battery (e.g., a rechargeable battery). As described in more detail below, a thermally conductive solid article portion may be at least partially between the first electrochemical cell and the second electrochemical cell. For example, in the embodiment shown in FIG. 3, thermally conductive solid article portion 131 is at least partially between first electrochemical cell 110 and second electrochemical cell 120. Further details, properties, and form factors for the thermally conductive solid article portion are described below.

In some embodiments, the phase change material portion is in thermal communication with the thermally conductive solid article portion. For example, referring again to FIG. 3, phase change material portion 160 may be in thermal communication with thermally conductive solid article portion 131. In general, two points are said to be in thermal communication when there exists at least one pathway that connects the two points and extends only through solid material having a thermal conductivity of greater than or equal to 0.5 W m$^{-1}$ K$^{-1}$ at a temperature of 25° C. In some embodiments, between two points in thermal communication, there exists at least one pathway that connects the two points and extends only through solid material having a thermal conductivity of greater than or equal to 1 W m$^{-1}$ K$^{-1}$, greater than or equal to 2 W m$^{-1}$ K$^{-1}$, greater than or equal to 5 W m$^{-1}$ K$^{-1}$, greater than or equal to 10 W m$^{-1}$ K$^{-1}$, greater than or equal to 25 W m$^{-1}$ K$^{-1}$, greater than or equal to 50 W m$^{-1}$ K$^{-1}$, greater than or equal to 65 W m$^{-1}$ K$^{-1}$, greater than or equal to 80 W m$^{-1}$ K$^{-1}$, greater than or equal to 100 W m$^{-1}$ K$^{-1}$, greater than or equal to 130 W m$^{-1}$ K$^{-1}$, greater than or equal to 150 W m$^{-1}$ K$^{-1}$, greater than or equal to 159 W m$^{-1}$ K$^{-1}$, greater than or equal to 200 W m$^{-1}$ K$^{-1}$, greater than or equal to 250 W m$^{-1}$ K$^{-1}$, or greater at a temperature of 25° C. In some embodiments, between two points in thermal communication, there exists at least one pathway that connects the two points and extends only through solid material having a thermal conductivity of up to 300 W m$^{-1}$ K$^{-1}$, or greater at a temperature of 25° C. Objects (e.g., phase change material portions, thermally conductive solid article portions, electrochemical cells, solid housing components) that are in thermal communication may be, in some embodiments, in direct contact with one another. For example, at least a portion of the phase change material may be in direct contact with at least a portion of the thermally conductive solid article portion. FIG. 3 shows one such configuration, where phase change material 160 is in direct contact with thermally conductive solid article portion 131. However, objects in thermal communication may also be separated by one or more intervening elements (e.g., layers), provided that the thermal conductivity ranges above are satisfied.

The thermally-conductive solid article portion (e.g., in thermal communication with the phase change material portion) may be in thermal communication with an electrochemical cell (e.g., the first electrochemical cell and/or the second electrochemical cell). When arranged in this manner, the stack may be arranged such that heat can dissipate from the electrochemical cell (e.g., during cycling), through at least a portion of the thermally conductive solid article, and to the phase change material portion. Such an arrangement may promote relatively efficient cooling of the electrochemical cell. In some such embodiments, at least a portion of the thermally conductive solid article portion is in direct contact with at least a portion (e.g., a pouch) of the electrochemical cell. For example, the thermally conductive solid article portion be may in direct contact with the phase change material portion and the electrochemical cell.

Certain embodiments relate to transferring heat relatively rapidly between components of a battery (e.g., a rechargeable battery). For example, some embodiments may comprise transferring heat relatively rapidly, during at least one period of charge and/or discharge of the first electrochemical cell and/or the second electrochemical cell, from the first electrochemical cell, through the thermally conductive solid article portion, to the phase change material portion. In some embodiments, heat is transferred, during at least one period of charge and/or discharge of the first electrochemical cell and/or the second electrochemical cell, from the first electrochemical cell, through the thermally conductive solid article portion, to the phase change material portion at a flux of at least 100 W m$^{-2}$, at least 150 W m$^{-2}$, at least 200 W m$^{-2}$, at least 500 W m$^{-2}$, and/or up to least 1000 W m$^{-2}$, or more. Such efficient transfer of heat may be achieved, for example, via arrangements of thermally conductive solid articles (e.g., metal (e.g., aluminum) sheets/cooling fins) and phase change material portions as described in this disclosure. The phase change material portion of the stack of electrochemical cells and/or battery may have any of a variety of suitable properties for facilitating heat transfer within the stack and/or battery. For example, the phase change material portion may have a melting point that is within an operative temperature range of a battery. In such a way, the battery may be able to take advantage of the latent heat of fusion of the phase change material to absorb a relatively large amount of heat (e.g., dissipated from one or more electrochemical cells) during charge and/or discharge processes of one or more electrochemical cells of the stack and/or battery. In some embodiments, the phase change material portion has a melting point, at 1 atm of pressure, of greater than or equal to 30° C., greater than or equal to 40° C., greater than or equal to 50° C., or higher. In some embodiments, the phase change material portion has a melting point, at 1 atm of pressure, of less than or equal to 80° C., less than or equal to 70° C., less than or equal to 60° C., or less. Combinations of these ranges (e.g., greater than or equal to 30° C. and less than or equal to 80° C., greater than or equal to 40° C. and less than or equal to 70° C.) are possible. In some embodiments, the phase change material portion has a melting point, at the pressure at which the phase change material exists during charge and/or discharge of an electrochemical cell of the stack and/or battery, of greater than or equal to 30° C., greater than or equal to 40° C., greater than or equal to 50° C., or higher. In some embodiments, the phase change material portion has a melting point, at the pressure at which the phase change material exists during charge and/or discharge of an electrochemical cell of the stack and/or battery, of less than or equal to 80° C., less than or equal to 70° C., less than or equal to 60° C., or less. Combinations of these ranges (e.g., greater than or equal to 30° C. and less than or equal to 80° C., greater than or equal to 40° C. and less than or equal to 70° C.) are possible.

As noted above, the phase change material portion may have a relatively high latent heat of fusion. Having a relatively high latent heat of fusion can allow a phase change material portion to absorb a relatively large amount of thermal energy upon undergoing a phase transition from a solid to a liquid (and release a relatively large amount of thermal energy upon undergoing a phase transition from a liquid to a solid), which can be useful in some embodiments where a relatively large of amount of heat is dissipated from electrochemical cells (e.g., during cycling of the cells). In some embodiments, the phase change material portion has a latent heat of fusion, at 1 atm of pressure, of greater than or equal to 100,000 J kg$^{-1}$, greater than or equal to 150,000 J kg$^{-1}$, greater than or equal to 200,000 J kg$^{-1}$, greater than or equal to 210,000 J kg$^{-1}$, and/or up to 220,000 J kg$^{-1}$, up to 250,000 J kg$^{-1}$, up to 300,000 J kg$^{-1}$, or more. In some embodiments, the phase change material portion has a latent heat of fusion, at the pressure at which the phase change material exists during charge and/or discharge of an electrochemical cell of the stack and/or battery, of greater than or equal to 100,000 J kg$^{-1}$, greater than or equal to 150,000 J kg$^{-1}$, greater than or equal to 200,000 J kg$^{-1}$, greater than or equal to 210,000 J kg$^{-1}$, and/or up to 220,000 J kg$^{-1}$, up to 250,000 J kg$^{-1}$, up to 300,000 J kg$^{-1}$, or more.

In some embodiments, the phase change material portion has a high enough thermal conductivity to facilitate thermal transfer within the stack and/or battery. In some embodiments, the phase change material portion has an effective thermal conductivity of greater than or equal to 0.5 W m$^{-1}$ K$^{-1}$, greater than or equal to 1 W m$^{-1}$ K$^{-1}$, greater than or equal to 2 W m$^{-1}$ K$^{-1}$, greater than or equal to 5 W m$^{-1}$ K$^{-1}$, greater than or equal to 10 W m$^{-1}$ K$^{-1}$, and/or up to 20 W m$^{-1}$ K$^{-1}$, 50 W m$^{-1}$ K$^{-1}$, or higher.

In some embodiments, the phase change material portion has a relatively large specific heat capacity. The specific heat capacity of a substance is the heat capacity of a sample of the substance divided by the mass of the sample, and refers to the amount of energy that must be added, in the form of heat, to one unit of mass of the substance in order to cause an increase of one unit in temperature (units given as J kg$^{-1}$ K$^{-1}$). Specific heat capacity can be measured using, for example, ASTM E1269-11(2018): Standard Test Method for Determining Specific Heat Capacity by Differential Scanning Calorimetry. In some embodiments, the phase change material portion has a specific heat capacity, in its solid form, of greater than or equal to 1,000 J kg$^{-1}$ K$^{-1}$, greater than or equal to 2,000 J kg$^{-1}$ K$^{-1}$, greater than or equal to 2,100 J kg$^{-1}$ K$^{-1}$, greater than or equal to 2,400 J kg$^{-1}$ K$^{-1}$, greater than or equal to 2,500 J kg$^{-1}$ K$^{-1}$, and/or up to 3,000 J kg$^{-1}$ K$^{-1}$, up to 4,000 J kg$^{-1}$ K$^{-1}$, up to 4,500 J kg$^{-1}$ K$^{-1}$, or greater at 25° C.

In some embodiments, the phase change material portion has a large enough mass and specific heat capacity to absorb a sufficient amount of heat (e.g., dissipated from an electrochemical cell) over a desired temperature range. For example, the phase change material may have a sufficient mass and specific heat capacity to absorb at least 1 kJ, at least 2 kJ, at least 5 kJ, at least 7 kJ, and/or up to 8 kJ, up to 10 kJ, or more upon a change in temperature of less than or equal to 50° C., less than or equal to 30° C., less than or equal to 22° C., and/or as low as 20° C. In some embodiments, the phase change material has a sufficient mass and specific heat capacity to absorb at least 1 kJ, at least 2 kJ, at least 5 kJ, at least 7 kJ, and/or up to 8 kJ, up to 10 kJ, or more upon a change in temperature of less than or equal to 50° C., less than or equal to 30° C., less than or equal to 22° C., and/or as low as 20° C., without the phase change material undergoing a phase change (e.g., without melting). The amount of heat absorbed by a sample over a change in temperature can be determined by multiplying the mass of the sample by the specific heat capacity of the substance of which the sample is made, and then multiplying the resulting product by the temperature difference. For example, for a change in temperature from 23° C. to 45° C. of a phase change material portion having a mass of 129 g and a specific heat capacity of 2500 J kg$^{-1}$ K$^{-1}$, the phase change material portion will absorb (2500 J kg$^{-1}$ K$^{-1}$)*(0.129 kg)*(22° C.)=70,095 J. In some embodiments, the phase change material portion can absorb a greater quantity of thermal energy than is produced by at least one electrochemical cell (or all electrochemical cells) of a battery upon at least 0.5 hr, at least 1 hr, at least 2 hr, or more of discharge and/or charge of the electrochemical cell. In some embodiments, the phase change material portion can absorb a greater quantity of thermal energy than is produced by at least one electrochemical cell (or all electrochemical cells) of a battery upon at least 0.5 hr, at least 1 hr, at least 2 hr, or more of discharge and/or charge of the electrochemical cell, without the phase change material undergoing a phase change (e.g., without melting).

In some embodiments, the phase change material portion has a relatively low density in its solid form. Having a low density in its solid form may allow for the phase change material to be relatively light while have a large enough volume to contact all desired components in the battery (e.g., the thermally conductive solid article portion, a solid housing component). A relatively low mass may contribute to the battery having a relatively high specific energy density. In some embodiments, the phase change material portion has a density, in its solid form, of less than or equal to 1.5 g/cm$^3$, less than or equal to 1.25 g/cm$^3$, less than or equal to 1.025 g/cm$^3$, less than or equal to 1.0 g/cm$^3$, and/or as low as 0.9 g/cm$^3$, as low as 0.8 g/cm$^3$, or less.

The phase change material can be made of any of a variety of suitable materials, depending on, for example, the dimensions of a stack and/or battery, the operative temperature range of the battery, the number of electrochemical cells, and/or the duration of charging and/or discharging. In some embodiments, the phase change material portion comprises an organic solid at room temperature. For example, the phase change material may comprise a mixture of organic compounds, such as a mixture of hydrocarbons. For example, the phase change material may comprise a wax such as a paraffin. Paraffin waxes may be useful as phase change materials in some instances because they generally have a high heat of fusion per unit weight, have a large melting point selection, can provide dependable cycling, and are generally non-corrosive and chemically inert under typical conditions present in batteries. In some embodiments, the phase change material portion comprises fatty acids (e.g., lauric acid, stearic acid). In some embodiments, the phase change material comprises an inorganic compound. For example, the phase change material may comprise an inorganic salt. One potentially suitable class of inorganic salts is inorganic salt hydrates (e.g., sodium sulfate decahydrate, sodium chloride sodium sulfate decahydrate, manganese nitrate hexahydrate, sodium silicate pentahydrate). In some embodiments, the phase change material comprises a composite material. Some such phase change materials are generally non-flammable, low-cost, and readily commercially available. Example of commercially available phase change materials that may be suitable for at least some embodiments include, but are not limited to, Therm-Flow® (Parker Hannifin, Cleveland, OH) and AllCell's Phase Change Composite (PCC™) (AllCell Technologies, Chicago, IL).

In some embodiments, the phase change material portion is lateral to the electrochemical cell. For example, in FIG. 3, phase change material portion 160 is lateral to first electrochemical cell 110. In some instances, the phase change material portion is lateral to both the first electrochemical cell and the second electrochemical cell of the stack of electrochemical cells. A lateral positioning of the phase change material portion may allow for simplicity of assembly of a battery comprising the electrochemical cell and the phase change material portion (e.g., by separately assembling a stack of electrochemical cells and then coupling with a phase change material portion during battery assembly). In some instances where an anisotropic force with a component normal to an electrode active surface of the electrochemical cell is applied, a lateral positioning of the phase change material portion can reduce or eliminate pressure experienced by the phase change material portion due to that applied anisotropic force. Having the phase change material portion in thermal communication with a thermally conductive solid article portion that is in turn in thermal communication with the electrochemical cell may facilitate satisfactory thermal transfer (e.g., cooling during cycling) even in instances where the phase change material portion is lateral to the electrochemical cell (as opposed to part of the stack). In some embodiments, the phase change material portion is lateral to an electrode active surface (e.g., an anode active surface and/or cathode active surface) of the electrochemical cell. In some embodiments, the phase change material portion is lateral to all electrode active surfaces (e.g., an anode active surface and/or cathode active surface) of a stack of electrochemical cells. In some embodiments, at least 50 volume percent (vol %), at least 75 vol %, at least 90 vol %, at least 95 vol %, at least 99 vol % or all of the phase change material portion is lateral to at least 50 vol %, at least 75 vol %, at least 90 vol %, at least 95 vol %, at least 99 vol % or all of the electrochemical cell.

In some embodiments, a region of the thermally conductive solid article portion is lateral to the first electrochemical cell. For example, in FIG. 3, region 193 of thermally conductive solid article portion 131 is lateral to first electrochemical cell 110. In some embodiments, the phase change material portion (e.g., phase change material portion 160) is relatively close to a region of the thermally conductive solid article portion that is lateral to the first electrochemical cell. For example, at least a portion of the phase change material portion may be within 5 cm, within 2 cm, with 1 cm, within 5 mm, within 2 mm, within 1 mm, within 0.5 mm, or less of a region of the thermally conductive solid article portion. In some embodiments, at least a portion of the phase change material portion is in direct contact with a region of the thermally conductive solid article portion (e.g., a region lateral to the first electrochemical cell).

Figure 4A:
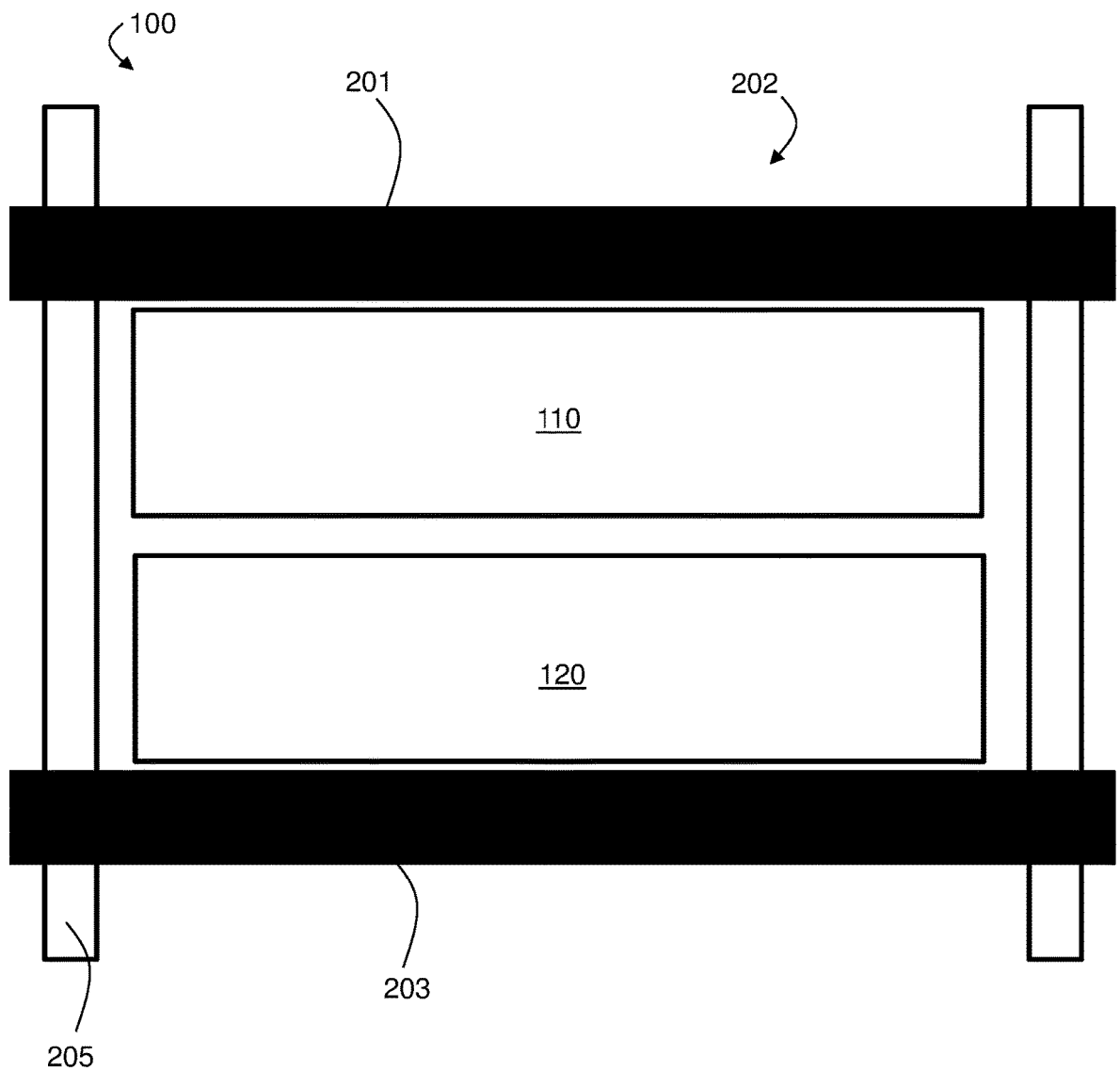
FIG. 4A shows a cross-sectional schematic diagram of an exemplary battery and solid plates, according to some embodiments.

In some embodiments, the battery comprises a housing. The housing may at least partially enclose other components of the battery. For example, the housing may at least partially enclose the first electrochemical cell and the second electrochemical cell. FIG. 1A shows optional housing 102 at least partially enclosing first electrochemical cell 110 and second electrochemical cell 120, according to certain embodiments. The housing may comprise rigid components. As one example, the housing may comprise one or more solid plates. The solid plate may, for example, be an endplate. FIG. 4A shows a cross-sectional schematic diagram of exemplary battery 100 comprising housing 202, housing 202 comprising first solid plate 201 and second solid plate 203. Further details of certain solid plates that may be used in the battery are described below. In certain cases, the housing does not comprise a solid plate. For example, in some cases, the solid surface and other components of a containment structure configured to house the electrochemical device are part of a unitary structure.

Some embodiments are related to applying, during at least one period of time during charge and/or discharge of the electrochemical cells (e.g., first electrochemical cell, second electrochemical cell), an anisotropic force with a component normal to an electrode active surface of at least one electrochemical cell of the battery. As mentioned above, application of such a force may reduce potentially deleterious phenomena associated with certain types of electrochemical cells (e.g., cells comprising lithium metal as an electrode active material) and improve utilization. For example, in some cases, applying an anisotropic force with a component normal to an active surface of an electrode of the electrochemical device can reduce problems (such as surface roughening of the electrode and dendrite formation) while improving current density. Application of such forces to multiple electrochemical cells of a battery pack may present certain challenges, including uniformity of pressure distribution for each electrochemical cell, which can be important for both performance and durability. Certain aspects described herein may, in some cases, address and overcome such challenges.

FIG. 1A depicts a schematic cross-sectional illustration of a force that may be applied to the first electrochemical cell and the second electrochemical cell in the direction of arrow 181. Arrow 182 illustrates the component of force 181 that is normal to an active surface of first electrochemical cell 110, according to certain embodiments. As used herein, the term "active surface" is used to describe a surface of an electrode that can be in physical contact with an electrolyte when the article is part of an electrochemical cell, and at which electrochemical reactions may take place.

In some embodiments, the housing of the battery is configured to apply, during at least one period of time during charge and/or discharge of the first electrochemical cell and/or the second electrochemical cell, an anisotropic force having a relatively high magnitude component normal to electrode active surfaces of at least one (or all) of the electrochemical cells in the battery. For example, in some embodiments where the battery comprises a first electrochemical cell having a first electrode active surface and a second electrochemical cell having a second electrode active surface, the housing of the battery is configured to apply, during at least one period of time during charge and/or discharge of the first electrochemical cell and/or the second electrochemical cell, an anisotropic force having a relatively high magnitude component normal to the first electrode active surface and the second electrode active surface. The housing may be configured to apply such a force in a variety of ways. For example, in some embodiments, the housing comprises two solid articles (e.g., a first solid plate and a second solid plate as shown in FIG. 4A, where housing 202 comprises first solid plate 201 and second solid plate 203). An object (e.g., a machine screw, a nut, a spring, etc.) may be used to apply the force by applying pressure to the ends (or regions near the ends) of the housing. In the case of a machine screw, for example, the electrochemical cells and other components of the battery may be compressed between the plates (e.g., a first solid plate and a second solid plate) upon rotating the screw. As another example, in some embodiments, one or more wedges may be displaced between the housing and a fixed surface (e.g., a tabletop, etc.). The force may be applied by driving the wedge between the housing (e.g., between a solid plate of a containment structure of the housing) and the adjacent fixed surface through the application of force on the wedge (e.g., by turning a machine screw).

Some embodiments comprise applying an anisotropic force with a component normal to a first electrode active surface of the first electrochemical cell and/or a second electrode active surface of the second electrochemical cell defining a pressure of at least 10 kg/cm$^2$, at least 12 kg/cm$^2$, at least 20 kg/cm$^2$, and/or up 25 kg/cm$^2$, or more. In some such cases, the housing is configured to apply such anisotropic forces. While high magnitudes of anisotropic force with a component normal to an electroactive surface can improve performance, too high of a magnitude of force may cause problems such as damage to certain components of the battery (e.g., the thermally insulating compressible solid article portion described below). It has been unexpectedly observed, however, that there are ranges of magnitudes of anisotropic force that can be applied that can, in some cases, achieve desirable performance of the battery while avoiding such damage. For example, some embodiments comprise applying (e.g., via the housing) during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of less than or equal to 40 kg$_f$/cm$^2$, less than or equal to 35 kg$_f$/cm$^2$, less than or equal to 30 kg$_f$/cm$^2$, less than or equal to 25 kg$_f$/cm$^2$, or less. Combinations of these ranges (e.g., at least 10 kg$_f$/cm$^2$ and less than or equal to 40 kg$_f$/cm$^2$, at least 10 kg$_f$/cm$^2$ and less than or equal to 25 kg$_f$/cm$^2$, or at least 12 kg$_f$/cm$^2$ and less than or equal to 30 kg$_f$/cm$^2$) are possible.

Some embodiments comprise applying a first anisotropic force with a component normal to a first electrode active surface of the first electrochemical cell and/or a second electrode active surface of the second electrochemical cell defining a pressure having a first magnitude of at least 10 kg$_f$/cm$^2$ (e.g., at least 12 kg$_f$/cm$^2$), and then also during a charge and/or discharge of the battery, applying a second anisotropic force with a component normal to a first electrode active surface of the first electrochemical cell and/or a second electrode active surface of the second electrochemical cell defining a pressure having a second magnitude that is at least 10 kg$_f$/cm$^2$, at least 12 kg$_f$/cm$^2$, or higher and less than or equal to 40 kg$_f$/cm$^2$, less than or equal to 30 kg$_f$/cm$^2$, or less. In some embodiments, the second magnitude of pressure is greater than the first magnitude by a factor of at least 1.2, at least 1.5, at least 2, at least 2.5, and/or up to 3, or up to 4. The second magnitude may be higher than the first magnitude, for example, in some embodiments where the first magnitude of force is applied via the housing (e.g., a rigid housing) and during a charging and/or discharge process, expansion of one or more components of the battery (e.g., one or more electrochemical cells) causes the force experienced by the electrochemical cells to increase. In some embodiments, the first magnitude occurs when the electrochemical cells are at a state of charge (SOC) of less than or equal to 10%, less than or equal to 5%, less than or equal to 2%, less than or equal to 1%, or 0%. In some embodiments, the second magnitude occurs when the electrochemical cells are at a state of charge of greater than or equal to 50%, greater than or equal to 75%, greater than or equal to 90%, greater than or equal to 95%, greater than or equal to 99%, or 100%. Combinations of these ranges are possible. For example, in some embodiments, the first magnitude occurs when the electrochemical cells are at a state of charge of less than or equal to 10% and the second magnitude (e.g., that defines a pressure that is greater than that of the first magnitude by a factor of at least 1.2 and up to 4) occurs when the electrochemical cells are at a state of charge of greater than or equal to 50%. In one exemplary embodiment, the magnitude of anisotropic force defines a pressure of 12 kg$_f$/cm$^2$ at a 0% SOC and 30 kg$_f$/cm$^2$ at a 100% SOC.

As mentioned above, in some embodiments, the battery comprises one or more solid plates. In some such cases, the housing is configured to apply the anisotropic force via a solid plate. The solid plates may be, for example, endplates configured to apply an anisotropic force to the electrochemical cells (e.g., first electrochemical cell, second electrochemical cell). For example, in FIG. 4A, first solid plate 201 and second solid plate 203 are endplates. It should be understood that the surfaces of a solid plate do not necessarily need to be flat. For example, one of the sides of the solid plate may comprise a surface that is curved (e.g., contoured, convex) in the absence of an applied force. In some embodiments, the solid plate (e.g., an aluminum solid plate) is convex with respect to the electrochemical cells in the absence of an applied force, and under at least one magnitude of applied force the end plate may become less convex (e.g., become flat).

The housing may comprise any suitable solid material. In some embodiments, a solid plate of the housing and/or stack is or comprises a metal, metal alloy, composite material, or a combination thereof. In some cases, the metal that the solid plate is or comprises is a transition metal. For example, in some embodiments, the solid article is or comprises Ti, Cr, Mn, Fe, Co, Ni, Cu, or a combination thereof. In some embodiments, the solid plate is or comprises a non-transition metal. For example, in some embodiments, the solid article is or comprises Al, Zn, or combinations thereof. Exemplary metal alloys that the solid plate can be or comprise include alloys of aluminum, alloys of iron (e.g., stainless steel), or combinations thereof. Exemplary composite materials that the solid plate can be or comprise include, but are not limited to, reinforced polymeric, metallic, or ceramic materials (e.g., fiber-reinforced composite materials), carbon-containing composites, or combinations thereof.

In some embodiments, a solid plate (e.g., solid plate 201) of the housing and/or stack comprises carbon fiber. Carbon fiber may be present in the solid plate in a relatively high amount (e.g., greater than or equal to 50 wt %, greater than or equal to 75 wt %, greater than or equal to 90 wt %, greater than or equal to 95 wt %, greater than or equal to 99 wt %, 100 wt %). Carbon fiber can, in some cases, afford relatively high stiffness and/or strength while having a relatively low mass (e.g., by having a relatively low mass density). It has been discovered, in the context of the present disclosure, that certain types of carbon fiber solid plates can allow for the application of relatively high magnitudes of anisotropic force to the electrochemical cells of the battery with relatively uniform distributions across multiple of the electrochemical cells without burdening the battery with too much mass. In some embodiments, the carbon fiber comprises unidirectional carbon fiber. In other words, in some embodiments, at least one layer (or all layers) of the carbon fiber material of the solid plate is unidirectional within the layer. While relatively thin and/or twill weave carbon fiber materials are known, it has been discovered herein that unidirectional carbon fiber laminates may afford relatively beneficial properties (e.g., high stiffness and/or strength, low deflection under load). In some embodiments, the housing comprises a solid plate comprising carbon fiber, the solid plate having a thickness of at least 5 mm, at least 8 mm, at least 10 mm, and/or up to 12 mm, up to 15 mm, up to 20 mm, or more.

Figure 4B:
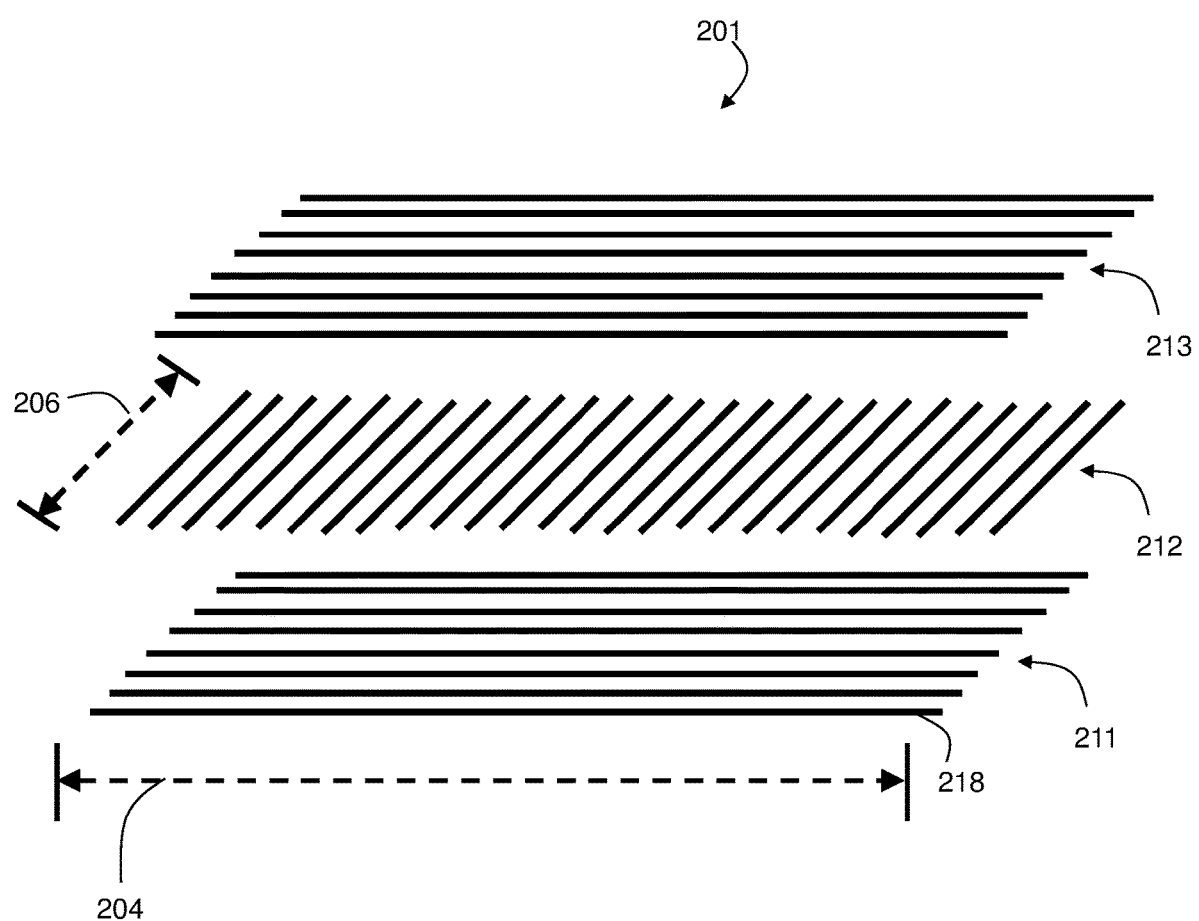
FIGS. 4B-4D show exploded view schematic diagrams of solid plates comprising layers of carbon fiber, according to some embodiments.
Figure 4C:
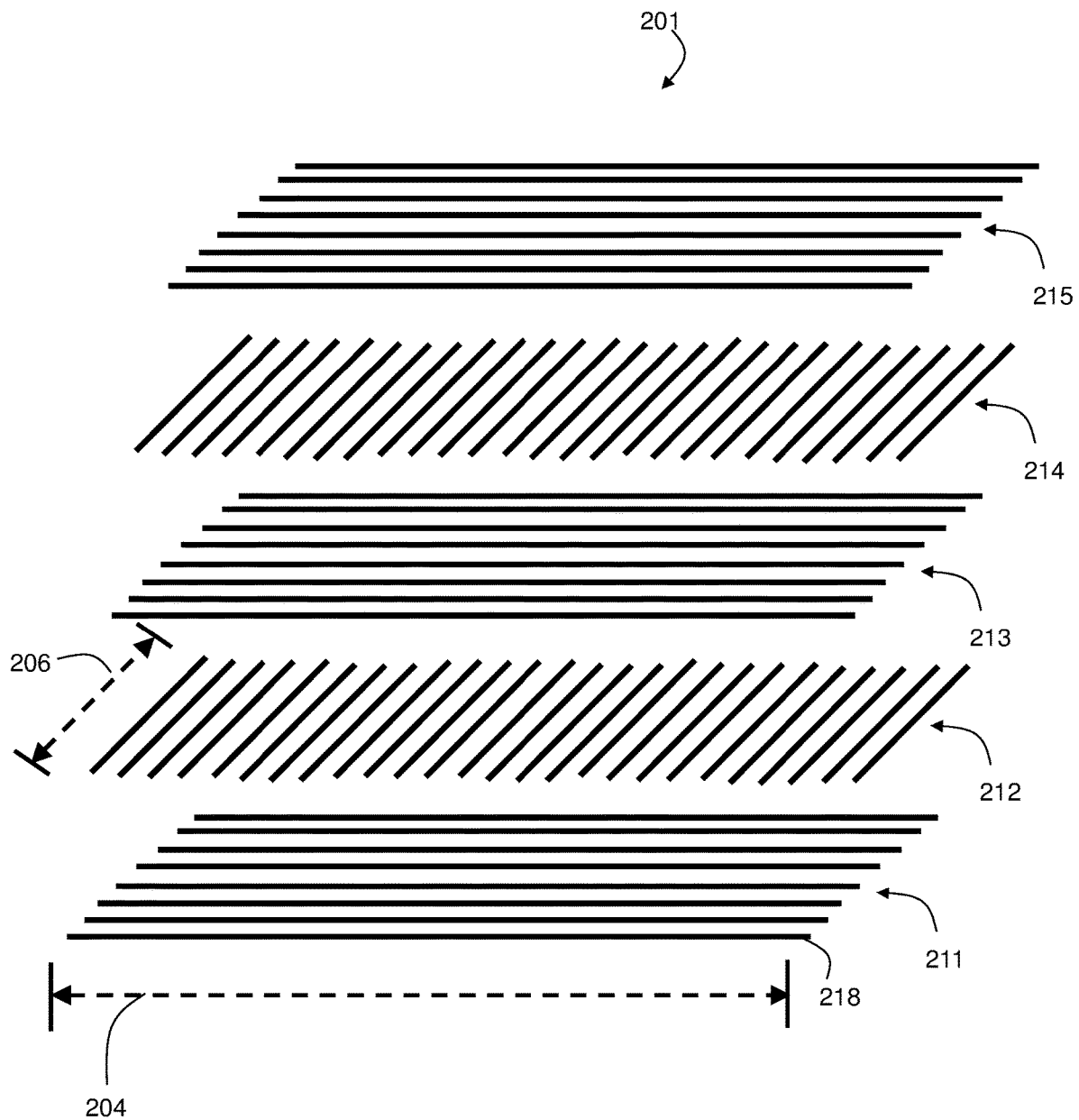
Figure 4D:
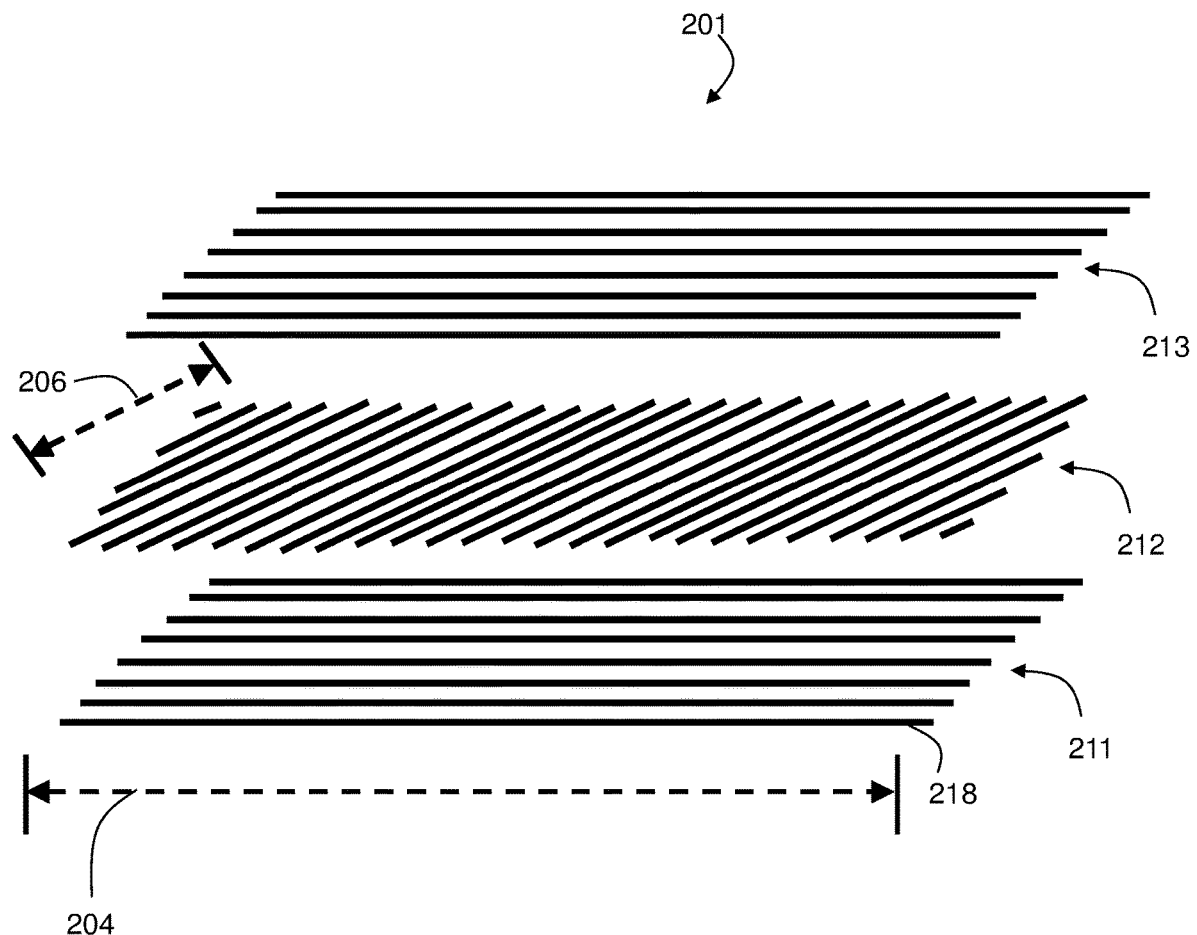
Figure 4E:
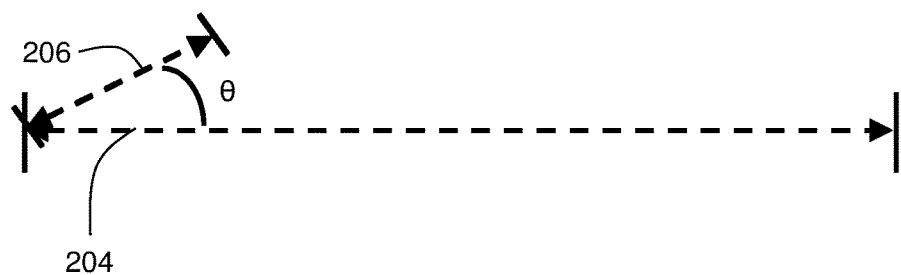
FIG. 4E shows an angle between the orientation of carbon fibers within layers of carbon fiber, according to some embodiments.

In some embodiments, the solid plate comprises multiple layers of carbon fiber (e.g., unidirectional carbon fiber). In some such embodiments, the solid plate of the housing comprises a first layer comprising carbon fibers substantially parallel to a first direction in the plane of the first layer and a second layer comprising carbon fibers substantially parallel to a second direction in the plane of the second layer. In some embodiments, two lines in a plane can be substantially parallel if, for example, the maximum angle defined by the two lines is less than or equal to 10°, less than or equal to 5°, less than or equal to 2°, or less than or equal to 1°. The angle between the first direction and the second direction may be an angle θ. In embodiments in which such a layer orientation pattern is repeated, the pattern can be represented as "[θ°/θ]." In some embodiments, θ is greater than or equal to (i.e., more positive than) −90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45°, less than or equal to 30°, less than or equal to 15°, or less. Combinations of these ranges (e.g., θ greater than or equal to −90° and less than or equal to 90°) are possible. In some embodiments, θ has a non-zero value. In some embodiments, the solid plate comprises a third layer comprising carbon fibers substantially parallel to the first direction. In embodiments in which such a layer orientation pattern is repeated, the pattern can be represented as "[θ°/θ/0°]." FIG. 4D shows one such embodiment, where first solid plate 201 comprises first layer 211 comprising carbon fibers 218 substantially parallel to first direction 204, second layer 212 comprising carbon fibers 218 substantially parallel to second direction 206, and third layer 213 comprising carbon fibers 218 substantially parallel to first direction 204. FIG. 4E shows angle θ between first direction 204 and second direction 206 for the embodiment illustrated in FIG. 4D. For example, the solid plate of the housing may comprise, in order: a first layer comprising carbon fibers substantially parallel to a first direction in the plane of the first layer, a second layer comprising carbon fibers substantially parallel to a second direction in the plane of the second layer substantially perpendicular (e.g., within 10°, within 5°, within 2°, within 1° of perpendicular) to the first direction, and a third layer comprising carbon fibers substantially parallel to the first direction. Put a different way, in some embodiments θ is within 10°, within 5°, within 2°, within 1° of 90°. Each of the individual layers may have a unidirectional weave. FIG. 4B depicts one such example, where first solid plate 201 comprises first layer 211 comprising carbon fibers 218 substantially parallel to first direction 204, second layer 212 comprising carbon fibers 218 substantially parallel to second direction 206, which is substantially perpendicular to first direction 204, and third layer 213 comprising carbon fibers 218 substantially parallel to first direction 204, according to some embodiments. It has been observed that, in some cases, carbon fiber materials having such a "[0°/90°/0°]" orientation of layers may have higher strength and/or stiffness than other types of carbon fiber materials. While FIG. 4B shows an embodiment of solid plate 201 comprising three layers, more layers are possible. In some embodiments, the solid plate further comprises, in order, a fourth layer comprising carbon fibers substantially parallel to the second direction and a fifth layer comprising carbon fibers parallel to the first direction. FIG. 4C shows one such embodiment, where first solid plate 201 comprises first layer 211 comprising carbon fibers 218 substantially parallel to first direction 204, second layer 212 comprising carbon fibers 218 substantially parallel to second direction 206, which is substantially perpendicular to first direction 204, third layer 213 comprising carbon fibers 218 substantially parallel to first direction 204, fourth layer 214 comprising carbon fibers 218 substantially parallel to second direction 206, and fifth layer 215 comprising carbon fibers 218 substantially parallel to first direction 204. In some embodiments, the solid plate of the housing comprises at least 1, at least 2, at least 3, at least 5, at least 10, at least 15, and/or up to 20, up to 25, up to 50, up to 60, up to 75, or more layers of carbon fiber (e.g., layered carbon fiber with oriented fibers) as described herein. Some or all of these layers (e.g., oriented layers) may have certain mechanical properties described below (e.g., modulus).

Figure 4F:
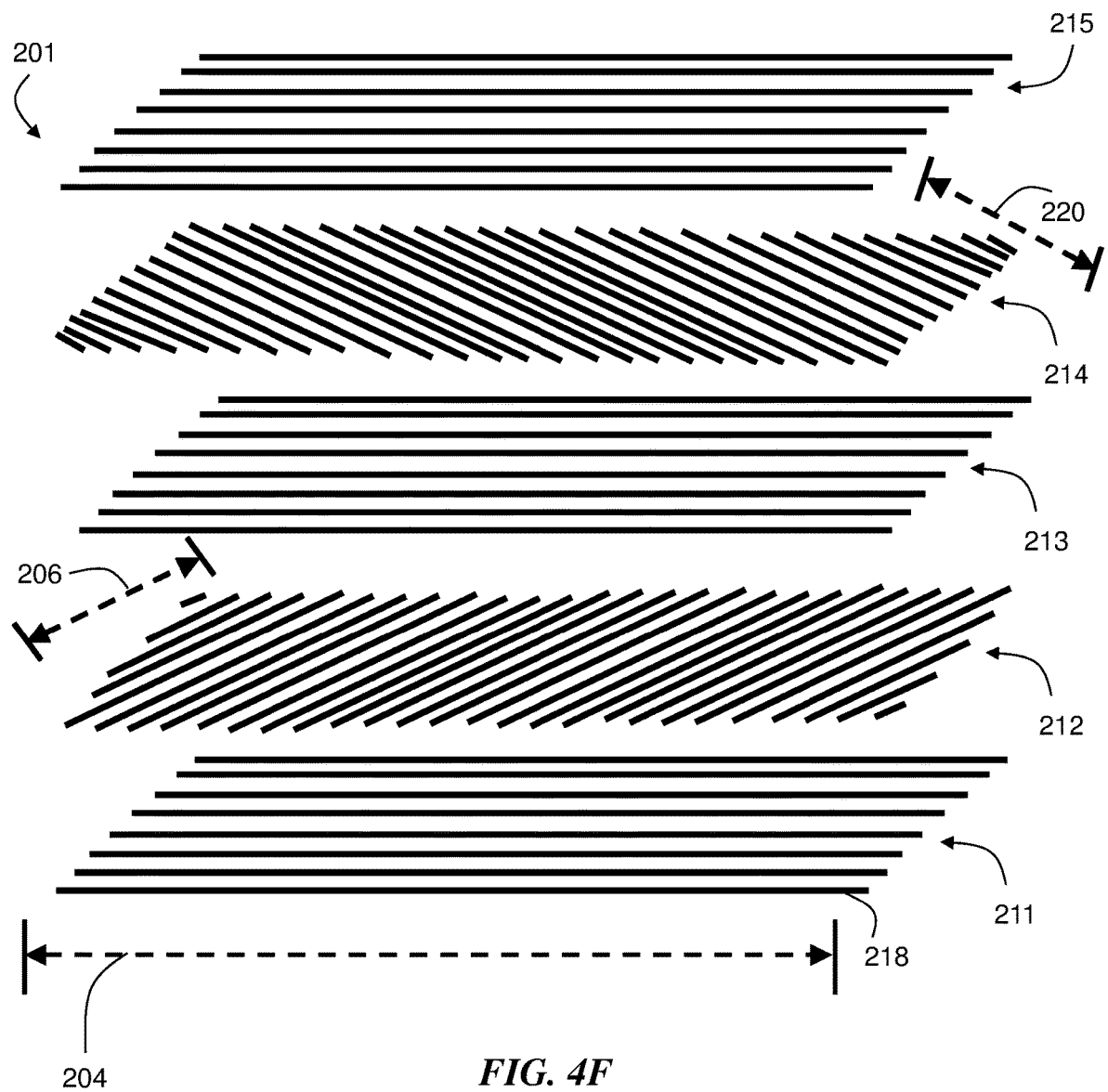
FIG. 4F shows an exploded view schematic diagram of a solid plate comprising layers of carbon fiber, according to some embodiments.
Figure 4G:
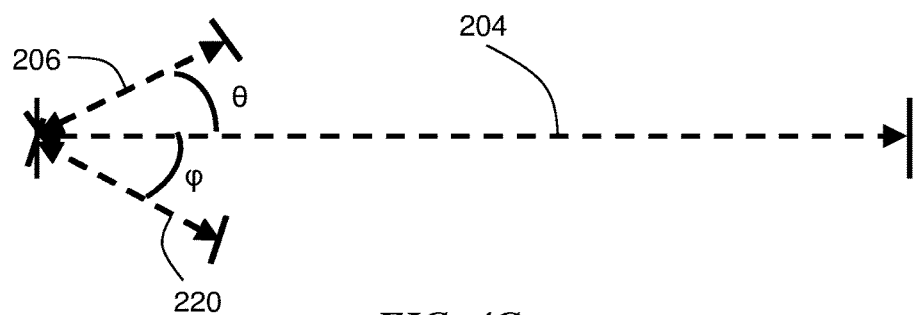
FIG. 4G shows angles between the orientation of carbon fibers within layers of carbon fiber, according to some embodiments.

In some embodiments, the multiple layers of carbon fiber comprise, in order: a first layer comprising carbon fibers substantially parallel to a first direction in the plane of the first layer, a second layer comprising carbon fibers substantially parallel (e.g. within 10°, within 5°, within 2°, within 1° of parallel) to a second direction in the plane of the second layer, a third layer comprising carbon fibers substantially parallel to the first direction in the plane of the third layer, a fourth layer comprising carbon fibers substantially parallel (e.g. within 10°, within 5°, within 2°, within 1° of parallel) to a third direction in the fourth layer, and a fifth layer comprising carbon fibers substantially parallel to the first direction in the plane of the fifth layer. The angle between the first direction and the second direction may be an angle θ, and the angle between the first direction and the third direction may be an angle φ. In embodiments in which such a layer orientation pattern is repeated, the pattern can be represented as "[0°/θ/0°/φ/0°]." It should be understood that when notation of this form is used, the direction of each layer may be within 100 (i.e., +/−10°) of the direction denoted by the angle value in the notation. For example, a layer orientation having repeating units in which the first layer is at 0°, the second layer is at θ, the third layer is at 5°, the fourth layer is at φ, and the fifth layer is at −10° would be considered to have a "[0°/θ/0°/φ/0°]" layer orientation pattern because each layer is within 100 of the value indicated by the notation. Each of the individual layers may have a unidirectional weave. In some embodiments, θ is greater than or equal to (i.e., more positive than) −90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45°, less than or equal to 30°, less than or equal to 15°, or less. Combinations of these ranges (e.g., θ greater than or equal to −90° and less than or equal to 90°) are possible. In some embodiments, φ is greater than or equal to −90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45° less than or equal to 30°, less than or equal to 15°, or less. Combinations of the ranges (e.g., φ greater than or equal to −90° and less than or equal to 90°) are possible. In some embodiments, φ has a nonzero value. In some embodiments, the value of φ is equal to the negative value of θ (e.g., θ equals 30° and φ equals −30°, or θ equals 60° and φ equals −60°). FIG. 4F shows one such embodiment, where first solid plate 201 comprises first layer 211 comprising carbon fibers 218 substantially parallel to first direction 204, second layer 212 comprising carbon fibers 218 substantially parallel to second direction 206, third layer 213 comprising carbon fibers 218 substantially parallel to first direction 204, fourth layer 214 comprising carbon fibers 218 substantially parallel to third direction 220, and fifth layer 215 comprising carbon fibers 218 substantially parallel to first direction 204. FIG. 4F shows angle θ between first direction 204 and second direction 206 and angle φ between first direction 204 and third direction 220 for the embodiment illustrated in FIG. 4G.

The multiple layers of carbon fiber may include repeating units of the patterns of layer orientations described above (e.g., repeating units of [0°/θ], [0°/θ/0°], [0°/θ/0°/φ/0°], etc.). It has been observed that some patterns of unidirectional carbon fiber layers, with certain orientations (e.g., where θ equals 300 and φ equals −30°, denoted as "[0°/30°/0°/−30/0°]") can afford properties that are beneficial in some scenarios. For example, it has been observed that solid articles such as solid plates having some such patterns of unidirectional carbon fiber layers demonstrate less deflection under applied load than otherwise identical solid articles such as solid plates lacking such patterns (e.g., solid plates in which the carbon fibers of each layer are all substantially parallel).

In some embodiments, the solid plate comprises carbon fiber having a relatively high modulus. For example, in some embodiments the solid plate comprises layers comprising carbon fiber, and one or more of the layers has a relatively high tensile modulus and a relatively high flexural modulus. In some embodiments, the solid plate comprises layers comprising carbon fiber, one or more of the layers having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid plate comprises layers comprising carbon fiber, one or more of the layers having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.). Combinations of the ranges (e.g., a tensile modulus of at least 120 GPa and less than or equal to 650 GPa and a flexural modulus of at least 120 GPa and less than or equal to 650 GPa) are possible. The tensile modulus of a layer can be measured using ASTM D3039, and the flexural modulus can be measured using ASTM D790. In certain instances, the solid plate has a relatively large number of layers satisfying the modulus ranges above. For example, in some embodiments, the solid plate comprises at least 1, at least 2, at least 3, at least 5, at least 10, at least 15, and/or up to 20, up to 25, up to 50, up to 60, up to 75, or more layers comprising carbon fiber having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid plate comprises at least 1, at least 2, at least 3, at least 5, at least 10, at least 15, and/or up to 20, up to 25, up to 50, up to 60, up to 75, or more layers comprising carbon fiber having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.).

The housing may comprise couplings that can be used to connect components of the housing and/or apply the anisotropic force. The housing may comprise, for example, couplings proximate to the ends of the housing (e.g., proximate to the ends of the solid plates). FIG. 4A shows coupling 205 connecting first solid plate 201 and second solid plate 203, according to certain embodiments. In some embodiments, the housing of the battery has more than one coupling. In certain cases, the housing includes at least 2 couplings, at least 4 couplings, and/or up to 8 couplings or more. In some embodiments, the coupling comprises a fastener. The fastener may span from one end of the housing to another. As one example, coupling 205 in FIG. 4A may be a fastener spanning from first solid plate 201 to second plate 203 of housing 202. Exemplary fasteners include, but are not limited to, a rod (e.g., a threaded rod, a rod with interlocking features), a bolt, a screw (e.g., a machine screw), a nail, a rivet, a tie, a clip (e.g., a side clip, a circlip), a band, or combinations thereof. In some cases, applying a force comprises causing relative motion between one portion of the coupling (e.g., a nut) and a fastener of the coupling (e.g., by tightening a nut at an interface between the fastener and the solid plate or, in cases where the fastener comprises a machine screw, by turning the machine screw).

Some embodiments may comprise at least partially charging and/or discharging electrochemical cells in a battery, such that the electrochemical cells undergo a cumulative expansion during the charging and/or discharging. The cumulative expansion of the electrochemical cells refers to the sum of the changes in thicknesses of the electrochemical cells themselves, not counting any other components of the battery (e.g., foams, sensors, plates, etc.). For example, referring to FIGS. 1A-1B, during the process of at least partially charging and/or discharging battery 100, first electrochemical cell 110 and second electrochemical cell 120 may expand (e.g., in thickness). Such an expansion may occur due, for example, to the deposition of lithium metal on an anode when lithium metal is used as an anode active material. In some embodiments, the electrochemical cells undergo the cumulative expansion during charging. During the expansion, first electrochemical cell 110 may expand from thickness 117 in FIG. 1A to thickness 217 in FIG. 1B, and second electrochemical cell 120 may expand from thickness 123 in FIG. 1A to thickness 223 in FIG. 1B, according to certain embodiments. The difference between the sum of thickness 117 and thickness 123 and the sum of thickness 217 and thickness 223 would then be the cumulative expansion of first electrochemical cell 110 and second electrochemical cell 120. Meanwhile, in some, but not necessarily all embodiments, the battery as a whole also undergoes an expansion during the charging and/or discharging. For example, battery 100 may expand from thickness 103 in FIG. 1A to thickness 107 in FIG. 1B, according to certain embodiments. In some embodiments, the electrochemical cells of the battery may undergo a cumulative expansion that is relatively large, while an expansion of the battery is relatively small. It has been discovered that certain inventive aspects of the present disclosure, such as the application of relatively high magnitudes of force to multiple electrochemical cells, the use of strong and/or stiff housings (e.g., comprising certain carbon fiber plates), and the use of compressible components such as the thermally insulating compressible solid article portions described below, may afford such a small (or no) expansion of the battery even when the electrochemical cells expand to a relatively large extent.

In some embodiments, the electrochemical cells of the battery undergo a cumulative expansion during the charging and/or discharging of at least 10%, at least 15%, at least 20%, and/or up to 30% or more, while an expansion of the battery during the charging and/or discharging is less than or equal to 0.75%, less than or equal to 0.5%, less than or equal to 0.1%, and/or as low as 0.05%. In some embodiments, the electrochemical cells undergo a cumulative expansion during the charging and/or discharging, wherein a ratio of the cumulative expansion of the electrochemical cells to an expansion of the battery is greater than or equal to the total number of electrochemical cells in the battery. For example a battery comprising 12 electrochemical cells may undergo a cumulative expansion of 13 mm, and the battery may undergo an expansion of 0.9 mm, and therefore the ratio of the cumulative expansion of the electrochemical cells to the expansion of the battery is 13 divided by 0.9=14.4, which is greater than the number of electrochemical cells in the battery (12). In some embodiments, the electrochemical cells undergo a cumulative expansion during the charging and/or discharging of greater than 1 mm, greater than or equal to 1.2 mm, greater than or equal to 1.5 mm, greater than or equal to 2 mm, greater than or equal to 5 mm, greater than or equal to 10 mm, greater than or equal to 12 mm, and/or up to 20 mm, up to 30 mm, or more, and an expansion of the battery during the charging and/or discharging is less than or equal to 1 mm, less than or equal to 0.75 mm, less than or equal to 0.5 mm, and/or as low as 0.2 mm, as low as 0.1 mm, or less. It should be understood that in some embodiments, the cumulative expansion of the electrochemical cells may be in any of the above-mentioned ranges, while the battery does not expand at all. For example, in some embodiments, one or more components of the battery (e.g., a compressible component such as a thermally insulating compressible solid article portion) may absorb the expansion by compressing to an equal extent. In some embodiments, during the cumulative expansion of the electrochemical cells, each electrochemical cell expands by at least 1 mm. In some embodiments, the cumulative expansion of the electrochemical cells is at least 12 mm.

In some embodiments, the battery has a relatively small volume. It has been observed that certain aspects described herein, alone or in combination, such as the solid plates comprising carbon fiber, the solid housing components described in more detail below, the thermally insulating compressible solid article portions, and the thermally conductive solid article portions, can allow for relatively high magnitudes of force and/or relatively high energy densities for the battery, even with a relatively small volume. In some embodiments, the battery has a volume of less than or equal to 15000 cm$^3$, less than or equal to 13500 cm$^3$, less than or equal to 12000 cm$^3$, less than or equal to 10000 cm$^3$, less than or equal to 8000 cm$^3$, less than or equal to 6750 cm$^3$, less than or equal to 6000 cm$^3$, less than or equal to 5000 cm$^3$, and/or as low as 4000 cm$^3$, or lower. As described in more detail below, certain configurations of the housing may provide for an ability to enclose a relatively large amount of electrochemical cell volume and/or apply relatively high force while having a relatively small housing volume.

In some embodiments, the battery has a relatively high energy density, as described above. In some embodiments, the battery has a specific energy of greater than or equal to 250 Wh/kg. In some embodiments, the battery has a specific energy of greater than or equal to 280 Wh/kg, greater than or equal to 290 Wh/kg, greater than or equal to 300 Wh/kg, and/or up to 320 Wh/kg, up to 350 Wh/kg, or more. In some embodiments, the battery has a volumetric density of greater than or equal to 230 Wh/L, greater than or equal to 250 Wh/L, greater than or equal to 280 Wh/L, and/or up to 300 Wh/L, or higher.

The battery may have a relatively high energy density and/or apply a relatively high magnitude of force while having a relatively low pack burden (defined as one minus the mass of the electrochemical cells of the battery divided by the total mass of the battery). Expressed as an equation, pack burden=1−(mass of the electrochemical cells/mass of the battery). In some embodiments, the battery has a pack burden of less than or equal to 50%, less than or equal to 45%, less than or equal to 40%, less than or equal to 35%, less than or equal to 30%, and/or as low as 25%, as low as 20%, or lower.

In some embodiments, the battery includes components configured such that the battery (or portions of the battery) has a relatively low volume for a given size of electrochemical cells, compared to other configurations. Having a relatively low housing volume while having relatively large electrochemical active regions of cells may afford relatively large volumetric energy densities. Relatively large volumetric energy densities may be advantageous in certain applications where limited space for batteries is available, but where a large amount of stored energy may be desired, such as certain battery-powered vehicles. It has been realized that certain existing housings configured to apply anisotropic forces may have arrangements or operate under mechanisms that require relatively large spatial profiles. For example, housings configured to apply anisotropic forces to electrochemical cells via solid plates generally include fasteners spanning between solid plates. Tension in the fasteners may contribute some or all of the force applied to the cells within the housings. The battery in FIG. 4A is one such example. However, while such configurations may be useful for certain applications, the use of fasteners for applying tension when applying force via solid plates generally requires a relatively large lateral extension of pressure-applying components of the housing past lateral dimensions of electrochemical active regions of the electrochemical cells. Such "overhang" of housing components with respect to the cells may contribute to a large volume of the overall housing and battery. Certain embodiments herein are directed to application of force to electrochemical cells (e.g., the first electrochemical cell, the second electrochemical cell) with relatively low lateral extension of solid plates and/or pressure-applying components.

Figure 5:
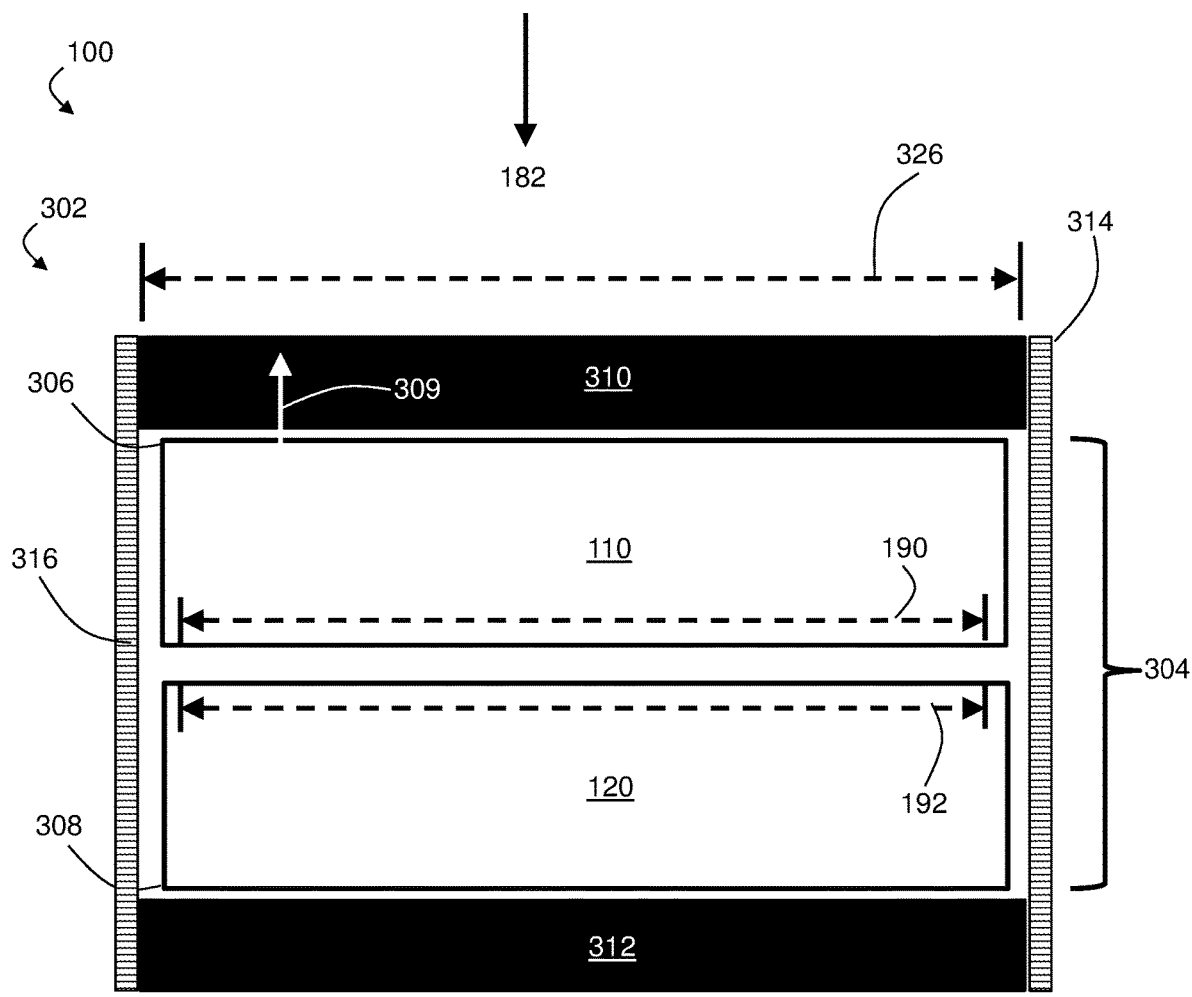
FIG. 5 shows a cross-sectional schematic diagram of an exemplary battery comprising a stack comprising electrochemical cells, and a housing that comprises a solid plate and a solid housing component, according to some embodiments.

In some embodiments, the battery comprises a stack comprising electrochemical cells (e.g., the first electrochemical cell, the second electrochemical cell). It should be understood that the stack may be a multicomponent stack comprising non-cell components such as thermally insulating compressible solid article portions, thermally conductive solid article portions, and/or sensors. In some embodiments, the stack includes a solid plate. In some embodiments, the stack is at least partially enclosed by a housing comprising a solid plate. The solid plate may cover at least a portion (e.g., at least 10%, at least 25%, at least 50%, at least 75%, at least 90%, at least 95%, or all) of an end of the stack. A portion of a surface (e.g., an end of a stack) of an object is considered covered by a second object in this context if there exists a line perpendicular to and extending out of the portion of the surface and away from a bulk of the object that intersects any of the second object. Those of ordinary skill in the art will appreciate that any stack of components (e.g., cells) includes two ends: the first end corresponds to the external surface of the first component (e.g., first cell) that faces away from the bulk of the stack, and the second end corresponds to the external surface of the last component (e.g., last cell) that faces away from the bulk of the stack. In the schematic cross-sectional illustration in FIG. 5, battery 100 comprises housing 302 comprising solid plate 310, where housing 302 at least partially encloses stack 304 comprising first electrochemical cell 110 and second electrochemical cell 120, in accordance with some embodiments. Stack 304 has first end 306 corresponding to the external surface of first electrochemical cell 110 that faces away from the bulk of stack 304, and stack 304 also has second end 308 corresponding to the external surface of second electrochemical cell 120 that faces away from the bulk of stack 304, according to certain embodiments. In FIG. 5, solid plate 310 covers at least a portion of first end 306 of stack 304, because line 309 perpendicular to and extending out of first end 306 and away from the bulk of stack 304 intersects plate 310. Similarly, in FIG. 10A below, solid housing component 314 covers at least a portion of first end 306 of stack 304, because line 309 perpendicular to and extending out of first end 306 and away from the bulk of stack 304 intersects solid housing component 314.

As noted above, in some embodiments, the housing of the battery further comprises a solid housing component coupled to a solid plate. In some embodiments, the solid housing component is a discrete object separate from the solid plate rather than part of a unitary object with the solid plate (though in some embodiments the solid housing component and the solid plate are part of a unitary solid object). The solid housing component (e.g., discrete solid housing component) may contribute, at least in part, to application of anisotropic force by the housing (e.g., to an electrochemical cell in the stack). For example, in some embodiments, the housing is configured to apply, via the solid plate and tension in the solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell. As noted above, the anisotropic force may define a pressure of at least 10 $kg_f/cm^2$, at least 12 $kg_f/cm^2$, at least 20 $kg_f/cm^2$, and/or up to 25 $kg_f/cm^2$, up to 30 $kg_f/cm^2$, up to 35 $kg_f/cm^2$, up to 40 $kg_f/cm^2$, or more. The solid housing component (e.g., discrete solid housing component) may contribute to force application by being coupled to a first solid plate (e.g., covering at least a portion of a first end of the stack, or a solid plate between the solid housing component and the first electrochemical cell) and a second component of the housing covering at least a portion of a second end of the stack (e.g., a second solid plate or a part of a frame). For example, referring again to FIG. 5, housing 302 comprises solid housing component 314 coupled to first solid plate 310 and second solid plate 312 (which covers second end 308 of stack 304). Tension in solid housing component 314 may contribute force causing first solid plate and/or second solid plate 312 to compress stack 304, thereby applying an anisotropic force in direction of arrow 182 having component 182 normal to a first electrode active surface of first electrochemical cell 110 and/or a second electrode active surface of second electrochemical cell 120.

Figure 6A:
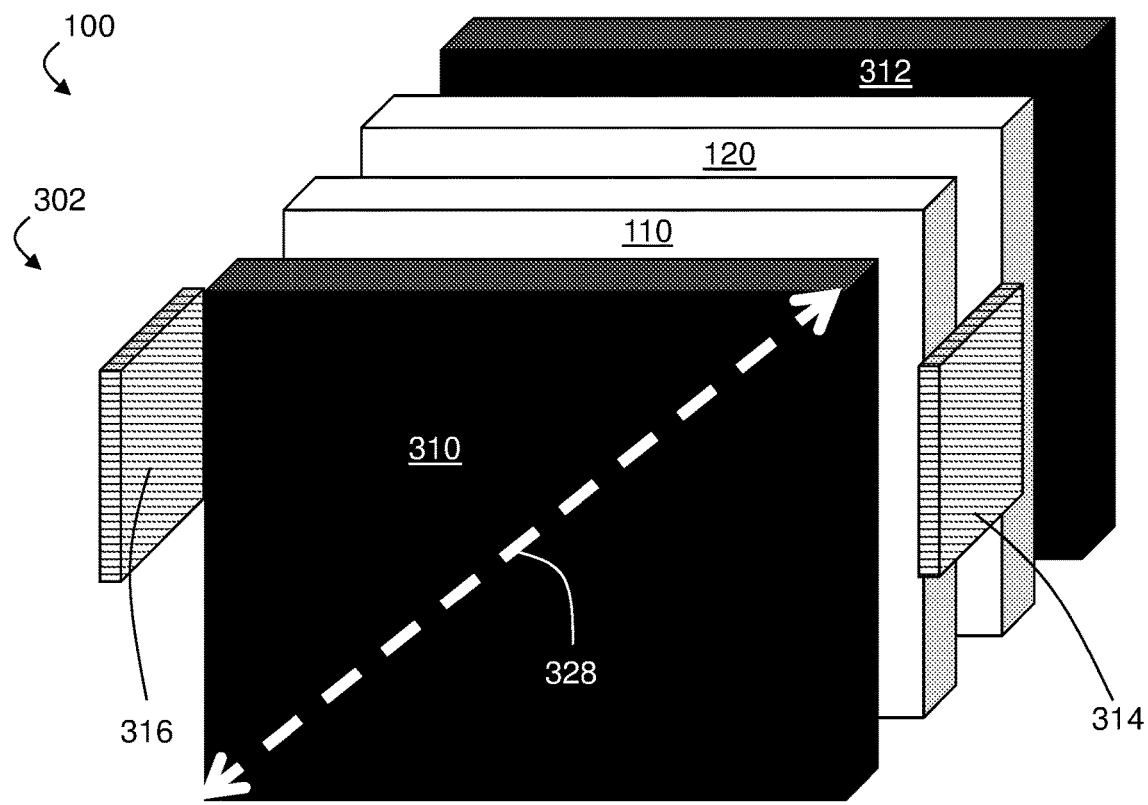
FIG. 6A shows an exploded perspective schematic diagram of an exemplary battery comprising a stack comprising electrochemical cells, and a housing that comprises a solid plate and a solid housing component, according to some embodiments.
Figure 6B:
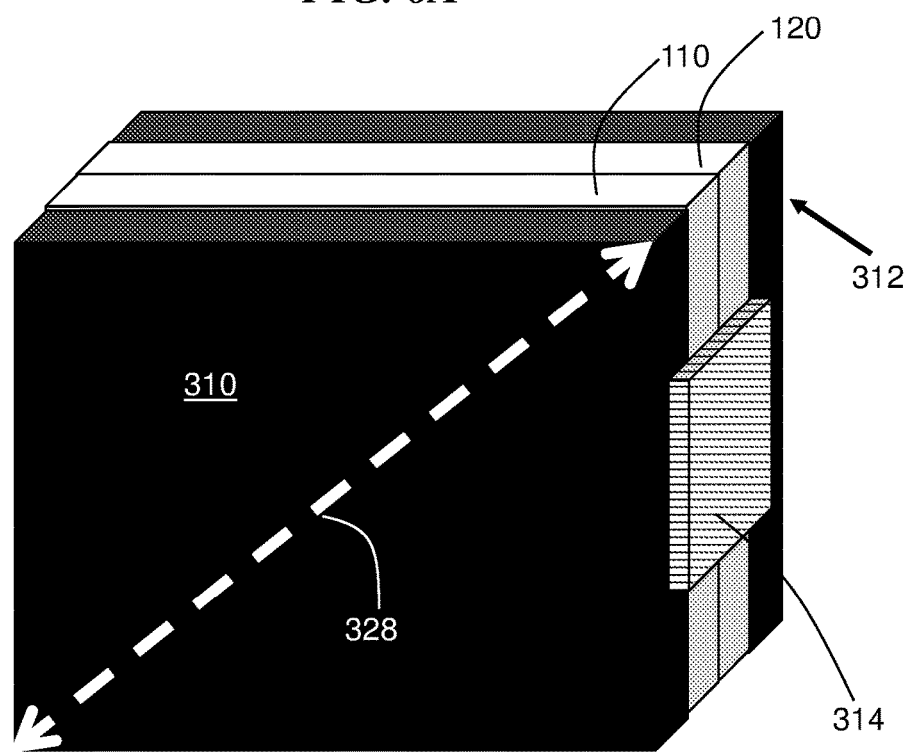
FIG. 6B shows a perspective schematic diagram of an exemplary battery comprising a stack comprising electrochemical cells, and a housing that comprises a solid plate and a solid housing component, according to some embodiments.

The solid plate may have a largest lateral dimension that is relatively small with respect to an electrochemical active region of one or more of the electrochemical cells in the battery. Electrochemical active regions of electrochemical cells are described in more detail below in connection with FIG. 22. FIG. 5 shows lateral dimension 326 of solid plate 310 as an illustrative example. FIG. 5 also shows first electrochemical active region 190 of first electrochemical cell 110 and second electrochemical active region 192 of second electrochemical cell 120, according to some embodiments. FIGS. 6A-6B show exploded view (FIG. 6A) and perspective (FIG. 6B) schematic illustrations of battery 100 including housing 302 at least partially enclosing first electrochemical cell 110 and second electrochemical cell 120, in accordance with some embodiments. In FIGS. 6A-6B, housing 302 comprises solid plate 310 having largest lateral dimension 328, as illustrated by the dashed line with arrows. Solid plate 310 may be a first solid plate, and housing 302 may further comprise second solid plate 312 coupled to first solid plate via solid housing component 314.

In some embodiments in which the stack comprises a first electrochemical cell comprising a first electrochemical active region and a second electrochemical cell comprising a second electrochemical active region, a ratio of the largest lateral dimension of the solid plate to the largest lateral dimension of the first electrochemical active region and/or a ratio of the largest lateral dimension of the solid plate to the largest lateral dimension of the second electrochemical active region is less than or equal to 1.5, less than or equal to 1.4, less than or equal to 1.3, less than or equal to 1.2, less than or equal to 1.1, less than or equal to 1.05, less than or equal to 1.02, less than or equal to 1.01, and/or as low as 1.005, as low as 1.001, or as low as 1.

The housing of the battery may have a largest lateral pressure-applying dimension. A lateral pressure-applying dimension refers to a dimension of the housing parallel with the lateral exterior surfaces of components of the stack and the solid plate that corresponds to components of the housing under tension such that they participate in the application of pressure to the electrochemical cells of the stack via the anisotropic force discussed above.

Figure 6C:
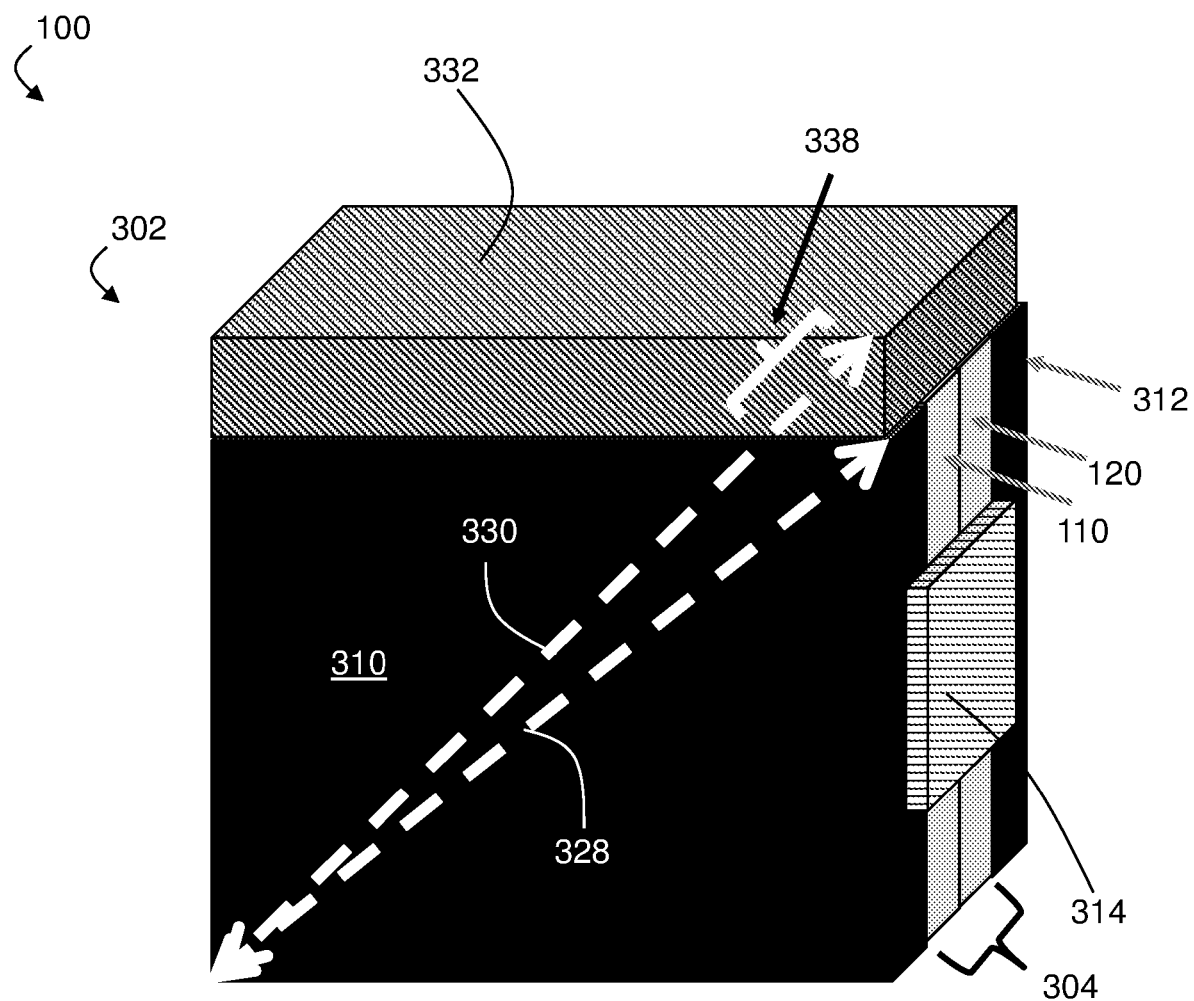
FIG. 6C shows a perspective schematic diagram of an exemplary battery comprising a stack comprising electrochemical cells, and a housing that comprises a solid plate, a solid housing component, and an electronics component, according to some embodiments.

FIG. 6C illustrates the concept of a lateral pressure-applying dimension of a housing. Battery 100 comprises housing 302 comprising solid plate 310, solid housing component 314, and electronics component 332 coupled to solid plate 310 and positioned along a side of stack 304. Housing 302 has largest lateral pressure-applying dimension 328 between far corners of solid plate 310. (While this matches the largest lateral dimension of solid plate 310 in the pictured embodiment, such an occurrence is not necessary, as in other embodiments parts beyond the solid plate may be pressure-applying and contribute to a largest lateral pressure-applying dimension). All components of housing 302 within largest lateral pressure-applying dimension 302 are under tension during application of force by the housing to first electrochemical cell 110 and/or second electrochemical cell 120. Housing 302 also has an overall largest lateral dimension 330 from a corner of solid plate 310 to a far corner of electronics component 332. However, because in this embodiment housing 302 is configured to apply the anisotropic force via solid plate 310 and tension in solid housing component 314, electronics component 332 is not under tension and consequently does not substantially contribute to the application of pressure to first electrochemical cell 110 and/or second electrochemical cell 120. Electronics component 332 would therefore not be considered part of a lateral pressure-applying dimension of housing 302. As a result, part 338 of overall largest lateral dimension 330 is not pressure-applying, and overall largest lateral dimension 330 is larger than the largest lateral pressure-applying dimension 328 of housing 302.

The housing may have a largest lateral pressure-applying dimension that is relatively small with respect to an electrochemical active region of one or more of the electrochemical cells in the battery. Having a relatively small lateral pressure-applying profile of the housing may stand in contrast to certain existing pressure-applying housings having larger lateral pressure-applying profiles (e.g., due to lateral space needed for load-applying fasteners to pass through one or more components of the housing such as a solid plate). Certain embodiments of this disclosure are directed to various techniques and configurations that can make housings having relatively small lateral pressure-applying profiles practical (e.g., via certain configurations of solid housing components). Small pressure-applying regions of housings (relative to the electrochemical cells) may afford overall batteries having relatively small volumes, which can be advantageous in some applications.

In some embodiments in which the stack comprises a first electrochemical cell comprising a first electrochemical active region and a second electrochemical cell comprising a second electrochemical active region, a ratio of the largest lateral pressure-applying dimension to the largest lateral dimension of the first electrochemical active region and/or a ratio of the largest lateral pressure-applying dimension of the solid plate to the largest lateral dimension of the second electrochemical active region is less than or equal to 1.6, less than or equal to 1.5, less than or equal to 1.4, less than or equal to 1.3, less than or equal to 1.2, less than or equal to 1.1, less than or equal to 1.05, less than or equal to 1.02, less than or equal to 1.01, and/or as low as 1.005, as low as 1.001, or as low as 1. In some embodiments, at least 90%, at least 95%, at least 99%, or all of the first electrochemical active region of the first electrochemical cell and/or the second electrochemical active region of the second electrochemical cell is covered by a portion of the housing within the largest lateral pressure-applying dimension of the housing.

The solid housing component may couple (or contribute to coupling of) the solid plate covering at least a portion of a first end of the stack to a component of the housing covering at least a portion of second end of the stack. Such a coupling via the solid housing component (e.g., solid housing component 314) may contribute to the anisotropic force applied by the housing. In some embodiments, the solid housing component spans from the solid plate to the second end of the stack. For example, in FIG. 5, solid housing component 314 spans from first solid plate to second end 308 of stack 304. It should be understood that an object spanning from a first element to a second element may extend past some or all of either the first element of the second element, provided that it reach at least a portion of each the two elements in the direction of the spanning. For example, in FIG. 5, solid housing component 314, which reaches all of but does not extend past solid plate 310 and extends past second end 308, is considered to span from solid plate 310 to second end 308. In some embodiments in which the housing comprises a first solid plate covering at least a portion of the first end of the stack and a second solid plate covering at least a portion of the second end of the stack (e.g., as shown in FIG. 5), the solid housing component spans from the first solid plate to the second solid plate.

Solid housing components may join two or more parts of the housing via any of a variety of coupling techniques. The solid housing components may be part of the underlying structure of the housing. For example, in some embodiments, the housing comprises a frame at least partially enclosing the stack, and a solid housing component is a part of the frame (e.g., a side of the frame joining two ends of the frame). The housing may have a single solid housing component, or the housing may comprise multiple solid housing components. In some embodiments, the housing comprises a first solid housing component along a first side of the stack and a second solid housing component on along a second (e.g., opposite) side of the stack. Housing 302 in FIG. 5 shows one such embodiment, where first solid housing component 314 and optional second solid housing component 316 are along opposite sides of stack 304.

In some embodiments, no auxiliary fastener spanning from the solid plate toward the second end of the stack along a side of the stack is in tension during application of the anisotropic force. An auxiliary fastener in this context is a fastener that is not part of the underlying housing structure. For example, in FIG. 4A, where housing 202 comprises first solid plate 201 coupled to second solid plate 203 via a fastener in the form of rod 205, rod 205 is not part of the underlying structure of housing 202 and is therefore considered an auxiliary fastener. In contrast, in FIG. 5, housing 302 comprises first solid plate 310 and second solid plate 312 coupled via solid housing component 314, which is part of an underlying structure of housing 302 and is therefore not considered an auxiliary fastener. A housing in which no auxiliary fastener spans from the solid plate toward the second end of the stack along a side of the stack is in tension during application of the anisotropic force may still be able to apply the anisotropic force to the electrochemical cells of the stack even without tension from an auxiliary fastener at least because of the presence of a solid housing component in tension coupled to the solid plate, as described above and below. By not requiring an auxiliary fastener in tension for application of the anisotropic force, the housing may require less lateral extension ("overhang") of pressure-applying components such as solid plates compared to housings that employ auxiliary fasteners in tension for force application. As discussed, less lateral extension beyond electrochemical active areas of the electrochemical cell may contribute to lower overall housing and battery volumes (and higher volumetric energy density). In some embodiments, no auxiliary fastener spans from the solid plate to the second end of the stack. For example, in FIG. 5, no auxiliary fastener spans from solid plate 310 to second end 308 of stack 304, in accordance with some embodiments. In some embodiments, no auxiliary fastener passes through a thickness of the solid plate. It should be understood that while in some embodiments no auxiliary fastener spans from the solid plate to the second end of the stack (or passes through a thickness of the solid plate), other fasteners may be present in the housing. For example, in some embodiments, fasteners couple the solid housing component to the solid plate or a solid portion adjacent to the solid plate, as described in more detail below.

The solid housing component may be made of any of a variety of materials, depending on desired properties of the solid housing component and/or the overall battery. The solid housing component may be made of any of the materials described above for the solid plate. In some embodiments, the solid housing component comprises a metal (e.g., aluminum, titanium, etc.), metal alloy (e.g., stainless steel), composite, polymeric material (e.g., a rigid plastic), or combination thereof. For example, some (e.g., at least 50 wt %, at least 75 wt %, at least 90 wt %, at least 95 wt %, at least 99 wt %) or all of the solid housing component may be metal, metal alloy, polymeric material, composite, or a combination thereof. One non-limiting example of a metal alloy that may be suitable for the solid housing component is 5052-H32 aluminum, which is an aluminum alloy in which aluminum is primarily alloyed with magnesium and chromium and has been strained hardened and thermally stabilized. Other non-limiting examples of potentially suitable metals and/or metal alloys include, but are not limited to, steel (e.g., mild steel, high strength steel, stainless steel) and titanium alloys that can withstand the pressures defined by the applied anisotropic forces described in this disclosure (e.g., greater than or equal to 10 $kg_f/cm^2$ and/or up to 40 $kg_f/cm^2$ or higher). In some embodiments, the solid housing component comprises a composite material. Exemplary composite materials that the solid housing component can be or comprise include, but are not limited to, reinforced polymeric, metallic, or ceramic materials (e.g., fiber-reinforced composite materials), carbon-containing composites, or combinations thereof. For example, in some embodiments, the solid housing component comprises carbon fiber. As described above in the context of the solid plate, the solid housing component may comprise multiple layers of carbon fiber (e.g., unidirectional carbon fiber weaves, optionally with binder). In some embodiments, the solid housing component comprises multiple layers of carbon fiber (e.g., unidirectional carbon fiber) having any of the orientation patterns described above (e.g., a "[0°/90°/0°]" pattern, a "[0°/30°/0°/–30°/0°]" pattern, etc.). In some embodiments, the solid housing component comprises a woven fabric. For example, the solid housing component may comprise multiple layers of woven fabric (e.g., woven carbon fibers). It has been observed that carbon fiber composite solid housing components may afford sufficient strength and rigidity for contributing to application of anisotropic force to cells in the stack while being relatively light-weight, which may promote desirable specific energy densities for certain applications. In some embodiments where a housing comprises a solid plate and a solid housing component coupled to the solid plate, the solid plate and the solid housing component have the same composition. In some embodiments where a stack comprises a solid plate and the housing comprises a solid housing component covering the solid plate, the solid plate and the solid housing component have the same composition. For example, both may be made of the same metal or metal alloy (e.g., aluminum), polymeric material, composite (e.g., carbon fiber composite), or combination thereof. However, in some embodiments the solid plate and the solid housing component are made of different compositions (e.g., different types of materials or the same materials in different relative amounts).

In some embodiments, the solid housing component comprises a material (e.g., a composite comprising carbon fiber) having a relatively high modulus. In some embodiments, the solid housing component has a relatively high tensile modulus and a relatively high flexural modulus. In some embodiments, some or all of the solid housing component has a tensile modulus of at least 1 GPa, at least 5 GPa, at least 10 GPa, at least 20 GPa, at least 50 GPa, at least 75 GPa, at least 100 GPa, 120 GPa, at least 150 GPa, at least 200 GPa, at least 300 GPa, at least 500 GPa and/or up to 550 GPa, up to 600 GPa, up to 650 GPa, or greater, and a flexural modulus of at least 120 GPa at least 150 GPa, at least 200 GPa, at least 300 GPa, at least 500 GPa and/or up to 550 GPa, up to 600 GPa, up to 650 GPa, or greater at room temperature (25° C.). For example, in some embodiments the solid housing component comprises layers comprising a material (e.g., a composite comprising carbon fiber), and one or more of the layers has a relatively high tensile modulus and a relatively high flexural modulus. In some embodiments, the solid housing component comprises layers comprising a material (e.g., a composite comprising carbon fiber), one or more of the layers having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid housing component comprises layers comprising a material (e.g., a composite comprising carbon fiber), one or more of the layers having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.). Combinations of the ranges (e.g., a tensile modulus of at least 120 GPa and less than or equal to 650 GPa and a flexural modulus of at least 120 GPa and less than or equal to 650 GPa) are possible. In certain instances, the solid housing component has a relatively large number of layers satisfying the modulus ranges above. For example, in some embodiments, the solid housing component comprises at least 1, at least 2, at least 3, at least 5, at least 10, at least 15, and/or up to 20, up to 25, up to 50, up to 60, up to 75, or more layers comprising a material (e.g., a composite comprising carbon fiber) having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid housing component comprises at least 1, at least 2, at least 3, at least 5, at least 10, at least 15, and/or up to 20, up to 25, up to 50, up to 60, up to 75, or more layers comprising a material (e.g., a composite comprising carbon fiber) having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.).

In some embodiments, a substantial portion of the housing comprises a material (e.g., a composite comprising carbon fiber) having a relatively high modulus. In some embodiments, a material having a flexural and/or tensile modulus of at least 120 GPa, at least 150 GPa, at least 200 GPa, at least 300 GPa, at least 500 GPa, and/or up to 550 GPa, up to 600 GPa, up to 650 GPa, or higher is present in the housing in an amount of at least 50 wt %, at least 75 wt %, at least 90 wt %, at least 95 wt %, or more. Some embodiments where the housing comprises a material having a relatively high modulus may be advantageous because they facilitate batteries with a relatively small lateral profile, a relatively high volumetric energy density, and/or adequate resistance to deformation (e.g., upon application of force). In some embodiments where the housing comprises a solid plate and a solid housing component, each comprising a composite material having a relatively high modulus, such as a composite comprising carbon fiber, it can be beneficial to have some housing components with planarity parallel to a first plane and other housing components with planarity not parallel to that first plane. For example, in some embodiments it may be advantageous for a solid plate of the housing to have multiple layers of unidirectional carbon fiber having planarity parallel to a plane of the solid plate, as well as a solid housing component (e.g., a frame component spanning from the solid plate to a second end of the stack) having multiple layers of unidirectional carbon fiber with planarity nonparallel to (e.g., substantially perpendicular to) the plane of the solid plate.

While in some embodiments the solid housing component has a relatively high modulus, such a property is not necessary in all embodiments. In some embodiments, the solid housing component has a tensile strength sufficient to avoid observable deflection and/or failure when the housing applies the anisotropic force to the electrochemical cells. In some embodiments, the solid housing component has a tensile strength in at least one dimension of at least 10 MPa, at least 20 MPa, at least 50 MPa, at least 100 MPa, at least 200 MPa, at least 500 MPa, at least 1 GPa, at least 2 GPa, at least 5 GPa, and/or up to 10 GPa, up to 20 GPa, up to 50 GPa, up to 100 GPa, up to 120 GPa, or higher.

In some embodiments, components of the housing of the battery are reinforced by local increases in thickness and/or the attachment of mechanical doublers. In some embodiments, local increases in thickness and/or the attachment of mechanical doublers provide additional support for portions of the housing (e.g., solid housing components along a side of the stack) that are pressure-applying or are otherwise mechanically loaded under at least some configurations of the housing. In some embodiments, local increases in thickness and/or the attachment of mechanical doublers facilitate a reduction in the largest lateral pressure applying dimension of the housing and/or increase the gravimetric and/or volumetric energy density of the battery. A local increase in thickness or a mechanical doubler may have an area of less than 100%, less than or equal to 90%, less than or equal to 75%, less than or equal to 50%, less than or equal to 25%, less than or equal to 10%, less than or equal to 5%, or less of a corresponding solid housing component. Further, a thickness of the solid housing component at a local increase in thickness and/or a combined thickness of a solid housing component and a mechanical doubler may be greater than an average thickness of the solid housing component by a factor of greater than or equal to 1.05, greater than or equal to 1.1, greater than or equal to 1.25, greater than or equal to 1.5, greater than or equal to 2, and/or up to 3, up to 5, or greater. FIGS. 8D-8E introduce an exemplary embodiment of battery 100, where mechanical doubler 315 is attached to solid housing component 314. FIG. 8D presents an exploded perspective schematic diagram of the battery, while FIG. 8E presents a perspective schematic diagram of the battery. Note that while any feature appearing in FIGS. 8D-8E may appear in some embodiments, some embodiments can include fewer than all pictured features while still accomplishing any of a variety of the advantages and performances described above.

The solid housing component may have any of a variety of lengths while maintaining rigidity. In some embodiments, such a rigidity even at relatively long lengths (unlike traditional auxiliary fasteners) affords an ability for the ratio of the distance between a solid plate and the second end of the stack to the largest lateral dimension of the housing to be relatively large if desired. In turn, such a large ratio may allow for a relatively large number (e.g., at least 6, at least 12, or more) of electrochemical cells to be included in the stack of the battery. Such an ability for relatively long housing components spanning the stack stands in contrast to traditional auxiliary fasteners such as rods or bolts with nuts. Tension in long fasteners may produce bending moments that result in deleterious deflection. Solid housing components (e.g., comprising composites comprising carbon fiber) may not appreciably deflect under such tension. In some embodiments, the ratio of the distance between a solid plate and the second end of the stack to the largest lateral dimension of the battery is less than or equal to 20, less than or equal to 10, less than or equal to 5, less than or equal to 2, less than or equal to 1.5, less than or equal to 1, less than or equal to 0.5, less than or equal to 0.2, less than or equal to 0.1, or less. In some embodiments, the ratio of the distance between a solid plate and the second end of the stack to the largest lateral dimension of the battery is greater than or equal to 0.01, greater than or equal to 0.1, greater than or equal to 0.5, greater than or equal 1, greater than or equal to 2, greater than or equal to 5, or greater. Combinations of the above ranges are possible: for instance, in some embodiments, the ratio of the distance between a solid plate and the second end of the stack to the largest lateral dimension of the battery is greater than or equal to 0.01 and less than or equal to 20. In some embodiments, housings with any given ratio of the distance between a solid plate and the second end of the stack to the largest lateral dimension of the housing can be reconfigured to have a new ratio of the distance between the solid plate and the second end of the stack to largest lateral dimension of the battery by modifying and/or adjusting one or more solid housing components of the housing. For a given collection of geometries, a variety of solid housing components for spanning along a side of the stack of the battery can be interchanged to accommodate a variety of ratios of the distance between a solid plate and the second end of the stack to the largest lateral pressure-applying dimension, in some embodiments. In some embodiments, the ability to reconfigure the length of the housing without the adjustment of auxiliary fasteners can facilitate a reduction in the largest lateral pressure applying dimension of the battery. In some embodiments, the ability to reconfigure the length of the housing in such a way advantageously reduces the number of parts of the housing.

In some embodiments, the housing comprises a lateral base portion proximate to and/or along a lateral edge of the solid plate. In some embodiments, the lateral base portion is part of the solid plate. However, in some embodiments, the lateral base portion is part of a solid housing component coupled to the solid plate. In some embodiments, batteries can be mounted to an external surface using fasteners (e.g., auxiliary fasteners). In some embodiments, the lateral base portion is configured for mounting the battery to an external surface. For batteries that lack a lateral base portion, additional portions of the solid plate may be required to mount the battery to an external surface, and these may increase the lateral profile of the battery. Therefore, inclusion of a lateral base portion may be advantageous for reducing the maximum lateral pressure-applying dimension of the housing and/or increasing the battery's volumetric energy density. For example, battery 100 in FIGS. 8D-8E includes lateral base portion 319 of housing 302, which may be mounted to an external surface via fasteners 317.

In some embodiments, the solid housing component has a relatively high effective thermal conductivity. Such a high effective thermal conductivity may allow the solid housing component to assist with dissipating heat from one or more electrochemical cells of the battery (e.g., via a thermally conductive solid article portion and/or a phase change material portion). Thermal conductivity is generally understood to be an intrinsic property of a material related to its ability to conduct heat. Thermal conductivity is a temperature-dependent quantity and is typically reported in units of $W\ m^{-1}\ K^{-1}$. The effective thermal conductivity of an article generally refers to the ability of an article to conduct heat, taking into account that the article may be made of a single material or of a non-homogeneous material that includes a combination of materials (e.g., a composite material such as a particulate material or layered material). An exemplary method for measuring the thermal conductivity or effective thermal conductivity solid housing component is using a hot disk method, as described in ISO/DIS 22007-2.2.

In some embodiments, a solid housing component (e.g., first solid housing component, second solid housing component) has an effective thermal conductivity of greater than or equal to 10 $W\ m^{-1}\ K^{-1}$, greater than or equal to 25 $W\ m^{-1}\ K^{-1}$, greater than or equal to 50 $W\ m^{-1}\ K^{-1}$, greater than or equal to 65 $W\ m^{-1}\ K^{-1}$, greater than or equal to 80 $W\ m^{-1}\ K^{-1}$, greater than or equal to 100 $W\ m^{-1}\ K^{-1}$, greater than or equal to 138 $W\ m^{-1}\ K^{-1}$, greater than or equal to 150 $W\ m^{-1}\ K^{-1}$, and/or up to 159 $W\ m^{-1}\ K^{-1}$, up to 200 $W\ m^{-1}\ K^{-1}$, or greater in an in-plane direction and/or in a thickness direction at a temperature of 25° C. For example, a solid housing component (e.g., first solid housing component, second solid housing component) may be made of aluminum (e.g., aluminum metal) and have an effective thermal conductivity of 159 W m$^{-1}$ K$^{-1}$ in an in-plane direction and/or in a thickness direction at a temperature of 25° C. As another example, a solid housing component (e.g., first solid housing component, second solid housing component) may be made of 5052-H32 aluminum and have an effective thermal conductivity of 138 W m$^{-1}$ K$^{-1}$ in an in-plane direction and/or a thickness direction at a temperature of 25° C.

In some embodiments, a relatively large percentage of the stack of the battery is covered by the housing of the battery. This may, in some cases, be advantageous because it can afford substantial protection to the battery (e.g., from impact during handling and/or use). In some embodiments, the housing covers at least 30%, at least 50%, at least 70%, at least 90%, at least 95%, at least 99%, or 100% of an external surface area of the stack. The solid housing component may couple to the solid plate of the housing in any of a variety of suitable ways. It has been realized that certain coupling techniques may establish coupling while maintaining relatively small lateral profiles for the housing. In some embodiments, mechanically interlocking features of the solid housing component and a lateral edge of the solid plate establish a joint. Any of a variety of suitable joints may be employed via the interlocking features. For example, any of a variety of woodworking joints may be suitable. It should be understood that woodworking joints refer to the geometries and balances of forces associated with the joints, and it is not required that any part of two components joined with a woodworking joint actually be made of wood. Examples of types of joints that may be established by interlocking features of the solid housing component and a lateral edge of the solid plate include, but are not limited to, box joints, dovetail joints, splice joints (e.g. tabled splice joints), and Knapp joints.

In some embodiments, a joint between the solid housing components and the solid plate of the housing is formed at least in part between a projection of the solid housing component (or solid plate) and a recess of the solid plate (or solid housing component). Some such embodiments may involve the solid housing comprising a projection, the solid plate comprising a recess, and the solid housing component and the solid plate being configured to form a joint at least in part via coupling of the projection and the recess. For example, referring to FIGS. 7A-7C, exemplary battery 100 may be configured such that first solid housing component 314 has first projection 340 and optional second projection 342, while optional second solid housing component 316 has third projection 344 and fourth projection 346. First projection 340 of first solid housing component 314 is configured to couple, at least in part, with first recess 350 of solid plate 310 to form a joint, while optional second projection 342 of first solid housing component 314 is configured to couple, at least in part, with optional second recess 352 of optional second solid plate 312 to form a joint. Third projection 344 of optional second solid housing component 316 is configured to couple, at least in part, with optional third recess 354 of solid plate 310 to form a joint, while the fourth projection 346 of optional second solid housing component 316 is configured to couple, at least in part, with optional fourth recess 356 of optional second solid plate 312 to form a joint. A housing of this type may, in some embodiments, decrease a largest lateral pressure-applying dimension of the housing relative to a housing comprising, for example, auxiliary fasteners coupling solid plates. Additionally, use of mechanically interlocking features (e.g., for woodworking joints) for coupling may require a lower part count than housings that employ auxiliary fasteners (e.g., nuts and bolts) for coupling. In some embodiments, the solid housing component and the solid plate are configured to be joined via a dovetail joint (e.g., via tapered projects and/or recesses in the solid housing component and solid plate). For example, the solid housing component may comprise male dovetail features at an end of the solid housing component, and the solid plate may comprise a female dovetail feature (e.g., proximate to a lateral edge of the solid plate). The male and female features may mate to form a joint.

Figure 7A:
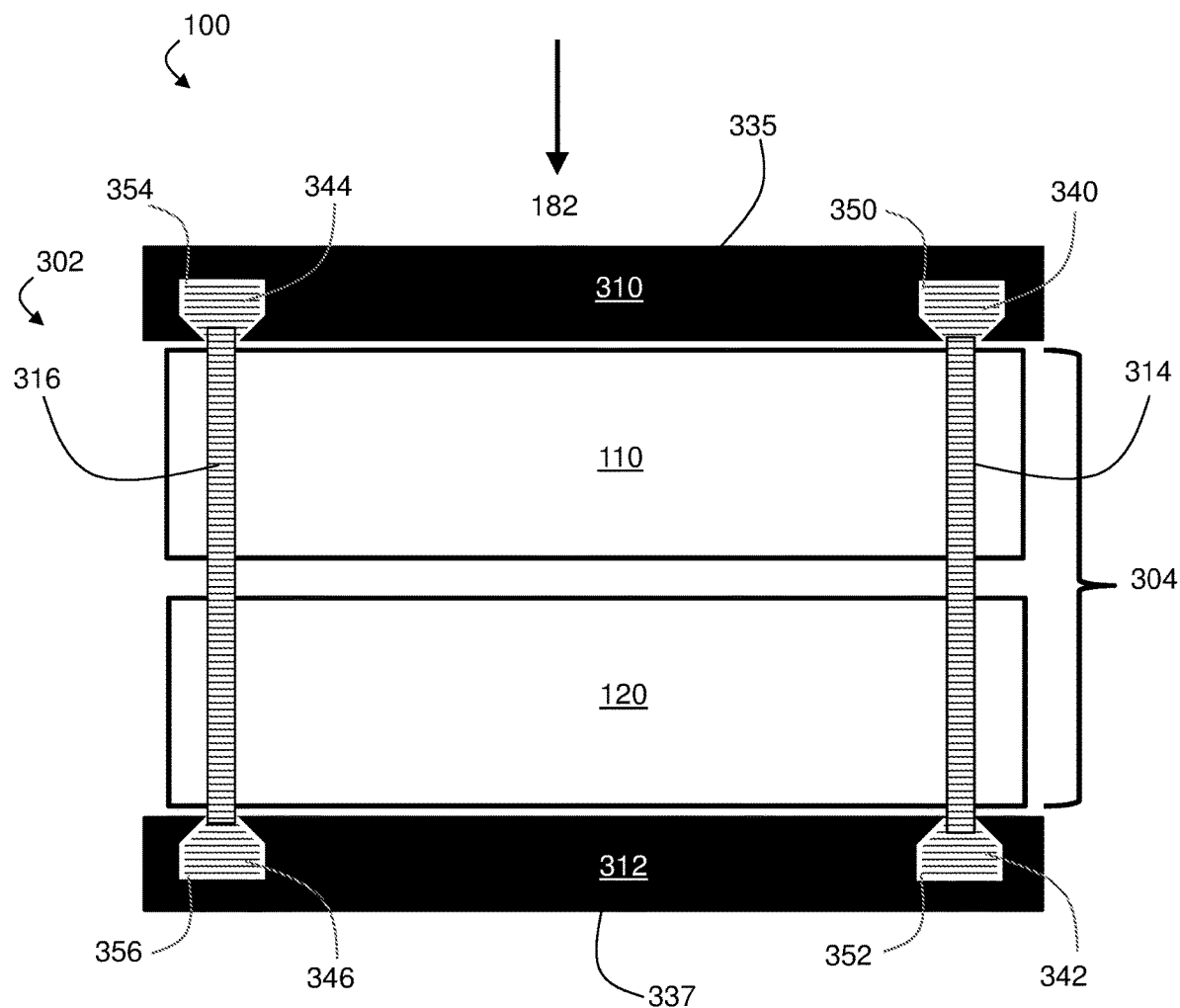
FIG. 7A shows a side-view schematic diagram of an exemplary battery comprising a stack comprising electrochemical cells, and a housing that comprises a solid plate comprising a recess and a solid housing component comprising a projection, according to some embodiments.
Figure 7B:
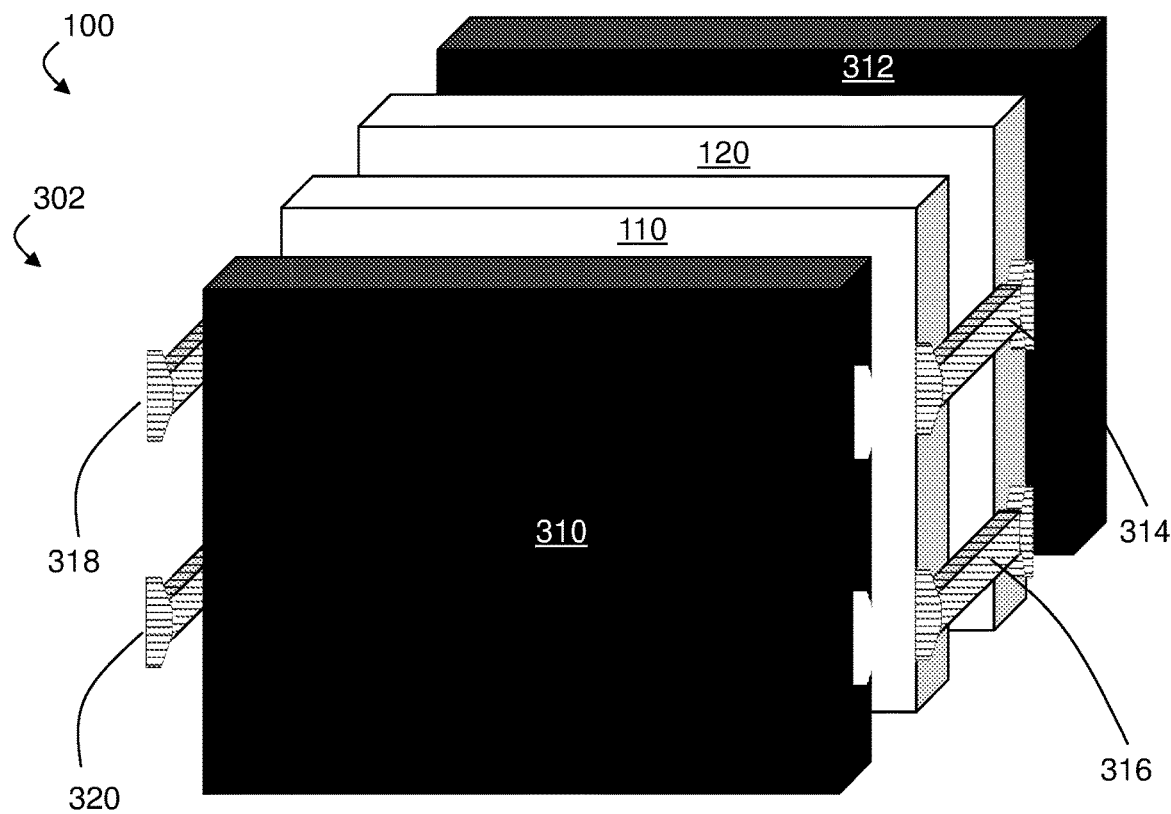
FIG. 7B shows an exploded perspective schematic diagram of an exemplary battery comprising a stack comprising electrochemical cells, and a housing that comprises a solid plate comprising a recess and a solid housing component comprising a projection, according to some embodiments.
Figure 7C:
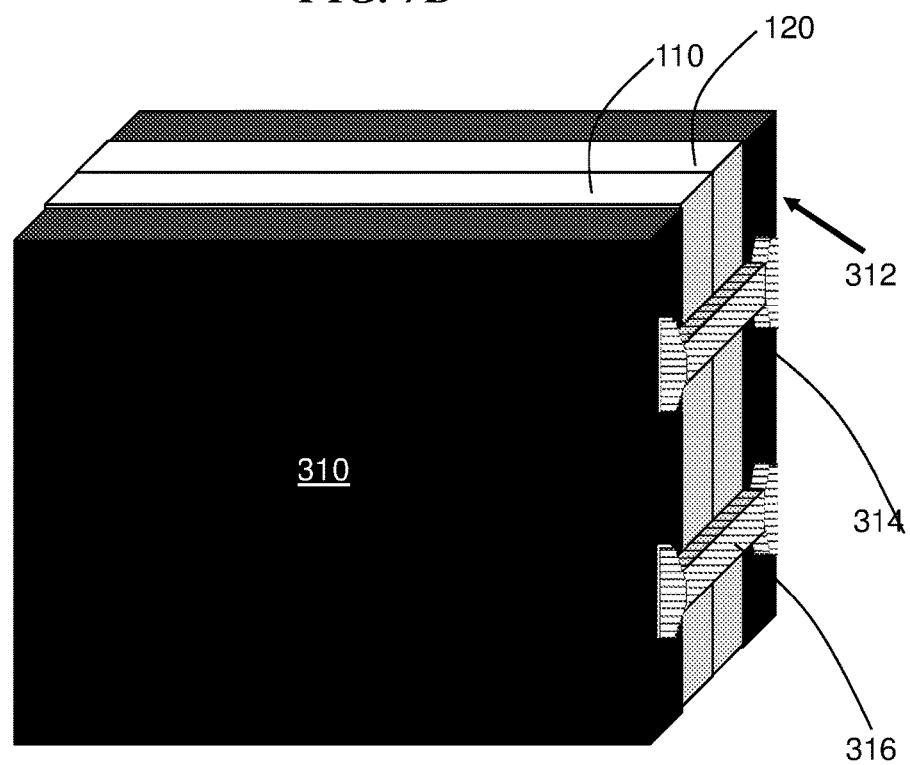
FIG. 7C shows a perspective schematic diagram of an exemplary battery comprising a stack comprising electrochemical cells, and a housing that comprises a solid plate comprising a recess and a solid housing component comprising a projection, according to some embodiments.

FIG. 7A shows a side view schematic illustration of exemplary battery 100, where all recesses are identical and where all projections are identical, in accordance with some embodiments. FIG. 7B shows an exploded schematic illustration of exemplary battery 100 of this type, also revealing optional third solid housing component 318 and optional fourth solid housing component 320. FIG. 7C shows a perspective schematic illustration of exemplary battery 100. It should be understood that other embodiments where projections differ from one another are also contemplated, as are embodiments with more or fewer solid housing components. In some embodiments, the solid housing component comprises recesses which can couple, at least in part, with projections of the solid plates to form joints. In some embodiments in which a solid housing component and a solid plate are coupled via interlocking mechanical features (e.g., via a woodworking joint), the solid housing component and the solid plate may further be coupled via, for example, an adhesive and/or a weld (e.g., at a joint formed by the interlocking features).

In some embodiments, the solid housing component is coupled to the solid plate via coupling to a housing stop portion adjacent to an exterior surface of the solid plate. The housing stop portion may be directly adjacent to the exterior surface of the solid plate (a surface of the plate facing away from the stack). However, in some embodiments, the housing stop portion is indirectly adjacent to the exterior surface of the solid plate such that one or more intervening components (e.g., washers, layers of material, etc.) is between the housing stop portion and the exterior surface of the solid plate. The housing stop portion may be discrete from the solid housing component and/or the solid plate. The housing stop portion may be made of any of a variety of materials, such as a metal (e.g., aluminum or titanium), a metal alloy (e.g., stainless steel), a composite (e.g., carbon fiber), a polymeric material (e.g., a rigid plastic), or a combination thereof. The housing stop portion may have any of a variety of shapes depending on, for example, a desired deflection of the solid plate and/or pressure distribution within the battery. It has been realized that some shapes of housing stop portions (e.g., elongated bars, or rings (e.g., rectangular or non-rectangular rings) conforming to a perimeter of the solid plate) can distribute force (e.g., from tension in the solid housing component) across the face of the solid plate more uniformly than, for example, solid plates coupled via discrete auxiliary fasteners (e.g., bolts with nuts) in contact with relatively small areas of the solid plate.

Figure 8A:
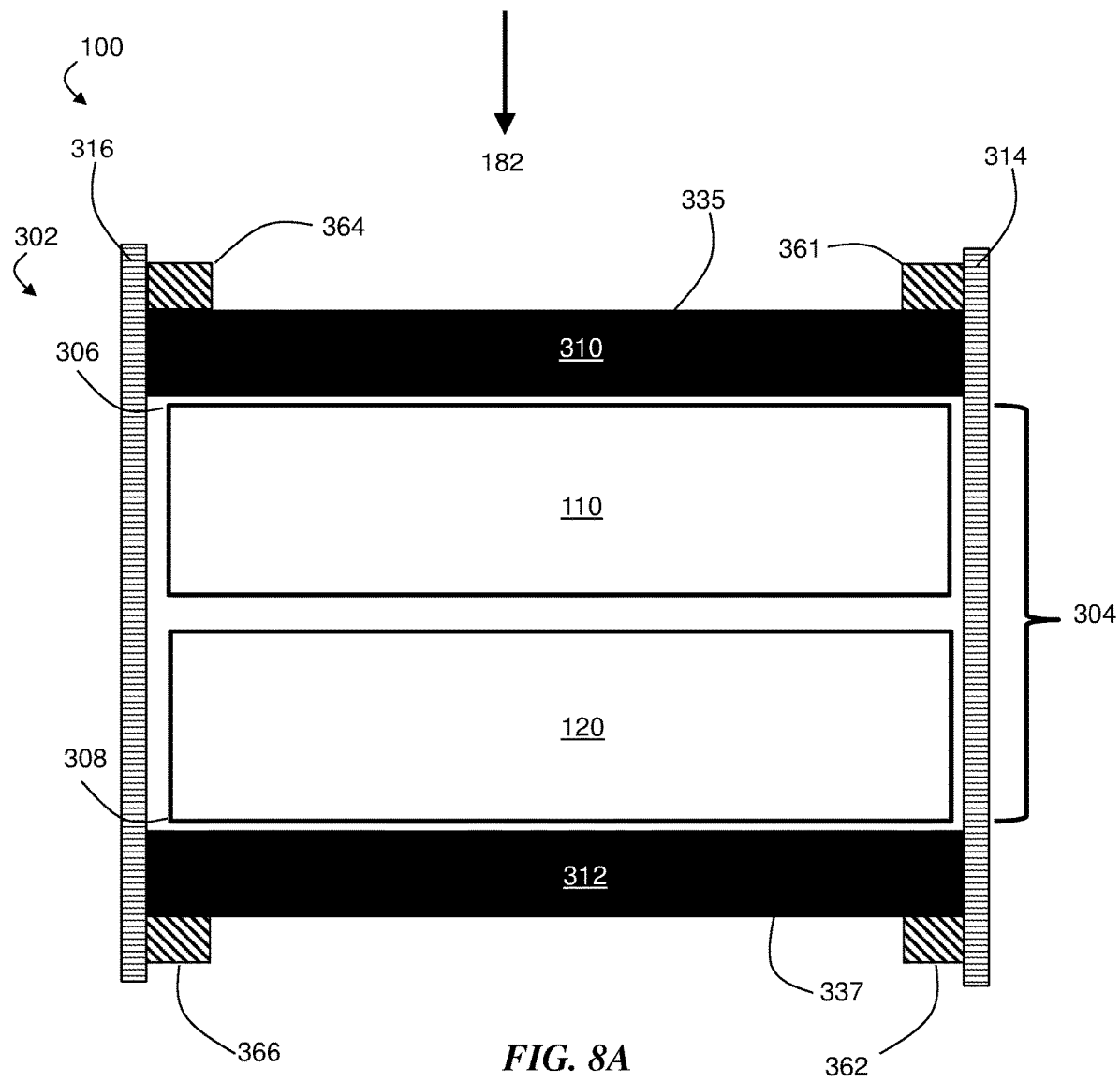
FIG. 8A shows a cross-sectional schematic diagram of an exemplary battery comprising a stack comprising electrochemical cells, and a housing that comprises a solid plate, a solid housing component, and a housing stop portion, according to some embodiments.
Figure 8B:
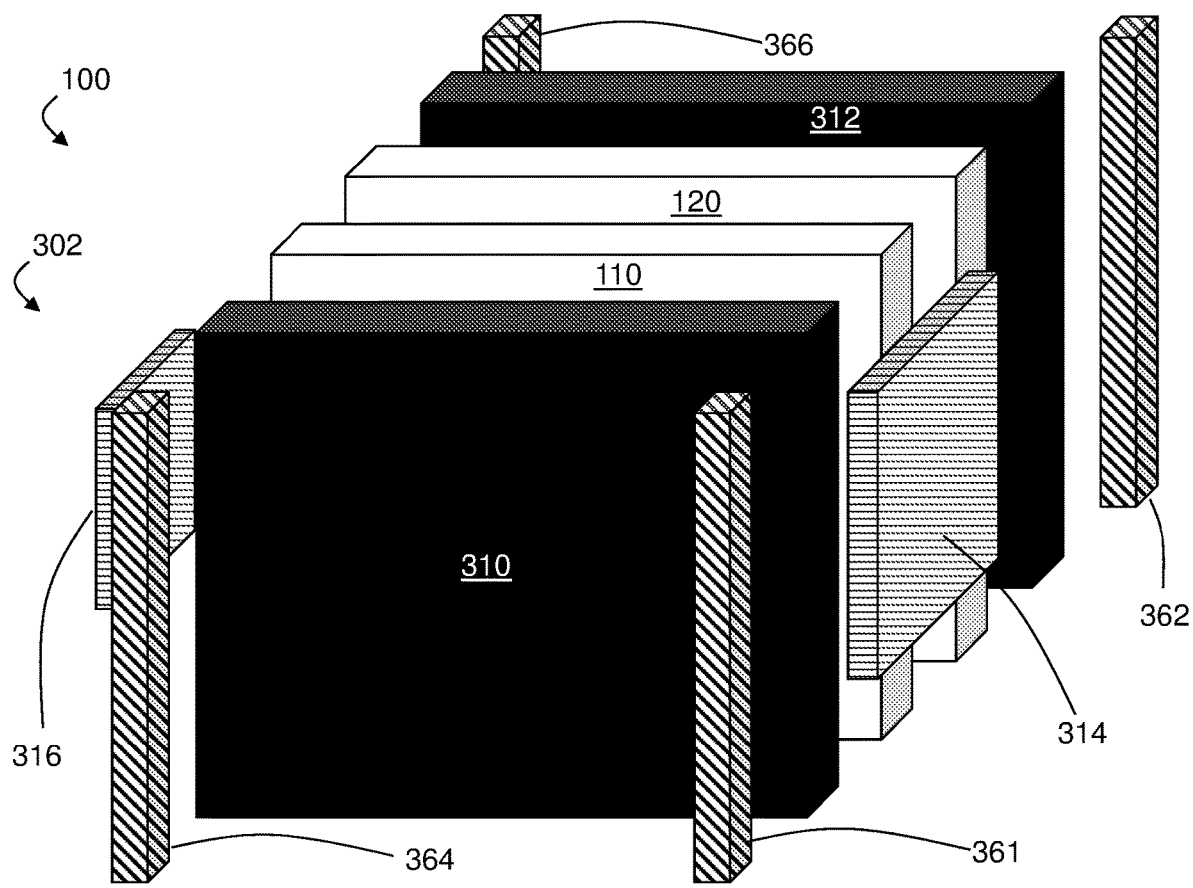
FIG. 8B shows an exploded perspective schematic diagram of an exemplary battery comprising a stack comprising electrochemical cells, and a housing that comprises a solid plate, a solid housing component, and a housing stop portion, according to some embodiments.
Figure 8C:
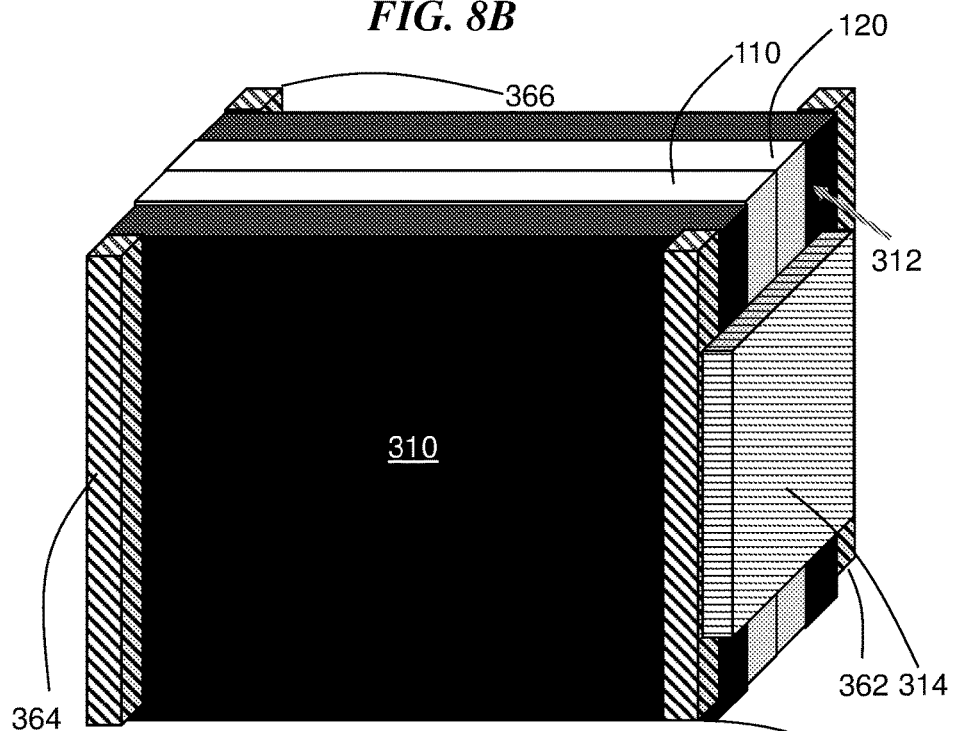
FIG. 8C shows a perspective schematic diagram of an exemplary battery comprising a stack comprising electrochemical cells, and a housing that comprises a solid plate, a solid housing component, and a housing stop portion, according to some embodiments.

Referring to FIGS. 8A-8C, exemplary battery 100 may be configured such that first solid housing component 314 is coupled to first solid plate 310 via coupling of the first solid housing component 314 to first housing stop portion 361 adjacent to exterior surface 335 of first solid plate 310. Optionally, in some embodiments first solid housing component 314 is coupled to optional second solid plate 312 via coupling of first solid housing component 314 to optional second housing stop portion 362 adjacent to exterior surface 337 of optional second solid plate 312. Optionally, exemplary battery 100 may further be configured as illustrated in FIGS. 8A-8C, such that optional second solid housing component 316 is coupled to first solid plate 310 via coupling of optional second solid housing component 316 to third housing stop portion 364 adjacent to exterior surface 335 of first solid plate 310, as well as to optional second solid plate 312 via coupling of first solid housing component 314 to optional fourth housing stop portion 366 adjacent to exterior surface 337 of optional second plate 312. The couplings between exemplary housing stop portions and exemplary solid housing components may comprise, for example, welds, fasteners, adhesives, or combinations thereof. A housing of this type may, in some embodiments, decrease a largest lateral pressure-applying dimension of the housing relative to a housing comprising, for example, fasteners coupling solid plates.

FIG. 8A shows a front view schematic illustration of exemplary battery 100 in one embodiment, where all housing stop portions are identical. FIG. 8B shows an exploded perspective of the same exemplary battery 100, and FIG. 8C shows a perspective illustration of the same exemplary battery 100. It should be understood that other embodiments, where housing stop portions have different geometries from each other, are possible, as are embodiments with more or fewer solid housing components and/or housing stop portions. In some embodiments, stop portions are discrete, as illustrated by FIGS. 8A-8C. However, in some embodiments, stop portions are portions of a single unitary object connected to multiple solid housing components (e.g., a first solid housing component and a second solid housing component). For example, FIGS. 8D-8E illustrate an embodiment where stop portion 361 and stop portion 364 are portions of single unitary object 321. The geometry of the stop portion may be configured to apply force to and/or support a relatively large area of the solid plate, in contrast to auxiliary fasteners (e.g., a bolt and nut), which may apply pressure in a fairly localized region. In some embodiments, at least 50%, at least 60%, at least 75%, at least 90%, at least 95%, at least 99%, or 100% of a perimeter of an exterior surface of a solid plate is covered by (e.g., adjacent to) one or more housing stop portions.

The solid housing component may be coupled to the housing stop portion via any of a variety of suitable techniques. For example, the solid housing component may be coupled to the housing stop portion via a weld, a fastener, an adhesive, or a combination thereof.

Figure 9A:
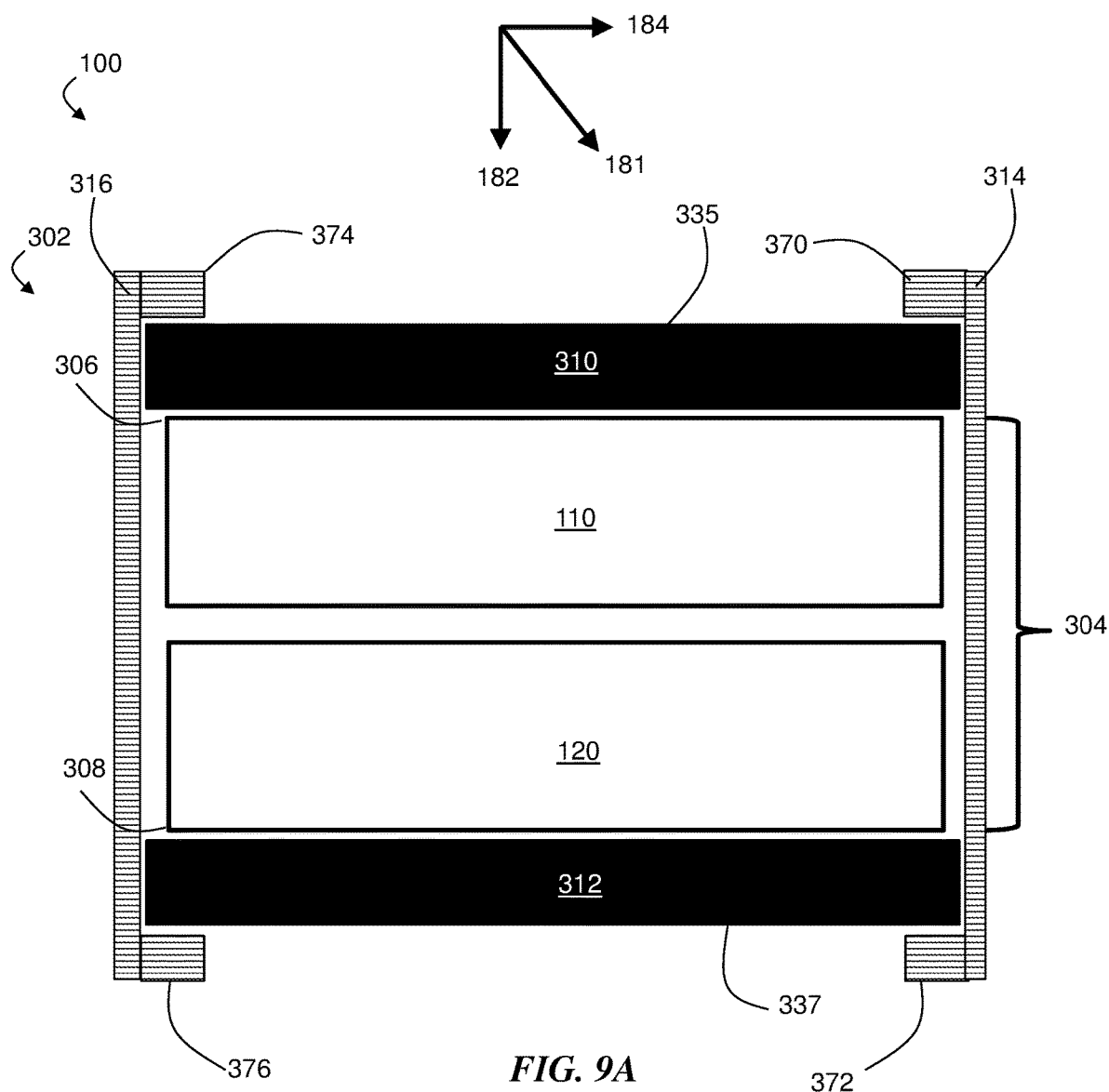
FIG. 9A shows a side-view schematic diagram of an exemplary battery comprising a stack comprising electrochemical cells, and a housing that comprises a solid plate and a solid housing component comprising a lateral portion, according to some embodiments.
Figure 9B:
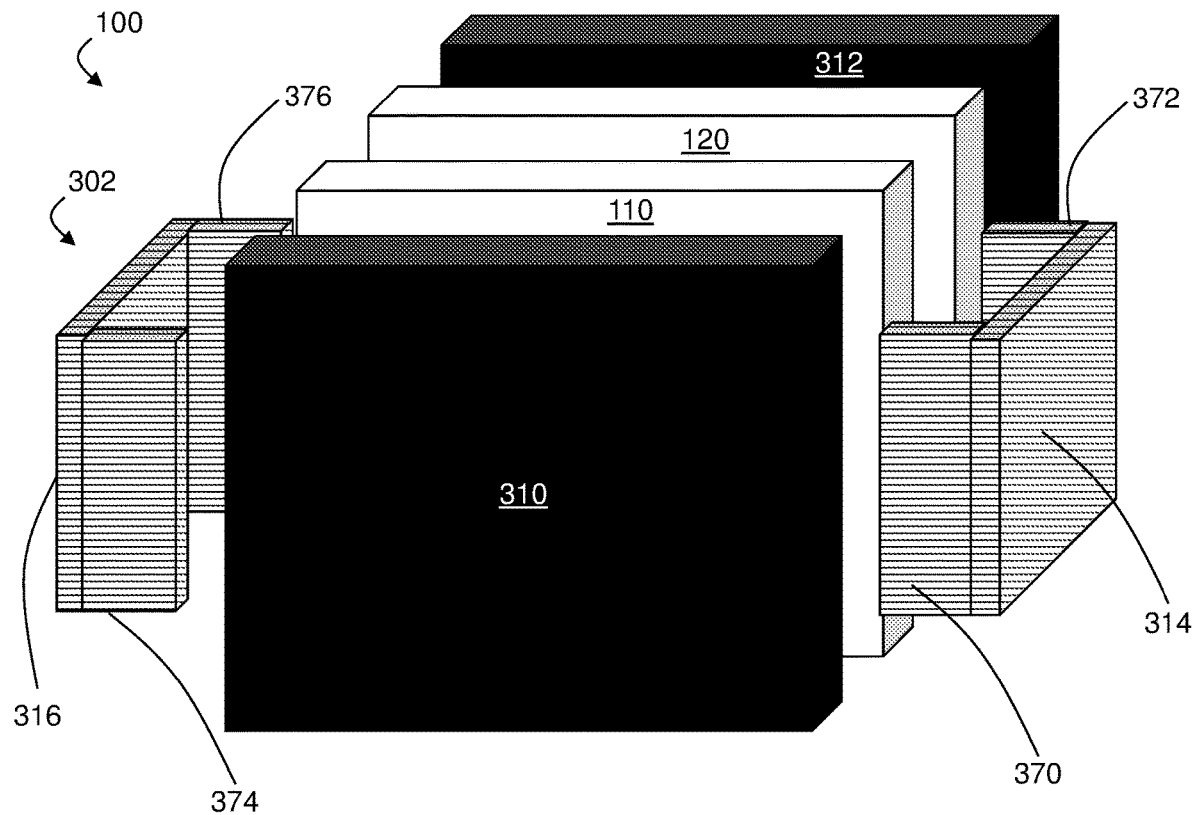
FIG. 9B shows an exploded perspective schematic diagram of an exemplary battery comprising a stack comprising electrochemical cells, and a housing that comprises a solid plate and a solid housing component comprising a lateral portion, according to some embodiments.
Figure 9C:
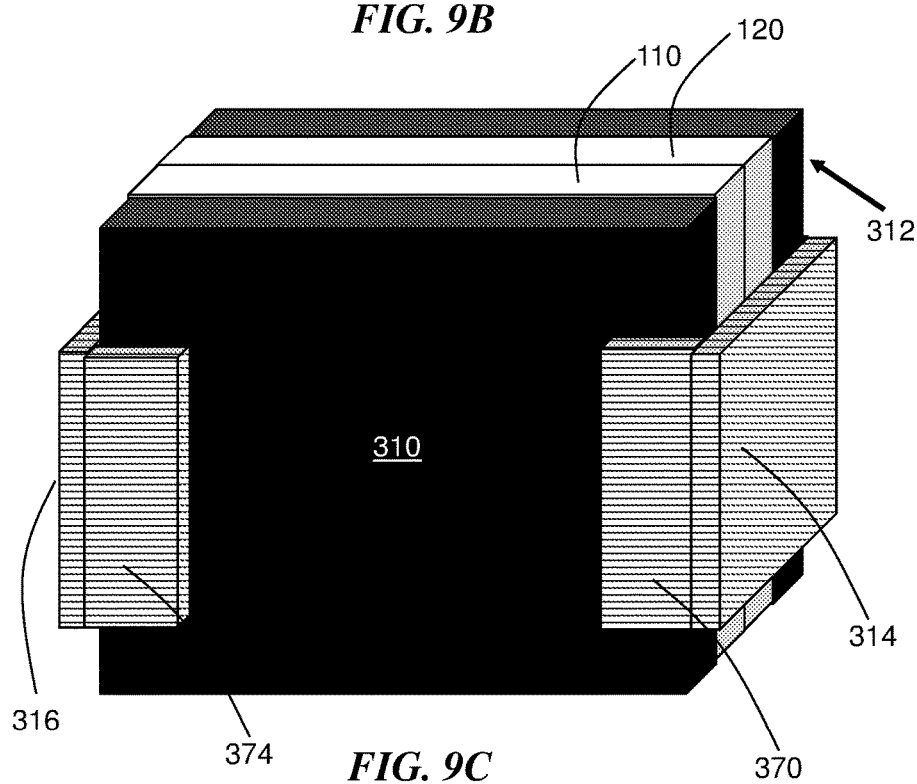
FIG. 9C shows a perspective schematic diagram of an exemplary battery comprising a stack comprising electrochemical cells, and a housing that comprises a solid plate and a solid housing component comprising a lateral portion, according to some embodiments.

In some embodiments, the solid housing component is coupled to the solid plate via a lateral portion of the solid housing component adjacent to an exterior surface of the solid plate. A lateral portion of the solid housing component refers to one which can be substantially parallel to a lateral surface of the solid plate when the solid housing component and the solid plate are coupled in the housing of the battery. For example, referring to FIGS. 9A-9C, exemplary battery 100 may be configured such that first solid housing component 314 is coupled to first solid plate 310 via first lateral portion 370 of first solid housing component 314 adjacent to exterior surface 335 of first solid plate 310. In FIG. 9A, first lateral portion 370 is substantially parallel to exterior surface 335 of solid plate 310, in accordance with some embodiments. Optionally, in some embodiments first solid housing component 314 is coupled to optional second solid plate 312 via second lateral portion 372 of optional second solid housing component 316 adjacent to exterior surface 337 of optional second solid plate 312. In some embodiments, the exemplary battery may further be configured as illustrated in FIGS. 9A-9C, such that optional second solid housing component 316 is coupled to first solid plate 310 via third lateral portion 374 of optional second solid housing component 316 adjacent to exterior surface 335 of first solid plate 310, and such that optional second solid housing component 316 is coupled to optional second solid plate 312 via fourth lateral portion 376 of optional second solid housing component 316 adjacent to exterior surface 337 of optional second solid plate 312. When the solid housing component coupled to the solid plate is in tension, the lateral portion of the solid plate may apply a force to at least a portion of the solid plate. For example, in FIGS. 9A-9C, tension in first solid housing component 304 may cause lateral portion 370 to press against exterior surface 335 of solid plate 310, thereby causing stack 304 to experience an anisotropic compressive force having a component in the direction of arrow 182 in FIG. 9A).

The lateral portion of the solid housing component may have any of a variety of shapes depending on, for example, a desired deflection of the solid plate and/or pressure distribution within the battery. It has been realized that some shapes of lateral portions (e.g., relatively flat portions) can distribute force (e.g., from tension in the solid housing component) across the face of the solid plate more uniformly than, for example, solid plates coupled via discrete auxiliary fasteners (e.g., bolts with nuts) in contact with relatively small areas of the solid plate. A housing of this type may, in some embodiments, decrease a largest lateral pressure-applying dimension of the housing relative to a housing comprising, for example, auxiliary fasteners coupling solid plates.

FIG. 9A shows a front view schematic illustration of exemplary battery 100 in one embodiment, where all the lateral portions are identical. FIG. 9B shows an exploded schematic illustration of the same exemplary battery 100, and FIG. 9C shows a perspective schematic illustration of the same exemplary battery 100. It should be understood that other embodiments, where lateral portions have different geometries from each other, are possible, as are embodiments with more or fewer solid housing components and/or lateral portions of solid housing components.

The lateral portion of the solid housing component may be directly adjacent to the exterior surface of the solid plate (a surface of the plate facing away from the stack). However, in some embodiments, the lateral portion is indirectly adjacent to the exterior surface of the solid plate such that one or more intervening components (e.g., washers, layers of material, etc.) is between the lateral portion of the solid housing component and the exterior surface of the solid plate. In some embodiments, the lateral portion of the solid housing component and a remainder of the solid housing component form a unitary object.

In some embodiments, the solid housing component contributes to force application by covering at least a portion (e.g., at least 10%, at least 25%, at least 50%, at least 75%, at least 90%, at least 95%, or all) of a first end of the stack comprising the first electrochemical cell and the second electrochemical cell. While in some embodiments a solid housing component directly covers at least a portion of an end of the stack (e.g., is directly adjacent), in some embodiments, the solid housing component covers at least a portion of an intervening component (e.g., a first solid plate) or part of a housing frame covering at least a portion of the end of the stack. In some embodiments, a second solid housing component contributes to force application by covering at least a portion of a second end of the stack. For example, referring to the cross-sectional schematic diagram in FIG. 10A, housing 302 comprises second solid housing component 316 (which covers second end 308 of stack 304, and which has a portion along at least some of side 380 of stack 304). Tension in first solid housing component 314 and in second solid housing component 316 may contribute force compressing stack 304, thereby applying an anisotropic force in direction of arrow 181 having component 182 normal to a first electrode active surface of first electrochemical cell 110 and/or a second electrode active surface of second electrochemical cell 120.

Figure 10A:
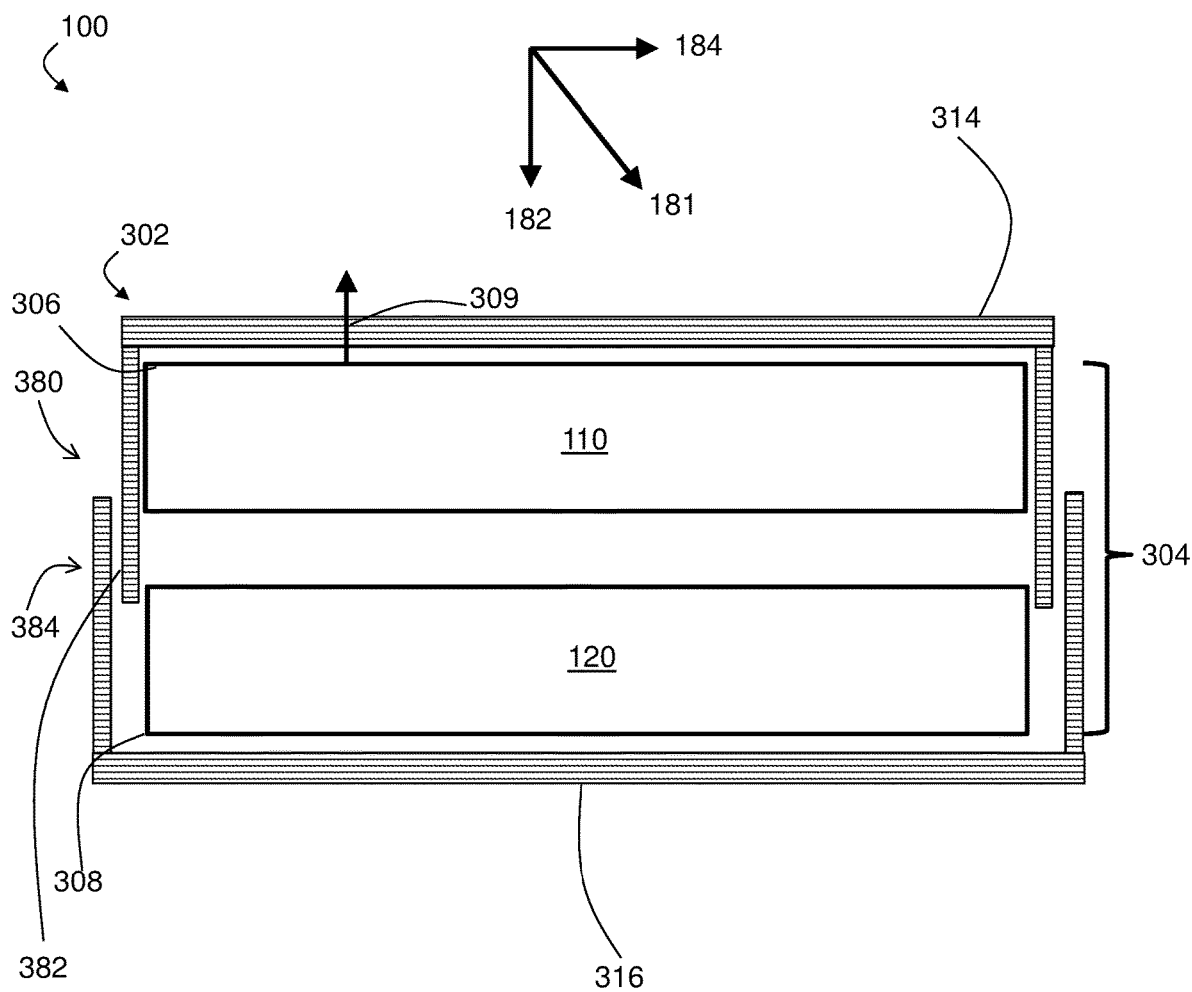
FIG. 10A shows a cross-sectional schematic diagram of an exemplary battery comprising a stack comprising electrochemical cells and a housing that comprises solid housing components, according to some embodiments.

In some embodiments, the first solid housing component covers a portion (e.g., at least 10%, at least 25%, at least 50%, at least 75%, at least 90%, at least 95%, or all) of the first end of the stack and has a portion along at least some of the side of the stack. In some embodiments, a second solid housing component covers at least a portion (e.g., at least 10%, at least 25%, at least 50%, at least 75%, at least 90%, at least 95%, or all) of the second end of the stack a portion along at least some of the side of the stack. The first solid housing component and second solid housing component may be coupled directly or indirectly. Such a coupling be accomplished in any of a variety of suitable ways. For example, in some embodiments, a point of attachment between the first solid housing component and the second solid housing component is at a region of overlap between the first solid housing component and the second solid housing component along the side of the stack. It should be understood that a point of attachment may be part of a region of attachment between two surfaces (e.g., a region along a line of attached points, or a region occupying a 2-dimensional set of attached points), and is not meant to apply that an entirety of attachment is limited to a single point. It has been realized that, in some such embodiments, certain coupling techniques may establish coupling while maintaining relatively small lateral profiles for the housing, while maintaining an ability for the housing to apply and/or maintain an anisotropic force with a component normal to an active surface of one or more electrochemical cells of the stack. In some embodiments, the point of attachment between the first solid housing component and the second solid housing component comprises a weld, a fastener, an adhesive, friction, a joint, or a combination thereof. Referring to FIG. 10A, which shows a cross-sectional schematic illustration of exemplary battery 100, first solid housing component 314 and second solid housing component 316 are coupled at point of attachment 382 at region of overlap 384 along side 380 of stack 304, in accordance with some embodiments. A similar point of attachment may be present at a region of overlap at an opposite side of the stack. A housing of this type may, in some embodiments, decrease a largest lateral pressure-applying dimension of the housing relative to a housing comprising, for example, auxiliary fasteners coupling solid plates. In some embodiments, the stack comprises one or more solid plates. For example, though not shown in FIG. 10A, a solid plate of the same type as solid plate 310 in FIG. 5 may be between first solid housing component 314 and first electrochemical cell 110. The solid plate may be a first solid plate, and the stack may further comprise a second solid plate between the second solid housing component and the second electrochemical cell.

Figure 11:
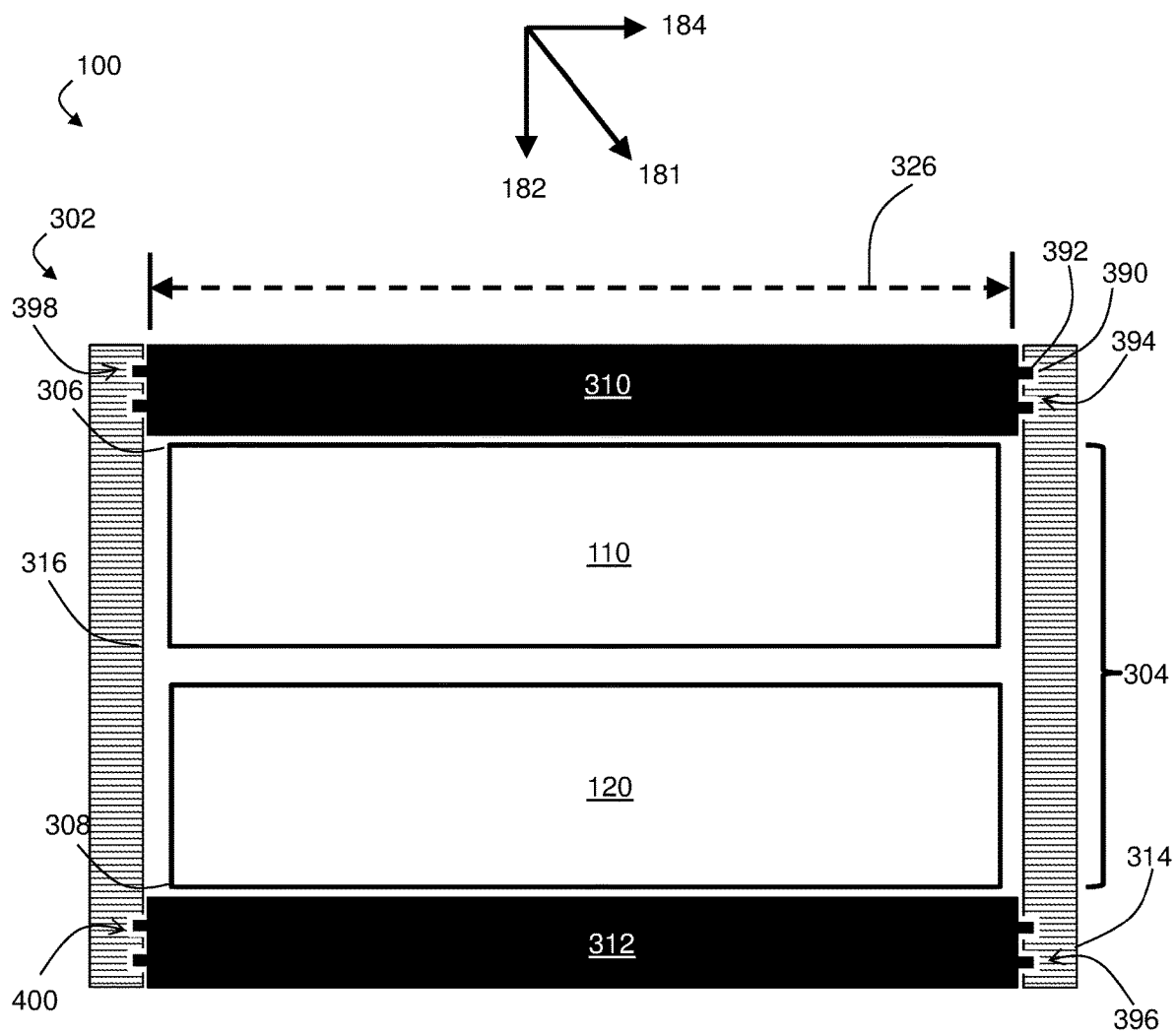
FIG. 11 shows a cross-sectional schematic diagram of an exemplary battery comprising a stack comprising electrochemical cells, and a housing that comprises a solid housing component joined to solid plates via mechanically interlocking features, according to some embodiments.

In some embodiments, the housing comprises a first solid plate covering at least a portion (e.g., at least 10%, at least 25%, at least 50%, at least 75%, at least 90%, at least 95%, or all) of the first end of the stack and a second solid plate covering at least a portion (e.g., at least 10%, at least 25%, at least 50%, at least 75%, at least 90%, at least 95%, or all) of the second end of the stack. In some such embodiments, a solid housing component possesses features that mechanically interlock with features along a lateral edge of the first solid plate to establish a joint. In some embodiments, the first solid housing component possesses features that mechanically interlock with features along a lateral edge of the second solid plate, establishing a second joint. In some embodiments, a second solid housing component possesses features that mechanically interlock with features along a lateral edge of the first plate and features along a lateral edge of the second plate to form a third joint and a fourth joint, respectively. Mechanically interlocking features may be designed to interlock in any of a variety of suitable ways, including, but not limited to, interdigitation of features, formation of woodworking joints (e.g. dovetail joints, Knapp joints, lap joints, box joints), or by a mechanical clipping mechanism. It has been realized that certain mechanically interlocking features may establish coupling while maintaining relatively small lateral profiles for the housing. For example, referring to the schematic cross-sectional illustration in FIG. 11, housing 302 of battery 100 comprises first solid plate 310 covering at least a portion of first end 306 of stack 304, as well as second solid plate 312 covering second end 308 of stack 304. First solid housing component 314 possesses features 390 that mechanically interlock with features 392 along lateral edges of first solid plate 310 to establish first joint 394 between first solid housing component 314 and first solid plate 310. Similar interlocking features establish second joint 396 between first solid housing component 314 and second solid plate 312, as well as third joint 398 between second solid housing component 314 and first solid plate 310 and fourth joint 400 between second solid housing component 314 and second solid plate 312. A housing of this type may, in some embodiments, decrease a largest lateral pressure-applying dimension of the housing relative to a housing comprising, for example, auxiliary fasteners coupling solid plates. In some embodiments, an adhesive further coupled the solid housing component and the solid plate (e.g., at interfaces between the mechanically interlocking features).

In some embodiments, the first solid housing component covers at least a portion (e.g., at least 10%, at least 25%, at least 50%, at least 75%, at least 90%, at least 95%, or all) of the first end of the stack and has a portion along at least some of the side of the stack. In some embodiments, a second solid housing component covers at least portion (e.g., at least 10%, at least 25%, at least 50%, at least 75%, at least 90%, at least 95%, or all) of the second end of the stack and has a portion along at least some of the side of the stack. In some embodiments, first solid housing component and the second solid housing component are each mechanically joined with at least one additional solid housing component (e.g., along a side of the stack). The at least one additional solid housing component may be coupled to the first solid housing component at a first region of overlap, and coupled to the second solid housing component at a second region of overlap. It has been realized that, in some embodiments, certain coupling techniques may establish coupling while maintaining relatively small lateral profiles for the housing. In some embodiments, the couplings between the solid housing components comprise welds, joints, and/or adhesives.

Figure 12:
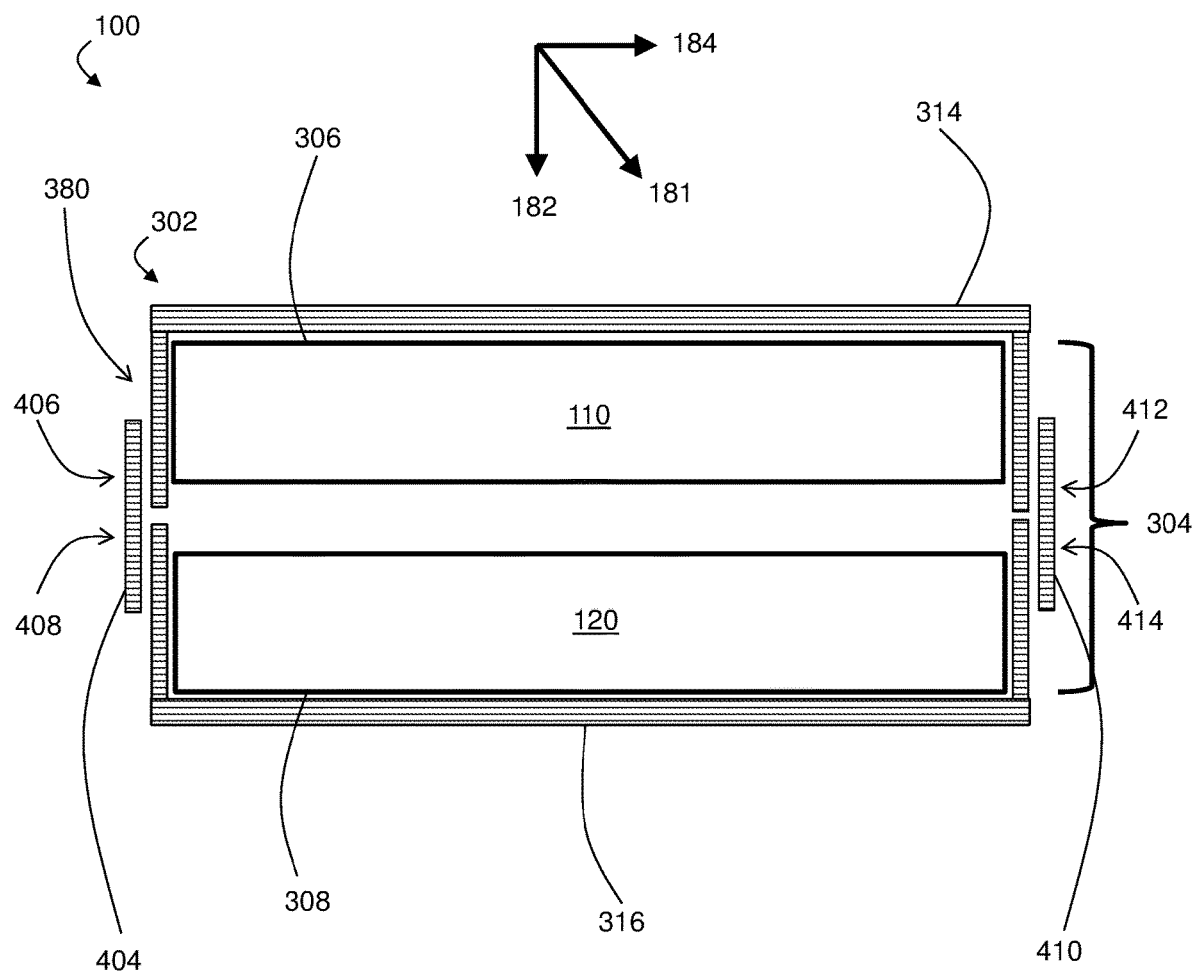
FIG. 12 shows a cross-sectional schematic diagram of an exemplary battery comprising a stack comprising electrochemical cells, and a housing that comprises solid housing components, according to some embodiments.

Referring to the cross-sectional schematic diagram in FIG. 12, first solid housing component 314 and second solid housing component 316 of housing 302 are coupled to additional solid housing component 404 of housing 302. First solid housing component 314 forms first region of overlap 406 with additional solid housing component 404, where the two housing components are mechanically joined (e.g., via a weld, an adhesive, friction, a fastener, etc.), in accordance with some embodiments. Second solid housing component 316 forms second region of overlap 408 with additional solid housing component 404, where the two housing components are mechanically joined (e.g., via a weld, an adhesive, friction, a fastener, etc.), in accordance with some embodiments. In some embodiments, such as the embodiment illustrated in FIG. 12, second additional housing component 410 may form third region of overlap 412 with first solid housing component 314 where the two solid housing components are mechanically joined, and may form fourth region of overlap 414 with second solid housing component 316 where the two solid housing components are mechanically joined, however embodiments with more or fewer additional housing components are also contemplated. A housing of this type may, in some embodiments, decrease a largest lateral pressure-applying dimension of the housing relative to a housing comprising, for example, auxiliary fasteners coupling solid plates.

Figure 10B:
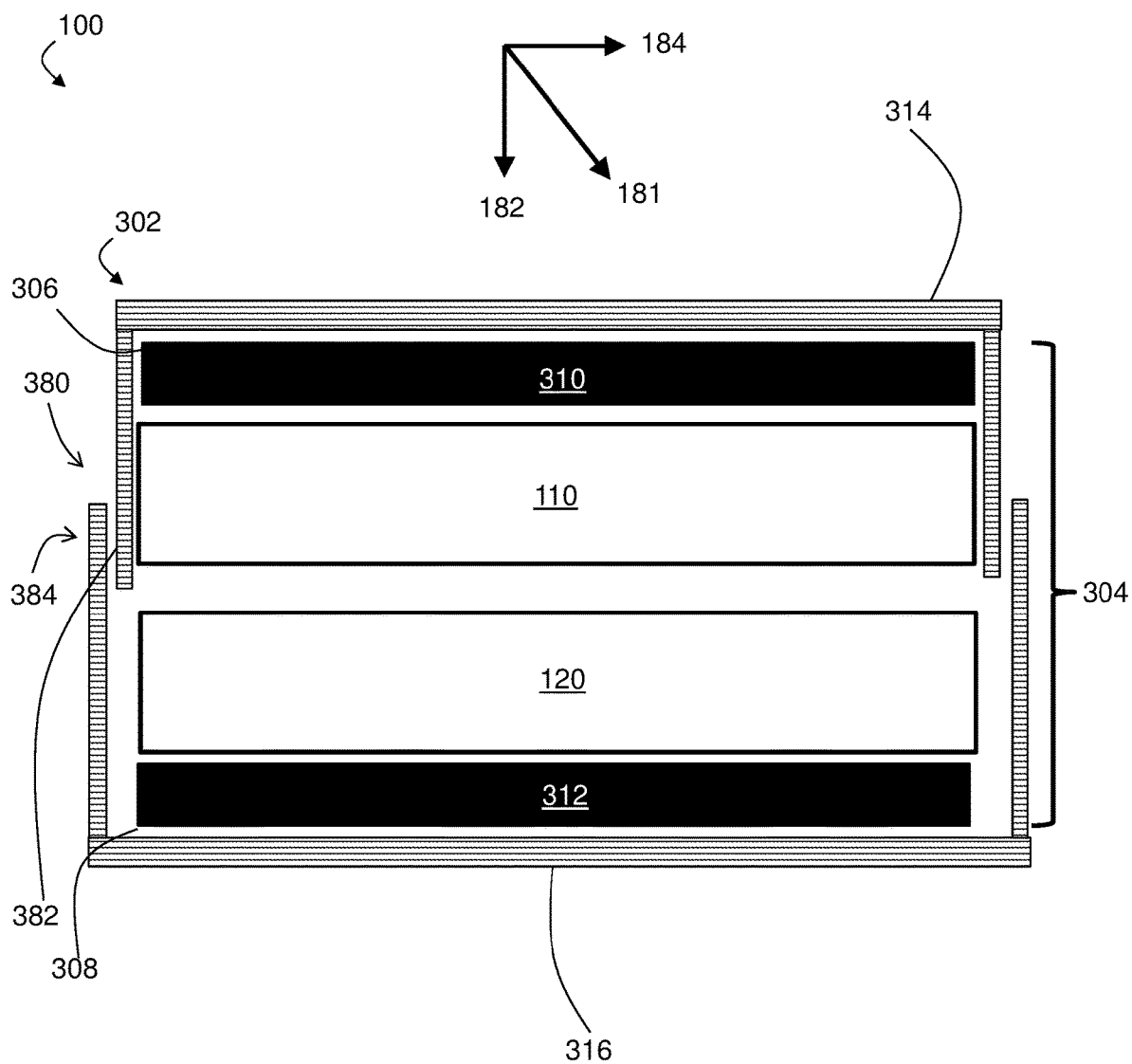
FIG. 10B shows a cross-sectional schematic diagram of an exemplary battery comprising a stack comprising electrochemical cells and solid plates, and a housing that comprises solid housing components, according to some embodiments.

In some embodiments, the stack comprises one or more solid plates. Such a solid plate (e.g., comprising carbon fiber) may be between a solid housing component (e.g., the first solid housing component) and an electrochemical cell of the stack (e.g., the first electrochemical cell). For example, in FIG. 10B, solid plate 310 may be between first solid housing component 314 and first electrochemical cell 110. The solid plate may be a first solid plate, and the stack may further comprise a second solid plate between the second solid housing component and the second electrochemical cell. In the embodiment shown in FIG. 10B, tension in first solid housing component 314 and second solid housing component 316 of housing 302 may contribute force causing first solid plate 310 and/or second solid plate 312 to compress first electrochemical cell 110 and/or second electrochemical cell 120 in stack 304, thereby applying an anisotropic force in direction of arrow 181 having component 182 normal to a first electrode active surface of first electrochemical cell 110 and/or a second electrode active surface of second electrochemical cell 120.

Some embodiments comprise applying an external anisotropic force to a stack at least partially enclosed by a housing described above (e.g., with one or more solid housing components), the stack comprising a first electrochemical cell and a second electrochemical cell. As mentioned above, the external anisotropic force may have a component normal to a first electrode active surface of the first electrochemical cell and/or a second electrode active surface of the second electrochemical cell. The external anisotropic force may be applied via a pressure application device/system external to the battery (e.g., an external clamp, a hydraulic press, etc.), and may be applied, for example, during manufacture of a battery comprising the stack and the housing. The external anisotropic force may define a pressure of at least 10 $kg_f/cm^2$, at least 12 $kg_f/cm^2$, at least 20 $kg_f/cm^2$, and/or up to 25 $kg_f/cm^2$, up to 30 $kg_f/cm^2$, up to 35 $kg_f/cm^2$, up to 40 $kg_f/cm^2$, or more. Some embodiments of such housings are described above.

In some embodiments, pressure on the stack is maintained via one or more components of the housing. For example, in some embodiments, a first solid housing component of the housing is attached to a second, solid housing component during at least a portion of the step of applying the external anisotropic force. In some embodiments, a solid housing component is attached to a first solid plate covering at least a portion of a first end of the stack during at least a portion of the step of applying the external anisotropic force. In some such embodiments, the solid housing component is attached to a second solid plate covering at least a portion of a second end of the stack during at least a portion of the step of applying the external anisotropic force. In some embodiments, a first solid housing component is attached to a second discrete solid housing component during at least a portion of the step of applying the external anisotropic force by attaching the first solid housing component to one or more additional solid housing components that are attached to the second solid housing component.

In some embodiments, attaching the first solid housing component to the second solid housing component or to one or more additional solid housing comprises welding (e.g., laser welding) the first housing component and the second housing component together. For example, in FIGS. 10A-10B, first solid housing component 314 may be welded (e.g., laser welded) to second solid housing component 316 at point of attachment 382 at region of overlap 384 along side 308 of stack 304 (e.g., during application of an external anisotropic force in direction 181 having component 182 normal to an electrode active surface of first electrochemical cell 110). In some embodiments, attaching the first solid housing component to the second solid housing component or to one or more additional solid housing comprises applying a fastener (e.g., a screw, a rivet, etc.) to the first housing component and the second housing component. In some embodiments, attaching the first solid housing component to the second solid housing component or to one or more additional solid housing comprises applying an adhesive to the first housing component and the second housing component, thereby forming an adhesive interaction. In some embodiments, attaching a solid housing component to the first solid plate and/or the second solid plate comprises establishing a joint by mechanically interlocking features of the solid housing component and a lateral edge of the first solid plate and/or second solid plate.

Subsequently, some embodiments include removing the applied external anisotropic force while maintaining, via tension in the attached first solid housing component and the second solid housing component, an anisotropic force having a component normal to the first electrode active surface and/or the second electrode active surface. The anisotropic force may have a component normal to the first electrode active surface of the first electrochemical cell of the stack and/or the second electrode active surface of the second electrochemical cell of the stack. As above, the anisotropic force may define a pressure of at least 10 $kg_f/cm^2$, at least 12 $kg_f/cm^2$, at least 20 $kg_f/cm^2$, at and/or up to 25 $kg_f/cm^2$, up to 30 $kg_f/cm^2$, up to 35 $kg_f/cm^2$, up to 40 $kg_f/cm^2$, or more. It has been realized that by applying an initial force to the stack and subsequently establishing tension in one or more parts of the housing (e.g., a solid housing component and/or a solid plate), relatively high pressures may be established in the stack at a point of manufacture within a substantially fixed housing. Some such configurations may reduce a number of parts required for the overall battery, e.g., by avoiding use of tension in auxiliary fasteners (e.g., with separate screws or threaded rods, nuts, washers, etc.). A reduction in number of parts and/or fasteners in the housing may promote an overall reduction in housing and/or battery volume, which may be desirable in some applications.

In some embodiments, the solid housing component (e.g., a first solid housing component, a second solid housing component) comprises a solid sheet. It should be understood that in this context a solid sheet refers generally to an overall shape and aspect ratio of an object. A solid sheet need not be completely flat or completely planar to be considered a solid sheet. For example, a solid sheet can have surfaces forming an angle, such as solid housing component 314 in FIGS. 10A-10B. In some embodiments, the solid housing component has a relatively large aspect ratio in terms of its lateral dimensions versus its thickness dimension. In some embodiments, a ratio of at least one (or all) lateral dimensions of the solid housing component to the thickness of the solid housing component is greater than or equal to 1.5, greater than or equal to 2, greater than or equal to 5, greater than or equal to 10, greater than or equal to 20, greater than or equal to 50, greater than or equal to 100, greater than or equal to 500, and/or up to 1000, up to 5000, or greater. In some embodiments, the solid housing component (e.g., comprising a solid sheet) has a relatively small thickness. Having a relatively small thickness (e.g., compared thickness of other components of the battery such as the electrochemical cells, solid plates when present, etc.) may contribute to the housing having a relatively small lateral profile, which may promote overall small volumes for the battery. In some embodiments, the solid housing component (e.g., comprising a solid sheet) has a thickness of less than or equal to 5 mm, less than or equal to 2 mm, less than or equal to 1 mm, less than or equal to 500 microns, and/or as low as 200 microns or less. In some embodiments, the solid housing component (e.g., first solid housing component, second solid housing component) comprises a metal and/or metal alloy sheet, such as an aluminum (e.g., aluminum metal) sheet. For example, the solid housing component (e.g., first solid housing component, second solid housing component) may comprise a sheet of 5052-H32 aluminum.

Figure 13:
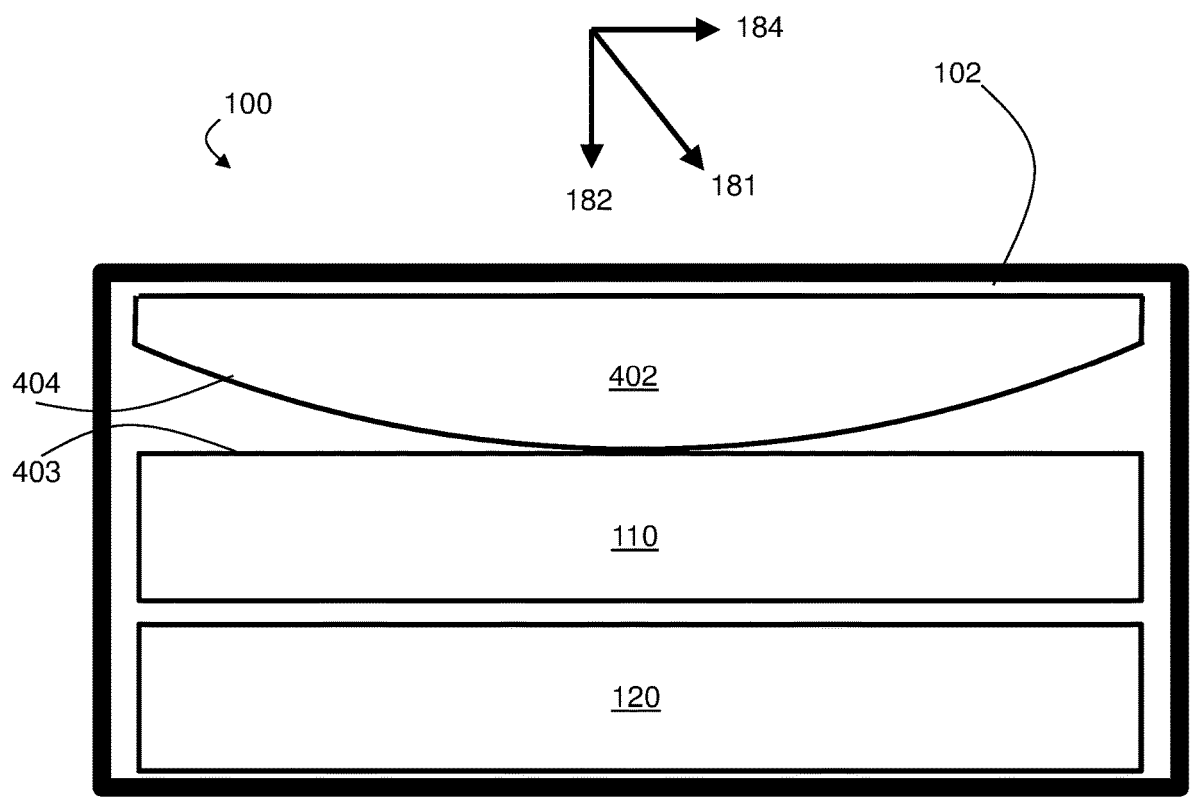
FIG. 13 shows a cross-sectional schematic diagram of an exemplary battery comprising a stack comprising electrochemical cells, a contoured solid article portion, and a housing, according to some embodiments.

In some embodiments, the battery further comprises a contoured solid article portion between a lateral exterior surface of the first electrochemical cell and a portion of the housing. The contoured solid article portion may comprise a surface adjacent (e.g., directly adjacent or indirectly adjacent) to the lateral exterior surface of the first electrochemical cell that is convex with respect to the lateral exterior surface in the absence of an applied force. In some embodiments, under at least one magnitude of applied force, the surface of the contoured solid article portion becomes less convex. Referring to the cross-sectional schematic diagram of battery in FIG. 13, battery 100 may comprise contoured solid article portion 402 between lateral exterior surface 403 of electrochemical cell 110 and a portion of housing 102, in accordance with certain embodiments. Surface 404 of contoured solid article portion 402, which is adjacent to lateral exterior surface 403, is convex with respect to lateral exterior surface 403 in the absence of an applied force. In some embodiments, the contoured solid article portion is a discrete article with respect to the housing. The contoured solid article portion may be between the lateral exterior surface of the first electrochemical cell and, for example, a solid plate of the housing and/or a solid housing component described above.

In some embodiments, under at least one magnitude of applied force, the surface of the contoured solid article portion becomes less convex. Such a change in convexity may be caused by force-induced deformation of the contoured solid article portion. For example, during application of at least one magnitude of an anisotropic force having a component normal to an active surface of an electrode of the first electrochemical cell, the surface of the contoured solid article portion may become less convex.

As would be understood by one of ordinary skill in the art, a solid surface that has a given shape "in the absence of an applied force" is one that, when all external forces are removed from the object comprising that surface, always assumes that particular shape. Accordingly, a surface that has a convex shape in the absence of an applied force is one that always assumes a convex shape when all external forces are removed from the object comprising that surface. Generally, a first surface is convex with respect to a second surface when the first surface curves away from the second surface. It should be understood that portions of surfaces being convex with respect to other surfaces refers to the external geometric surface of the portion. An external geometric surface of an object refers to the surface defining the outer boundaries of the object when analyzed on substantially the same scale as the maximum cross-sectional dimension of the object. Generally, the external geometric surface of an object does not include the internal surfaces, such as the surface defined by pores within a porous object.

It has been observed in the context of this disclosure that the presence of a contoured solid article portion can promote a desired pressure distribution experienced by one or more (or all) of the active surfaces of the electrochemical cells of the battery. For example, in some cases, a uniform pressure distribution is achieved. Such desired pressure distributions can, in some cases, lead to improved performance of the battery. The deformation of the contoured solid article portion (e.g., to become less convex) under applied force may, in some instances, reduce potentially deleterious effects in pressure distribution caused by deformation (e.g., deflection) of portions of the housing (e.g., solid plates) during application of pressure. Further description of contoured surfaces and related devices and methods is provided in International Publication No. WO2020/257414, published on Dec. 24, 2020, and entitled "Methods, Systems, and Devices for Applying Forces to Electrochemical Devices," filed as International Application No. PCT/US2020/038375 on Jun. 18, 2020, which is incorporated herein by reference in its entirety.

In some embodiments, the contoured solid article portion (e.g., that is part of a device configured to apply a force to an electrochemical device) comprises any suitable solid material. In some embodiments, the contoured solid article portion is or comprises a metal, metal alloy, composite material, or a combination thereof. In some cases, the metal that the contoured solid article portion is or comprises is a transition metal. For example, in some embodiments, the contoured solid article portion is or comprises Ti, Cr, Mn, Fe, Co, Ni, Cu, or a combination thereof. In some embodiments, the contoured solid article portion is or comprises a non-transition metal. For example, in some embodiments, the contoured solid article portion is or comprises Al, Zn, or combinations thereof. Exemplary metal alloys that the contoured solid article portion can be or comprise include alloys of aluminum, alloys of iron (e.g., stainless steel), or combinations thereof. Exemplary composite materials that the contoured solid article portion can be or comprise include, but are not limited to, reinforced polymeric, metallic, or ceramic materials (e.g., fiber-reinforced composite materials), carbon-containing composites, or combinations thereof.

In some embodiments, the contoured solid article portion comprising the solid surface (e.g., convex surface) comprises a polymeric material (e.g., an organic polymeric material). In some such embodiments, the contoured solid article portion comprises a polymeric material (e.g., an organic polymeric material) in an amount of greater than or equal to 25 weight percent (wt %), greater than or equal to 50 wt %, greater than or equal to 75 wt %, greater than or equal to 90 wt %, greater than or equal to 95 wt %, greater than or equal to 99 wt %, or up to 100 wt %. Example of suitable polymeric materials include, but are not limited to, acrylonitrile butadiene styrene, polylactic acid, polyamide, polyether ether ketone, Nylon, polycarbonate, polyetherimide resin, or combinations thereof. A contoured solid article portion comprising a polymeric material may be relatively inexpensive to fabricate and may deform relatively easily compared to other types of materials.

The contoured solid article portion may have any of a variety of suitable elastic moduli. The elastic modulus of the contoured solid article portion may be high enough such that it can adequately hold its shape. In some embodiments, the contoured solid article portion has an elastic modulus of greater than or equal to 10 MPa, greater than or equal to 50 MPa, greater than or equal to 100 MPa, greater than or equal to 200 MPa, greater than or equal to 500 MPa, greater than or equal to 1 GPa, greater than or equal to 2 GPa, greater than or equal to 5 GPa, greater than or equal to 10 GPa, greater than or equal to 20 GPa, greater than or equal to 50 GPa, greater than or equal to 100 GPa, greater than or equal to 200 GPa, or greater. In some embodiments, the contoured solid article portion comprising the solid surface has an elastic modulus of less than or equal to 800 GPa, less than or equal to 760 GPa, less than or equal to 500 GPa, less than or equal to 400 GPa, less than or equal to 300 GPa, less than or equal to 250 GPa, less than or equal to 200 GPa, less than or equal to 150 GPa, less than or equal to 100 GPa, less than or equal to 75 GPa, less than or equal to 50 GPa, less than or equal to 25 GPa, less than or equal to 10 GPa, less than or equal to 5 GPa, or lower). Combinations of these ranges are possible (e.g., greater than or equal to 10 MPa and less than or equal to 800 GPa, greater than or equal to 1 GPa and less than or equal to 250 GPa). Materials having a low elastic modulus tend to deform under a given load more than materials having a high elastic modulus.

Figure 14:
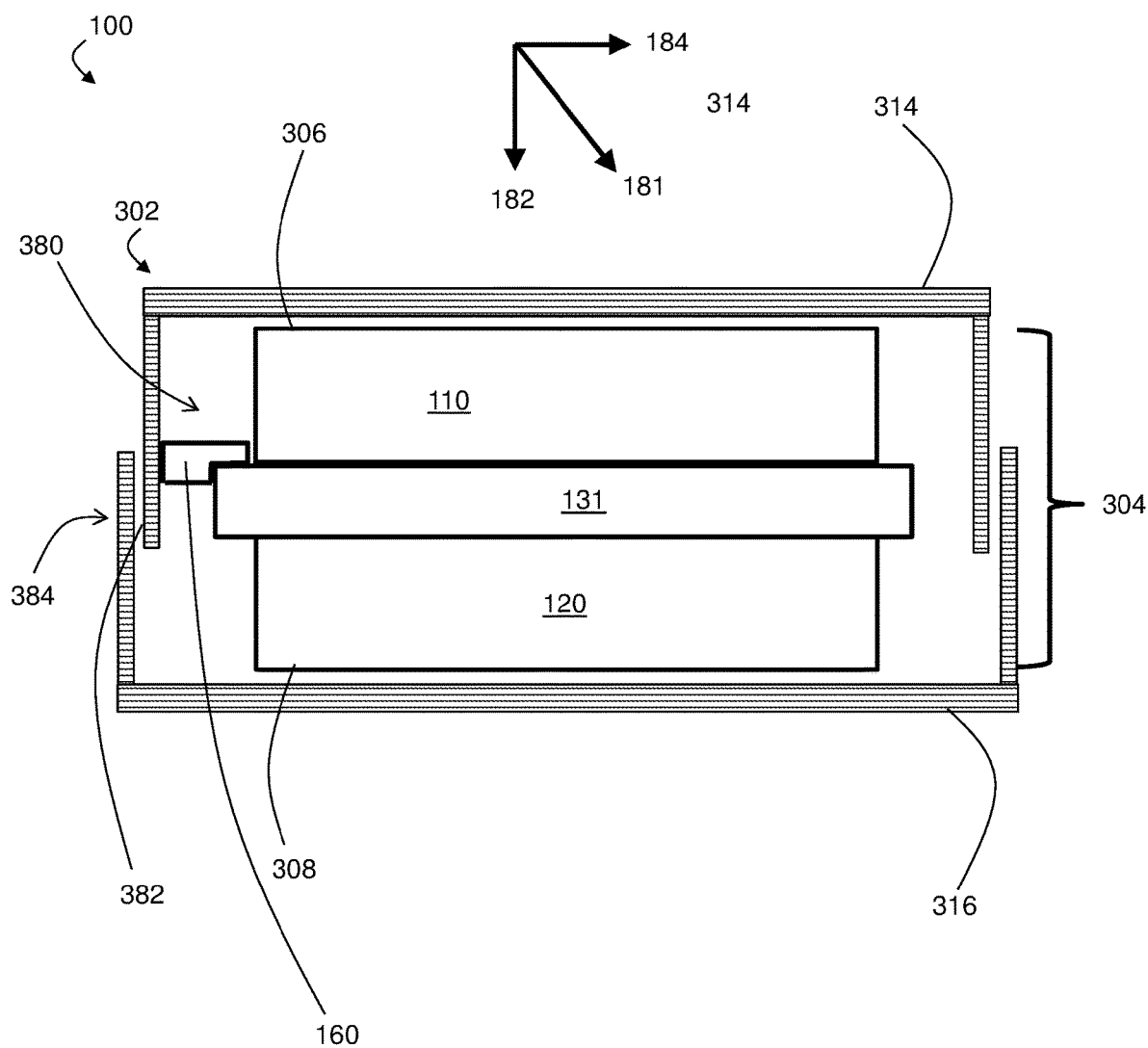
FIG. 14 shows a cross-sectional schematic diagram of an exemplary battery comprising a stack comprising electrochemical cells, a housing that comprises solid housing components, and a phase change material portion, according to some embodiments.

In some embodiments, a battery comprising a stack and a housing comprising a first solid housing component and a second solid housing component as described above comprises a phase change material portion. As noted above, the phase change material portion may be in thermal communication with a thermally conductive solid article portion in the stack of electrochemical cells at least partially enclosed by the housing. FIG. 14 shows an illustrative cross-sectional schematic diagram of one such embodiment. In FIG. 14, battery 100 comprises housing 302 at least partially enclosing stack 304, with housing 302 comprising first solid housing component 314 covering first end 306 of stack 304 and second solid housing component 316 covering second end 308 of stack 304. First solid housing component 314 and second solid housing component 316 are coupled (e.g., via laser welding) at point of attachment 382 in region of overlap 384 along side 380 of stack 304, according to some embodiments. In the embodiment shown in FIG. 14, phase change material portion 160 is in thermal communication with thermally conductive solid 131, which is at least partially between first electrochemical cell 110 and second electrochemical cell 120. While in some embodiments the phase change material portion is lateral to one or more electrochemical cells of a stack in a battery (e.g., as shown with phase change material portion 160 in FIG. 14), other configurations are possible, such as configurations in which the phase change material portion is a layer within the stack.

In some embodiments, the phase change material portion is in thermal communication with the first solid housing component and/or the second solid housing component. For example, at least a portion of the phase change material portion may be in direct contact with at least a portion of the first solid housing component and/or the second solid housing component In some such embodiments, the phase change material portion (e.g., lateral to at least some components of the stack) is in thermal communication with both a solid housing component (e.g., the first solid housing component, the second solid housing component) and a thermally conductive solid article portion, which is in turn in thermal communication with one or more electrochemical cells of the stack (e.g., the first electrochemical cell). For example, in the embodiment shown in FIG. 14, phase change material portion 160 may be in thermal communication with first solid housing component 314 and thermally conductive solid article 131. Having the phase change material portion be in thermal communication with a solid housing component may facilitate efficient heat dissipation from one or more electrochemical cells in the battery to an exterior of the battery, which can assist in cooling the cells of the stack (e.g., during charging and/or discharging). In some such embodiments, gaseous fluid (e.g., air) can be flowed across an exterior of the housing such that heat dissipated from the electrochemical cells to the housing via the phase change material portion is removed from the battery. In some embodiments, the phase change material is in thermal communication with the thermally conductive solid article (and in some instances consequently in thermal communication with an electrochemical cell of the stack) via at least a portion (e.g., at least 0.01%, at least 0.1%, at least 1%, at least 10%, at least 50%, at least 75% or more by surface area) of the side of the stack. For example, in FIG. 14, phase change material portion 160 is in thermal communication with thermally conductive solid article portion 131 via at least a portion of side 380 due to the lateral positioning of phase change material portion 131.

Figure 15:
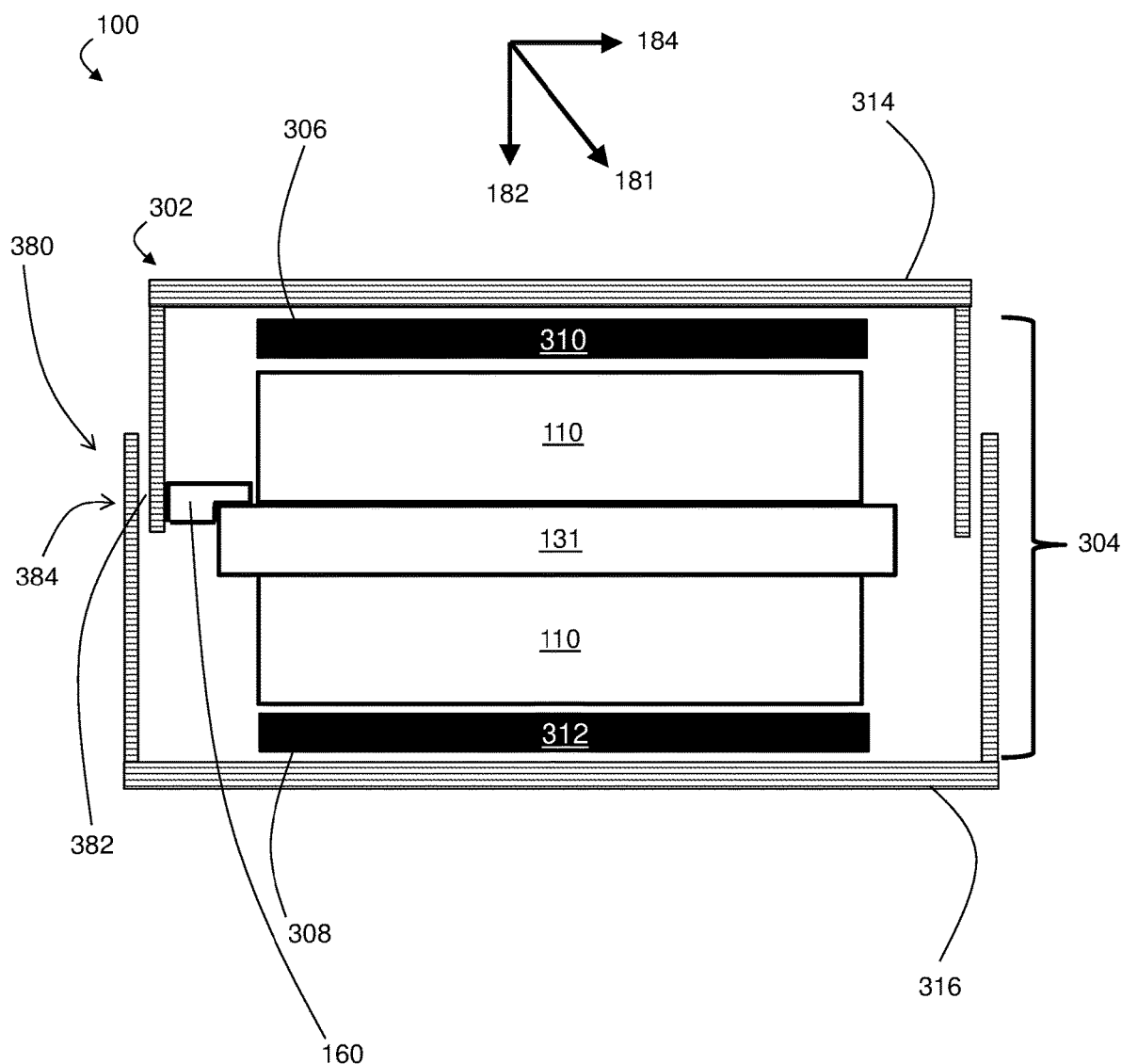
FIG. 15 shows a cross-sectional schematic diagram of an exemplary battery comprising a stack comprising electrochemical cells and solid plates, a housing that comprises solid housing components, and a phase change material portion, according to some embodiments.

In some embodiments in which the phase change material portion is part of a battery comprising a housing at least partially enclosing a stack of electrochemical cells, the stack comprises one or more solid plates (e.g., a first solid plate, a second solid plate). For example, there may be a first solid plate between an electrochemical cell (e.g., an outermost electrochemical cell of the stack) and the first solid housing component. Furthermore, there may be a second solid plate between an electrochemical cell (e.g., an outermost electrochemical cell of the stack) and the second solid housing component. FIG. 15 shows a cross-sectional schematic diagram on one such embodiment, which is configured similarly to that shown in FIG. 14, but further has first solid plate 310 between first electrochemical cell 110 and first solid housing component 314, and has second solid plate 312 between second electrochemical cell 120 and second solid housing component 316.

In some embodiments, the phase change material portion is located such that it experiences a relatively low pressure compared to an average pressure defined by the anisotropic force experienced by the electrode active surface. As described above, application of an anisotropic force with a component normal to an electrode active surface of an electrochemical cell (e.g., during charging and/or discharging) may improve performance and/or durability of the cell (e.g., when the cell comprises lithium (e.g., lithium metal and/or a lithium alloy) as an electrode active material). However, in some instances a magnitude of pressure sufficient to cause improved performance of the electrochemical cell may cause adverse effects on some phase change materials (e.g., mechanical failure due to compressive stress). It has been determined in the context of this disclosure that the phase change material portion and an electrochemical cell can be arranged such that the relatively efficient heat transfer from the electrochemical cell to the phase change material portion can occur but without the phase change material portion experiencing as high a pressure as does the electrochemical cell. For example, lateral positioning of the phase change material portion relative to the electrochemical cell (e.g., lateral to a stack comprising the electrochemical cell) can allow for thermal communication, while at least partially decoupling the pressure experienced by the cell and the pressure experienced by the phase change material portion. For example, in FIG. 15, the lateral positioning of phase change material portion 160 relative to electrochemical cell 110 and solid plate 310 can, in some instances, result in the phase change material portion experiencing less pressure than does an electrode active surface of electrochemical cell during application of anisotropic force 181. Such an arrangement stands in contrast to arrangements where, for example, a phase change material portion is part of a stack comprising the electrochemical cell, or where the phase change material forms a matrix into which an array of electrochemical cells are embedded. In those arrangements, the pressure experienced by the electrochemical cell would be substantially similar to the pressure experienced by the phase change material portion. In some embodiments, the phase change material portion is located such that during at least some period of time during which the housing applies the anisotropic force with a component normal to an electrode active surface of the electrochemical cell, some (e.g., at least 25 vol %, at least 50 vol %, at least 75 vol %, at least 90 vol %, at least 95 vol %, at least 99 vol % or more) or all of the phase change material portion experiences a pressure defined by the anisotropic force that is zero or at least 50%, at least 75%, at least 90%, at least 95%, or at least 99% lower than an average pressure defined by the anisotropic force experienced by the electrode active surface. For example, during application of an anisotropic force by the housing, separate pressure sensors having spatial resolution (e.g., a Tekscan sensor such as a Tekscan 5101 sensor) can be separately coupled to the electrochemical cell and to the phase change material portions, respectively, to measure pressures experienced by each. The spatial average of the pressure experienced by the electrochemical cell can then be compared to the pressures experienced by the phase change material portion to assess whether any of the above values/ranges are satisfied.

The battery may comprise components having a potentially advantageous arrangement (e.g., for thermal management). For example, in some embodiments, a stack is described comprising electrochemical cells, thermally conductive solid article portions, and thermally insulating compressible solid article portions. The stack of electrochemical cells may be part of a battery pack described in this disclosure. In some embodiments, a stack comprises the following in the order listed: a first electrochemical cell; a thermally conductive solid article portion; and a thermally insulating compressible solid article portion. In some embodiments, a stack comprises the following in the order listed: an electrochemical cell; a first thermally conductive solid article portion; a thermally insulating compressible solid article portion; a second thermally conductive solid article portion; and a second electrochemical cell. For example, referring to FIG. 16A, battery 100 comprises a stack comprising first electrochemical cell 110, first thermally conductive solid article portion 131, thermally insulating compressible solid article portion 140, second thermally conductive solid article portion 132, and second electrochemical cell 120.

Figure 17A:
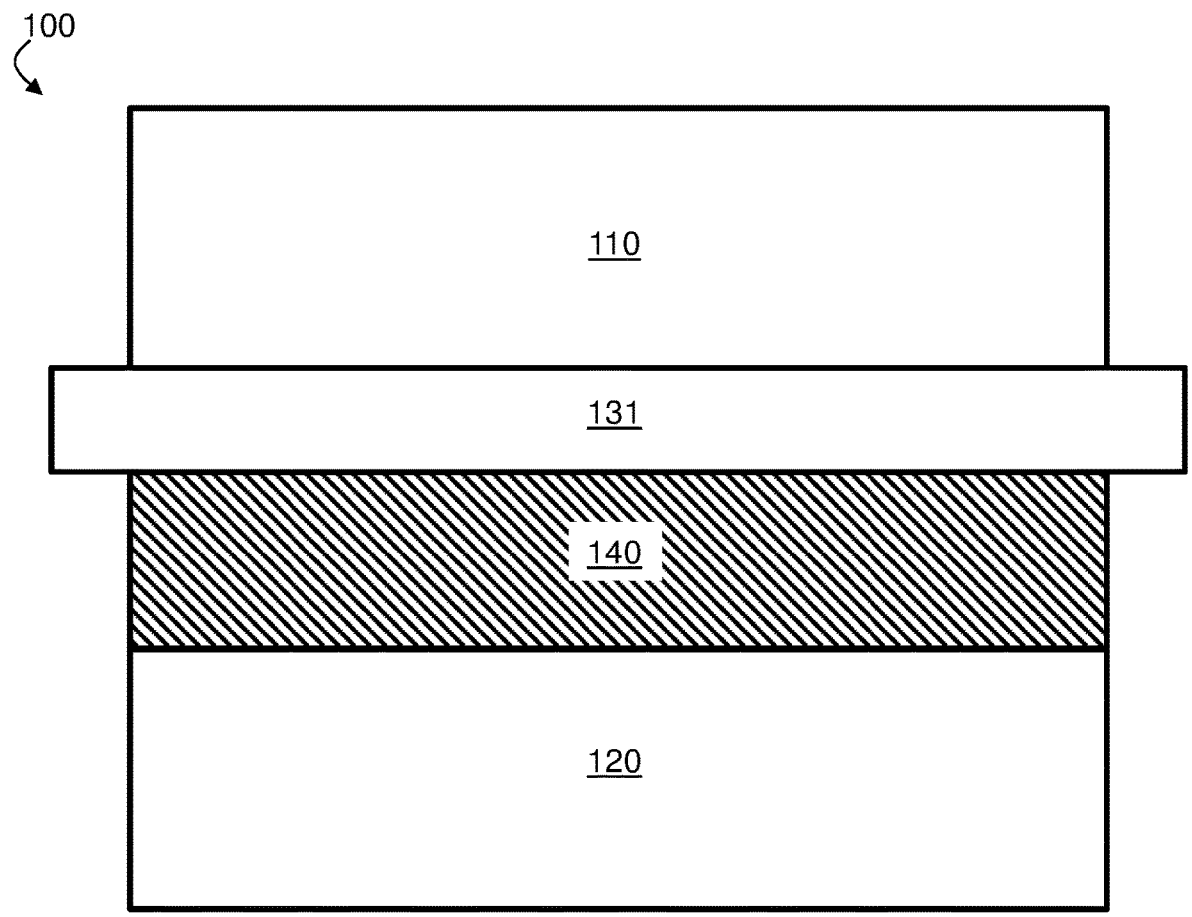
FIGS. 17A-17B show cross-sectional schematic diagrams of exemplary stacks comprising electrochemical cells, a thermally conductive solid article portion, and a thermally insulating compressible solid article portion, according to some embodiments.
Figure 17B:
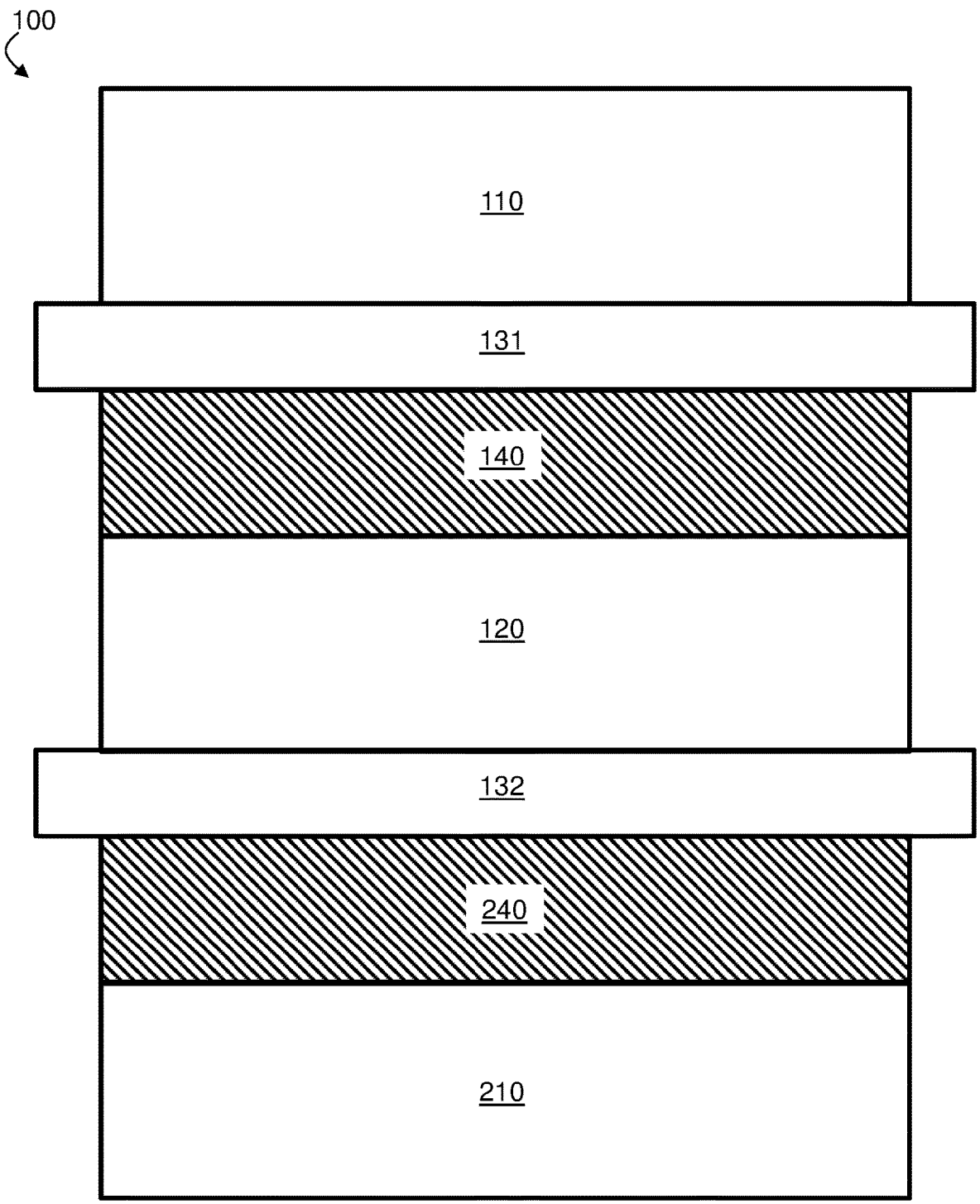

In some embodiments, a stack comprises the following in the order listed: a first electrochemical cell; a thermally conductive solid article portion; a thermally insulating compressible solid article portion, and a second electrochemical cell. For example, FIG. 17A shows a cross-sectional schematic diagram of one such embodiment, where stack of electrochemical cells 100 comprises, in order: electrochemical cell 110, thermally conductive solid article portion 131, thermally insulating compressible solid article portion 140, and second electrochemical cell 120. In some embodiments, a stack comprises the following in the order listed: a first electrochemical cell, a first thermally conductive solid article portion, a first thermally insulating compressible solid article portion, a second electrochemical cell, a second thermally conductive solid article portion, a second thermally insulating compressible solid article portion, and a third electrochemical cell. For example, FIG. 17B shows a cross-sectional schematic diagram of one such embodiment, where stack of electrochemical cells 100 comprises, in order: first electrochemical cell 110, first thermally conductive solid article portion 131, first thermally insulating compressible solid article portion 140, second electrochemical cell 120, second thermally conductive solid article portion 132, second thermally insulating compressible solid article portion 240, and third electrochemical cell 210.

Figure 16A:
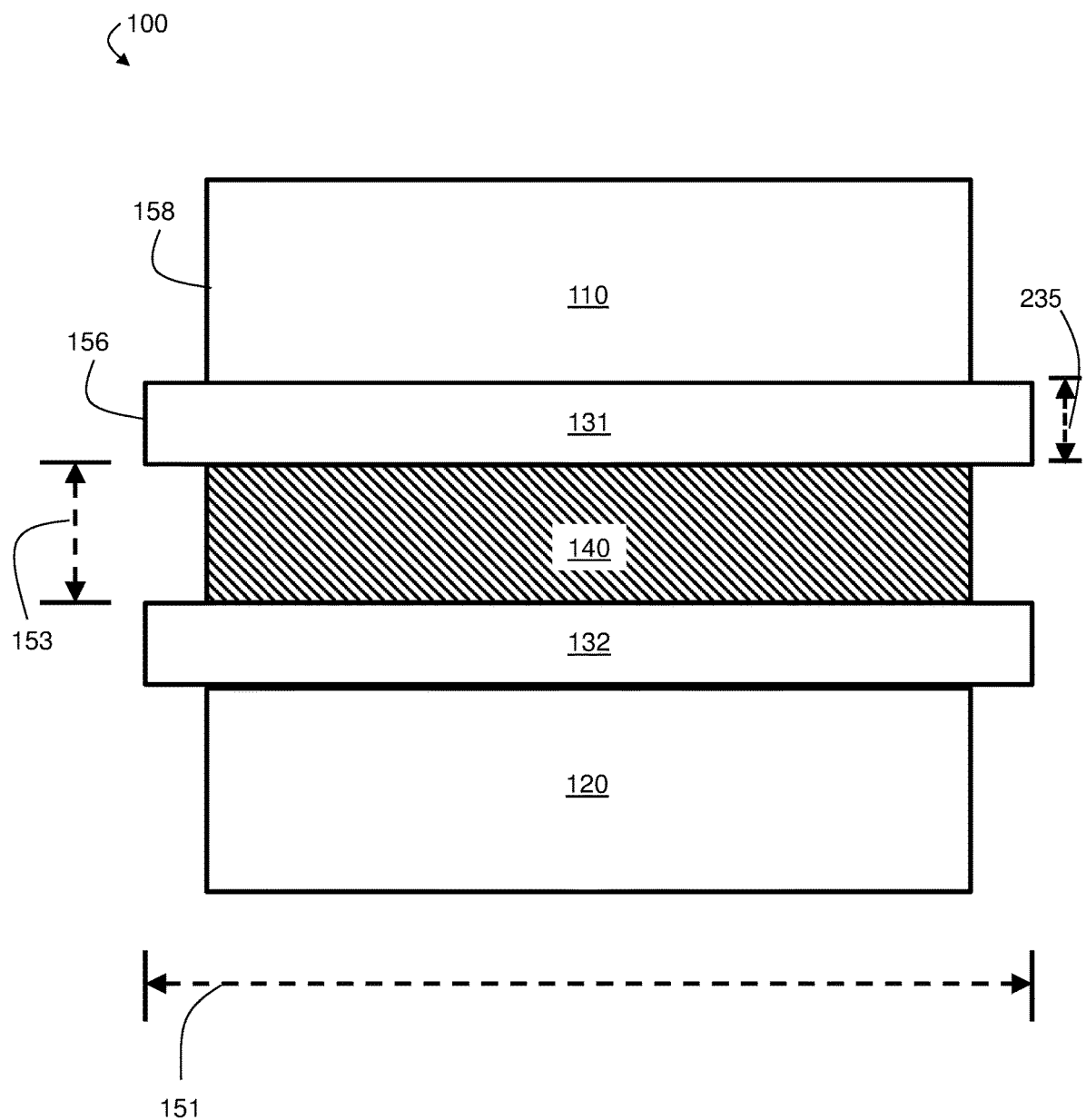
FIGS. 16A-16B show cross-sectional schematic diagrams of exemplary stacks comprising electrochemical cells, thermally conductive solid article portions, and a thermally insulating compressible solid article portion, according to some embodiments.
Figure 16B:
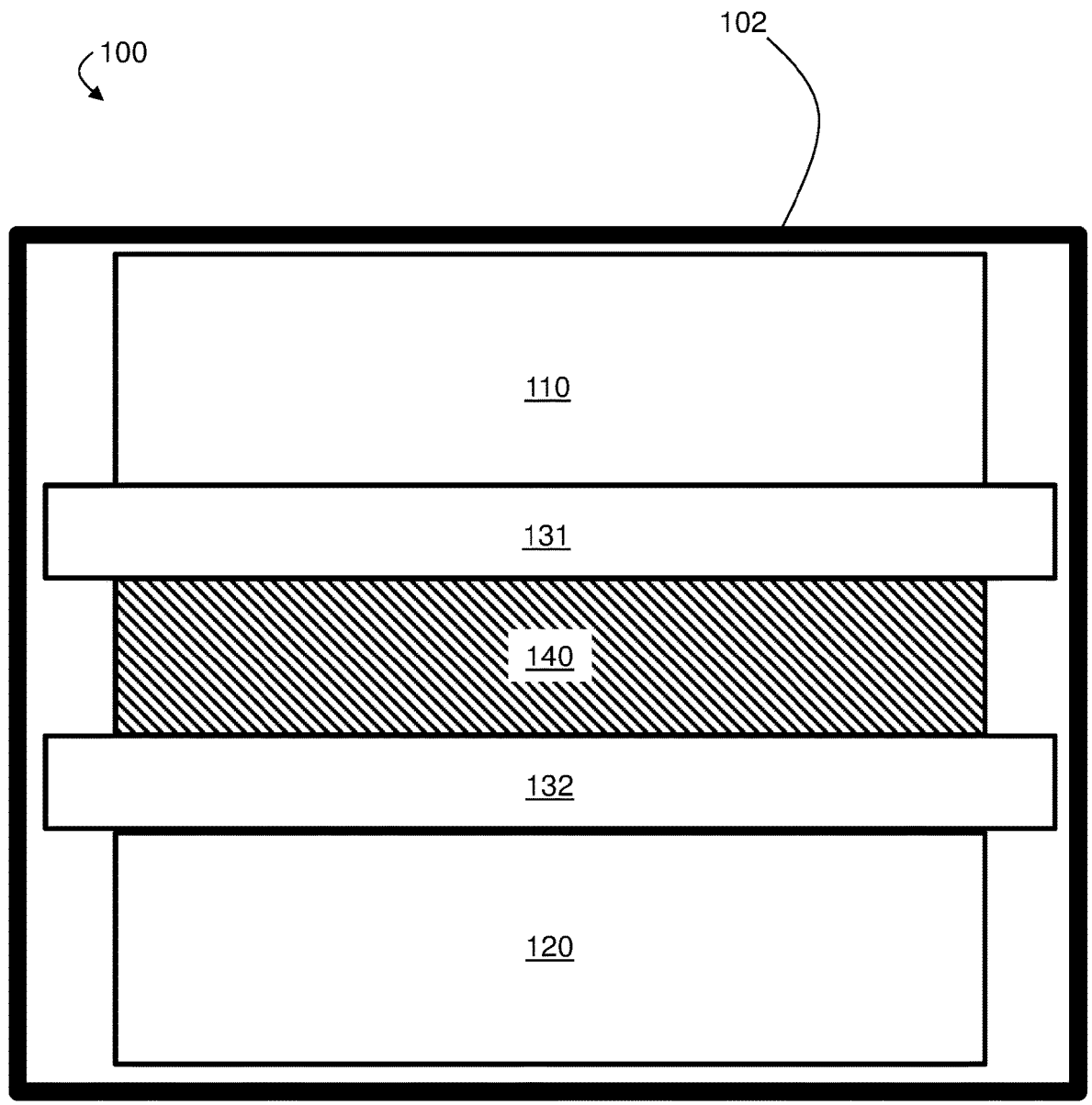

The above-mentioned arrangements of thermally conductive and thermally insulating components may facilitate relatively rapid transfer of heat away from electrochemical cells in the stack while mitigating thermal transfer between electrochemical cells of the stack. For example, battery 100 may have a relatively low rate of thermal transfer in thickness direction 153 shown in FIG. 16A, while at least a portion of battery 100 may have a relatively high rate of thermal transfer in lateral direction (in-plane direction) 151 as shown in FIG. 16A. Additionally, having one or more of the components be compressible may assist with mitigating expansion of the battery pack, e.g., during cumulative expansion of electrochemical cells during cycling. The stack may be at least partially enclosed by a housing. For example, battery pack 100 may be at least partially enclosed by optional housing 102 in FIG. 16B. The housing may, in some instances have a configuration with a first solid housing component and a second solid housing component, for example as shown in FIG. 14 and FIG. 15. In some, but not necessarily all embodiments, there are no intervening layers or components between these articles. For example, in some embodiments, the first electrochemical cell is directly adjacent to the first thermally conductive solid article portion, the first thermally conductive solid article portion is directly adjacent to the thermally insulating compressible solid article portion, the thermally insulating compressible solid article portion is directly adjacent to the second thermally conductive solid article portion, and the second thermally conductive solid article portion is directly adjacent to the second electrochemical cell. However, in other embodiments, intervening articles or layers may be present, such as sensors (e.g., pressure sensors, temperature sensors, phase change material portions, etc.). In some embodiments, at least one lateral edge of the thermally conductive solid article portion extends past a lateral edge of the first electrochemical cell. For example, in FIG. 16A lateral edge 156 of first thermally conductive solid article portion 131 extends past lateral edge 158 of first electrochemical cell 110, in accordance with certain embodiments. This may facilitate removal of heat from the electrochemical cells.

Figure 18A:
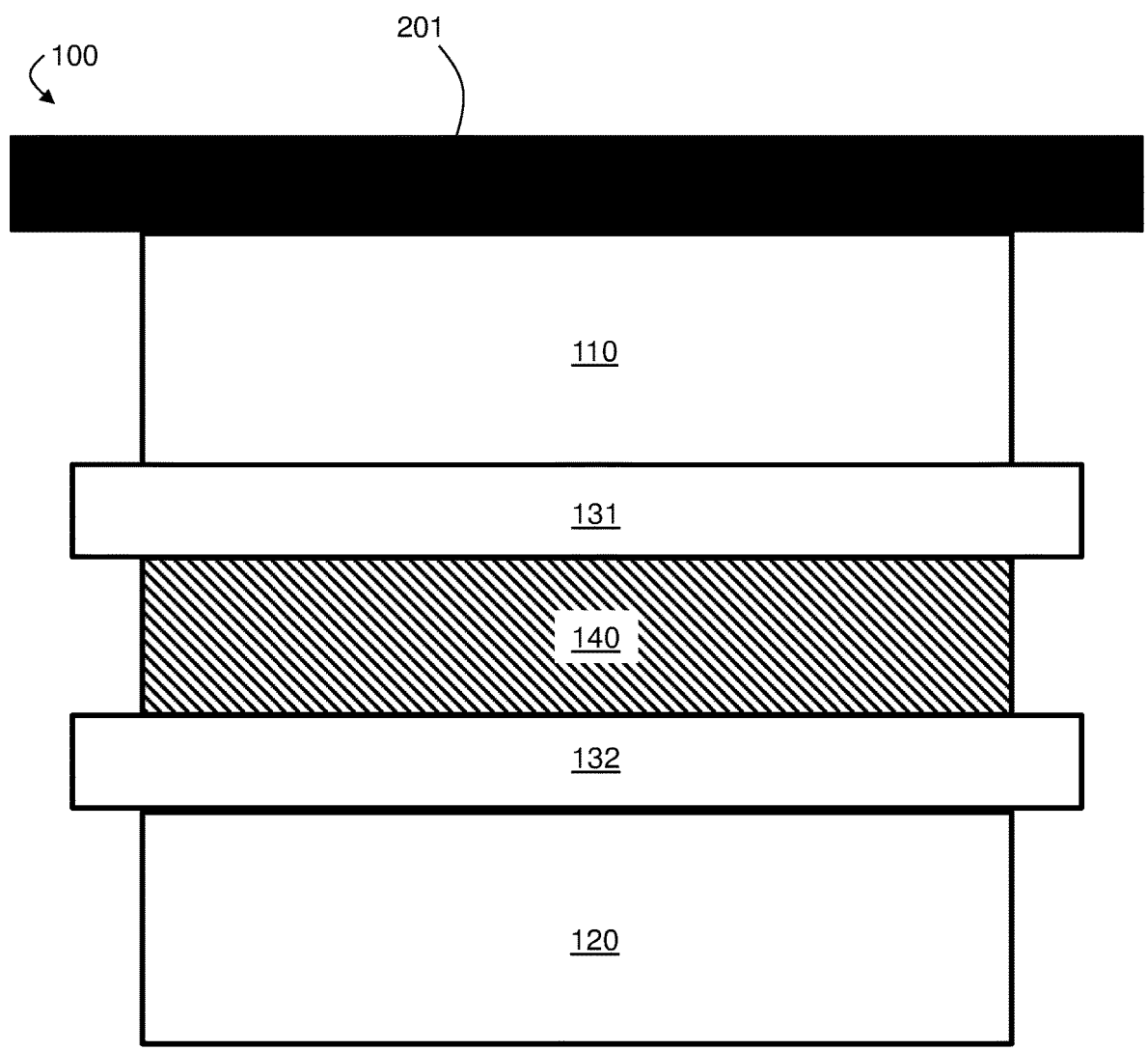
FIGS. 18A-18B show cross-sectional schematic diagrams of exemplary stacks comprising electrochemical cells, thermally conductive solid article portions, a thermally insulating compressible solid article portion, and a solid plate in the absence and presence of an anisotropic force, respectively, according to some embodiments.
Figure 18B:
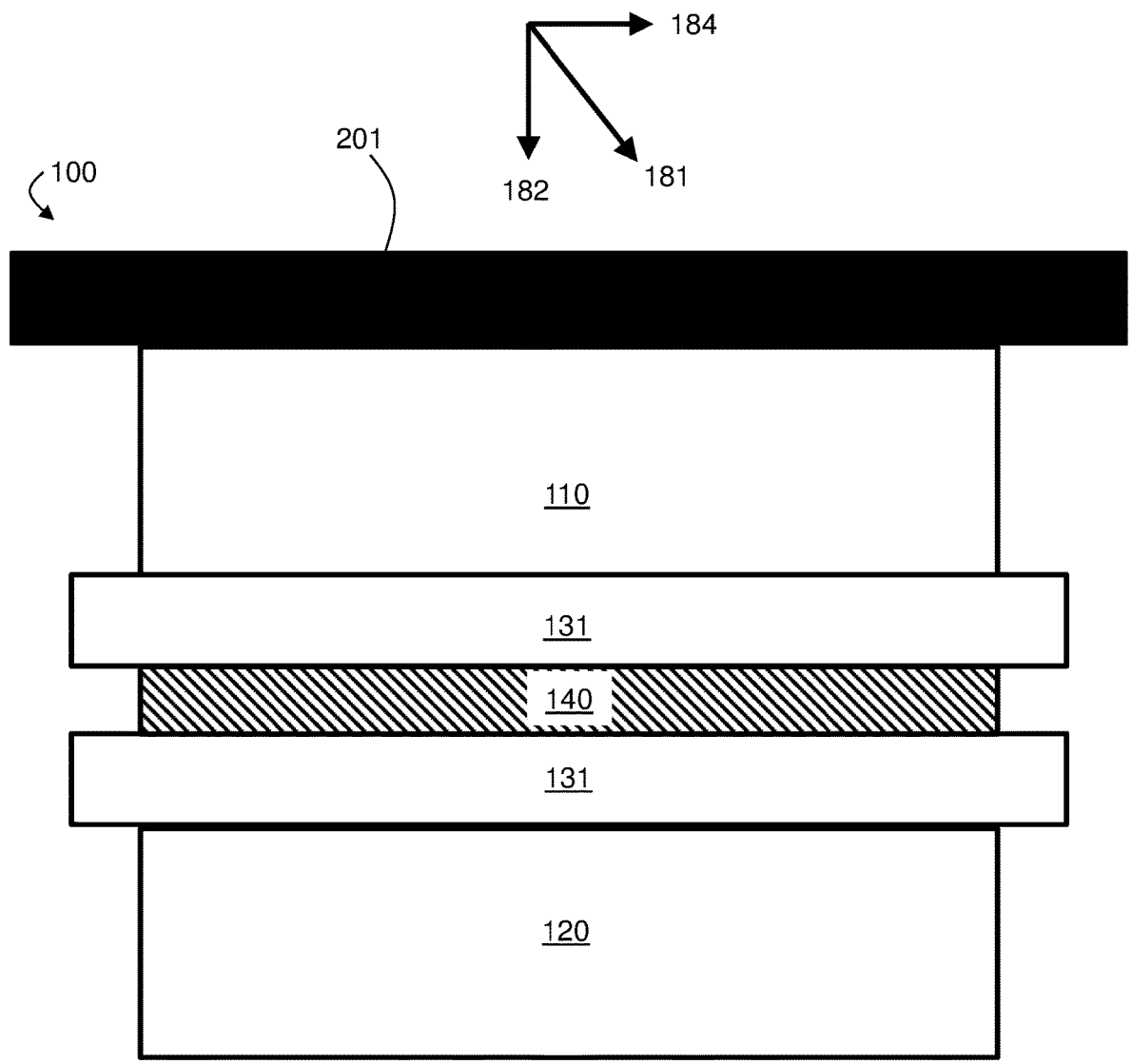

As mentioned above, some embodiments may comprise application of an anisotropic force (e.g., via a solid plate). FIGS. 18A-18B show one such embodiment, where anisotropic force 181 is applied via first solid plate 201 (see FIG. 18B). FIG. 18B illustrates how in some embodiments, the application of such a force causes thermally insulating compressible solid article portion 140 to compress.

In some embodiments, the battery comprises thermally conductive solid article portions (e.g., in thermal communication with a phase change material portion). Referring back to FIGS. 16A-16B, battery 100 comprises first thermally conductive solid article portion 131 and second thermally conductive solid article portion 132. As mentioned above, the thermally conductive solid article portions may promote heat transfer away from components of the battery (e.g., the electrochemical cells) (and in some instances while also facilitating alignment of electrochemical active regions of the electrochemical cells). In some, but not necessarily all, cases thermally conductive solid article portions are in direct contact with the electrochemical cells. For example, in FIGS. 16A-16B, first thermally conductive solid article portion 131 is shown as being in direct contact with first electrochemical cell 110. However, direct contact is not required, and in some embodiments, there are one or more intervening components (e.g., sensors, etc.) between the thermally conductive solid article portions and the electrochemical cells.

In some embodiments, the thermally conductive solid article portion of the battery has a relatively high effective thermal conductivity. As mentioned above, such a high effective thermal conductivity may allow the thermally conductive solid article to assist with dissipating heat from one or more electrochemical cells of the battery. Thermal conductivity is generally understood to be an intrinsic property of a material related to its ability to conduct heat. Thermal conductivity is a temperature-dependent quantity and is typically reported in units of $W\,m^{-1}\,K^{-1}$. The effective thermal conductivity of an article generally refers to the ability of an article to conduct heat, taking into account that the article may be made of a single material or may be a non-homogeneous material that may be made of a combination of materials (e.g., a composite material such as a particulate material or layered material). An exemplary method for measuring the thermal conductivity or effective thermal conductivity of a thermally insulating compressible solid article portion is using a hot disk method, as described in ISO/DIS 22007-2.2.

In some embodiments, a thermally conductive solid article portion (e.g., first thermally conductive solid article portion, second thermally conductive solid article portion) has a relatively high effective thermal conductivity in an in-plane direction. Referring again to FIG. 16A, for example, first thermally conductive solid article portion 131 and/or second thermally conductive solid article portion 132 may have a high effective thermal conductivity in lateral direction 151, which is parallel to the in-plane directions of first thermally conductive solid article portion 131 and/or second thermally conductive solid article portion 132. As a result, first thermally conductive solid article portion 131 and/or second thermally conductive solid article portion 132 may enhance the rate at which heat conducted from first electrochemical cell 110 and/or second electrochemical cell 120 is then transferred away (in a lateral direction) from first electrochemical cell 110 and/or second electrochemical cell 120, according to certain embodiments. A resulting accelerated rate of cooling of the electrochemical cells may occur, and in combination with a reduced extent of heat transfer in the thickness direction can, in some instances, improve the safety and performance of the battery (e.g., by reducing thermal propagation). In some embodiments, a thermally conductive solid article portion (e.g., first thermally conductive solid article portion, second thermally conductive solid article portion) has an effective thermal conductivity of greater than or equal to $10\,W\,m^{-1}\,K^{-1}$, greater than or equal to $25\,W\,m^{-1}\,K^{-1}$, greater than or equal to $50\,W\,m^{-1}\,K^{-1}$, greater than or equal to $65\,W\,m^{-1}\,K^{-1}$, greater than or equal to $80\,W\,m^{-1}\,K^{-1}$, greater than or equal to $100\,W\,m^{-1}\,K^{-1}$, greater than or equal to $150\,W\,m^{-1}\,K^{-1}$, and/or up to $159\,W\,m^{-1}\,K^{-1}$, up to $200\,W\,m^{-1}\,K^{-1}$, or greater in an in-plane direction at a temperature of 25° C. For example, a thermally conductive solid article portion (e.g., first thermally conductive solid article portion, second thermally conductive solid article portion) may be made of aluminum and have an effective thermal conductivity of $159\,W\,m^{-1}\,K^{-1}$ in an in-plane direction at a temperature of 25° C.

The thermally conductive solid article portion (e.g., first thermally conductive solid article portion, second thermally conductive solid article portion) may comprise any of a variety of suitable materials. In some embodiments, a thermally conductive solid article portion (e.g., first thermally conductive solid article portion, second thermally conductive solid article portion) comprises a metal and/or metal alloy. Exemplary metals include, but are not limited to transition metals (e.g., titanium, manganese, iron, nickel, copper, zinc), non-transition metals (e.g., aluminum), and alloys or other combinations thereof. In certain embodiments, a thermally conductive solid article portion (e.g., first thermally conductive solid article portion, second thermally conductive solid article portion) comprises or is made of aluminum, at least because aluminum has a relatively high effective thermal conductivity and a relatively low mass density, which in some cases contributes to an overall high specific energy density for the battery. One exemplary type of aluminum material of which a thermally conductive solid article portion may be made is 3003 H14 series aluminum, which is aluminum alloyed with 1.2% manganese to increase strength. In some embodiments, a relatively high percentage (e.g., greater than or equal to 50 weight percent (wt %), greater than or equal to 75 wt %, greater than or equal to 90 wt %, greater than or equal to 95 wt %, greater than or equal to 99 wt %, or more) of the thermally conductive solid article portion is metal and/or metal alloy.

In some embodiments, the thermally conductive solid article portion comprises or is made of a carbon-based material. Suitable carbon-based materials include, but are not limited to, graphite, carbon-fiber, graphene (e.g., as part of thermally conductive solid article comprising a solid substrate and associated with graphene), and combinations thereof. In some embodiments, the carbon-based material is present in a relatively high percentage (e.g., greater than or equal to 50 wt %, greater than or equal to 75 wt %, greater than or equal to 90 wt %, greater than or equal to 95 wt %, greater than or equal to 99 wt %, or more) of the thermally conductive solid article portion. In some embodiments, a carbon-based material of a thermally conductive solid article portion has graphite, carbon-fiber, graphene, or a combination thereof present in an amount of at least 25 wt %, at least 50 wt %, at least 75 wt %, at least 90 wt %, at least 95 wt %, at least 99 wt %, or 100 wt %.

The thermally conductive solid article portion (e.g., first thermally conductive solid article portion, second thermally conductive solid article portion) may have any of a variety of form factors. In some embodiments, the thermally conductive solid article portion (e.g., first thermally conductive solid article portion, second thermally conductive solid article portion) is in the form of a relatively planar object (notwithstanding the non-planarities and/or alignment features described below). For example, the thermally conductive solid article portion (e.g., first thermally conductive solid article portion, second thermally conductive solid article portion) may be in the form of a sheet (e.g., a metal and/or metal alloy sheet). In some embodiments, the thermally conductive solid article portion (e.g., first thermally conductive solid article portion, second thermally conductive solid article portion) is or comprises a fin (e.g., a metal and/or metal alloy fin). In some embodiments, the thermally conductive solid article portion (e.g., first thermally conductive solid article portion, second thermally conductive solid article portion) is or comprises a solid plate. It should be understood that the surfaces of a sheet, fin, or solid plate do not necessarily need to be flat. For example, one of the sides of a sheet, fin, or solid plate could have any of the non-planarities and/or alignment features described herein.

The thermally conductive solid article portion (e.g., first thermally conductive solid article portion, second thermally conductive solid article portion) may have a thickness as well as two orthogonal lateral dimensions that are orthogonal to each other as well as orthogonal to the thickness. For example, referring to FIG. 16A, first thermally conductive solid article portion 131 has maximum thickness 235, lateral dimension 151, and a second lateral dimension (not pictured) orthogonal to both maximum thickness 235 and lateral dimension 151 (which would run into and out of the plane of the drawing in FIG. 16A).

The dimensions of the thermally conductive solid article portion may be chosen based on any of a variety of considerations. For example, the thickness or lateral dimensions may be chosen based on the desired total size of the battery and/or a desired pack burden. In some embodiments, one or more lateral dimensions of the thermally conductive solid article portion is such that heat generated by the electrochemical cells, once conducted to the thermally conductive solid article portions, can be transferred a relatively long distance from the electrochemical active regions of the electrochemical cells. In some embodiments, the thermally conductive solid article portion has one or more lateral dimensions that extends at least 1 mm, at least 2 mm, at least 5 mm, at least 1 cm, at least 2 cm, at least 5 cm, and/or up to 10 cm or more past the electrochemical active region of the electrochemical cell coupled to the thermally conductive solid article portion.

In some embodiments, the thermally conductive solid article portion (e.g., first thermally conductive solid article portion, second thermally conductive solid article portion) has at least one lateral dimension that is at least 5 times, at least 10 times, and/or up to 20 times, up to 50 times, up to 100 times or more greater than the maximum thickness of the thermally conductive solid article portion.

As noted above, in some embodiments, the battery comprises a thermally insulating compressible solid article portion. The thermally insulating compressible solid article portion may be between two electrochemical cells of the battery. For example, referring back to FIGS. 16A-16B, battery 100 comprises thermally insulating compressible solid article portion 140 between first electrochemical cell 110 and second electrochemical cell 120, according to certain embodiments. A more detailed description of exemplary thermally insulating compressible solid article portions is described below.

Figure 19:
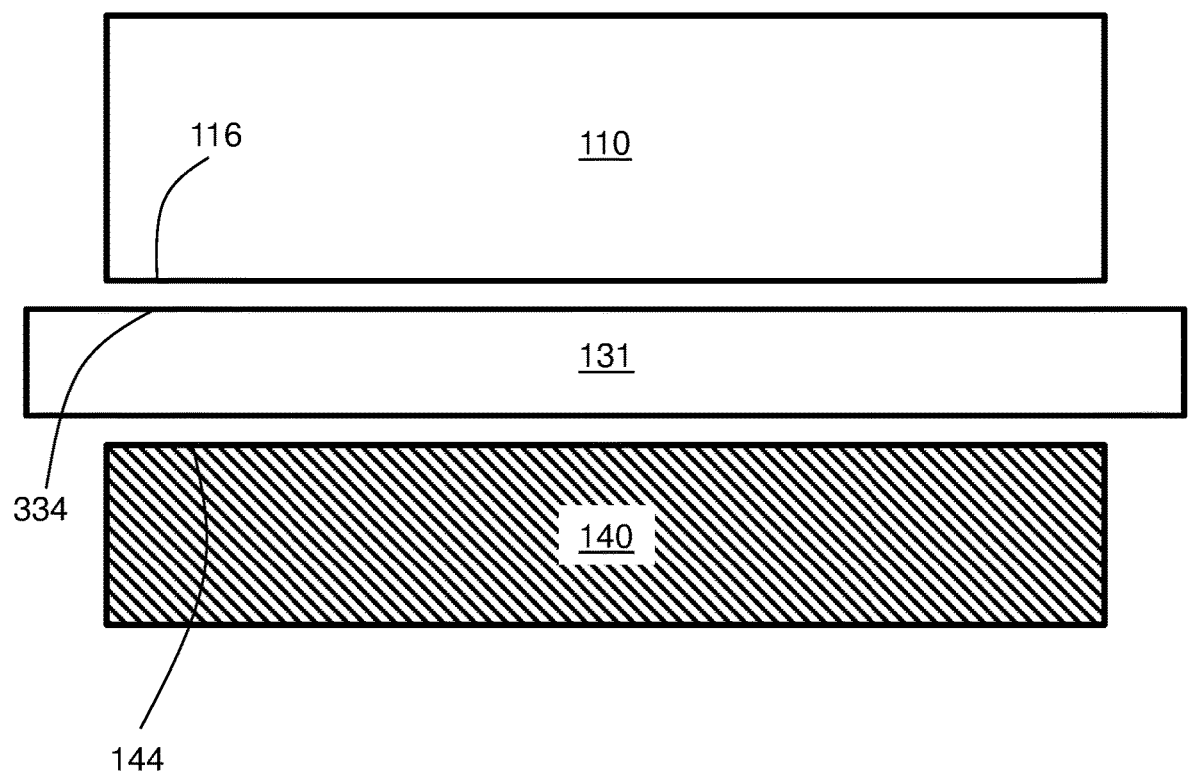
FIG. 19 shows a cross-sectional schematic diagram of an exemplary stack comprising an electrochemical cell, thermally conductive solid article portion, and a thermally insulating compressible solid article portion, according to some embodiments.

In some embodiments, the thermally conductive solid article portion is relatively smooth as compared to the thermally insulating compressible solid article portion. This may, in some cases, be advantageous, because, under high magnitudes of force, surface irregularities in certain types of thermally insulating compressible solid article portions (e.g., microcellular foams) may cause non-uniform pressure distributions on the electrode active surfaces of the battery. A relatively smooth thermally conductive solid article portion (e.g., a metal sheet) may, comparatively, have few irregularities and "smooth" out the pressure distribution. As one example, in FIG. 19, surface 144 of thermally insulating compressible solid article portion 140 may be relatively rough (e.g., have a relatively high surface roughness), while surface 334 of first thermally conductive solid article portion 131 may be relatively smooth (e.g., have a relatively low surface roughness), thereby mitigating irregularities in pressure distribution to surface 116 of first electrochemical cell 110. In some embodiments, the thermally conductive solid article portion has a surface facing a surface of the first electrochemical device having a surface roughness of less than or equal to 10 micrometers, less than or equal to 5 micrometers, less than or equal to 1 micrometer, less than or equal to 0.5 micrometers, less than or equal to 0.1 micrometers, less than or equal to 0.05 micrometers, less than or equal to 0.01 micrometers, or less. In some embodiments, the thermally conductive solid article portion has a surface facing a surface of the first electrochemical device having a surface roughness as low as 0.005 micrometers. That is to say, in some embodiments, the thermally conductive solid article portion has a surface having a surface roughness as low as 0.005 micrometers, with that surface facing a surface of the first electrochemical device.

Figure 20:
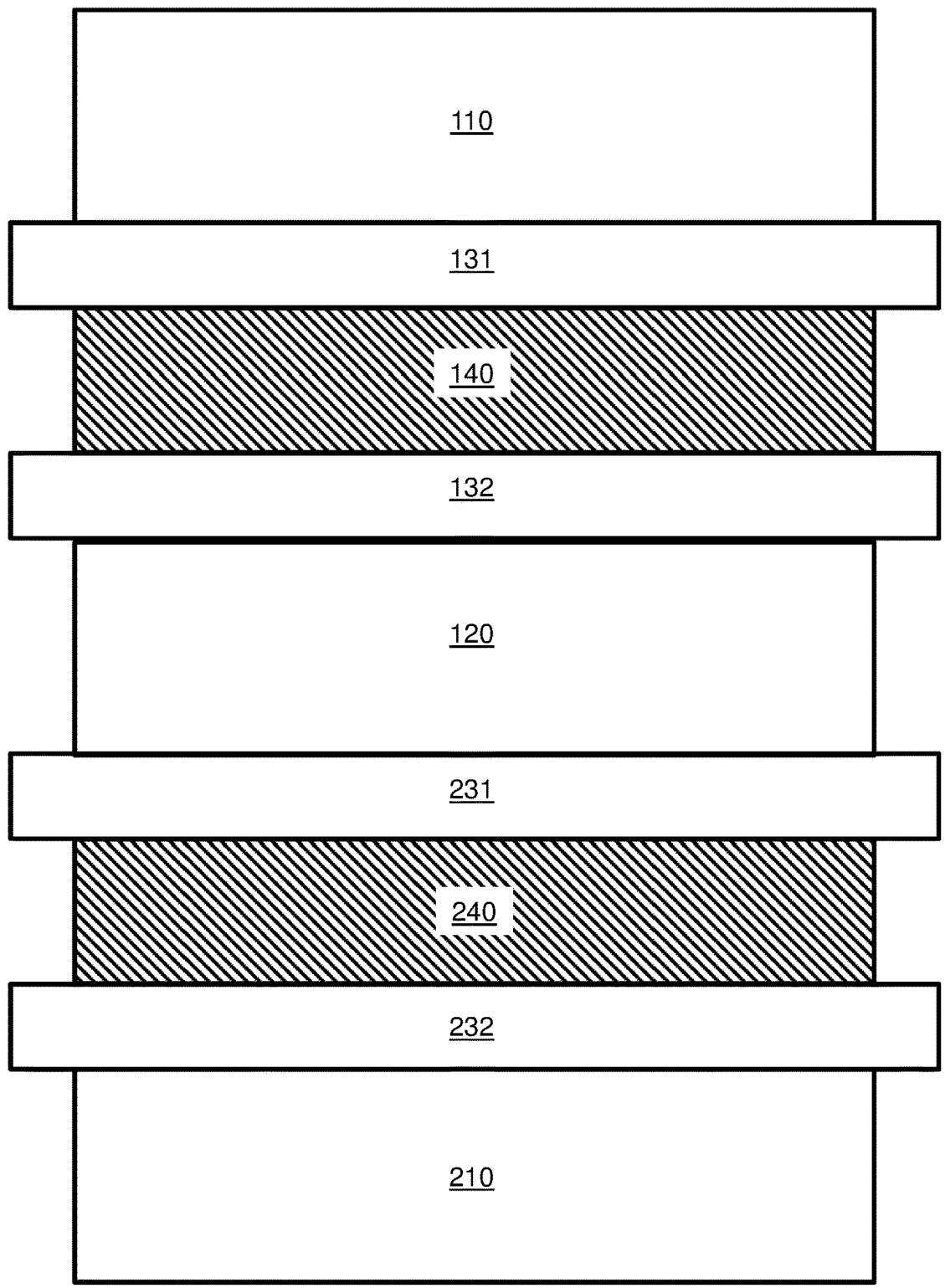
FIG. 20 shows a cross-sectional schematic diagram of an exemplary stack comprising electrochemical cells, thermally conductive solid article portions, and thermally insulating compressible solid article portions, according to some embodiments.

In some embodiments, the arrangement of components of the battery may be repeated. For example, in FIG. 20, battery 400 comprises first electrochemical cell 110, first thermally conductive solid article portion 131, first thermally insulating compressible solid article portion 140, second thermally conductive solid article portion 132, second electrochemical cell 120, third thermally conductive solid article portion 231, second thermally insulating compressible solid article portion 240, fourth thermally conductive solid article portion 232, and third electrochemical cell 210.

Figure 21:
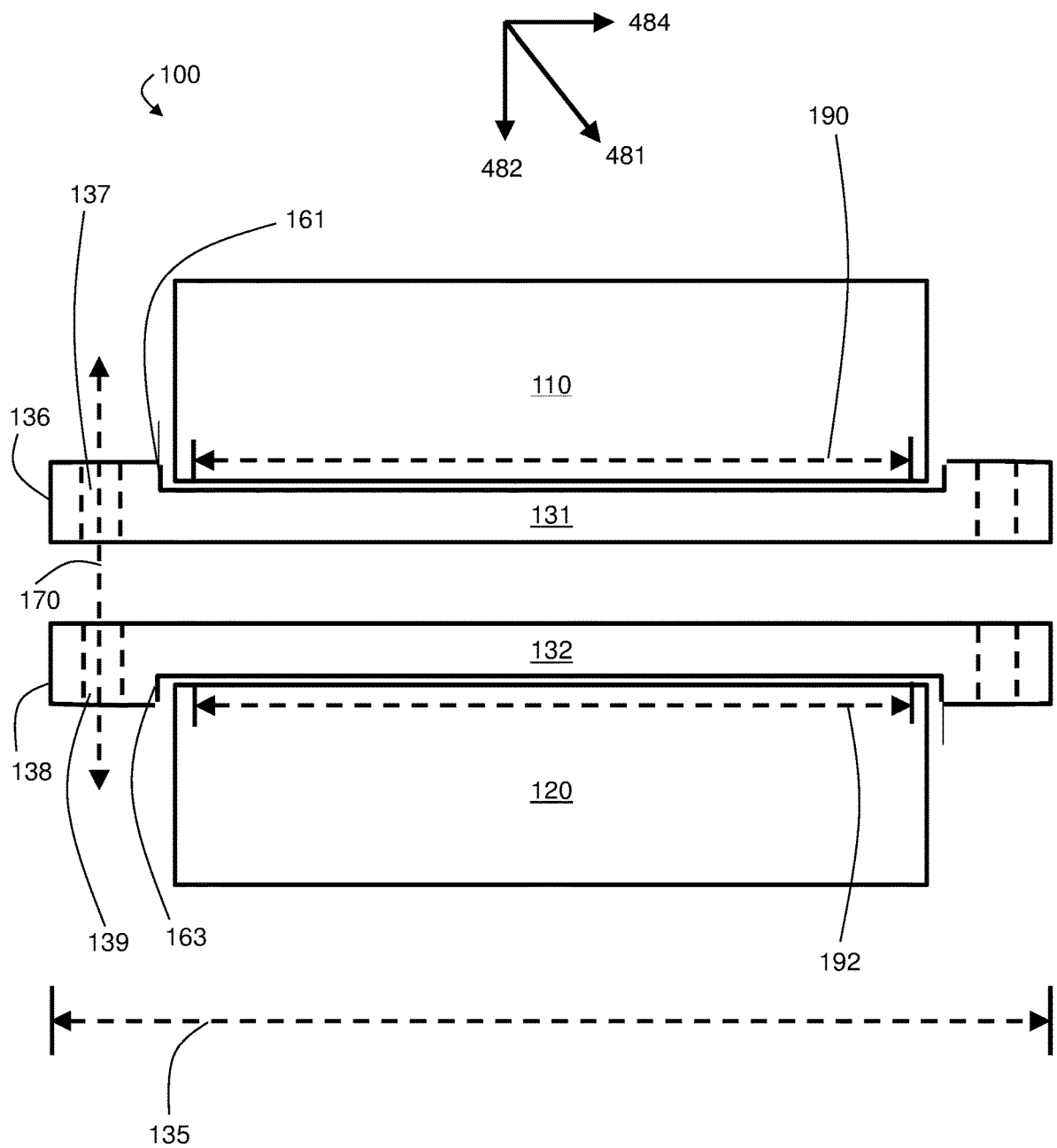
FIG. 21 shows a cross-sectional schematic diagram of an exemplary battery comprising electrochemical cells and thermally conductive solid article portions comprising alignment features, according to some embodiments.

In certain aspects, batteries with components that may facilitate alignment of electrochemical active areas are generally described. FIG. 21 is a schematic diagram of a non-limiting embodiment of battery 100. Battery 100 in FIG. 21 comprises first electrochemical cell 110 and second electrochemical cell 120 as part of a stack with first thermally conductive solid article portion 131 and second thermally conductive solid article portion 132, in accordance with certain embodiments. The thermally conductive solid article portions may comprise alignment features, as described in more detail below.

Figure 22:
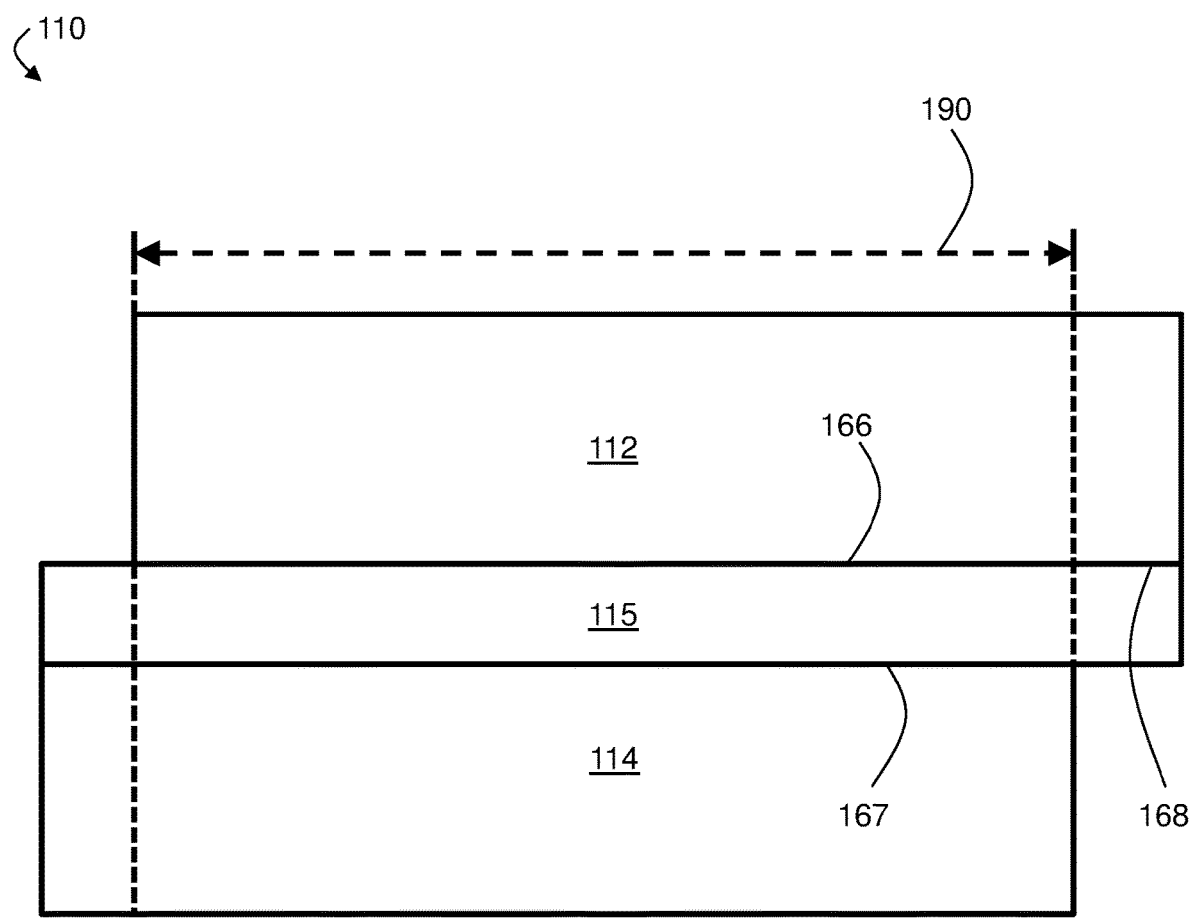
FIG. 22 shows a cross-sectional schematic diagram of an exemplary electrochemical cell, according to some embodiments.

Each of the electrochemical cells in the batteries described herein may have an electrochemical active region. For example, FIG. 21 shows an embodiment where battery 100 comprises first electrochemical cell 110 comprising first electrochemical active region 190 and second electrochemical cell 120 comprising second electrochemical active region 192. An electrochemical active region refers to a region defined by the overlap of the anode active surfaces of the anodes and cathode active surfaces of the cathodes of the electrochemical cell. For example, referring to FIG. 22, first electrochemical cell 110 has electrochemical active region 190 defined by the overlap of anode active surface 166 and cathode active surface 167. As used herein, the term "active surface" is used to describe a surface of an electrode that can be in physical contact with an electrolyte when the article is part of an electrochemical cell, and at which electrochemical reactions may take place. In some embodiments, a portion of an anode and/or cathode may not be part of the electrochemical active region of the electrochemical cell. For example, an anode and cathode may be offset such that a portion of an anode does not overlap with the corresponding cathode, thereby preventing that portion of the anode from participating in electrochemical reactions with the cathode. Referring to FIG. 22, portion 168 of anode 112 does not overlap with any of cathode 114 and therefore cannot participate in any electrochemical reactions with cathode 114, and therefore portion 118 of anode 112 is not part of first electrochemical active region 190, according to certain embodiments.

In some embodiments, an electrochemical cell of the battery (e.g., first electrochemical cell, second electrochemical cell) is coupled to a non-planarity of a thermally conductive solid article portion (e.g., first thermally conductive solid article portion, second thermally conductive solid article portion) of the battery. FIG. 21 shows one non-limiting such example, where battery 100 comprises first electrochemical cell 110 coupled to non-planarity 161 of first thermally conductive solid article portion 131 and battery 100 further comprises second electrochemical cell 120 coupled to non-planarity 163 of second thermally conductive solid article portion 132. Any of a variety of non-planarities may be part of a thermally conductive solid article portion and used to couple to an electrochemical cell. For example, a non-planarity of a thermally conductive solid article portion may be a deviation from the mean plane of a surface of the thermally conductive solid article portion facing the electrochemical cell to which it is coupled.

As used herein, a surface is said to be "facing" an object when a line extending normal to and away from the bulk of the material comprising the surface intersects the object. For example, a first surface and a second surface can be facing each other if a line normal to the first surface and extending away from the bulk of the material comprising the first surface intersects the second surface. A surface can be facing another object when it is in contact with the other object, or when one or more intermediate materials are positioned between the surface and the other object. For example, two surfaces that are facing each other can be in contact or can include one or more intermediate materials between them. In some instances, a surface and an object (e.g., another surface) facing each other are substantially parallel. In some embodiments, two surfaces can be substantially parallel if, for example, the maximum angle defined by the two planes is less than or equal to 10°, less than or equal to 5°, less than or equal to 2°, or less than or equal to 1°.

Figure 23:
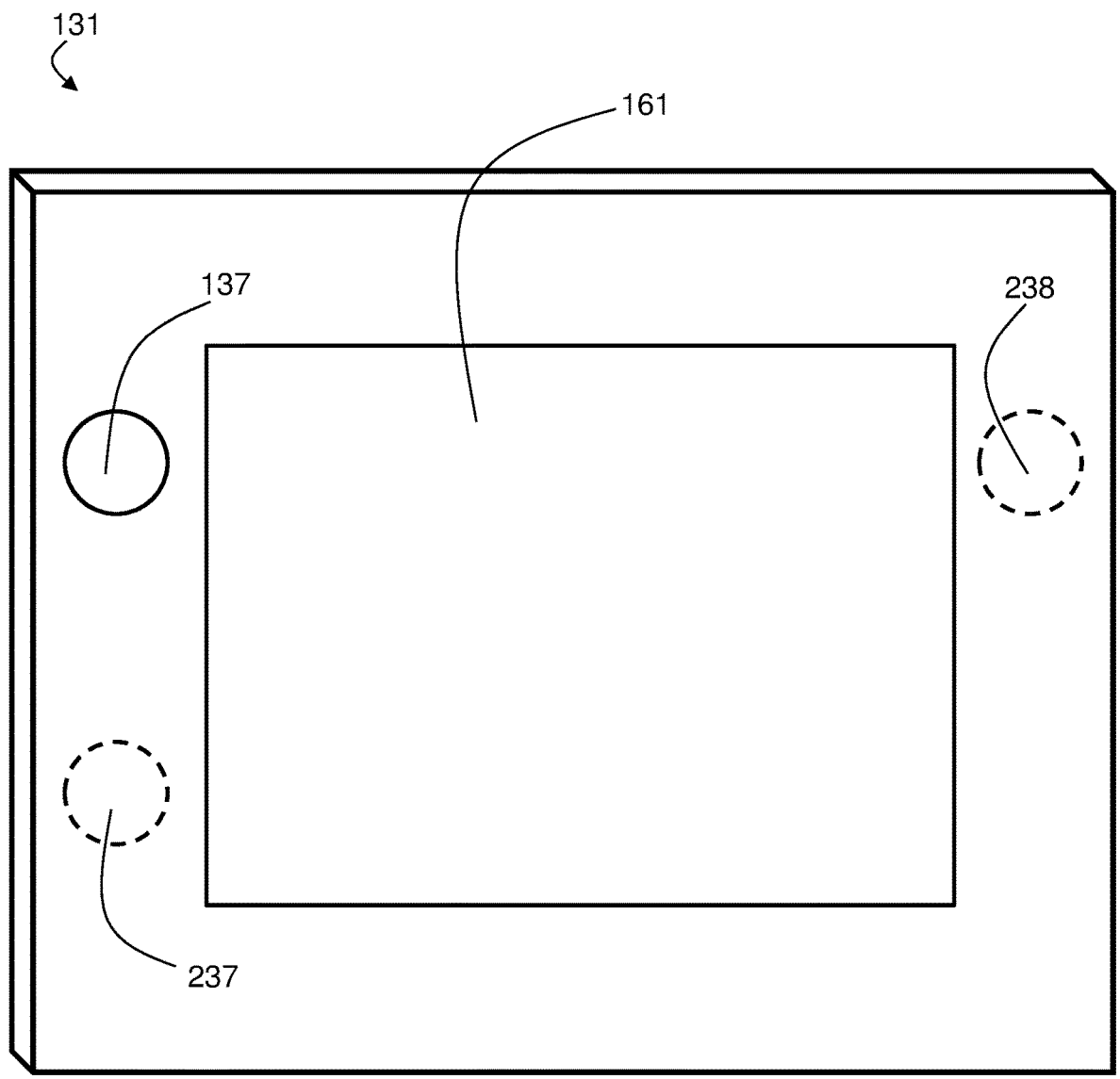
FIG. 23 shows a perspective view schematic diagram of an exemplary thermally conductive solid article portion comprising an alignment feature and a non-planarity, according to some embodiments.

In some embodiments, the non-planarity of a thermally conductive solid article portion (e.g., first thermally conductive solid article portion, second thermally conductive solid article portion) of the battery is a recess in the thermally conductive solid article portion. FIG. 21 and FIG. 23 show non-limiting such embodiments. In FIG. 21, non-planarity 161 and non-planarity 163 are recesses in first thermally conductive solid article portion 131 and second thermally conductive solid article portion 132, respectively, according to some embodiments. FIG. 23 shows a perspective view schematic diagram of first thermally conductive solid article 131 comprising non-planarity 161, which may be a recess in first thermally conductive solid article 131. A non-planarity (e.g., recess) may have any of a variety of shapes and dimensions, depending, for example, on the size and shape of a corresponding electrochemical cell (and its electrochemical active region).

An electrochemical cell may be coupled to a recess in a thermally conductive solid article portion by having a shape such that the electrochemical cell can fit into the recess. For example, referring again to FIG. 21, first electrochemical cell 110 fits into non-planarity 161 like an object in a pocket such that when first electrochemical cell 110 and first thermally conductive solid article portion 131 are coupled, the position of first electrochemical cell 110 is fixed with respect to first thermally conductive solid article portion 131. It should be understood that while FIG. 21 shows an entirety of the illustrated first electrochemical cell 110 fitting into non-planarity 161, in some embodiments one or more portions of an electrochemical cell, such as a conductive tab or pouch, may not be fit into the non-planarity, and may extend past the thermally conductive solid article portion.

Figure 24:
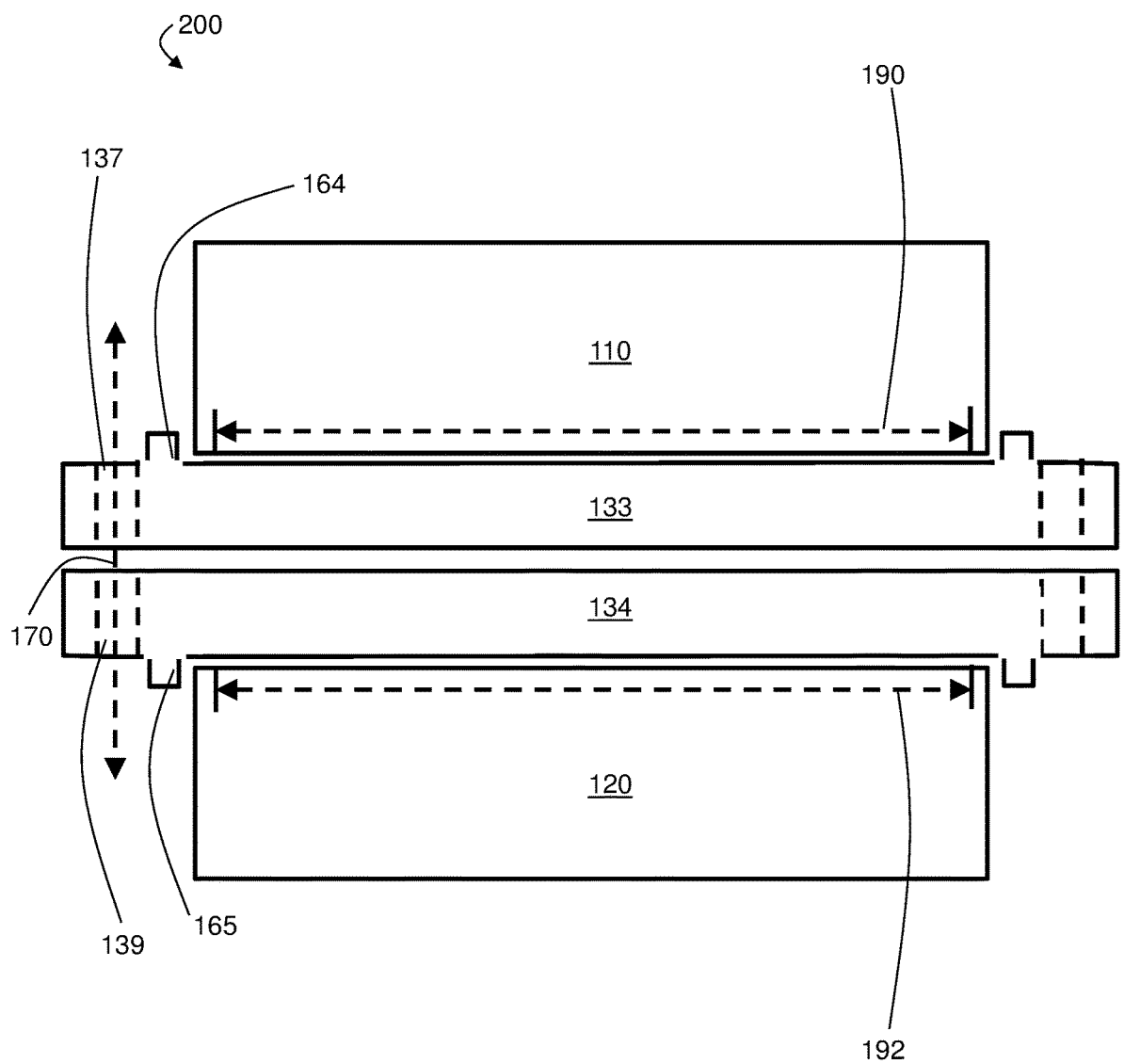
FIG. 24 shows a cross-sectional schematic diagram of an exemplary battery comprising electrochemical cells and thermally conductive solid article portions comprising alignment features, according to some embodiments.

In some embodiments, the non-planarity of a thermally conductive solid article portion (e.g., first thermally conductive solid article portion, second thermally conductive solid article portion) of the battery is a protrusion. The protrusion may extend away from the main surface of the thermally conductive solid article portion facing the electrochemical cell. For example, FIG. 24 shows a cross-sectional schematic diagram of battery 200 comprising first electrochemical cell 110 coupled to non-planarity 164 of first thermally conductive solid article portion 133 and second electrochemical cell 120 coupled to non-planarity 165 of second thermally conductive solid article portion 134. In FIG. 24, non-planarity 164 and non-planarity 165 are protrusions from first thermally conductive solid article portion 133 and second thermally conductive solid article portion 134, respectively.

An electrochemical cell may be coupled to a protrusion in a thermally conductive solid article portion by having a shape such that the electrochemical cell can fit between protrusions. For example, referring again to FIG. 24, first electrochemical cell 110 couples to non-planarity 164 by fitting between the protrusions of non-planarity 164 such that the position of first electrochemical cell 110 is fixed with respect to first thermally conductive solid article portion 133. It should be understood that while FIG. 24 shows an entirety of the illustrated first electrochemical cell 110 fitting between protrusions of non-planarity 164, in some embodiments one or more portions of an electrochemical cell, such as a conductive tab or pouch, may not be fit into or between portions of the non-planarity, and may extend past the thermally conductive solid article portion.

A non-planarity that is protrusion may take any of a variety of forms. For example, in some embodiments, a non-planarity that is a protrusion is a raised edge in the thermally conductive solid article portion (e.g., first thermally conductive solid article portion, second thermally conductive solid article portion). In some embodiments a non-planarity is a plurality of posts extending from the thermally conductive solid article portion.

Non-planarities in thermally conductive solid article portions (e.g., recesses, protrusions) may be formed in any of a variety of suitable ways, such as via machining, milling, molding, additive manufacturing (e.g., 3D-printing), etc.

In some embodiments, a thermally conductive solid article portion (e.g., first thermally conductive solid article portion, second thermally conductive solid article portion) comprises an alignment feature. An alignment feature may be, for example, a structural component of the thermally conductive solid article portion that can assist with the positioning of the thermally conductive solid article portion with respect to another thermally conductive solid article portion of the battery. In FIG. 21, first thermally conductive solid article portion 131 comprises first alignment feature 137 and second thermally conductive solid article portion 132 comprises second alignment feature 139, according to some embodiments. In some instances, first alignment feature 137 and second alignment feature 139 can be used to fix the relative positions of first thermally conductive solid article portion 131 and second thermally conductive solid article portion 132 with respect to each other.

An alignment feature may take any of a variety of suitable structural forms. For example, in some embodiments, an alignment feature of the thermally conductive solid article portion (e.g., first thermally conductive solid article portion, second thermally conductive solid article portion) is a gap in the thermally conductive solid article portion. FIG. 21 shows one such example, where first alignment feature 137 and second alignment feature 139 are gaps in first thermally conductive solid article portion 131 and second thermally conductive solid article portion 132, respectively. FIG. 23 shows a perspective view of first alignment feature 137 as a gap in first thermally conductive solid article portion 131, according to some embodiments. In certain cases, a gap serving as an alignment feature may be a through-hole, slot, or opening in a thermally conductive solid article portion. In some embodiments, an alignment feature of the thermally conductive solid article portion (e.g., first thermally conductive solid article portion, second thermally conductive solid article portion) is an edge of the thermally conductive solid article portion. For example, while FIG. 21 shows first alignment feature 137 and second alignment feature 139 as gaps, in some embodiments, edge 136 of first thermally conductive solid article portion 131 and edge 138 of second thermally conductive solid article portion 132 can be alignment features. In some embodiments, an alignment feature of the thermally conductive solid article portion (e.g., first thermally conductive solid article portion, second thermally conductive solid article portion) is a protrusion of the thermally conductive solid article portion. In some embodiments an alignment feature of the first thermally conductive solid article portion and an alignment feature of the second thermally conductive solid article portion are substantially similar or the same (e.g., both gaps, both edges, both protrusions). However, in some instances an alignment feature of a first thermally conductive solid article portion and an alignment feature of a second thermally conductive solid article portion are different (e.g., a first alignment feature is a gap and a second alignment feature is a protrusion). In some such cases, a first alignment feature of a first thermally conductive solid article portion is complementary to a second alignment feature of a second thermally conductive solid article portion (e.g., a protrusion in one thermally conductive solid article portion may fit into a recess or through-hole of another thermally conductive solid article portion).

In some embodiments, a thermally conductive solid article portion comprises multiple alignment features. In certain cases, using multiple alignment features per thermally conductive solid article portion may facilitate easier and/or more accurate alignment of components of the battery. Referring again to FIG. 23, in some embodiments, first thermally conductive solid article 131 comprises first alignment feature 137 and third alignment feature 237. Each of first alignment feature 137 and optional third alignment feature 237 may be substantially aligned with corresponding alignment features of second thermally conductive solid article portion 132 during an alignment process. In some embodiments, a thermally conductive solid article portion comprises multiple alignment features on the same side of the thermally conductive solid article portion with respect to an electrochemical cell coupled to the thermally conductive solid article portion. FIG. 23 shows one exemplary such embodiment with first alignment feature 137 and third alignment feature 237 on the same side of first thermally conductive solid article 131. Moreover, in some embodiments, the thermally conductive solid article portion comprises multiple alignment features on different sides of the thermally conductive solid article portion with respect to an electrochemical cell coupled to the thermally conductive solid article portion. FIG. 23 also shows one exemplary embodiment with first alignment feature 137 and third alignment feature 238 on the opposite side of first thermally conductive solid article 131. Third alignment feature 238 may be optional, as indicated by the dashed line. In some embodiments, the thermally conductive solid article portion comprises one or more (e.g., multiple such as two or more) alignment features on the same side of the thermally conductive solid article portion with respect to an electrochemical cell coupled to the thermally conductive solid article portion and one or more (e.g., multiple such as two or more) alignment features on different sides of the thermally conductive solid article portion with respect to an electrochemical cell coupled to the thermally conductive solid article portion.

Some embodiments comprise substantially aligning a first feature (e.g., a first alignment feature) of a first thermally conductive solid article portion with a second feature (e.g., a second alignment feature) of a second thermally conductive solid article portion. Such an alignment process may result in a first electrochemical active region of a first electrochemical cell coupled to a non-planarity of the first thermally conductive solid article portion being substantially aligned with a second electrochemical active region of a second electrochemical cell coupled to a non-planarity of the second thermally conductive solid article portion. In certain cases, the first alignment feature and the second alignment feature are located such that when the first alignment feature is substantially aligned with the second alignment feature, the first electrochemical active region and the second electrochemical active region are substantially aligned. For example, in FIG. 21, first alignment feature 137 and second alignment feature 139 may be located (e.g., with respect to non-planarity 161 and non-planarity 163) such that substantial alignment of first alignment feature 137 and second alignment feature 139 results in the substantial alignment of first electrochemical active region 190 with second electrochemical active region 192 due to the coupling of first electrochemical cell 110 to non-planarity 161 and the coupling of second electrochemical cell 120 with non-planarity 163. Substantially aligning electrochemical active areas of electrochemical cells in the battery may result in substantially uniform conditions for the electrochemical active areas (e.g., during charge and/or discharge). As one example, in some embodiments in which an anisotropic force with a component normal to one or more of the electrochemical cells is applied, the pressure distribution experienced by two substantially aligned electrochemical active areas may be substantially identical, which can in some cases lead to beneficial performance and/or durability for the battery. In some embodiments when a first electrochemical active area of the first electrochemical cell is substantially aligned with the second electrochemical active area of a second electrochemical cell, the first electrochemical active area and second electrochemical active area are aligned to within a distance of less than or equal to 2 mm, less than or equal to 1 mm, less than or equal to 0.5 mm, and/or as low as 0.1 mm, or less. In some embodiments when a first electrochemical active area of the first electrochemical cell is substantially aligned with the second electrochemical active area of a second electrochemical cell, at least 90%, at least 95%, at least 98%, at least 99%, at least 99.5% or more of the first electrochemical active area overlaps with the second electrochemical active area. The extent of alignment may be determined, for example, by visual inspection. Visual inspection in batteries may include discharging and charging the battery and visually examining and comparing the accumulation of electrode active material (e.g., lithium metal and/or a lithium metal alloy plating) on electrodes of the first electrochemical cell and second electrochemical cell.

One non-limiting way in which alignment features of thermally conductive solid article portions of the battery may be substantially aligned when they are gaps is by passing an object through the alignment features (e.g., through the first alignment feature and the second alignment feature). As an example, in FIG. 21, passing an object through first alignment feature 137 and second alignment feature 139 along an axis defined by arrow 170 may substantially align first alignment feature 137 and second alignment feature 139. The direction in which the object is passed through the alignment features may be substantially perpendicular to one or more lateral dimensions of the thermally conductive solid article portions (e.g., arrow 170 is substantially perpendicular to lateral dimension 135 of first thermally conductive solid article 131 and thermally conductive solid article portion 132 in FIG. 21). Exemplary objects that may be passed through the alignment features include, but are not limited to rods, fasteners, bands, and straps. An object passed through the alignment features may be kept in place even after alignment (e.g., permanently or removably kept in place), or the object may be removed following alignment. Another non-limiting way in which alignment features of the thermally conductive solid article portions of the battery may be substantially aligned is by visual or optical inspection (e.g., to see if electromagnetic radiation can pass through the alignment features).

Some embodiments may comprise substantially aligning two or more alignment features of the first thermally conductive solid article portion with two or more features of the second thermally conductive solid article portion. For example, alignment of components of the battery may comprise substantially aligning the first alignment feature of the first thermally conductive solid article portion with the second alignment feature of a second thermally conductive solid article portion and substantially aligning a third alignment feature of the first thermally conductive solid article portion with a fourth alignment feature of the second thermally conductive solid article portion. Aligning multiple alignment features of each thermally conductive solid article portion, can, in some cases, increase the accuracy and/or ease with which the components of the battery are aligned.

Another nonlimiting way of aligning features of a battery is by aligning components of the battery with a housing of the battery. For instance, in some embodiments, thermally conductive solid article portions may comprise alignment features that interlock with features of the housing. For example, an alignment feature such as non-planarity (e.g. a ridge) of a solid housing component of a housing may interlock with alignment features such as grooves of the thermally conductive solid article portions. In some embodiments, alignment may be achieved without the incorporation of alignment features, due to geometric constraints imposed by the housing (e.g., by one or more solid housing components described above) on components of the battery. Aligning components of the battery with the housing may prove advantageous to some embodiments by facilitating a reduction in the number of constituent parts of the housing, reducing a largest lateral pressure applying dimension of the housing, and/or increasing the battery's volumetric energy density.

In some embodiments, the arrangement of components of the battery is repeated. For example, in FIG. 17B, battery 100 comprises first electrochemical cell 110, first thermally conductive solid article portion 131, first thermally insulating compressible solid article portion 140, second electrochemical cell 120, second thermally conductive solid article portion 132, second thermally insulating compressible solid article portion 240, and third electrochemical cell 210.

It should be understood that the battery may not be limited to three electrochemical cells, and may comprise at least 2, at least 3, at least 4 at least 5, at least 8, at least 10, and/or up to 12, up to 15, up to 20, up to 24, up to 30, up to 40, up to 48, or more electrochemical cells. In some such cases, the total number of thermally insulating compressible solid article portions is equal to one more than the total number of electrochemical cells in the battery (e.g., 12 electrochemical cells and 13 thermally insulating compressible solid article portions). For example, there may be an electrochemical cell between each of the thermally insulating compressible solid article portions.

Figure 26:
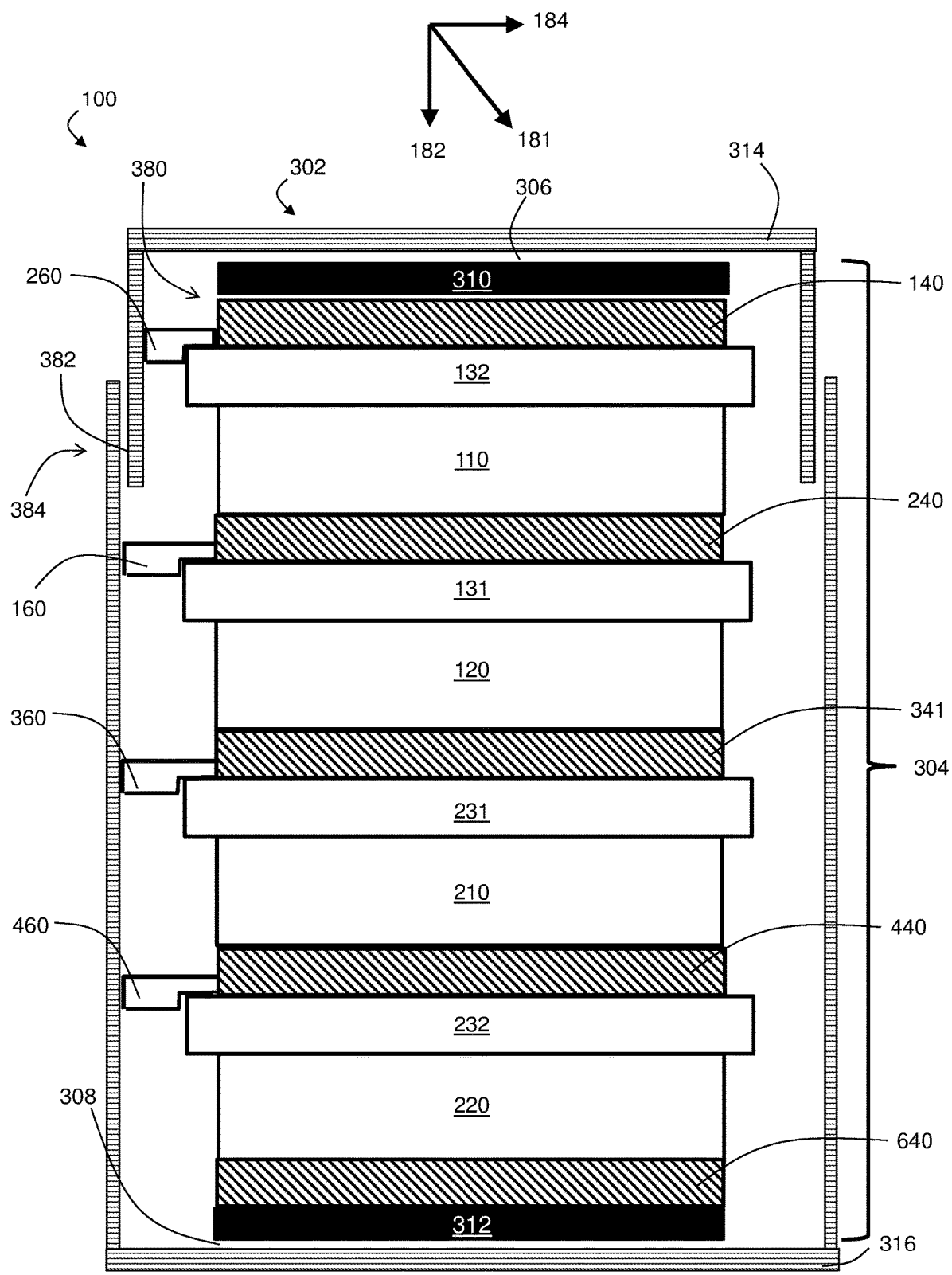
FIG. 26 shows a cross-sectional schematic diagram of an exemplary battery comprising a stack comprising electrochemical cells, thermally conductive solid article portions, thermally insulating compressible solid article portions, and solid plates, a housing that comprises solid housing components, and phase change material portions, according to some embodiments.

In some embodiments, multiple thermally conductive solid articles are in thermal communication with phase change material portion. For example, in some embodiments, the stack of the battery comprises the following in order:

a first solid plate; a first thermally insulating compressible solid article portion; a second thermally conductive solid article portion in thermal communication with a second phase change material portion; a first electrochemical cell; a second thermally insulating compressible solid article portion; a first thermally conductive solid article portion in thermal communication with the first phase change material; a second electrochemical cell; a third thermally insulating compressible solid article portion; a third thermally conductive solid article portion in thermal communication with a third phase change material portion; a third electrochemical cell; a fourth thermally insulating compressible solid article portion; a fourth thermally conductive solid article portion in thermal communication with a fourth phase change material portion; a fourth electrochemical cell; a fifth thermally insulating compressible solid article portion; and a second solid plate. FIG. 26 shows a cross-sectional schematic illustration of one such embodiment, where battery 100 comprises housing 302 at least partially enclosing stack 304, where stack 304 comprises the following, in order: first solid plate 310; first thermally insulating compressible solid article portion 140; second thermally conductive solid article portion 132 in thermal communication with second phase change material portion 260; first electrochemical cell 110; second thermally insulating compressible solid article portion 240; first thermally conductive solid article portion 131 in thermal communication with first phase change material 160; second electrochemical cell 120; third thermally insulating compressible solid article portion 341; third thermally conductive solid article portion 231 in thermal communication with third phase change material portion 360; third electrochemical cell 210; fourth thermally insulating compressible solid article portion 440; fourth thermally conductive solid article portion 232 in thermal communication with fourth phase change material portion 460; fourth electrochemical cell 220; fifth thermally insulating compressible solid article portion 640; and second solid plate 312. It should be understood that while a single thermally conductive solid article portion is shown between each electrochemical cell in FIG. 15, multiple thermally conductive solid articles (e.g., in thermal communication with a phase change material portion) may be present between electrochemical cells in the stack. For example, in some embodiments stack 304 comprises a thermally conductive solid article portion (not shown) at least partially between first electrochemical cell 110 and second thermally insulating compressible solid article 240, between second electrochemical cell 120 and third thermally insulating compressible solid article portion 341, between third electrochemical cell 210 and fourth thermally insulating compressible solid article portion 440, and between fourth electrochemical cell 220 and fifth thermally insulating compressible solid article portion 640.

In some embodiments where multiple phase change material portions are described (e.g., in FIG. 26), at least some (or all) of the portions are or are part of discrete articles (e.g., discrete solid bodies). For example, in some embodiments, two or more (e.g., three or more, or all four) of the first phase change material portion, the second phase change material portion, the third phase change material portion, and the fourth phase change material portion are or are part of discrete articles (e.g., discrete solid bodies). Referring again to FIG. 26, in accordance with some embodiments, first phase change material portion 160, second phase change material portion 260, third phase change material portion 360, and fourth phase change material portion 460 are separate, discrete articles (e.g., separate solid bodies). However, in some embodiments, at least some (or all) of the phase change material portions are part of the same solid body. For example, in some embodiments, at least two (e.g., at least three, or all four) of the first phase change material portion, the second phase change material portion, the third phase change material portion, and the fourth phase change material portion are part of the same solid body. For example, first phase change material portion 160 and second phase change material portion 260 may be connected via an additional phase change material portion (not pictured) in FIG. 26. As one example, the battery may comprise a phase change material spanning a length of the stack and comprising slots (e.g., for receiving extended lateral regions of thermally conductive solid article portions), with each section of phase change material corresponding to a phase change material portion as described in this disclosure.

Figure 25:
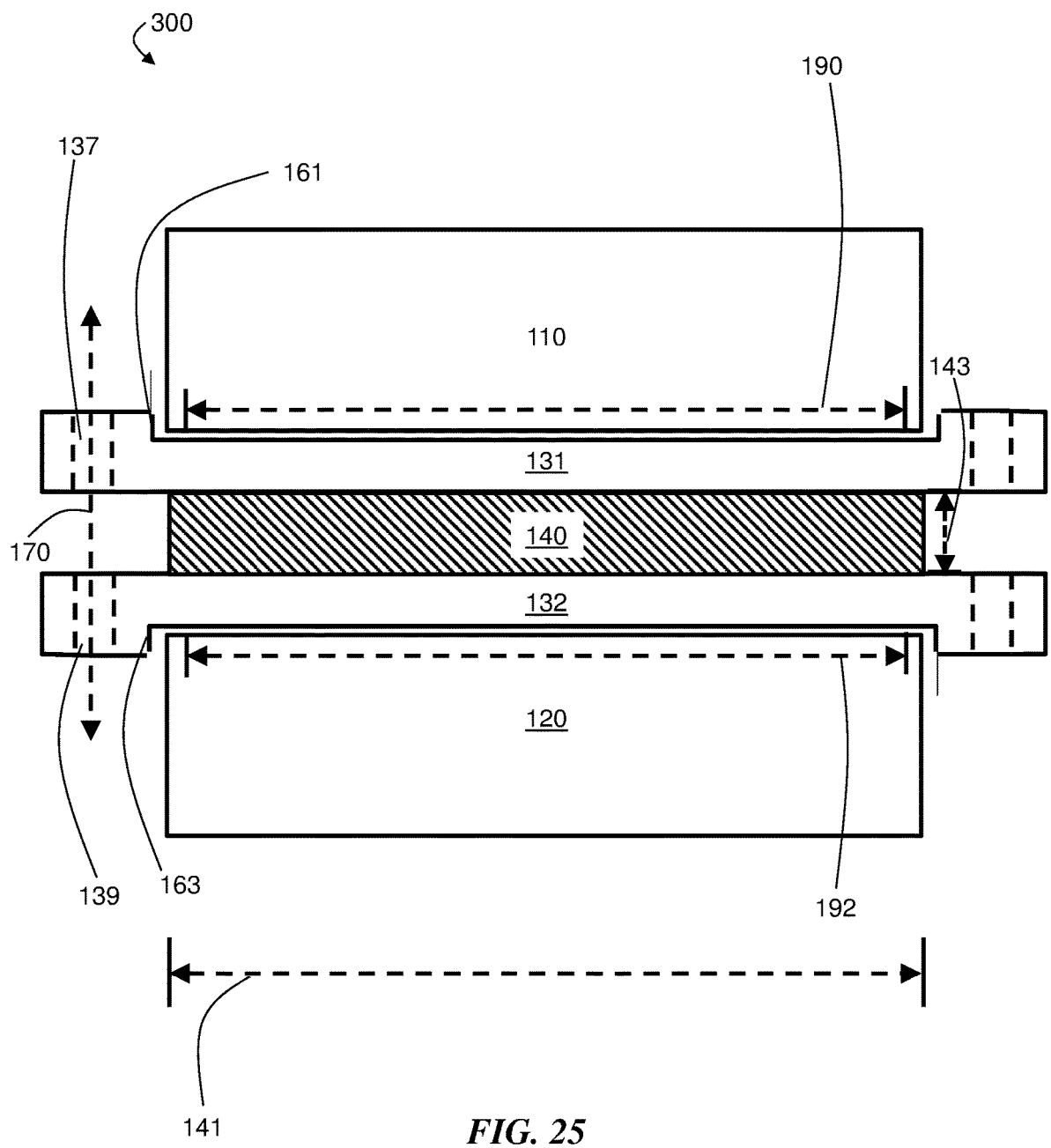
FIG. 25 shows a cross-sectional schematic diagram of an exemplary battery comprising electrochemical cells, thermally conductive solid article portions comprising alignment features, and a thermally insulating compressible solid article portion, according to some embodiments.

In some embodiments, a thermally conductive solid article portion (e.g., first thermally conductive solid article portion, second thermally conductive solid article portion) is between electrochemical cells (e.g., first electrochemical cell, second electrochemical cell) in the battery. FIG. 16A and FIG. 21 show examples of such embodiments, where first thermally conductive solid article portion 131 is between first electrochemical cell 110 and second electrochemical cell 120. In certain embodiments, both a first thermally conductive solid article portion and a second thermally conductive solid article portion are between the first electrochemical cell and the second electrochemical cell. For example, referring again to FIG. 16A and FIG. 21, first thermally conductive solid article portion 131 is between first electrochemical cell 110 and second electrochemical cell 120, and second thermally conductive solid article portion 132 is between first thermally conductive solid article portion 131 and second electrochemical cell 120. In some embodiments, a thermally insulating compressible solid article portion is between the first thermally conductive solid article portion and the second thermally conductive solid article portion. FIG. 25 shows one such embodiment, where thermally insulating compressible solid article portion 140 of exemplary battery 300 is between first thermally conductive solid article portion 131 and second thermally conductive solid article portion 132.

In some embodiments, the first thermally conductive solid article portion and the second thermally conductive solid article portion are part of discrete articles. Referring again to FIG. 16A, in some embodiments first thermally conductive solid article portion 131 and second thermally conductive solid article portion 132 are separate, discrete articles (e.g., separate sheets or fins). However, in some embodiments, first thermally conductive solid article portion and the second thermally conductive solid article portion are part of the same article. For example, first thermally conductive solid article portion 131 and second thermally conductive solid article portion 132 may be connected via a third thermally conductive solid article portion (not pictured) in FIG. 16A. As one example, the battery may comprise a thermally conductive solid article that is foldable and/or has a serpentine shape such that electrochemical cells and/or other components of the battery can be arranged between portions of the thermally conductive solid article portion.

Figure 27:
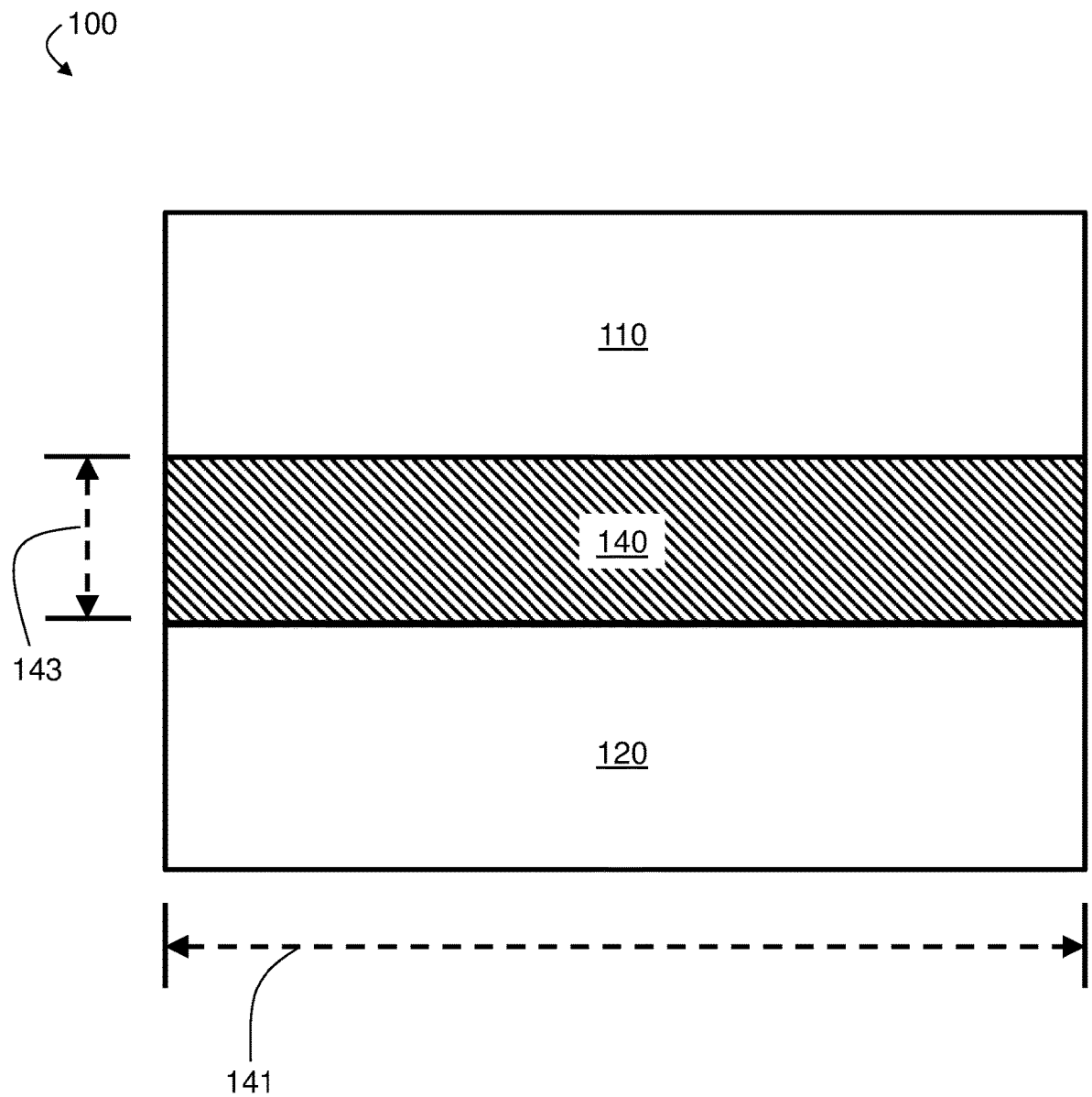
FIG. 27 shows a cross-sectional schematic diagram of an exemplary battery comprising electrochemical cells and a thermally insulating compressible solid article portion, according to some embodiments.

In some aspects, batteries comprising solid articles that can compensate for dimensional changes of other battery components while also limiting heat transfer between electrochemical cells are generally described. FIG. 27 is a schematic diagram of a non-limiting embodiment of battery 100. Battery 100 in FIG. 27 comprises first electrochemical cell 110 and second electrochemical cell 120 as part of a stack with thermally insulating compressible solid article portion 140. In some, but not necessarily all cases, the thermally insulating compressible solid article portion is in direct contact with the first electrochemical cell and/or the second electrochemical cell. For example, in FIG. 27, thermally insulating compressible solid article portion 140 is shown as being in direct contact with both first electrochemical cell 110 and second electrochemical cell 120. However, direct contact is not required, and in some embodiments there are one or more intervening components (e.g., other solid article portions such as plates or fins, sensors, etc.) between the thermally insulating compressible solid article portion and the first electrochemical cell and/or second electrochemical cell.

The thermally insulating compressible solid article portion may take any of a variety forms. For example, the thermally insulating compressible solid article portion may be in the form of a solid block, a foam sheet, a mesh, or any other suitable form, provided that it be thermally insulating and compressible. It should be understood that while the thermally insulating compressible solid article portion is referred to as a solid article, it may be at least partially hollow and/or contain pores or voids.

In some embodiments, the thermally insulating compressible solid article portion is a unitary object. FIG. 27 depicts thermally insulating compressible solid article portion 140 as a unitary object (e.g., a single sheet of foam), as one example. It should be understood that a thermally insulating compressible solid article portion that is a unitary object may be part of a larger article in some instances. In some embodiments, the thermally insulating compressible solid article portion comprises multiple separate objects. For example, the thermally insulating compressible solid article portion may comprise multiple layers (e.g., sheets) of either the same or different materials (e.g., foams) as a stack or otherwise arranged. For the properties described herein (e.g., uncompressed thickness, compression set, compressive stress versus percent compression, thermal conductivity, etc.), the measured values correspond to the entirety of the thermally insulating compressible solid article portion. For example, if the thermally insulating compressible solid article portion is a unitary object, the parameters correspond to that unitary object. In instances where the thermally insulating compressible solid article portion comprises multiple separate objects (e.g., a stack of foam sheets), the parameters of the thermally insulating compressible solid article portion correspond to that of the aggregate of all the separate objects of that portion (e.g., all foam sheets measured together as a stack).

In some embodiments, the thermally insulating compressible solid article portion comprises a foam. A foam solid article generally refers to a solid containing pockets of ("cells") capable of being occupied by a fluid. The pockets may be present throughout the dimensions of the solid. The foam may be present as a relatively high percentage of the thermally insulating compressible solid article portion (e.g., greater than or equal to 50 weight percent (wt %), greater than or equal to 75 wt %, greater than or equal to 90 wt %, greater than or equal to 95 wt %, greater than or equal to 99 wt %, or more). The use of thermally insulating compressible solid article portions comprising a relatively large amount of foam may, in some cases, contribute to a relatively high compressibility of the thermally insulating compressible solid article portion. For example, referring back to FIG. 16A or FIG. 27, in certain embodiments in which thermally insulating compressible solid article portion 140 has a relatively high foam content, pressure experienced by battery 100 may result in a relatively large compression of thermally insulating compressible solid article portion 140.

Figure 28A:
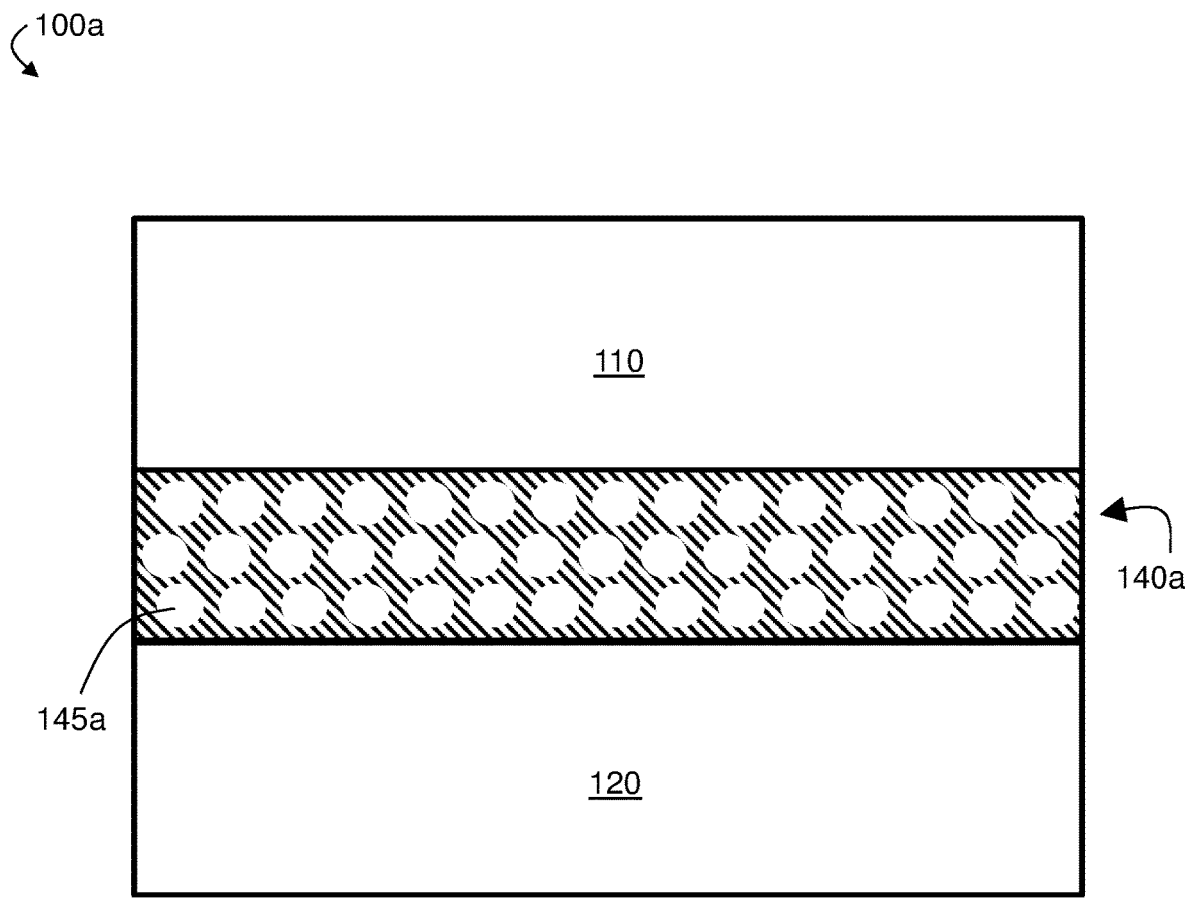
FIGS. 28A-28B show cross-sectional schematic diagrams of exemplary batteries comprising electrochemical cells and a thermally insulating compressible solid article portion, according to some embodiments.

In some embodiments, the thermally insulating compressible solid article portion is or comprises a closed-cell foam. A closed-cell foam solid generally refers to a foam comprising cells (gas pockets) that are discrete and completely surrounded by the solid material of the foam. FIG. 28A shows one such example, where thermally insulating compressible solid article portion 140a of battery 100a is a closed-cell foam comprising discrete cells 145a.

Figure 28B:
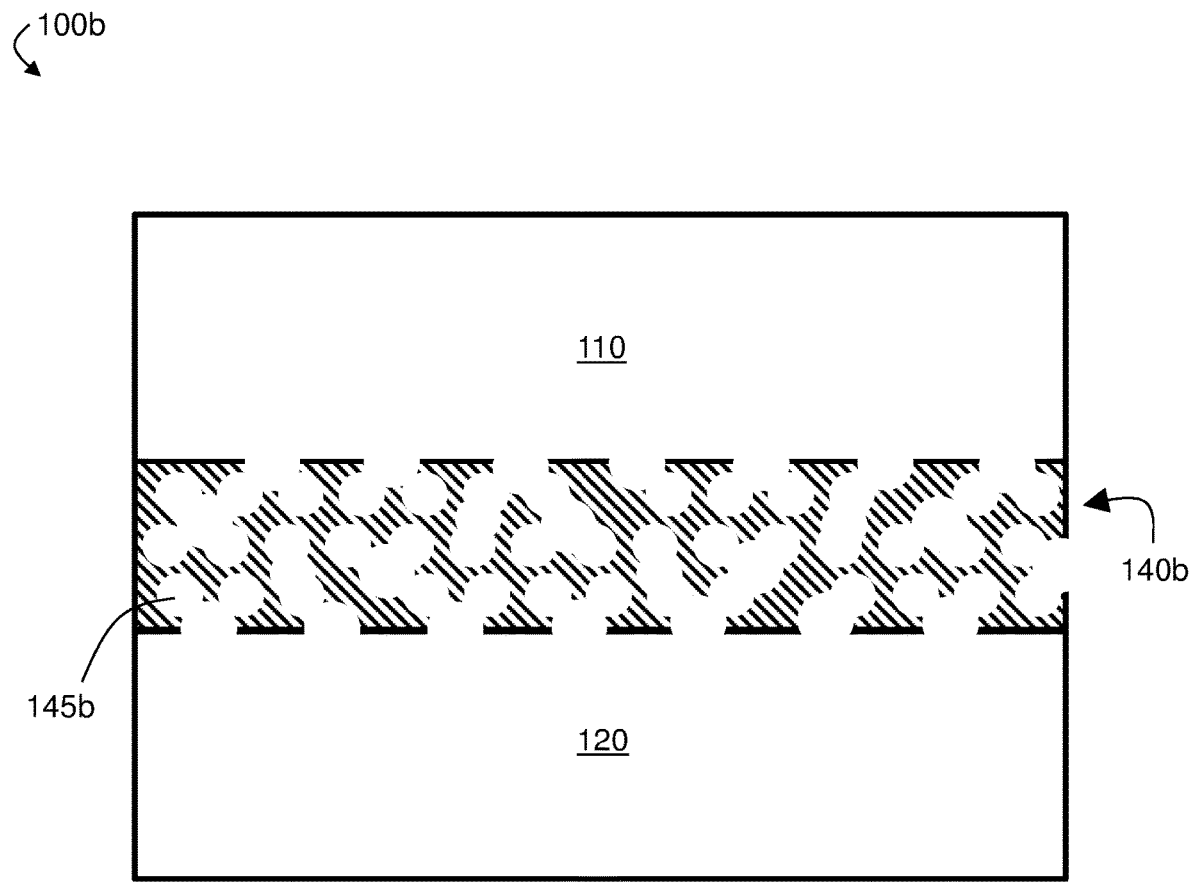

However, in some embodiments, the thermally insulating compressible solid article portion is or comprises an open-cell foam. An open-cell foam solid generally refers to a foam comprising cells connected to each other, thereby allowing for a gas or other fluid to travel from cell to cell. FIG. 28B shows one such example, where thermally insulating compressible solid article portion 140b of battery 100b is an open-cell foam comprising connected cells 145b.

In some embodiments, thermally insulating compressible solid article portion 140 comprises a microcellular foam. A microcellular foam generally refers to a foam whose cells have an average largest cross-sectional dimension on the order of microns (e.g., greater than or equal to 0.1 micron, greater than or equal to 1 micron, and/or up to 50 microns, up to 100 microns, or up to 500 microns). For example, in embodiments in which thermally insulating compressible solid article portion 140 in FIG. 28A is a microcellular foam, cell 145a may have a largest cross-sectional dimension of between 0.1 and 500 microns. Microcellular foams are typically made of polymeric materials (e.g., plastics) and can be prepared, for example by dissolving gases under high pressure into the material from which the foam is made. Foams such as microcellular foams may be useful in some instances in which thermally insulating compressible solid article portions having a relatively low mass density are desired. A low-density thermally insulating compressible solid article portion may contribute at least in part to a battery having a high specific energy density. In some embodiments, the density of the thermally-insulating compressible solid article portion is variable. For example, in some embodiments, regions occupying at least 0.5%, at least 1%, at least 2%, at least 5%, at least 10%, or more of the external geometric volume of the thermally insulating compressible solid article portion have a density (mass density) that is at least 5%, at least 10%, at least 25%, at least 50%, at least 75%, at least 90%, at least 95%, or at least 99% lower than an overall average density of the thermally insulating compressible solid article portion (which can be calculating by dividing the mass of the overall thermally insulating compressible solid article by the overall uncompressed volume of the thermally insulating compressible solid article). One non-limiting way of achieving such variance in density is by including holes/gaps in the thermally insulating compressible article portion such that the overall external geometric dimensions of the thermally insulating compressible solid article portion are suitable for performing some or all of the roles described herein, while a mass of the thermally insulating compressible solid article is reduced. It has been observed that some such configurations may provide for a relative reduction in the mass of the battery (and an increase in energy density) without significantly affecting performance of the battery. Further, it has also been observed that some such configurations may provide for relatively uniform pressure distribution experienced by one or more electrochemical cells of the battery is relatively uniform, at least because the density of region of a thermally insulating compressible solid article may affect a magnitude of force experienced by an electrochemical cell adjacent to that region.

In some embodiments, the thermally insulating compressible solid article portion comprises a mesh. As an example, in certain instances, the thermally insulating compressible solid article portion is a mesh structure made of strands of flexible, thermally-insulating material (e.g., fiber, plastic) that are attached and/or woven together.

In some embodiments, the thermally insulating compressible solid article portion is porous. As one example, referring again to FIG. 16A and FIG. 27, thermally insulating compressible solid article portion 140 is made of a porous material. As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g., closed cells) are not considered pores within this context. As such, a thermally insulating compressible solid article portion may be or comprise an open-cell solid, such an open-cell solid foam. It should be understood that, in cases where the thermally insulating compressible solid article portion comprises an agglomeration of particles, pores include both the interparticle pores (i.e., those pores defined between particles when they are packed together, e.g., interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porosity of a component of a battery (e.g., the thermally insulating compressible solid article portion comprising open cells) may be measured by physically separating the different regions of the electrochemical device by, for example, cutting out a region of the component, and then measuring the separated portion using the above-referenced ASTM Standard Test D4284-07.

In some instances, the thermally insulating compressible solid article portion (e.g., comprising an open-cell solid such as an open-cell foam) has a relatively high porosity. Having a relatively high porosity may contribute to the thermally insulating compressible solid article portion having a relatively low density, which in some instances can be advantageous as described above. A high porosity may also contribute, in some cases, to a relatively high compressibility. In some embodiments, the thermally insulating compressible solid article portion has a porosity of greater than or equal to 40%, greater than or equal to 50%, greater than or equal to 60%, or higher by volume. In some embodiments, the thermally insulating compressible solid article portion has a porosity of less than or equal to 90%, less than or equal to 80%, less than or equal to 70%, or less by volume. Combinations of these ranges are possible. For example, in some cases, the thermally insulating compressible solid article portion has a porosity of greater than or equal to 40% and less than or equal to 90%.

The thermally insulating compressible solid article portion may have any of a variety of suitable pore sizes, depending on, for example, the choice of material for the compressible solid article portion or the magnitude of force to be applied to the battery. For example, in some cases, the thermally insulating compressible solid article portion has an average pore size of greater than or equal to 0.1 microns, greater than or equal to 0.5 microns, greater than or equal to one micron, greater than or equal to 10 microns, greater than or equal to 50 microns, or greater. In some cases, the thermally insulating compressible solid article portion has an average pore size of less than or equal to 1 mm, less than or equal to 500 microns, less than or equal to 100 microns, or less. Combinations of these ranges are possible. For example, in some embodiments, the thermally insulating compressible solid article portion has an average pore size of greater than or equal to 0.1 microns and less than or equal to 1 mm, or greater than or equal to 1 micron and less than or equal to 100 microns.

In some embodiments, the thermally insulating compressible solid article portion has a relatively high void percentage. The voids of a solid object in this context generally refers to portions of the solids object not occupied by solid material. Voids may be occupied by a fluid such as a gas (e.g., air) or a liquid. It should be understood that pores such as open-cells may contribute to the void percentage, and closed-cells may also contribute to void percentage. As such, a thermally insulating compressible solid article portion comprising closed cells (e.g., a closed-cell foam such as thermally insulating compressible solid article portion 140a in FIG. 28A) may have a relatively high void percentage. Void percentage a solid article may be determined by dividing the void volume of the article by the volume defined by the outer boundaries of the article. Having a relatively high void percentage may contribute to the thermally insulating compressible solid article portion having a relatively low density, which in some instances can be advantageous as described above. A high void percentage may also contribute, in some cases, to a relatively high compressibility. In some embodiments, the thermally insulating compressible solid article portion has a void percentage of greater than or equal to 25%, greater than or equal to 40%, greater than or equal to 50%, and/or up to 60%, up to 75%, up to 90%, or more.

As a thermal insulator, the thermally insulating compressible solid article portion may contribute at least in part to advantageous thermal management of components of the battery. In some embodiments, the thermally insulating compressible solid article portion has a relatively low effective thermal conductivity (consequently making it a relatively good thermal insulator). The thermal insulating capability of the thermally insulating compressible solid article portion can, in some cases, contribute at least in part to thermally isolating one or more electrochemical cells and the battery from one or more other portions of the battery. For example, referring back to FIG. 16A and FIG. 27, in some embodiments in which thermally insulating compressible solid article portion 140 has a relatively low effective thermal conductivity, thermally insulating compressible solid article portion 140 mitigates heat transfer between first electrochemical cell 110 and second electrochemical cell 120. Such a mitigation in heat transfer can, in some instances, reduce propagation of deleterious phenomena among the electrochemical cells (e.g., during cycling).

In some embodiments, the thermally insulating compressible solid article portion has a relatively low effective thermal conductivity in the thickness direction. Referring again to FIG. 27, for example, thermally insulating compressible solid article portion 140 may have a low effective thermal conductivity in thickness direction 143. As a result, thermally insulating compressible solid article portion 140 may reduce the rate at which heat is transferred from first electrochemical cell 110, through thermally insulating compressible solid article portion 140 in thickness direction 143, and to second electrochemical cell 120, according to certain embodiments. This reduced extent of heat transfer in the thickness direction can, in some instances, improve the safety and performance of the battery (e.g., by reducing thermal propagation). In some embodiments, the thermally insulating compressible solid article portion has an effective thermal conductivity of less than or equal to 0.5 W m$^{-1}$ K$^{-1}$, less than or equal to 0.25 W m$^{-1}$ K$^{-1}$, and/or as low as 0.1 W m$^{-1}$ K$^{-1}$, as low as 0.01 W m$^{-1}$ K$^{-1}$, or less in the thickness direction at a temperature of 25° C. For example, the thermally insulating compressible solid article portion may comprise a microcellular foam and have an effective thermal conductivity of 0.21 W m$^{-1}$ K$^{-1}$ in the thickness direction at a temperature of 25° C. In some embodiments, the rate of heat transfer between two components of the battery (e.g., first electrochemical cell 110 and second electrochemical cell 120 in FIG. 27) is relatively low. In certain cases, the rate of heat transfer from the first electrochemical cell to the second electrochemical cell is less than or equal to 5 W m$^{-1}$ K$^{-1}$, less than or equal to 2.5 W m$^{-1}$ K$^{-1}$, and/or as low as 1 W m$^{-1}$ K$^{-1}$, as low as 0.1 W m$^{-1}$ K$^{-1}$, or less when the temperature difference between the first electrochemical cell and the second electrochemical cell is 10 K.

The compressibility of the thermally insulating compressible solid article portion may be useful in any of a variety of applications. As one example, in some instances in which one or more components of the battery change dimension during a charging and/or discharge process, a resulting compression of the thermally insulating compressible solid article portion may compensate for that change in dimension. In some such cases, the compressibility of the thermally insulating compressible solid article portion under stress may reduce the extent to which a battery expands or contracts when electrochemical cells within the battery undergo expansion and/or contraction during cycling.

Figure 29A:
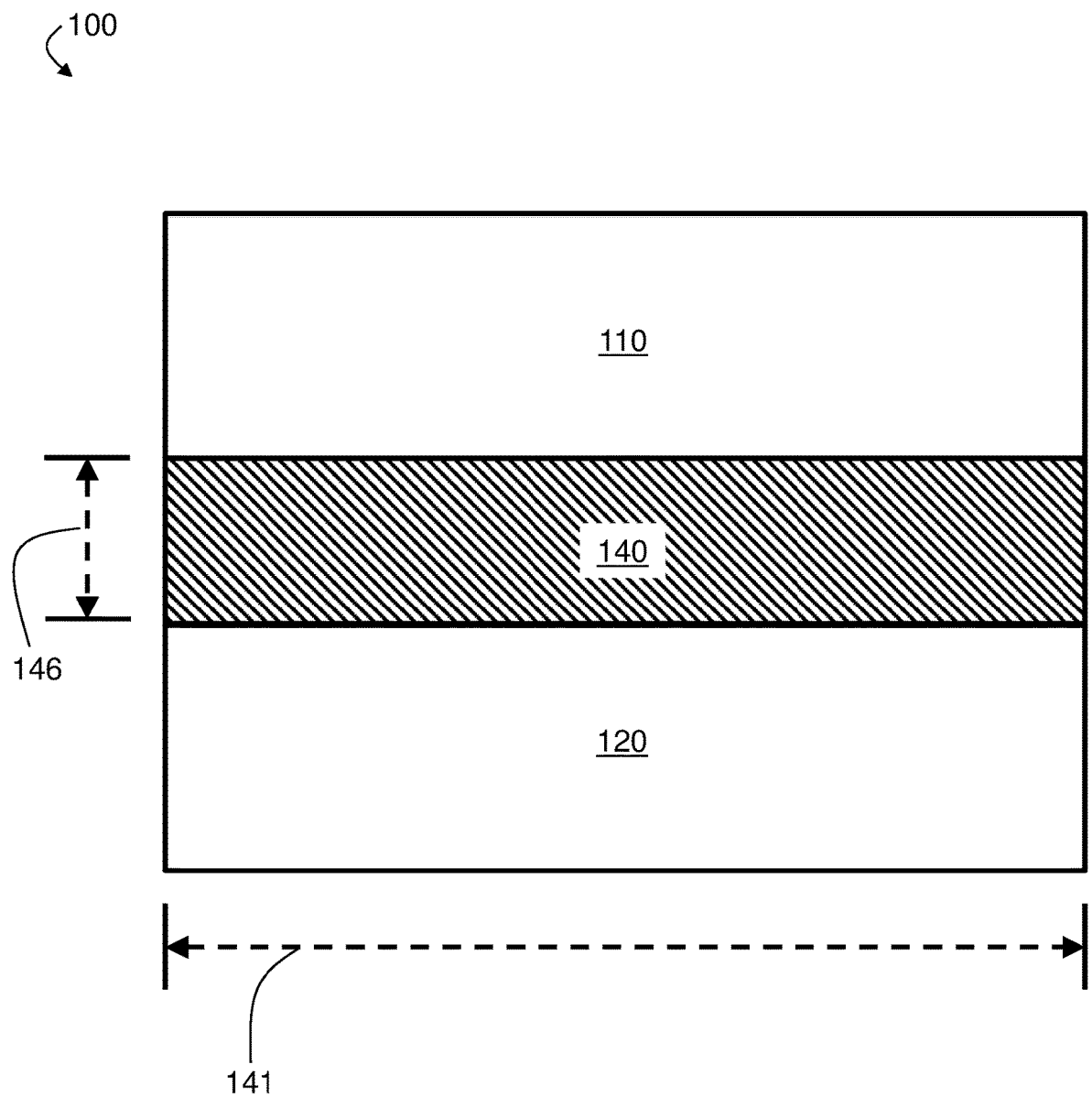
FIGS. 29A-29B show cross-sectional schematic diagrams of an exemplary battery comprising electrochemical cells and a thermally insulating compressible solid article portion in the absence and presence of an anisotropic force, respectively, according to some embodiments.
Figure 29B:
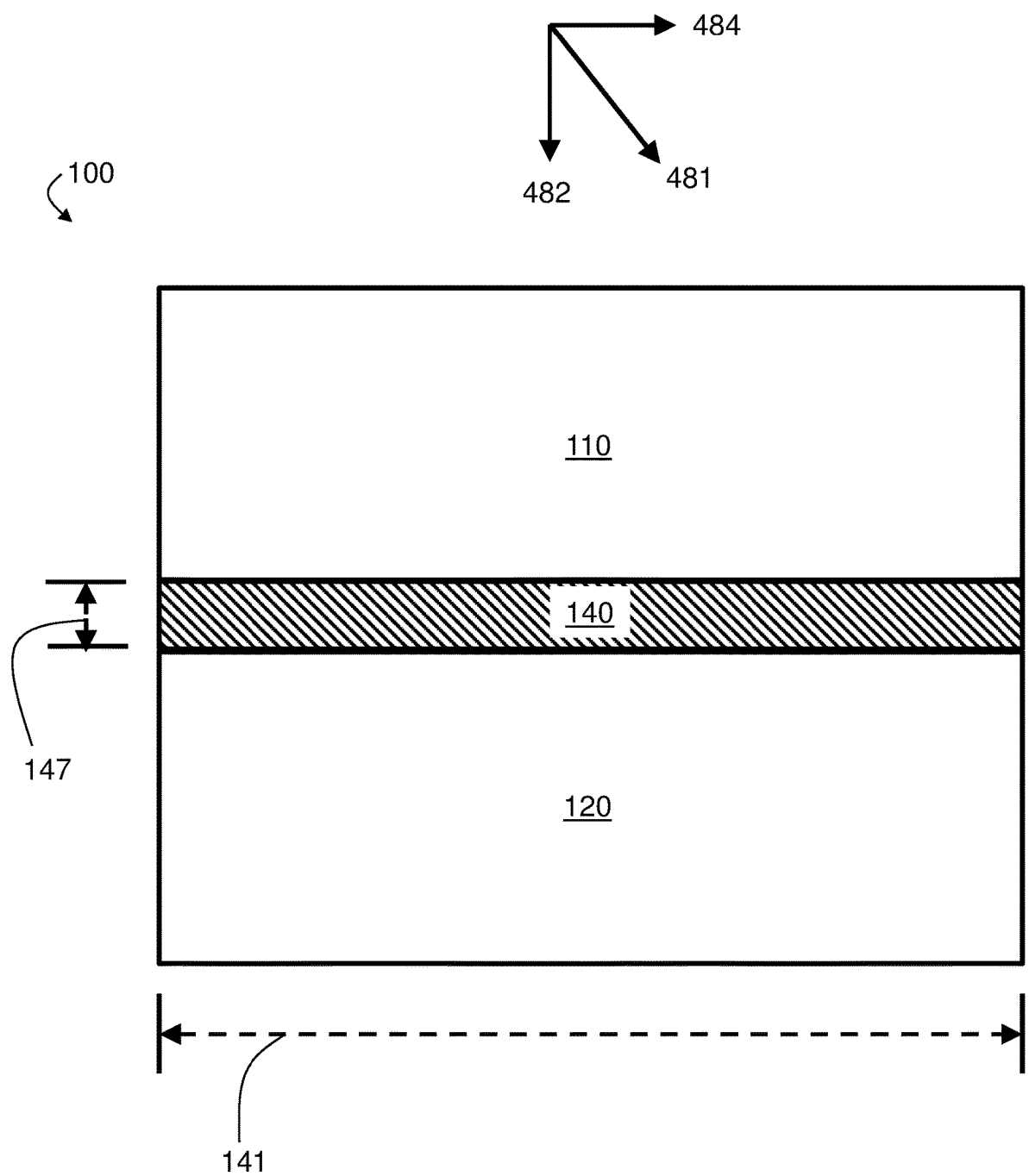

FIGS. 29A-29B show cross-sectional schematic diagrams of battery 100 in the absence (FIG. 29A) and presence (FIG. 29B) of an anisotropic force in the direction of arrow 481, with a component 482 normal to an electrochemical cell. The anisotropic force in the direction of arrow 481 may also have a component 484 parallel to an electrochemical cell. As described above, in some cases, at least a portion of the anisotropic force is applied by a pressure device such as solid plate (e.g., an endplate). In some instances, at least a portion of the anisotropic force is caused by a change in dimension (e.g., expansion) of one or more components of the battery. For example, in some cases a charging process of the battery causes one or more electrochemical cells (e.g., the first electrochemical cell, the second electrochemical cell) to expand in a thickness direction. One such example is in certain cases where a lithium metal and/or a lithium metal alloy is used as an anode active material, and lithium deposition on the anode occurs during charging.

In some embodiments, the application of force to the thermally insulating compressible solid article portion (e.g., via the first electrochemical cell and/or the second electrochemical cell or an intervening battery component) causes the thermally insulating compressible solid article portion to compress in the thickness direction. Referring again to FIGS. 29A-29B, for example, thermally insulating compressible solid article portion 140 may have uncompressed thickness 146 in the absence of an applied anisotropic force (as shown in FIG. 29A) and smaller compressed thickness 147 when anisotropic force 481 is applied and/or when expansion of first electrochemical cell 110 and/or second electrochemical cell 120 occurs.

In some embodiments, the thermally insulating compressible solid article portion has a relatively low compression set. The compression set of an article generally refers to the amount of permanent (plastic) deformation that occurs when the article is compressed to a given deformation, for a given amount of time, at a given temperature. Compression set of an article can be measured, for example using ASTM D395. For elastomeric materials, having a low compression set is associated with an ability for the material to maintain elastic properties even after prolonged compressive stress. Having a relatively low compression set may be beneficial, in some cases, where it is desired that the thermally insulating compressible solid article portion be able to regain at least a portion of its thickness when an applied compressive stress is removed. As an example, in some cases where the thermally insulating compressible solid article portion is compressed due to an expansion of an electrochemical cell in the battery, a subsequent contraction of the electrochemical cell may reduce the compressive stress applied. Having a relatively low compression set may then allow the thermally insulating compressible solid article to expand in thickness as the electrochemical cell contracts, thereby compensating for the change in dimension. In some embodiments, the thermally insulating compressible solid article portion has a compression set of less than or equal 15%, less than or equal to 12%, or less. In some embodiments, the thermally insulating compressible solid article portion has a compression set of less than or equal to 10%, less than or equal to 5%, or less. In some embodiments, the thermally insulating compressible solid article portion has a compression set of greater than or equal to 1%, greater than or equal to 2%, or more. Combinations of these ranges are possible. For example, in some embodiments, the thermally insulating compressible solid article portion has a compression set of greater than or equal to 1% and less than or equal to 10%. In some embodiments, the thermally insulating compressible solid article portion has a compression set value in one of the ranges above determined using a constant force measurement (e.g., ASTM D395 Test Method A). In some embodiments, the thermally insulating compressible solid article portion has a compression set value in one of the ranges above determined using a constant displacement measurement (e.g., ASTM D395 Test Method B).

In some embodiments, the thermally insulating compressible solid article portion has a relatively high compressibility. The compressibility of an article generally refers to the relative dimensional change of an article as a response to a change in compressive stress. In some instances, for example, the change in thickness 147 relative to thickness 146 in FIGS. 29A-29B is relatively large for a given magnitude of compressive stress (e.g., when the force from arrow 481 is applied). In some embodiments, at a compressive stress of 12 $kg_f/cm^2$, the percent compression of the thermally insulating compressible solid article portion is at least 30%, and at a compressive stress of 40 $kg_f/cm^2$, the percent compression of the thermally insulating compressible solid article portion is at least 80%. In some embodiments, at a compressive stress of 12 $kg_f/cm^2$, the percent compression of the thermally insulating compressible solid article portion is at least 30%, and at a compressive stress of 40 $kg_f/cm^2$, the percent compression of the thermally insulating compressible solid article portion is at least 50%.

The compressive response of a thermally insulating compressible solid article portion may be considered as a compressive stress versus percent compression curve. The thermally insulating compressible solid article portion may have a compressive stress versus percent compression curve that is suitable for a battery in which a high magnitude of anisotropic force with a component normal to one or more of the electrochemical cells is applied. In some instances, the thermally insulating compressible solid article portion has a compressive stress versus percent compression curve that is suitable for a battery in which one or more electrochemical cell undergoes a relatively high change in dimension during charging and discharging (e.g., such as certain electrochemical cells comprising lithium metal and/or lithium metal anode active materials).

Figure 30:
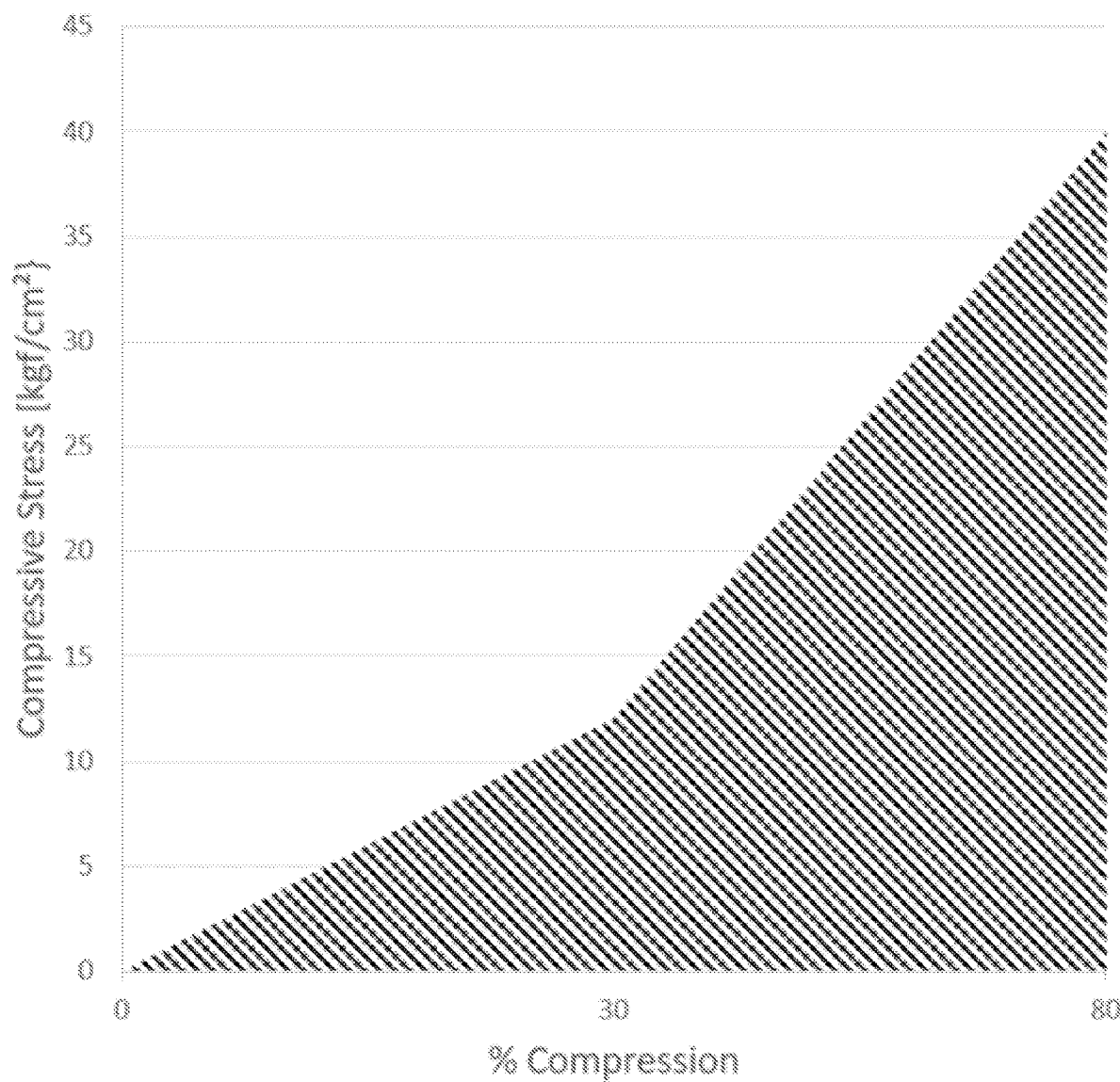
FIG. 30 shows a plot of a region of compressive stress versus percent compression responses for a thermally insulating compressible solid article portion, according to some embodiments.

In some such embodiments, the thermally insulating compressible solid article has a compressive stress versus percent compression curve in the hatched region of FIG. 30. It should be understood that a curve is considered to be in the hatched region if it is in the interior of the hatched region or at a boundary of the hatched region. In some embodiments, at least 50%, at least 75%, at least 90%, or more of the x-axis values of the compressive stress versus percent compression curve of the thermally insulating compressible solid article portion is in the hatched region. For example, if a compressive stress versus percent compression curve is measured for a sample for 100 equally spaced compression values between 0% and 80% (i.e., x-axis increments of 0.8%), and the measured compressive stress falls within the hatched region of FIG. 30 for at least 50 of the 100 compression values measured, then at least 50% of the x-axis value of the compressive stress versus percent compression curve of that sample is in the hatched region. In some embodiments, the thermally insulating compressible solid article has a compressive stress versus percent compression curve in the hatched region of FIG. 30 for x-axis values of greater than or equal to 1%, greater than or equal to 10%, greater than or equal to 20%, greater than or equal to 30%, greater than or equal to 40%, and/or up to 50%, up to 60%, up to 80%, or greater. Combinations of these ranges (e.g., x-axis values of greater than or equal to 1% and less than or equal to 80% or greater than or equal to 30% and less than or equal to 50%) are possible. Properties that may affect the compressive stress versus percent compression curve of a thermally insulating compressible solid article portion include intrinsic properties (e.g., uncompressed density) and extrinsic properties (e.g., thickness).

The measurement of the compressive stress versus percent compression curve (as shown in FIG. 30) of a sample may be conducted as follows. The compression rate may be, for example, greater than or equal to 0.001 mm/s, greater than or equal to 0.05, and/or up to 0.1 mm/s using a modified version of ASTM D3574.

In some embodiments, the thermally insulating compressible solid article portion has a relatively high resilience. The resilience of an article generally refers to the percentage of energy released when a deformed object recovers from deformation relative to the energy required to produce the deformation. Resilience can be measured, for example, using ASTM D3574 Test H (a ball drop resilience measurement). A relatively high resilience may contribute to the thermally insulating compressible solid article portion being durable under multiple repeated compressions and decompression of the battery (e.g., during charging and discharging). In some embodiments, the thermally insulating compressible solid article portion has a resilience of at least 60%, at least 65%, at least 75%, at least 90%, at least 95%, or more. In some embodiments, the thermally insulating compressible solid article portion has both a relatively high compressibility and a relatively high resilience (e.g., with values in the ranges described above), which may contribute to a high extent of compensation of dimensional changes in the battery while also being durable.

In some embodiments, the thermally insulating compressible solid article portion has a relatively high dynamic continuous load limit. A dynamic continuous load limit generally refers to the maximum compressive stress applied to the article before failure occurs. Having a relatively high dynamic continuous load limit may be useful in some embodiments where a relatively high magnitude of anisotropic force with a component normal to one or more electrochemical cells of the battery is applied, or where one or more of the electrochemical cells undergoes a relatively large expansion during cycling. In some embodiments, the thermally insulating compressible solid article portion has a dynamic continuous load limit of greater than or equal to 30 $kg_f/cm^2$, greater than or equal to 35 $kg_f/cm^2$, greater than or equal to 40 $kg_f/cm^2$, and/or up to 45 $kg_f/cm^2$, or greater.

In some embodiments, the thermally insulating compressible solid article portion has a relatively low uncompressed mass density. A low mass density may contribute, at least in part, to the battery having a relatively high specific energy density. The uncompressed mass density of the thermally insulating compressible solid article portion refers to the bulk mass per unit volume of the article portion in the absence of a load (e.g., compressive stress). In some embodiments, the thermally insulating compressible solid article portion has an uncompressed mass density of greater than or equal to 0.3 $g/cm^3$, greater than or equal to 0.35 $g/cm^3$, greater than or equal to 0.4 $g/cm^3$, greater than or equal to 0.45 $g/cm^3$, greater than or equal to 0.5 $g/cm^3$, and/or up to 0.55 $g/cm^3$, up to 0.6 $g/cm^3$, up to 0.65 $g/cm^3$, up to 0.7 $g/cm^3$, or greater at 25° C.

The thermally insulating compressible solid article portion can be made of any of a variety of suitable materials, provided that it have one or more of the combinations of thermal and mechanical properties in the present disclosure. In some embodiments, the thermally insulating compressible solid article portion comprises a polymeric material. A relatively large percentage of the thermally insulating compressible solid article portion may be made of a polymeric material. For example, greater than or equal to 50 wt %, greater than or equal to 75 wt %, greater than or equal to 90 wt %, greater than or equal to 95 wt %, greater than or equal to 99 wt %, or more (e.g., 100 wt %) of the thermally insulating compressible solid article portion may be made of a polymeric material. In certain embodiments, the thermally insulating compressible solid article portion comprises a polymeric foam, such as a microcellular polymeric foam.

While any of a variety of polymeric materials may be suitable, in certain instances the thermally insulating compressible solid article portion comprises a relatively elastic polymer. In some embodiments, the thermally insulating compressible solid article portion is or comprises an elastomer. As one non-limiting example, the thermally insulating compressible solid article portion may comprise a polyurethane. Polyurethanes are polymers comprising organic repeat units linked by carbamate (urethane) units. Polyurethanes can be made using any of a variety of techniques, such as by reacting isocyanates and polyols. In some embodiments, the thermally insulating compressible solid article portion is or comprises a microcellular polyurethane foam (e.g., foam sheet or foam layer). Referring to FIG. 27, for example, battery 100 may comprise first electrochemical cell 110, second electrochemical cell 120, and thermally insulating compressible solid article portion 140 between first electrochemical cell 110 and second electrochemical cell 120, where thermally insulating compressible solid article portion 140 is an elastomeric microcellular foam layer or sheet made of polyurethane. One non-limiting example of an elastomeric microcellular polyurethane foam that can be used as a thermally insulating compressible solid article portion is sold by BASF under the trade name Cellasto®.

The thermally insulating compressible solid article may have a thickness as well as two orthogonal lateral dimensions that are orthogonal to each other as well as orthogonal to the thickness. For example, referring to FIG. 29A, thermally insulating compressible solid article portion 140 has thickness 146, lateral dimension 141, and a second lateral dimension (not pictured) orthogonal to both thickness 146 and lateral dimension 141 (which would run into and out of the plane of the drawing in FIG. 29A). As mentioned above, the thermally insulating compressible solid article may have an uncompressed thickness (e.g., uncompressed thickness 146 in FIG. 29A) and a compressed thickness (e.g., compressed thickness 147 FIG. 29B), with the latter depending in some cases on the magnitude of an applied force.

The dimensions of the thermally insulating compressible solid article portion may be chosen based on any of a variety of considerations. For example, the thickness (e.g., uncompressed thickness) or lateral dimensions may be chosen based on the desired total size of the battery and/or a desired pack burden (defined as one minus the mass of the electrochemical cells of the battery divided by the total mass of the battery). In some embodiments, the uncompressed thickness of the thermally insulating compressible solid article portion is such that a sufficient amount of compression can occur (e.g., to compensate for expansion of the first electrochemical cell and/or second electrochemical cell during cycling).

In some embodiments, the thermally insulating compressible solid article portion has an uncompressed thickness of greater than or equal to 2 mm, greater than or equal to 3 mm, greater than or equal to 4 mm, greater than or equal to 5 mm, greater than or equal to 5.5 mm, greater than or equal to 6 mm, or greater. In some embodiments, the thermally insulating compressible solid article portion has an uncompressed thickness of less than or equal to 10 mm, less than or equal to 9 mm, less than or equal to 7 mm, or less. Combinations of these ranges are possible. For example, in some embodiments, the thermally insulating compressible solid article portion has an uncompressed thickness of greater than or equal to 2 mm and less than or equal to 10 mm, or greater than or equal to 5.5 mm and less than or equal to 6 mm.

In some embodiments the thermally insulating compressible solid article portion has one or more lateral dimension of greater than or equal to 50 mm, greater than or equal to 65 mm, greater than or equal to 80 mm, and/or up to 90 mm, up to 100 mm, up to 200 mm, or more. In some embodiments, the thermally insulating compressible solid article portion has at least one lateral dimension that is at least 5 times, at least 10 times, and/or up to 20 times, up to 50 times, up to 100 times or more greater than the uncompressed thickness of the thermally insulating compressible solid article portion.

Figure 31:
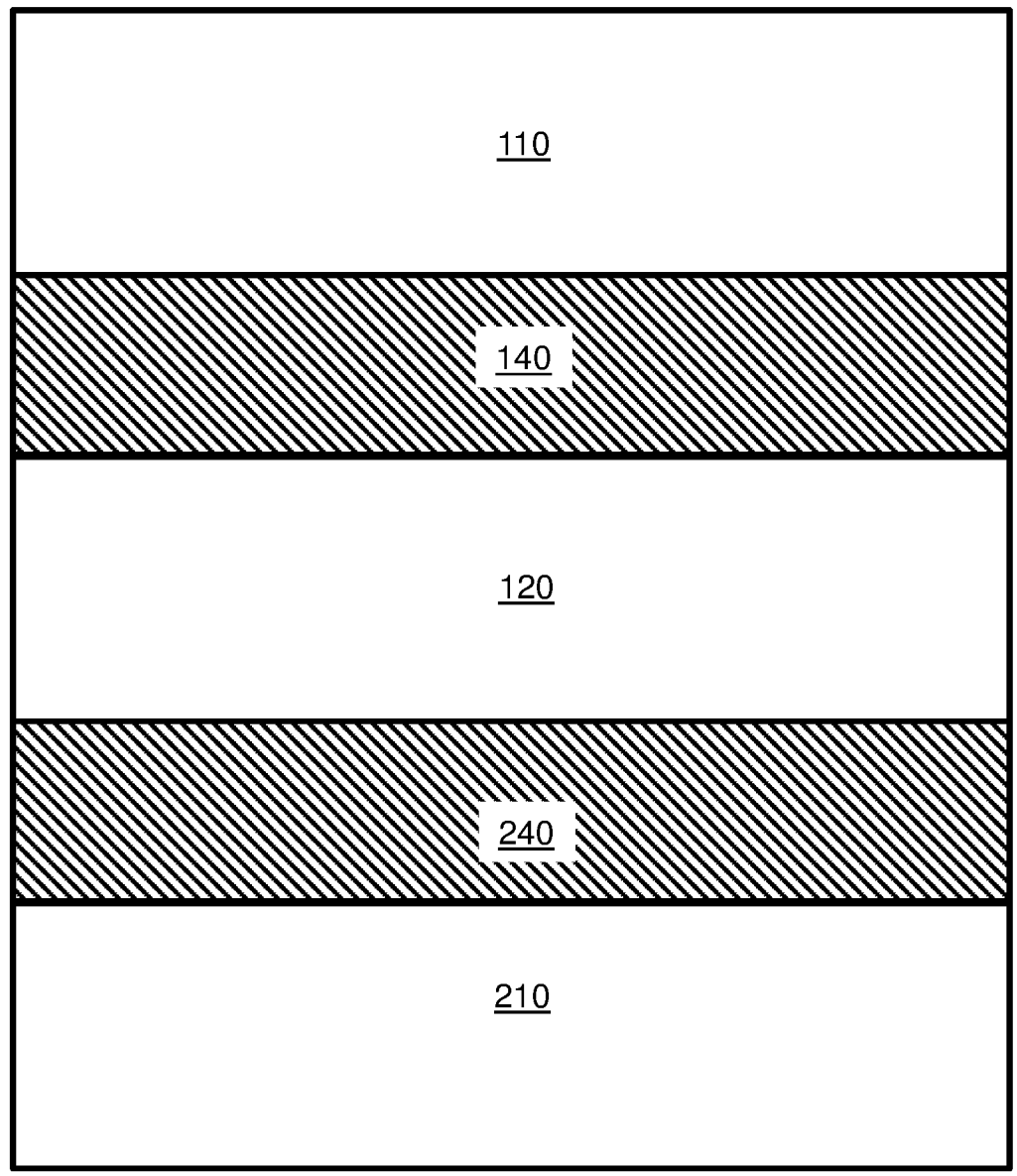
FIG. 31 shows a cross-sectional schematic diagram of an exemplary battery comprising electrochemical cells and thermally insulating compressible solid article portions, according to some embodiments.

In some embodiments, the battery has more than one thermally insulating compressible solid article portion. For example, in some embodiments, the battery comprises a third electrochemical cell, and a second thermally insulating compressible solid article portion between the second electrochemical cell and the third electrochemical cell. FIG. 31 shows a cross-sectional schematic diagram of one such embodiment, where battery 600 comprises, in order: first electrochemical cell 110, first thermally insulating compressible solid article portion 140, second electrochemical cell 120, second thermally insulating compressible solid article portion 240, and third electrochemical cell 210. It should be understood that the battery may not be limited to three electrochemical cells, and may comprise at least 1, at least 2, at least 3, at least 5, at least 8, at least 10, and/or up to 12, up to 15, up to 20, up to 24, up to 30 or more electrochemical cells. In some such cases, the total number of thermally insulating compressible solid article portions is equal to one more than the total number of electrochemical cells in the battery (e.g., 12 electrochemical cells and 13 thermally insulating compressible solid article portions). For example, there may be an electrochemical cell between each of the thermally insulating compressible solid article portions.

In some embodiments, the first thermally insulating compressible solid article portion and the second thermally insulating compressible solid article portion are part of discrete articles. Referring again to FIG. 26 or FIG. 31, for example, in some embodiments first thermally insulating compressible solid article portion 140 and second thermally insulating compressible solid article portion 240 are separate, discrete articles (e.g., separate foam sheets). However, in some embodiments, the first thermally insulating compressible solid article portion and the second thermally insulating compressible solid article portion are part of the same article. For example, first thermally insulating compressible solid article portion 140 and second thermally insulating compressible solid article portion 240 may be connected via a third thermally insulating compressible solid article portion hidden behind second electrochemical cell 120 in FIG. 26 or in FIG. 31. As one example, the battery may comprise a thermally insulating compressible solid article that is foldable and/or has a serpentine shape such that electrochemical cells and/or other components of the battery can be arranged between portions of the thermally insulating compressible solid article portion.

A variety of anode active materials are suitable for use with the anodes of the electrochemical cells described herein, according to certain embodiments. In some embodiments, the anode active material comprises lithium (e.g., lithium metal), such as lithium foil, lithium deposited onto a conductive substrate or onto a non-conductive substrate (e.g., a release layer), and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of or during all of a charging and/or discharging process of the electrochemical cell. In some embodiments, the anode active material comprises lithium (e.g., lithium metal and/or a lithium metal alloy) during a portion of a charging and/or discharging process of the electrochemical cell, but is free of lithium metal and/or a lithium metal alloy at a completion of a discharging process.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}$ $(LiNi_{0.3}Co_{0.15}Mn_{0.55}O_2)_{0.75}$. In some embodiments, the layered oxide is lithium nickel cobalt aluminum oxide ($LiNi_x$-$Co_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: MgO, $Al_2O_3$, $SiO_2$, $TiO_2$, ZnO, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, the electrochemical cells of the battery further comprise a separator between two electrode portions (e.g., an anode portion and a cathode portion). The separator may be a solid non-conductive or insulative material, which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As described above, in some embodiments, a force, or forces, is applied to portions of an electrochemical cell. Such application of force may reduce irregularity or roughening of an electrode surface of the cell (e.g., when lithium metal or lithium alloy anodes are employed), thereby improving performance. Electrochemical devices in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

In the embodiments described herein, batteries may undergo a charge/discharge cycle involving deposition of metal (e.g., lithium metal or other active material) on a surface of an anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical device has been found, in accordance with certain embodiments described herein, to reduce such behavior and to improve the cycling lifetime and/or performance of the cell.

In some embodiments, the battery (e.g., a housing of the battery) is configured to apply, during at least one period of time during charge and/or discharge of the device, an anisotropic force with a component normal to an electrode active surface of one of the electrochemical cells (e.g., first electrochemical cell, second electrochemical cell).

In some embodiments, an anisotropic force with a component normal to an electrode active surface of one of the electrochemical cells (e.g., first electrochemical cell, second electrochemical cell) is applied during at least one period of time during charge and/or discharge of the battery. In some embodiments, the force may be applied continuously, over one period of time, or over multiple periods of time that may vary in duration and/or frequency. The anisotropic force may be applied, in some cases, at one or more pre-determined locations, optionally distributed over an active surface of the one or more of the electrochemical cells of the battery. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an electrode such as an anode, is given its ordinary meaning as would be understood by those of ordinary skill in the art and includes, for example, a force which, at least in part, exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the battery, but the magnitude of the forces in out-of-plane directions is substantially unequal to the magnitudes of the in-plane forces.

In one set of embodiments, batteries (e.g., housings) described herein are configured to apply, during at least one period of time during charge and/or discharge of the cell, an anisotropic force with a component normal to an electrode active surface of one of the electrochemical cells (e.g., first electrochemical cell, second electrochemical cell). Those of ordinary skill in the art will understand the meaning of this. In such an arrangement, the electrochemical cell may be formed as part of a container which applies such a force by virtue of a "load" applied during or after assembly of the cell, or applied during use of the battery as a result of expansion and/or contraction of one or more components of the battery itself.

The magnitude of the applied force is, in some embodiments, large enough to enhance the performance of the battery. An electrode active surface (e.g., anode active surface) and the anisotropic force may be, in some instances, together selected such that the anisotropic force affects surface morphology of the electrode active surface to inhibit increase in electrode active surface area through charge and discharge and wherein, in the absence of the anisotropic force but under otherwise essentially identical conditions, the electrode active surface area is increased to a greater extent through charge and discharge cycles. "Essentially identical conditions," in this context, means conditions that are similar or identical other than the application and/or magnitude of the force. For example, otherwise identical conditions may mean a battery that is identical, but where it is not constructed (e.g., by couplings such as brackets or other connections) to apply the anisotropic force on the subject battery.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least 10 kg$_f$/cm$^2$, at least 20 kg$_f$/cm$^2$, or more. This is because the yield stress of lithium is around 7-8 kg$_f$/cm$^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 10 kg$_f$/cm$^2$, at least about 20 kg$_f$/cm$^2$, and/or up 30 kg$_f$/cm$^2$, up to 40 kg$_f$/cm$^2$ of externally-applied pressure, the lithium surface may become smoother with cycling when the pressing surface is smooth.

In some cases, one or more forces applied to the cell have a component that is not normal to an active surface of an anode. For example, in FIG. 1A force 184 is not normal to electrode active surfaces of the first electrochemical cell 110 and second electrochemical cell 120. In one set of embodiments, the sum of the components of all applied anisotropic forces in a direction normal to any electrode active surface of the battery is larger than any sum of components in a direction that is non-normal to the electrode active surface. In some embodiments, the sum of the components of all applied anisotropic forces in a direction normal to any electrode active surface of the battery is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the electrode active surface.

In some cases, electrochemical cells may be pre-compressed before they are inserted into housings, and, upon being inserted to the house, they may expand to produce a net force on the electrochemical cells. Such an arrangement may be advantageous, for example, if the electrochemical cells are capable of withstanding relatively high variations in pressure.

Figure 32:
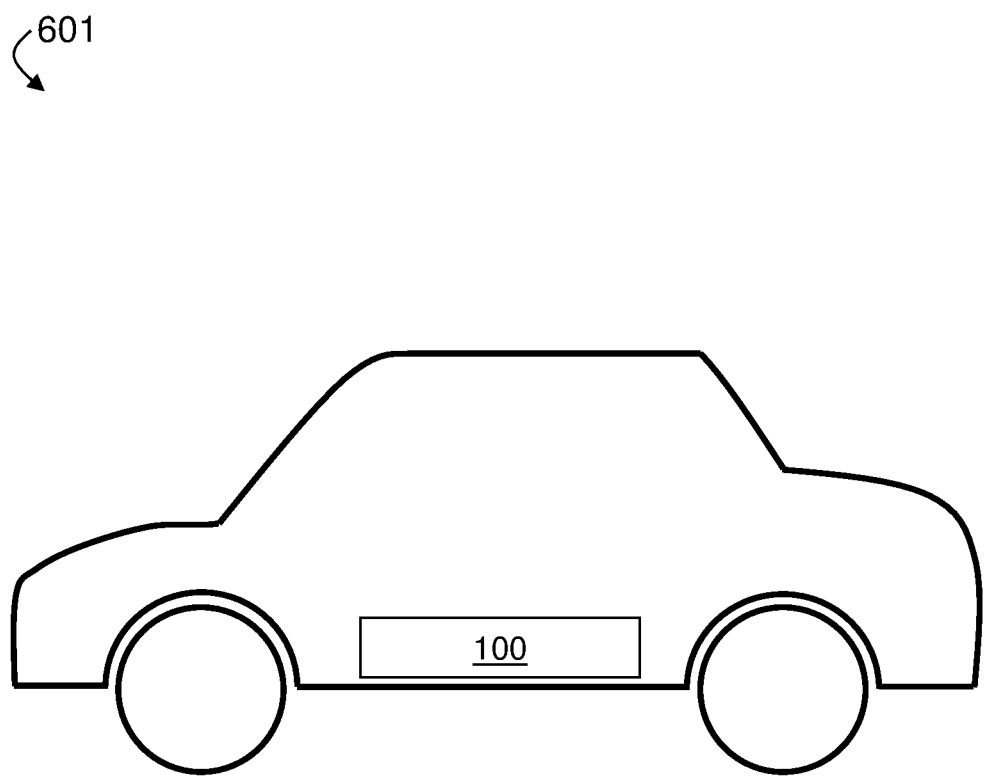
FIG. 32 shows a cross sectional schematic diagram of an exemplary electric vehicle comprising a battery, according to some embodiments.

In some embodiments, the electrochemical cells and batteries (e.g., rechargeable batteries) described in this disclosure can be used to provide power to an electric vehicle or otherwise be incorporated into an electric vehicle. As a non-limiting example, stacks of electrochemical cells and/or batteries described in this disclosure (e.g., comprising lithium metal and/or lithium alloy electrochemical cells, phase change materials and/or multiplexing switch apparatuses) can, in certain embodiments, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle. FIG. 32 shows a cross-sectional schematic diagram of electric vehicle 600 in the form of an automobile comprising battery 100, in accordance with some embodiments. Battery 100 can, in some instances, provide power to a drive train of electric vehicle 601.

It has been recognized and appreciated that conventional techniques for management and operation of rechargeable electrochemical cells have resulted in the previously poor longevity and performance of cells (and batteries in which they may be included). For example, cells have suffered a short cycle life (e.g., a low number of complete cycles before capacity falls below 80% of original capacity, as cells typically do at some point after sufficient usage), particularly where charge and discharge rates are similar, or where the charge rate is higher than the discharge rate. For example, many users of cells in batteries have desired the batteries to have nearly identical charge and discharge rates (e.g., 4 hours to charge and 4 hours to discharge), and battery manufacturers have provided batteries and battery management systems that provide such nearly identical rates. Many users have also desired batteries to charge at higher rates than they discharge (e.g., 30 minutes to charge and 4 hours to discharge) for various reasons, such as to reduce inconvenience of waiting for charging to use the batteries and extended runtimes.

The term "charging step" is used herein to generally refer to a continuous period of time during which charging is performed without discharging, and the term "discharging step" is used herein to generally refer to a continuous period during which discharging is performed without charging. A charging step coupled with a discharging step may form a cycle, but the cycle may not necessarily be a complete cycle.

The term "capacity" is used to generally refer to an amount of electrical charge a cell or cells can deliver at a given or rated voltage and is often measured in amp-hours (such as milliamp-hours or mAh). In some embodiments, capacity may be the mAh a cell or cells can hold at a given point in time (which may change over multiple cycles), it may be the mAh remaining in a cell or cells at a given point in time, or it may be the mAh a cell or cells need to fully re-charge.

The term "state of charge" (SOC) is used herein to refer to a level of charge of the cell relative to its capacity and is measured as a percentage. As examples, a state of charge of 100% refers to a fully charged cell, a state of charge of 40% refers to a cell that retains 40% of its capacity, and a state of charge of 0% refers to a fully discharged cell.

The term "state of charge range" (SOC range) is used herein to refer to a range of states of charge. For example, a state of charge range of 10% to 50% would include the states of charge of 10%, 50%, and all states of charge between 10% and 50%.

The "breadth" of the state of charge range is used herein to refer to the absolute value of the difference between the end points of a state of charge range. To illustrate, a state of charge range of 10% to 50% would have a breadth of 40% (because 50% minus 10% is 40%). As another example, a state of charge range of at least 2% and at most 5% would have a breadth of 3% (because 5% minus 2% is 3%).

It has been recognized and appreciated that the cycle life of a cell (and a battery including the cell), and consequently the longevity and performance of the cell (and battery), may be greatly improved by employing higher ratios of discharge rate to charge rate, higher ratios of charge rate to other charge rate(s) (such as a preceding or proceeding rate(s)), and/or higher ratios of discharge rate to other discharge rate(s). Furthermore, it has been recognized and appreciated that these ratios may be employed by providing a cell and/or battery management system that controls the cell or cells to provide such ratios.

It has been recognized and appreciated that such improvements and others described herein, such as improved cell cycle life, can be had even if not every charging step and/or every discharging step satisfies a target ratio, and/or even if the ratios are employed over only a portion of a charging step and/or a discharging step, and/or even if the ratios are employed over a state of charge range that constitutes only a portion of the full SOC range.

For example, some embodiments are directed to a cell management system that controls a cell such that the cell is discharged or charged over a SOC range (e.g., a range having breadth of at least 2% and at most 60%) to satisfy a rate ratio (such as by discharging at a rate at least 2 times an average charging rate of any of the last 5 cycles, or by charging to establish a similar ratio with discharging rate(s)) if the ratio has not been satisfied within the last 5 cycles. As another example, in some embodiments the cell is discharged over a SOC range to satisfy another rate ratio (such as by discharging at a rate at least 2 times an average discharging rate of any of the last 5 cycles, but discharging at most 4 times a maximum recommended continuous discharging rate) if the ratio has not been satisfied within the last 5 cycles.

As an additional example, in some embodiments, once a threshold SOC (e.g., 60% or less) is reached while discharging, the discharging rate is increased to at least 2 times an average charging rate of at least one cycle in the cycle history. In some embodiments, a charging step is terminated (e.g., at 60% SOC) and a discharge is initiated, whereupon the cell is discharged, over a SOC range having breadth of at least 1%, at a rate at least 2 times an average charging rate of the terminated charging step or of at least one cycle in the cycle history. In additional embodiments, the cell is discharged over a SOC range (e.g., a range having breadth of at least 2% and at most 60%), and then charged such that the discharging rate is at least 2 times the average charging rate.

In further embodiments, if a fast charging request has not been received, the cell is charged over a first SOC range (e.g., a range having breadth of at least 2% and at most 60%), and then charged over a second SOC range such that the rate over the first SOC range is at most 0.5 times the average rate over the second SOC range. In some embodiments, the cell is discharged, and then immediately charged over a first SOC range (e.g., a range having breadth of at least 2% and at most 60%), and a future charging schedule is set and executed such that by an end of the next 4 cycles, the cell is charged over a second SOC range such that the rate over the first SOC range is at most 0.5 times the average rate over the second SOC range.

Furthermore, it has been recognized and appreciated that analysis and control as described herein may be performed by a cell and/or battery management system (e.g., of a battery described herein). For example, analysis and control as described herein may be performed by a cell and/or battery management system of a battery comprising a stack of electrochemical cells at least partially enclosed by a housing (e.g., and comprising a phase change material), with the housing configured to apply an anisotropic force having a component normal to an electrode active surface of an electrochemical cell of the stack.

Some embodiments, such as embodiments having multiple cells (e.g., in a stack), are directed to a battery management system that multiplexes cells such that the cells can be charged all at once (or with multiple cells discharged at the same time) and discharged individually or in smaller sets. This may result in actual ratios of discharge rate to charge rate (or discharge rate to other discharge rate(s), or charge rate to other charge rate(s)) for the cells that improve their cycle life, while providing whatever output rates that are desired or required for particular loads and applications. Furthermore, the inventors have recognized and appreciated that discharging some but not all of the cells at once with homogeneous current distribution may also improve their cycle life.

For example, with a battery having 4 cells, 1 cell could be discharged at a time at 0.5 amps for 3 hours each, and then all 4 cells could be charged at 0.5 amps for 12 hours—such a configuration would provide an actual ratio of discharge rate to charge rate of 4:1, while the ratio from the user's perspective would be 1:1 because the cells are discharged individually for 3 hours each (totaling 12 hours of discharge time). The inventors have recognized and appreciated that such a battery management system may actually improve the cycle life of batteries while still providing users what they desire or need from the batteries. In some embodiments, the functionality providing this duo of benefits may be hidden from users and may be integrated into the cell blocks and/or batteries themselves.

It has been recognized and appreciated that the cycle life of batteries may be further improved by monitoring the cycles of the cells and various properties (such as the duration of a connection between a load and a cell or cells currently connected to the load, or a more complex function considering multiple parameters) and selecting which cells to discharge when based on this monitoring, especially compared to conventional techniques, which relied on much simpler selection processes like "round robin" or considering a number of prior cycles.

Figure 33:
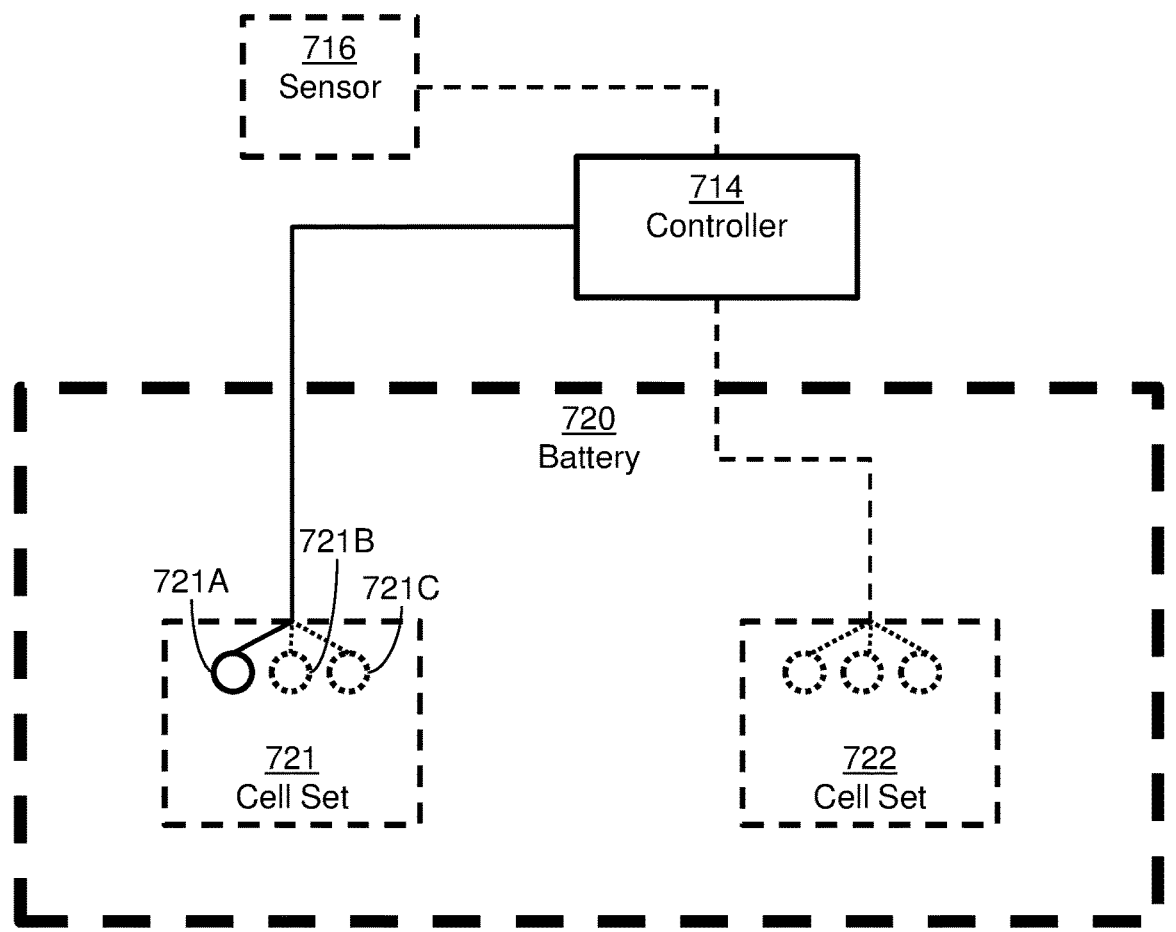
FIG. 33 shows a block diagram illustrating a representative electrochemical cell management system, according to some embodiments.

FIG. 33 depicts a representative cell management system 700A. In some embodiments, representative system 700A includes a controller (e.g., 714) and an electrochemical cell (e.g., 721A). In some embodiments, cell 721A is present alone. In other embodiments, additional cells (e.g., optional cells 721B and 721C in FIG. 33) and/or additional cell sets (e.g., optional cell set 722 in FIG. 33) are present (e.g., to form battery 720). Optionally, system 700A may include one or more sensors (e.g., 716). It should be appreciated that although only a single controller 714 and a single sensor 716 are shown in FIG. 33, any suitable number of these components may be used. Any of numerous different modes of implementation may be employed.

In some embodiments, such as embodiments having multiple cells, a multiplexing switch apparatus (not shown in FIG. 33) is included, such as described in relation to FIG. 34A below, and may include an array of switches. Additionally, the multiplexing switch apparatus may be connected to each set of cells and/or to each cell individually. In some embodiments, the controller, such as 714, uses the multiplexing switch apparatus to selectively discharge the cells or sets of cells.

In some embodiments, the controller (e.g., 714) includes one or more processors, which may be of whatever complexity is suitable for the application. Alternatively or additionally, the controller may include an analog circuit and/or a less complex logic device than a processor or microprocessor.

In some embodiments, the controller controls the cell such that, for at least a portion of a charging step of the cell, the cell is charged at a charging rate or current that is lower than a discharging rate or current of at least a portion of a previous discharging step. For example, the controller may cause the cell to be charged for some state of charge range (e.g., over a range having breadth of anywhere from 1% to 100%) at a charging rate or current that is on average at least 2 times lower than the discharging rate or current that has been used on average discharging for some state of charge range (e.g., over a range having breadth of anywhere from 1% to 100%) (i.e., the charging rate or current may be half as fast as the discharging rate or current). Alternatively or additionally, the controller may cause the cell to be charged at a charging rate or current that is at least 4 times lower than the discharging rate (e.g., as a result of this controlling, over the last cycle, the cell is charged for some range one-fourth as fast as the cell has been discharged for some range). The inventors have recognized and appreciated that such ratios of charge rate to discharge rate may improve the performance and cycle life of a cell.

In some embodiments, controlling the cell includes controlling when and how to start and stop charging and discharging, induce discharging, increase or decrease the rate or current of charging or discharging, and so on. For example, controlling charging or discharging of the cell may include, respectively, starting charging or discharging, stopping charging or discharging, increasing or decreasing the rate or current of charging or discharging, and so on.

In some embodiments, the cell is charged such that, over a period of time during which at least 5% (or at least 1%, or at least 10%, or at least 15%, or at least 25%, or anywhere between) of the capacity of the cell is charged, the average charge rate or current is lower than the average discharge rate or current used to discharge at least 5% (or at least 10%, or at least 15%, or at least 25%, or anywhere between) of the cell's capacity during a previous discharging step, which may be, for example, the immediately preceding discharging step or an earlier discharging step.

In some embodiments, a charging step is performed such that, for at least 5% (or at least 10%, at least 25%, at least 50%, or at least 75%) of the cell's or battery's capacity, the average of the charging rate and/or current is less than 50% (or less than 35%, or less than 25%) of an average discharging rate and/or current at which at least 5% (or at least 10%, at least 25%, at least 50%, or at least 75%) of the cell's or battery's capacity was discharged during a previous discharging step.

In certain embodiments, a charging step is performed such that, for at least 5% (or at least 10%, at least 25%, at least 50%, or at least 75%) of the cell's or battery's capacity, the average of the charging rate and/or current is less than 50% (or less than 35%, or less than 25%) of an average discharging rate and/or current at which at least 5% (or at least 10%, at least 25%, at least 50%, or at least 75%) of the cell's or battery's capacity was discharged during the immediately preceding discharging step.

In some embodiments, an average discharging rate or current during the previous discharging step is equal to or less than an average charging rate or current during the charging step, and an average discharging rate or current during discharge of a state of charge range have breadth of at least 5% during the previous discharging step may be at least 2 times higher (or may be 4 times higher) than the average charging rate or current during the charging step. The inventors have recognized and appreciated that improvements described herein, such as improved cell cycle life, can still be had even if the average discharge rate for the cell is the same or even slower than the charge rate, so long as during discharge of at least a portion (such as state of charge range having breadth of 5%) during the previous discharging step, an average discharging rate or current is sufficiently higher than (such as at least double, triple, or quadruple) the average charging rate or current during that time.

As used herein, when a cell is charged at multiple different rates over a given period of time (e.g., over a portion of a charging step, over an entire charging step, or over a series of charging steps), the average charging rate over that given period of time is calculated as follows:

$$CR_{Avg} = \sum_{i=1}^{n} \frac{CCap_i}{CCap_{Total}} CR_i$$

where $CR_{Avg}$ is the average charging rate over the given period of time, n is the number of different rates at which the cell is charged, CRi is the charging rate, $CCap_i$ is the portion of the cell's capacity that is charged at charging rate CRi during the given period of time, and $CCap_{Total}$ is the total of the cell's capacity that is charged over the entire period of time. To illustrate, if, during a charging step, a cell is charged from 0% to 50% of its capacity at a rate of 20 mAh/minute and then from 50% to 80% of its capacity at a rate of 10 mAh/minute, then the average charging rate during the charging step would be calculated as:

$$CR_{Avg} = \frac{50\%}{80\%}(20 \; mAh/min) + \frac{30\%}{80\%}(10 \; mAh/min) = 16.25 \; mAh/min.$$

As used herein, when a cell is discharged at multiple different rates over a given period of time (e.g., over a given charging step or series of charging steps), the average discharging rate over that given period of time is calculated as follows:

$$DR_{Avg} = \sum_{i=1}^{n} \frac{DCap_i}{DCap_{Total}} DR_i$$

where $DR_{Avg}$ is the average discharging rate over the given period of time, n is the number of different rates at which the cell is discharged, DRi is the discharging rate, $DCap_i$ is the portion of the cell's capacity that is discharged at discharging rate $DR_i$ during the given period of time, and $DCap_{Total}$ is the total of the cell's capacity that is discharged over the entire period of time. To illustrate, if, during a discharging step, a cell is discharged from 90% to 50% of its capacity at a rate of 25 mAh/minute and then from 50% to 20% of its capacity at a rate of 15 mAh/minute, then the average discharging rate during the discharging step would be calculated as:

$$DR_{Avg} = \frac{40\%}{70\%}(25 \; mAh/min) + \frac{30\%}{70\%}(15 \; mAh/min) = 20.71 \; mAh/min.$$

It has been recognized and appreciated that a number of factors may go into determining charge rates that may improve the performance and cycle life of a cell such as a lithium metal and/or lithium alloy cell, which may include rate of discharge, cell impedance, and/or cell State of Health (SOH). In some embodiments, the controller is aware of these factors because it may measure parameters or characteristics (such as via sensor 716) that can be used to determine each of them. The controller may directly or indirectly measure charge and discharge current, Coulombs added or removed, cell impedance (capacitive and resistive), and/or cell pressure, size, and/or thickness.

In some embodiments, the controller can monitor such characteristic(s) of the cell. For example, the characteristic(s) may include at least a portion of a discharge history of the cell. Alternatively or additionally, the characteristic(s) may include at least one morphological characteristic of the cell. The controller may monitor any of these using sensor 716, such as a pressure sensor, a gauge to measure thickness, a sensor to measure or determine surface roughness and/or pits (such as pits in an anode), and/or a memory for storing cell charge/discharge history. For example, a pressure sensor may be included to measure uniaxial pressure and/or gas pressure (such as to determine if the cell generates an excessive amount of gas). Alternatively or additionally, a gauge may be included to measure a thickness of the cell, and the controller may determine and monitor at least one rate of increase of the thickness.

In some embodiments, the controller can use this information, such as the characteristic(s), to determine the charge method and/or rate to be used, which may include controlling rates or other parameters as described herein.

In some embodiments, the controller can consider any of several factors when determining the cell state of charge and State of Health (SOH). An impedance measurement may have two components: real and imaginary. The real component may be simply the DC resistance R=RS+RP. The imaginary (or reactive) component in this case may be XC, which may be affected inversely by frequency;

$$XC = \frac{1}{2\pi fc}$$

where f is frequency and c is capacitance. Impedance (Z) may be found at any particular frequency, and the phase angle may be known or determined as follows:

$$Z = \sqrt{R^2 + XC^2}.$$

Impedance may change both with SOC and SOH. The inventors have recognized and appreciated that these relationships may allow the controller to determine how to charge the cell in order to provide improvements described herein.

It has also been recognized and appreciated that, in certain instances, pulses of cycles and/or charging/discharging steps should not be applied faster than a rate equal to about double or triple RC time constants, because at a faster rate, most of the energy may not be effective in charging or discharging the cell. Rather, it may be mostly reactive in nature and most of the energy may be returned by the capacitance or dissipated in the resistance.

It has been further recognized and appreciated that a cell may grow and shrink in thickness with every cycle and that a portion of the growth is retained each cycle. This growth and shrinkage can be measured by monitoring the pressure and/or size change of the cell directly. These are additional inputs that may be used when determining SOC and SOH, and they can also be used in determining how to charge the cell.

In some embodiments, the controller can control charging of the cell based on the characteristic(s) of the cell. For example, if the cell has had a discharging step or history of discharging at a certain discharge rate or current (such as 300 mA) at least for a portion of the previous discharging step, the cell may be controlled to charge at a lower rate or current (such as at 150 mA or 75 mA) for at least a portion of the charging step.

In some embodiments including an induced discharge, the controller can control the cell such that, for at least a portion of the charging step (such as 5% of the cycle), the cell is charged at a charging rate or current that is lower than a discharging rate or current of at least a portion of a previous discharging step other than (i.e., not including) the induced discharge.

As another example, the controller may terminate usage of the cell if an applied anisotropic pressure falls below a threshold, which may indicate that the pressure applying system (examples of which, including housings, are described in more detail throughout this disclosure) is damaged. For example, in some embodiments such a threshold may be 1% to 50% of nominal applied anisotropic pressure. Alternatively or additionally, the controller may terminate usage of the cell if pressure is too high or the thickness has been increasing faster than a threshold rate. For example, in some embodiments such a threshold rate may be 1% to 3% of thickness increase or more per cycle.

Figure 34A:
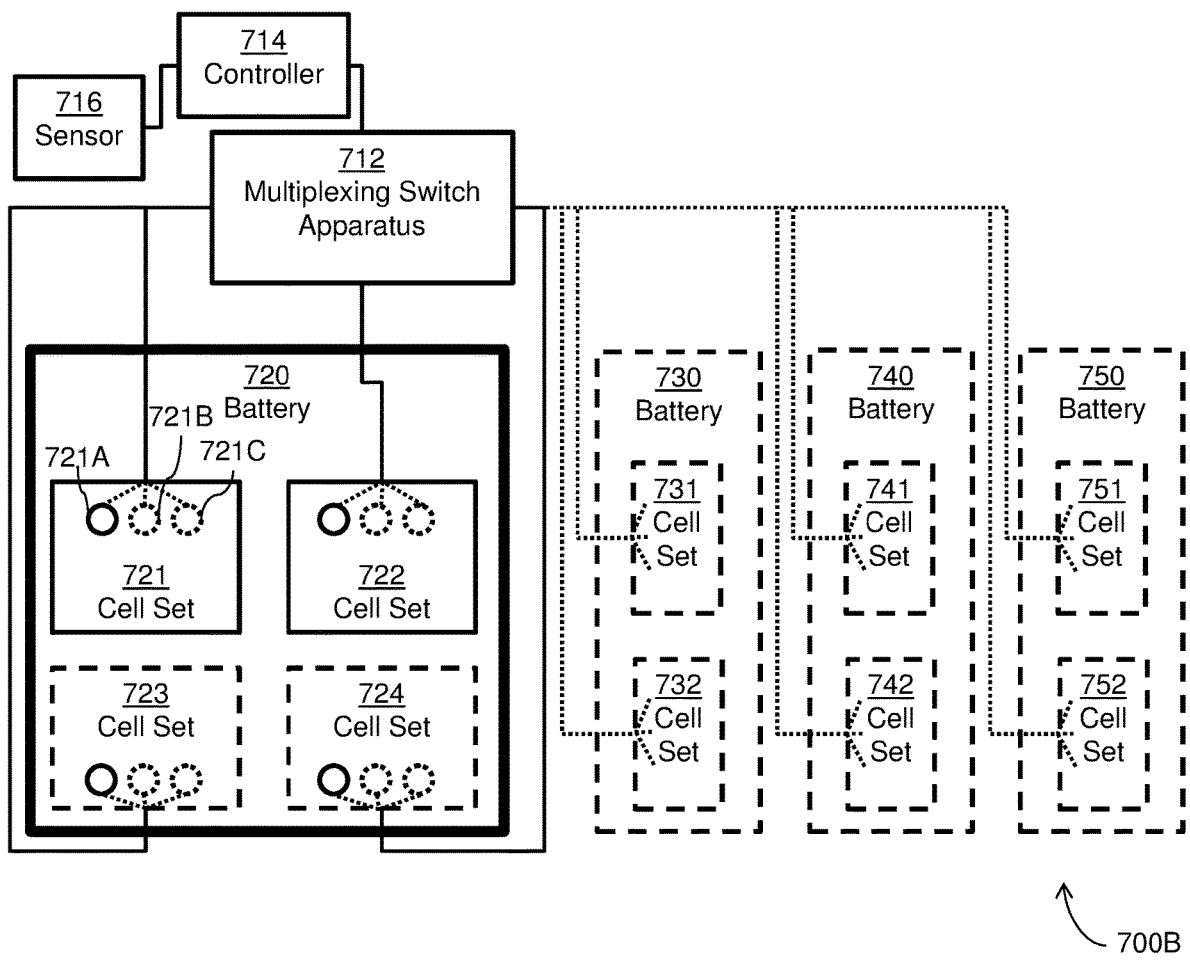
FIG. 34A shows a block diagram illustrating a representative battery management system, according to some embodiments.

FIG. 34A depicts representative battery management system 700B. In some embodiments, such as embodiments having multiple cells, representative system 700B includes a multiplexing switch apparatus (e.g., 712), a controller (e.g., 714), one or more sensors (e.g., 716), and one or more batteries (e.g., 720, 730, 740, 750, and so on). It should be appreciated that although only a single multiplexing switch apparatus 712, controller 714, sensor 716, and only four batteries 720-750 are shown in FIG. 34A, any suitable number of these components may be used. Any of numerous different modes of implementation may be employed. Furthermore, although a label in the singular is used herein to reference a multiplexing switch apparatus, it should be appreciated that the components used for the multiplexing and switching described herein may be distributed across any suitable number of devices (e.g., switches).

According to some embodiments, the battery or batteries include at least one lithium metal and/or lithium alloy battery. Additionally, the battery or batteries (e.g., 720-750) may respectively include one or more cell sets (e.g., 721-724, 731-732, 741-742, 751-752, and so on), referred to also as sets of cells. In some embodiments, two or more sets of cells are included in each battery, such as 721-722 and so on.

According to some embodiments, the cell(s) may include at least one lithium metal and/or lithium alloy electrode active material. Additionally, each set of cells (e.g., cell set 721) may include one or more cells (e.g., 721A-721C). In some embodiments, each set of cells has a single cell. Alternatively, each set of cells may include multiple cells and may form a cell "block," or multiple sets of cells may together form a cell block. Additionally, each cell (either in a battery, all the batteries in a battery pack, or in a set of cells) or set of cells may utilize the same electrochemistry. That is to say, in some embodiments, each cell may make use of the same anode active material and the same cathode active material.

In some embodiments, a multiplexing switch apparatus (e.g., 712) may include an array of switches. Additionally, the multiplexing switch apparatus may be connected to each set of cells and/or to each cell individually. In some embodiments, the controller, such as 714, can use the multiplexing switch apparatus to selectively discharge the cells or sets of cells based on at least one criterion.

For example, the criterion may include a sequence in which to discharge the cells or sets of cells, such as a predefined numbering or order associated with the sets of cells (e.g., starting with a first set, switching through each set to the last set, and then starting over with the first set), and/or an order based on the cell(s) or set(s) of cells with the next highest voltage or some other measure indicating the next strongest. The inventors have recognized and appreciated that using a sequence, especially a predefined numbering, may reduce the complexity of the operations performed by the system (e.g., a controller that is not a microprocessor) and may be usable by a wider array of systems.

Alternatively or additionally, the criterion may be context-sensitive, such as by considering any one or more of the following: a duration of a connection between a load and a set of cells currently connected to the load (which may be at least 0.01 seconds in some embodiments), a delivered capacity at the connection, and the value of a function having one or more parameters. In certain embodiments, the criterion may not include a number of prior discharging steps of the set of cells.

In some embodiments, the function has parameters such as any one or more of the following: a capacity accumulated over several connections between the load and the set of cells, the delivered capacity at the connection, a current of the set of cells, a voltage of the set of cells and/or of at least one other set of cells, a cutoff discharge voltage of the set of cells, a power of the set of cells, an energy of the set of cells, a number of charging or discharging steps of the set of cells, an impedance of the set of cells, a rate of voltage fading of the set of cells during the connection, a temperature of the set of cells, and a pressure of the set of cells (e.g., the pressure on the cell(s) from their physical enclosure, which may indicate cell capacity and is discussed further below). According to some embodiments, the delivered capacity at a single connection is in the range from 0.01% of nominal capacity to 100% (e.g., 95%) of set nominal capacity.

In some embodiments, a sensor (e.g., 716) can measure the criterion and/or any of the parameters of the function. For example, the sensor may include a current sensor that measures the current in amperes of a given set of cells. It should be appreciated that the criterion may be plural or singular and may relate to the currently discharging set of cells and/or may determine the next set of cells.

In some embodiments, the controller (e.g., 714) can include one or more processors, which may be of whatever complexity is suitable for the application. For example, evaluating the function of the criterion in some embodiments may rely on a microprocessor forming part or all of the controller.

In some embodiments, the controller can use the multiplexing switch apparatus to selectively discharge and charge the cells or sets of cells at different, programmable rates. For example, the controller may use the multiplexing switch apparatus to selectively discharge the cells or sets of cells at a first rate at least 2 times higher than a second rate of charging the sets of cells (i.e., discharging twice as fast as charging). Alternatively or additionally, the first rate of discharging may be at least 4 times higher than the second rate of charging the sets of cells (i.e., discharging four times as fast as charging). The inventors have recognized and appreciated that such ratios of discharge rate to charge rate may improve the performance and cycle life of the cells.

According to some embodiments, the controller can temporally overlap the discharge of the sets of cells. For example, before a given cell or set of cells ceases discharging, another cell or set of cells may begin discharging. In some embodiments, the controller may continue to provide power from the sets of cells during switching between different sets. The inventors have recognized and appreciated that this temporal overlap of discharging and continuation of power may maintain the power requirements of the load even during transition between different cells of sets of cells, which may further improve the cycle life of the cell(s) compared to conventional techniques. Accordingly, multiple cells may discharge simultaneously during such an overlap. Additionally, such an overlap may provide smoother transition of voltage than has been possible with conventional techniques.

Alternatively or additionally, the controller may use the multiplexing switch apparatus (e.g., 712) to connect the sets of cells to a load in a topology employed or required by the load. For example, the controller may use the multiplexing switch apparatus (e.g., 712) to connect the sets of cells in series, parallel, and/or serial/parallel.

In some embodiments, the controller can use the multiplexing switch apparatus (e.g., 712) to isolate a single set of cells for discharging while other sets of cells are not discharging. Alternatively or additionally, a single cell may be isolated at a time. For example, the controller may use the multiplexing switch apparatus to isolate a single set of cells or a single cell for discharging while the other cells or sets of cells are not discharging. For a given cycle, each cell may be discharged once before any cell is discharged twice, according to some embodiments (e.g., where sequential discharging is used, but not limited to such embodiments).

As for charging, in some embodiments the controller can use the multiplexing switch apparatus to charge the sets of cells, and/or cells within a set, in parallel. For example, all the cells in the cell block, battery, or batteries may be charged in parallel at a rate one-fourth of the rate of discharge.

In some embodiments, the controller can balance charge and/or discharge between multiple cells. In some embodiments, the controller turns the balancing on or off, and the balancing is achieved at least in part through circuitry that is part of the battery management system. For example, the controller may ensure that the cell(s) attain the same state and/or depth of charge and/or discharge using passive balancing and/or active balancing. In some embodiments, balancing may be performed "at top of charge" such that when a cell reaches maximum charge voltage, it may be bypassed so other cells in series with it come up to that voltage value. Alternatively or additionally, balancing may be performed at "bottom of charge" or any other suitable configuration.

In some embodiments, the controller can use active balancing, such as by taking charge from either the entire battery or a cell that has more charge and give it to cell(s) with less charge, which can be done at any point of a cycle.

Figure 34B:
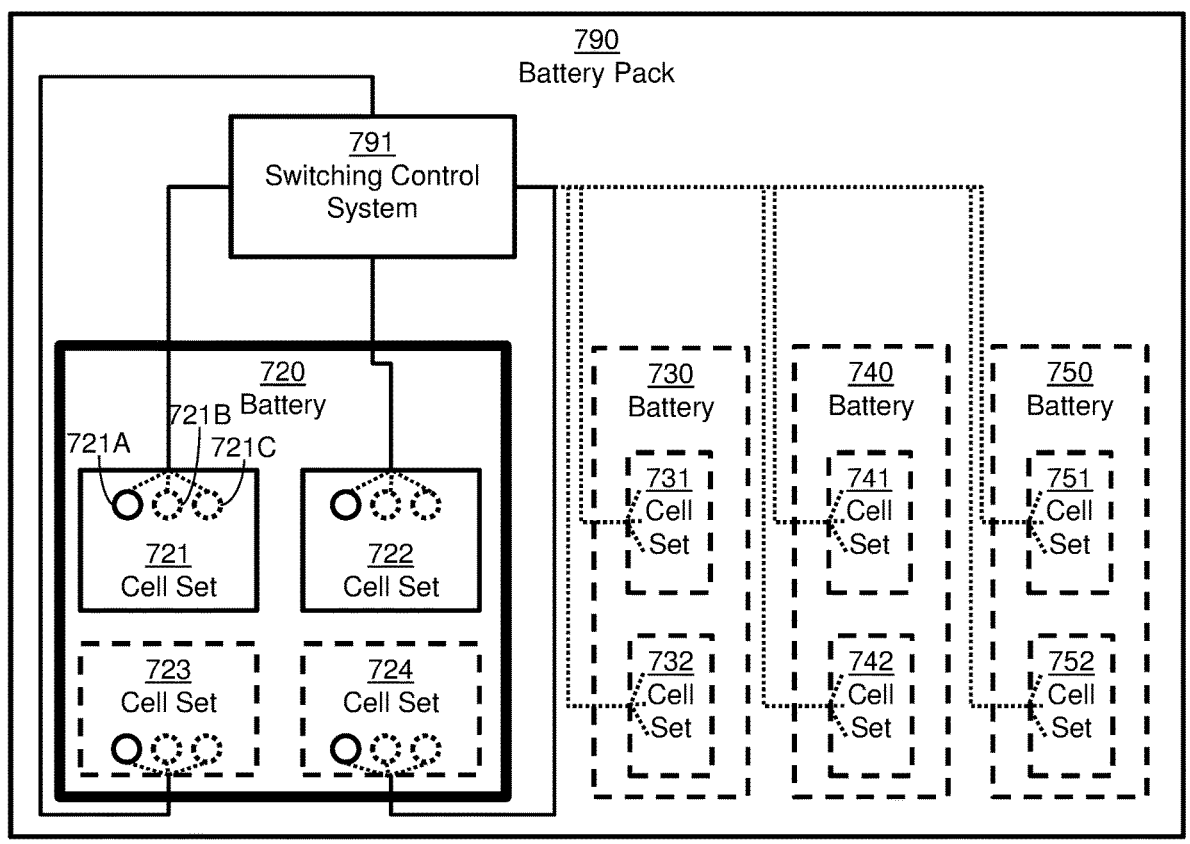
FIG. 34B shows a block diagram illustrating a representative battery pack, according to some embodiments.

FIG. 34B depicts a representative battery pack 790. In some embodiments, representative battery pack 790 may include a switching control system (e.g., 791) and one or more batteries (e.g., 720, 730, 740, 750, and so on). It should be appreciated that although only a single switching control system 791 and only four batteries 720-750 are shown in FIG. 34B, any suitable number of these components may be used. Any of numerous different modes of implementation may be employed. Furthermore, although a label in the singular is used herein to reference a switching control system, it should be appreciated that the components used for the control and switching described herein may be distributed across any suitable number of devices (e.g., switches, controller(s), etc.).

In some embodiments, a switching control system (e.g., 791) may include an array of switches, such as those further described in relation to FIGS. 34C and 34D below, and it may include a controller. Additionally, the switching control system may be connected to each set of cells and/or to each cell of the batteries individually, as discussed regarding FIG. 34A above. In some embodiments, the switching control system may be integrated into the battery pack. Additionally, the switching control system may control the switch(es) (such as in a switch array) to discharge the cells or sets of cells sequentially, such as in a predefined order associated with the cells or sets of cells. Alternatively or additionally, the switching control system may control the switch(es) to discharge the cells or sets of cells based on any one or more of the following: a duration of a connection between a load and a set of cells currently connected to the load (which may be at least 0.01 seconds in some embodiments), a delivered discharge capacity at the connection, and the value of a function. In certain embodiments, the basis for the control may not include a number of prior discharge cycles of the set of cells.

According to some embodiments, the switching control system may perform any number of other functions, such as those of the controller described in relation to FIG. 34A above.

It should be appreciated that any of the components of representative system 700B or representative battery pack 790 may be implemented using any suitable combination of hardware and/or software components. As such, various components may be considered a controller that may employ any suitable collection of hardware and/or software components to perform the described function.

Figure 34C:
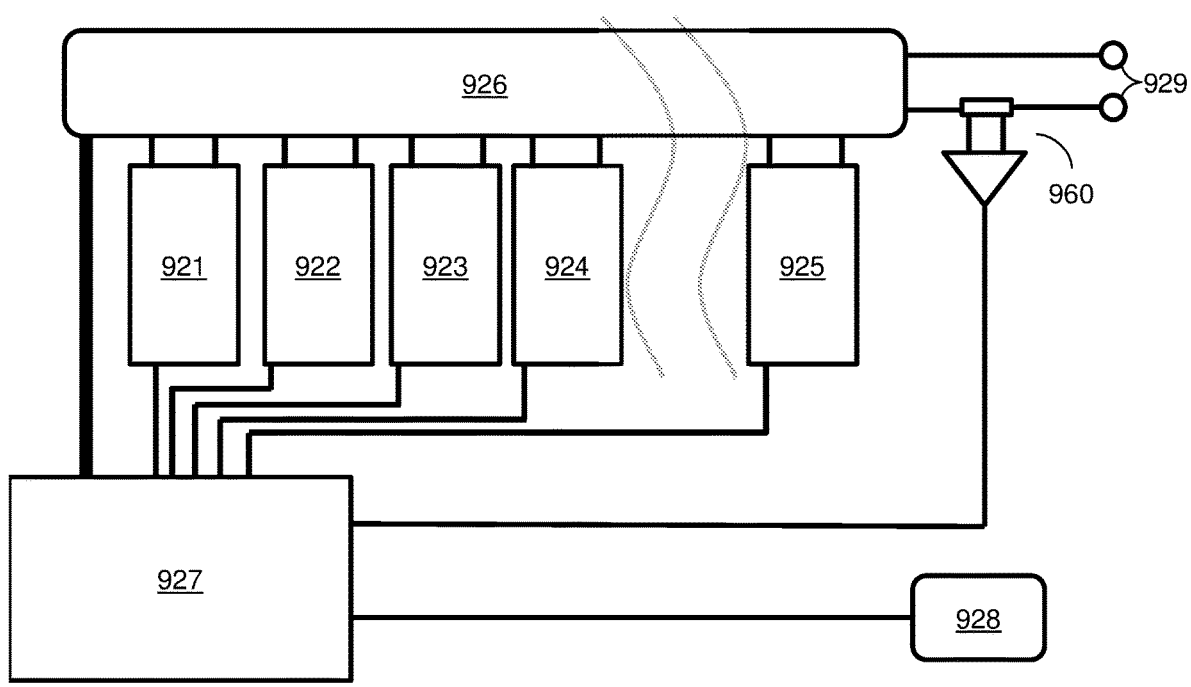
FIG. 34C shows a block diagram illustrating a representative battery management system, according to some embodiments.

FIG. 34C depicts a representative battery management system 1200. In some embodiments, representative system 1200 may include any suitable number of multi-cell blocks (e.g., 921-925), a battery cell block arrangement and balance switch configuration (e.g., 926), a battery management microcontroller (e.g., 927), a battery system interface (e.g., 928), battery power terminals (e.g., 929), and a sensor (e.g., 960). The multi-cell blocks may be connected to the battery cell block arrangement and balance switch configuration. The multi-cell blocks may also be connected to the battery management microcontroller.

In some embodiments, the battery cell block arrangement and balance switch configuration may include switch multiplexing, which may connect the cell blocks (e.g., 921-925) in the series, parallel, serial/parallel, or any other suitable topology required to meet the voltage and current requirements of a given application or load.

According to some embodiments, the battery management microcontroller may monitor and control the charging and discharging of the battery management system to ensure the safe operation of the system and its components. Additionally, the battery management microcontroller may communicate with a user (e.g., a consumer using the system to power a load) as well as with any suitable internal production, calibration, and test equipment. For example, the battery management microcontroller may be connected to the battery system interface (e.g., 928), which may provide the interface required for the battery management microcontroller to communicate with the user as well as internal production, calibration, and test equipment, and any other suitable entity.

In some embodiments, the sensor may be connected to the battery cell block arrangement and balance switch configuration, the battery management microcontroller, and/or the battery power terminals, and it may the measure attributes of the multi-cell blocks and/or any other component of the system. For example, the sensor may measure attributes of the multi-cell blocks that form a criterion and/or any of the parameters of a function as described above. For example, the sensor may include a current sensor that measures the current in amperes of a given set of cells.

It should be appreciated that although battery cell block arrangement and balance switch configuration 926, battery management microcontroller 927, battery system interface 928, and sensor 960 appear in singular form, and only five multi-cell blocks 921-925 are shown in FIG. 34C, any suitable number of these components may be used and they may represent multiple components. Any of numerous different modes of implementation may be employed. Indeed, although a label in the singular is used herein to reference a battery cell block arrangement and balance switch configuration, it should be appreciated that the components used for the arrangement and balance switching described herein may be distributed across any suitable number of devices (e.g., switches).

Figure 34D:
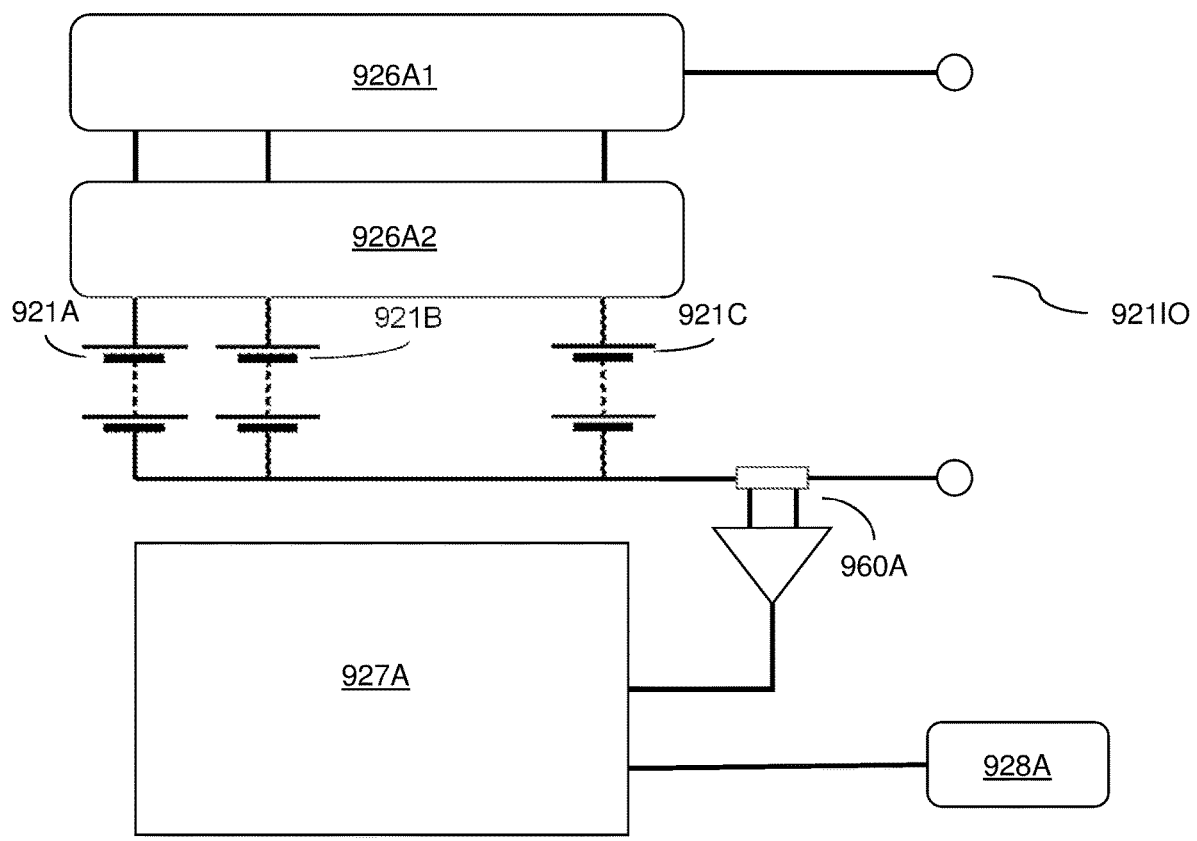
FIG. 34D shows a block diagram illustrating a representative cell set and corresponding components, according to some embodiments.

FIG. 34D depicts a representative cell set and corresponding components. In some embodiments, the representative cell set may include any suitable number of cells (e.g., 921A-C) and may constitute a multi-cell block, such as is described above. Additionally, the representative cell set may include cell multiplexing switches (e.g., 926A1), cell balance switches and resistors (e.g., 926A2), a cell block microcontroller (e.g., 927A), a battery management microcontroller interface (e.g., 928A), a sensor (e.g., 960A), and an input/output bus for the cell set (e.g., 921IO). In some embodiments, the cells may be connected to the cell balance switches and resistors, which may be connected to the cell multiplexing switches.

In some embodiments, each cell (e.g., each of 921A-C) may be connected to an array of the cell multiplexing switches, which may connect or isolate the given cell(s) from the input/output bus (e.g., 921IO), and which may connect or disconnect the given cell(s) to a balance resistor (e.g., one of the resistors in 926A2) that shares the balance bus with the other cells. Additionally, in discharge mode one cell (e.g., 921A) may be connected to the input/output bus and disconnected from the balance resistor. The remaining cells (e.g., 921B-C) may be disconnected from the input/output bus and connected to the corresponding balance resistor(s). Additionally, in charge mode for some embodiments, all cells (e.g., 921A-C) may be connected to the input/output bus and disconnected from the balance resistors 926A2.

According to some embodiments, the cell block microcontroller (e.g., 927A) may generate switching waveforms to ensure that overlap and deadband requirements for the switching is appropriate for the application or load. Additionally, the cell block microcontroller may determine the state required by the application or load by monitoring the cell block's voltage and current, as well as by receiving communication from a battery management microcontroller (e.g., 927 in FIG. 34C), to which the cell block microcontroller may be connected via the battery management microcontroller interface.

Figure 35A:
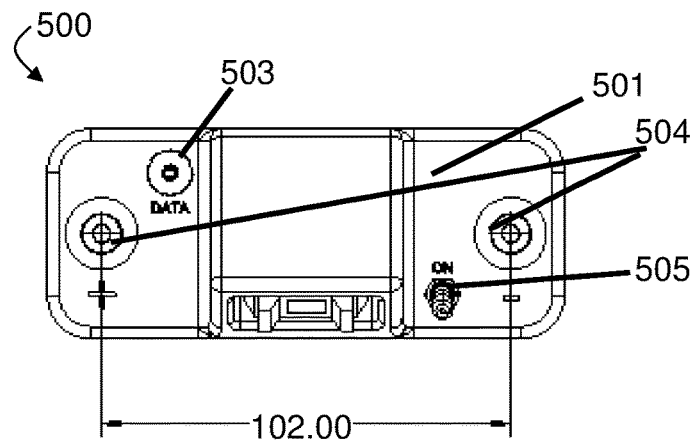
FIGS. 35A-35C show top view (FIG. 35A), front view (FIG. 35B), and side view (FIG. 35C) schematic illustrations of an exemplary battery, according to some embodiments.
Figure 35B:
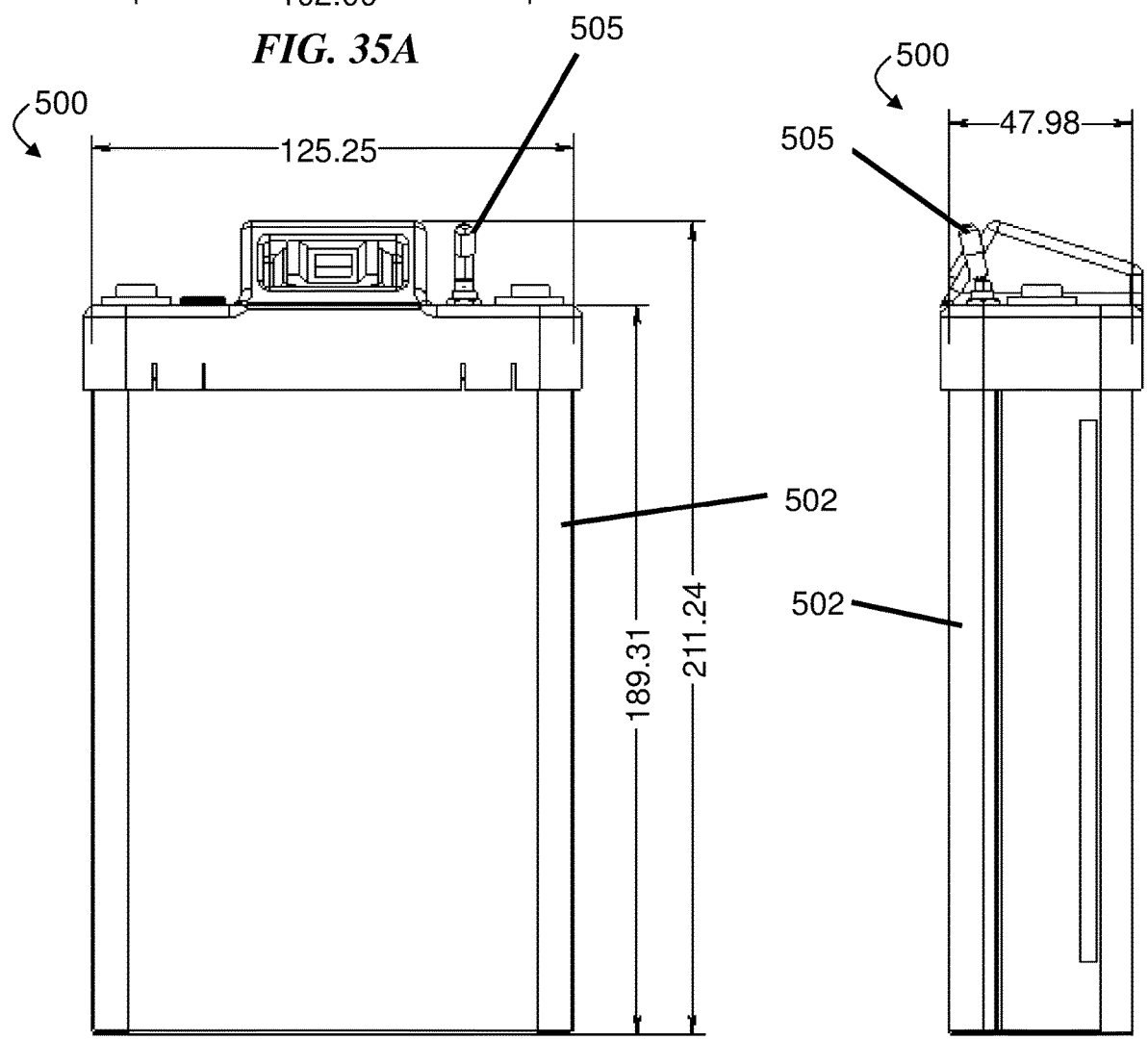
Figure 35C:
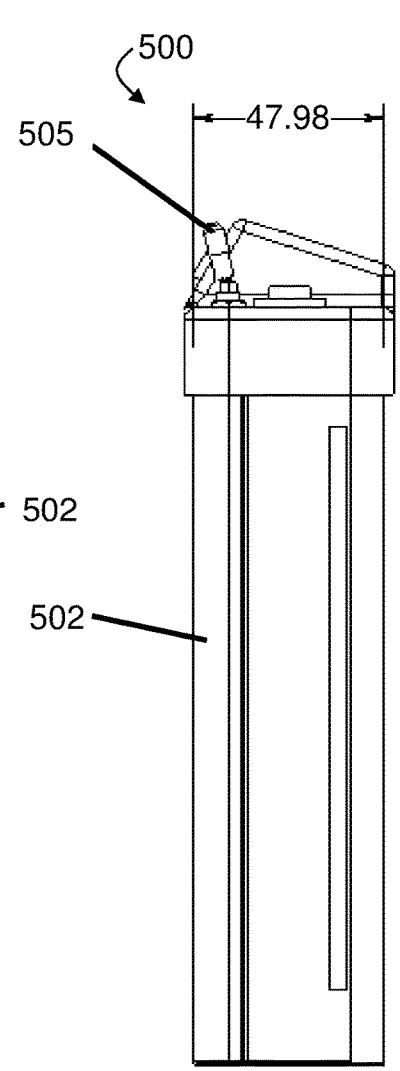
Figure 36A:
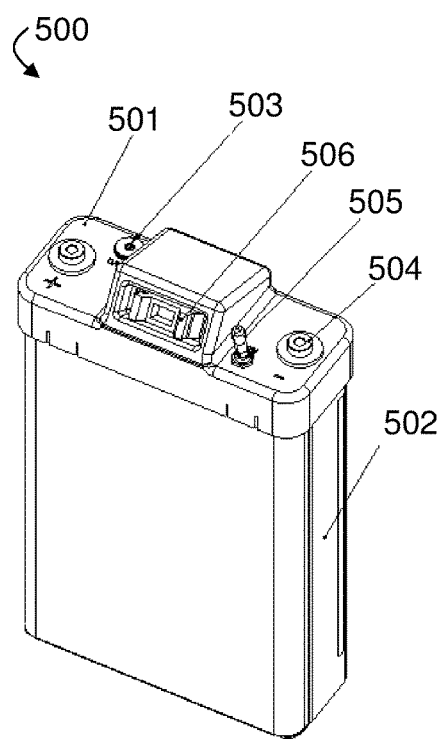
FIGS. 36A-36B show perspective view (FIG. 36A) and perspective interior view (FIG. 36B) schematic illustrations of an exemplary battery, according to some embodiments.
Figure 36B:
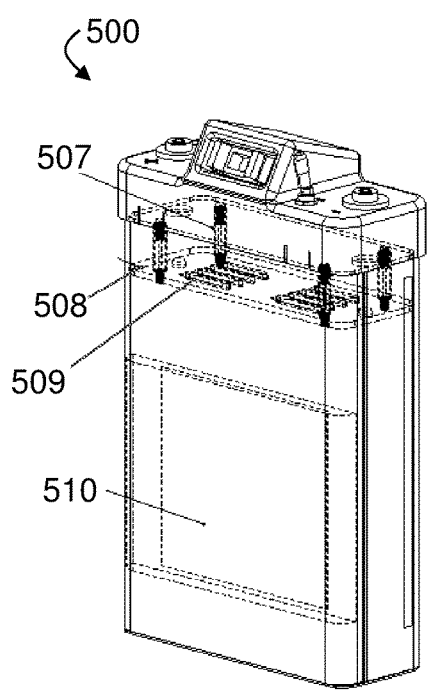

FIGS. 35A-35C show top view (FIG. 35A), front view (FIG. 35B), and side view (FIG. 35C) schematic illustrations of exemplary battery 500, according to some embodiments. Battery 500 shown in FIGS. 35A-35C comprises housing 502 attached to cover 501, with cover 501 interfacing with data jack 503, terminals 504, and on/off toggle switch 505, in accordance with some embodiments. Dimensions indicated in FIGS. 35A-35C are in units of millimeters. FIGS. 36A-36B show perspective view (FIG. 36A) and perspective interior view (FIG. 36B) schematic illustrations of exemplary battery 500, according to some embodiments. As can be seen in FIG. 36A, cover 501 also includes fuse holder 506 for battery 500. Additional, as can be seen in FIG. 36A, housing 502 comprises a first solid housing component and a second solid housing component as described in FIGS. 10A-15 and 26, in the form of clamshell sheets welded together. The clamshell sheets of housing 502 may be made of a metal alloy such as 5052-H32 aluminum, and may be attached via, for example, welding (e.g., laser welding). As described above, the attached clamshell sheets of housing 502 can maintain an anisotropic force with a component normal to electrode active surfaces of electrochemical cells within the battery (e.g., defining a pressure of at least 10 kg/cm² and less than or equal to 25 kg/cm²). As can be seen in FIG. 36B, battery 500 may comprise upper printed circuit board (PCB) 507 and lower PCB 508 with tab connections 509 (e.g., laser welded tab connections) for electrical connectivity to the electrochemical cells. As can also be seen in FIG. 36B, housing 502 may at least partially cover solid plates 510, which can be in the form of carbon fiber endplates each having a mass of 97.21 g in some embodiments.

Figure 37A:
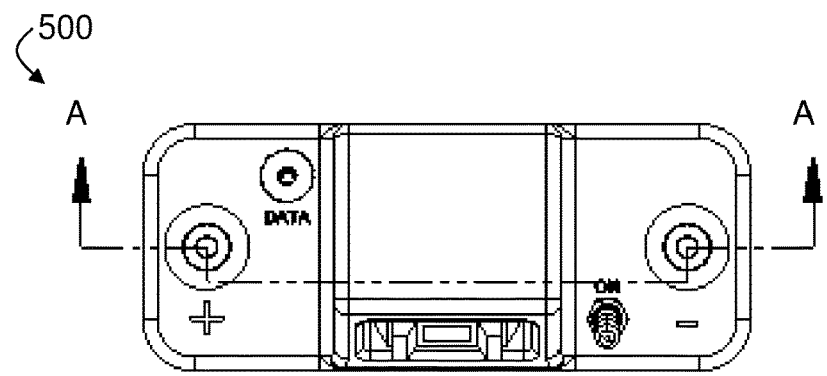
FIG. 37A shows a top view schematic illustration of an exemplary battery, according to some embodiments.
Figure 37B:
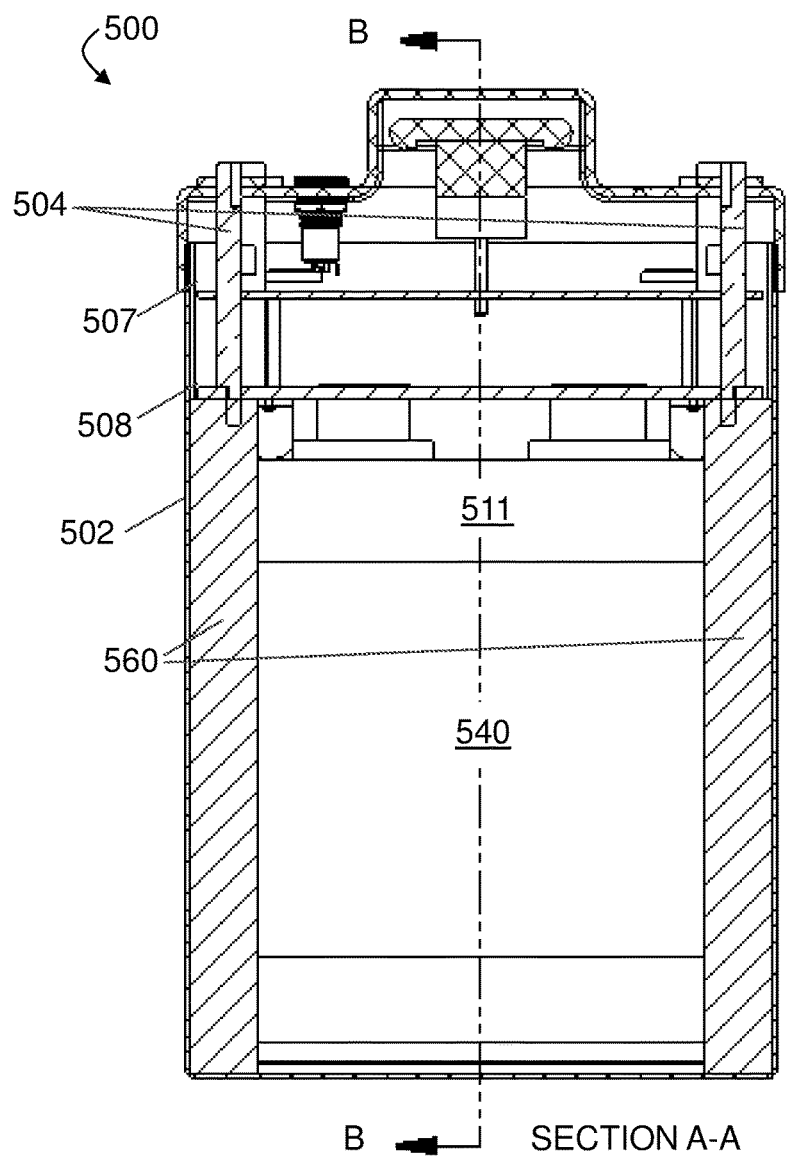
FIG. 37B shows section AA from FIG. 37A, according to some embodiments.

FIG. 37A shows a top view schematic illustration of exemplary battery 500, this time indicating section AA which is shown in FIG. 37B. As can be seen in FIG. 37B, battery 500 comprises, according to some embodiments, a stack comprising electrochemical cells 511 and thermally insulating compressible solid article portions 540 within housing 502. Electrochemical cells 511 may be lithium metal rechargeable electrochemical cells with dimensions of 128 mm length×118 width×2.6 mm thickness, a 6.0 Ah capacity, a nominal voltage of 3.82 V, an upper operating voltage limit of 4.35 V, a lower operating voltage limit of 3.20 V, a mass of 0.056 kg, a volume of 0.039 L, a specific energy of 409 Wh/kg, and a volumetric energy density of 584 Wh/L. As can be seen in FIG. 37B, battery 500 further comprises phase change material portions 560 lateral to electrochemical cells 511. Phase change material portions 560 may be in thermal communication (e.g., via direct contact) with housing 502 and a thermally conductive solid article portion (not shown in FIG. 37B but described below). In some instances, phase change material portions 560 in battery 500 each have dimensions of 143.5 mm×14.3 mm×31.0 mm and a mass of 129 g. Thermally insulating compressible solid article portion 540 may be in the form of a microcellular polyurethane foam sheet having dimensions of 95 mm×84 mm×5.5 mm (uncompressed thickness), a density of 600 kg/m³, a mass of 18.15 g, and having properties consistent with those described above.

FIG. 37C shows section BB from FIG. 37B, according to some embodiments. As can be seen in FIG. 37C and Detail C in FIG. 37D, battery 500 comprises a stack enclosed by housing 502, the stack comprising solid plates 510, thermally insulating compressible solid article portions 540, thermally conductive solid article portions 531, and electrochemical cells 511. The thermally conductive solid article portions 531 may be in the form of aluminum cooling fins each having a mass of 5.45 g.

Figure 38:
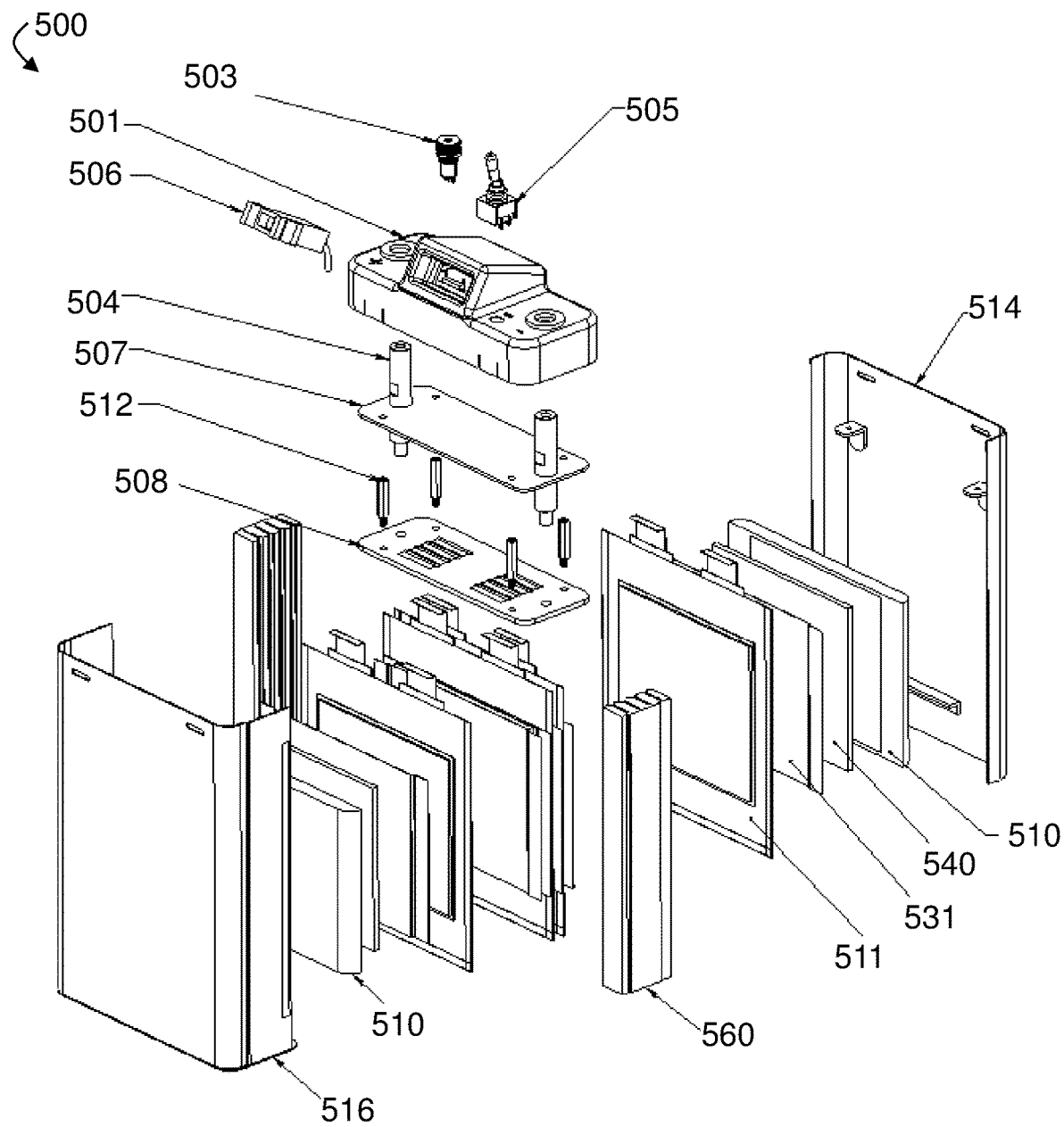
FIG. 38 shows an exploded perspective view schematic illustration of an exemplary battery comprising a stack comprising electrochemical cells, thermally conductive solid article portions, thermally insulating compressible solid article portions, solid plates, a phase change material portion, solid housing components, a PCB, terminals, and a cover, according to some embodiments.

FIG. 38 shows an exploded perspective view schematic illustration of exemplary battery 500 comprising a stack comprising electrochemical cells 511, thermally conductive solid article portions 531, thermally insulating compressible solid article portions 540, and solid plates 510, phase change material portions 560, upper PCB 507, lower PCB 508, PCB standoffs 512, terminals 504, and cover 501, according to some embodiments. As can be seen in FIG. 38, housing 502 shown in FIGS. 35A-37B comprises first solid housing component 514 in the form of a first aluminum alloy "clamshell half" (having a mass of 60.54 g) and second solid housing component 516 in the form of a second aluminum alloy "clamshell half" (having a mass of 91.96 g). First solid housing component 514 and second solid housing component 516 are, in some instances, welded to each other at a region of overlap along a side of the stack once the stack is assembled under anisotropic pressure, with resulting welded housing 502 maintaining pressure during at least some portions of time of charging and/or discharging of battery 500. The embodiment of battery 500 shown in FIG. 20 includes four electrochemical cells 511, five thermally insulating compressible solid article portions 540, eight thermally conductive solid article portions 531, two phase change material portions 560, and two solid plates 510. The total mass of battery 500 may be 1,135.48 g, with battery 500 having a total specific energy density of 80.75 Wh/kg.

Figure 39:
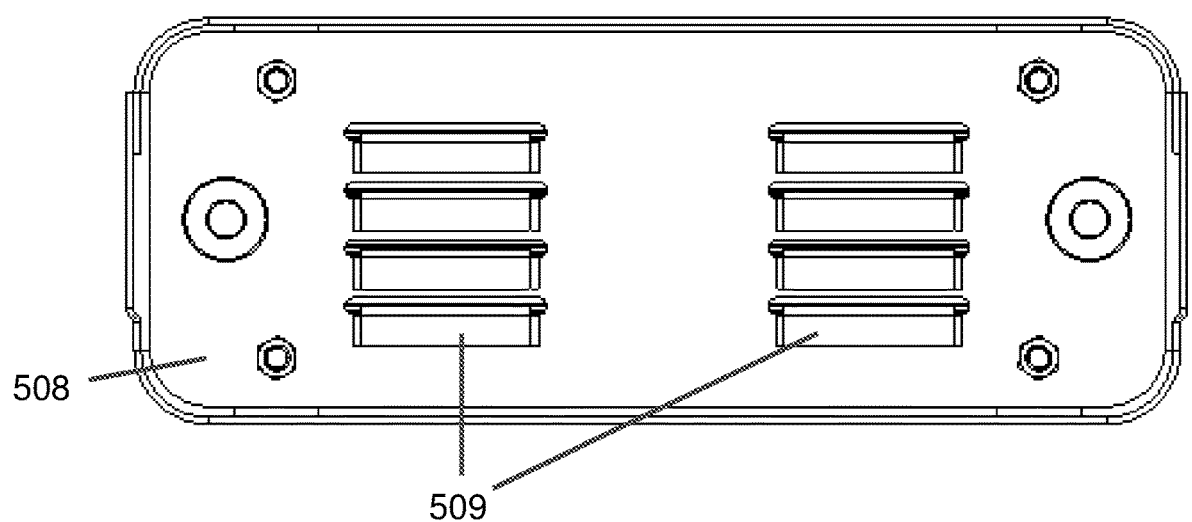
FIG. 39 shows a top view schematic illustration of a portion of a PCB of an exemplary battery with cell tab connections, according to some embodiments.

FIG. 39 shows a top view schematic illustration of lower PCB 508 of exemplary battery 500 with cell tab connections 509, according to some embodiments. According to some embodiments, a multiplexing switch apparatus (such as 712 described herein) may be located at an end of the housing at which tabs of electrochemical cell(s) (such as cell tab connections 509 described herein) are located. For example, the multiplexing switch apparatus may be included in the upper PCB 507 and/or the lower PCT 508, as shown in FIGS. 36B, 37B, and 38.

Figure 40:
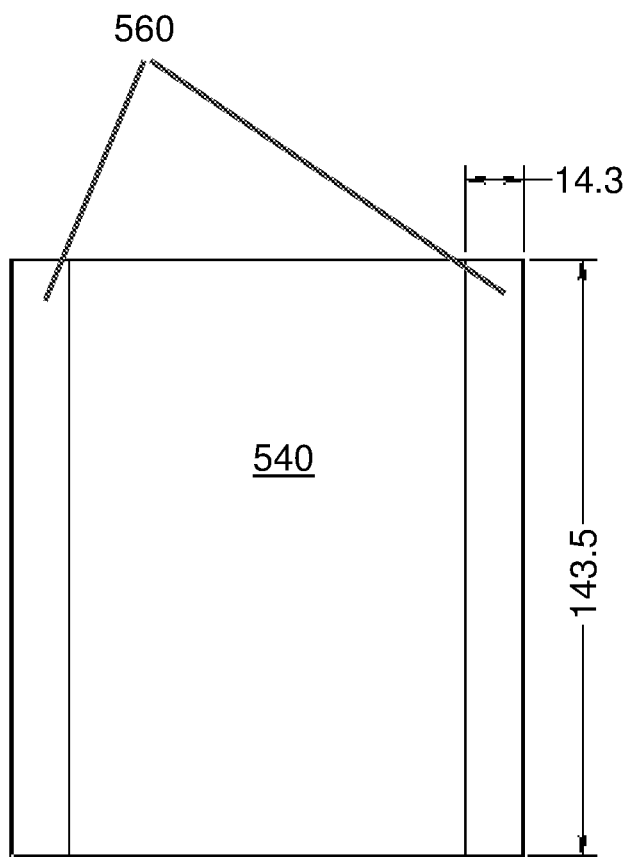
FIG. 40 shows a top view schematic illustration of a stack of an exemplary battery comprising a thermally insulating compressible solid article portion, and two phase change material portions in contact with the stack, according to some embodiments.
Figure 41A:
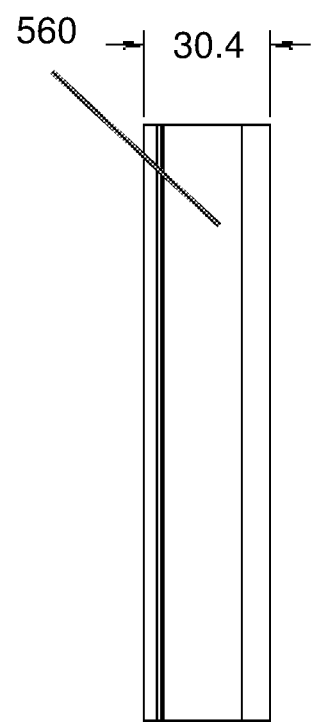
FIG. 41A shows a side view schematic illustration of a phase change material portion of an exemplary battery, according to some embodiments.
Figure 41B:
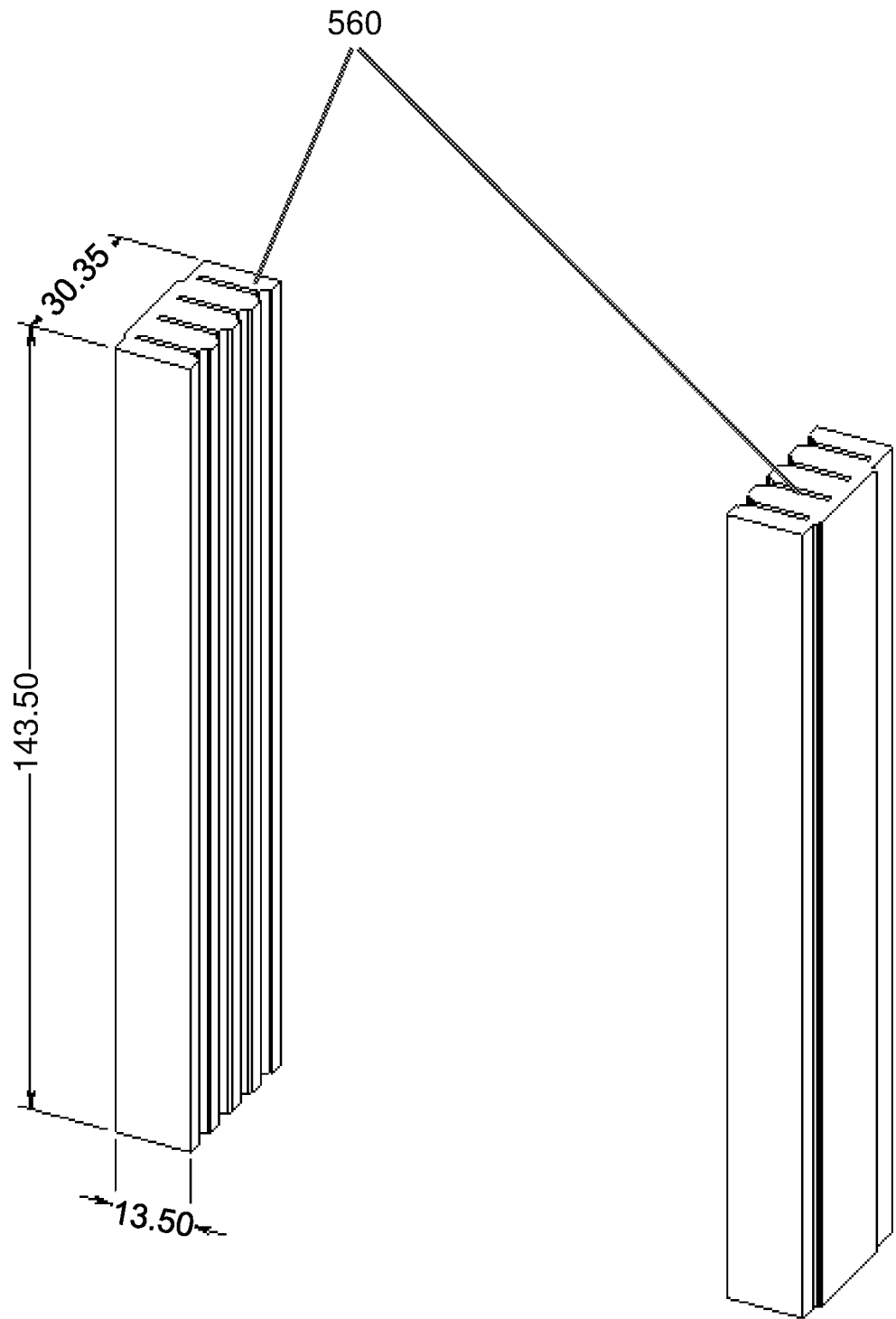
FIG. 41B shows a perspective view schematic illustration of two phase change material portions of an exemplary battery, according to some embodiments.
Figure 42:
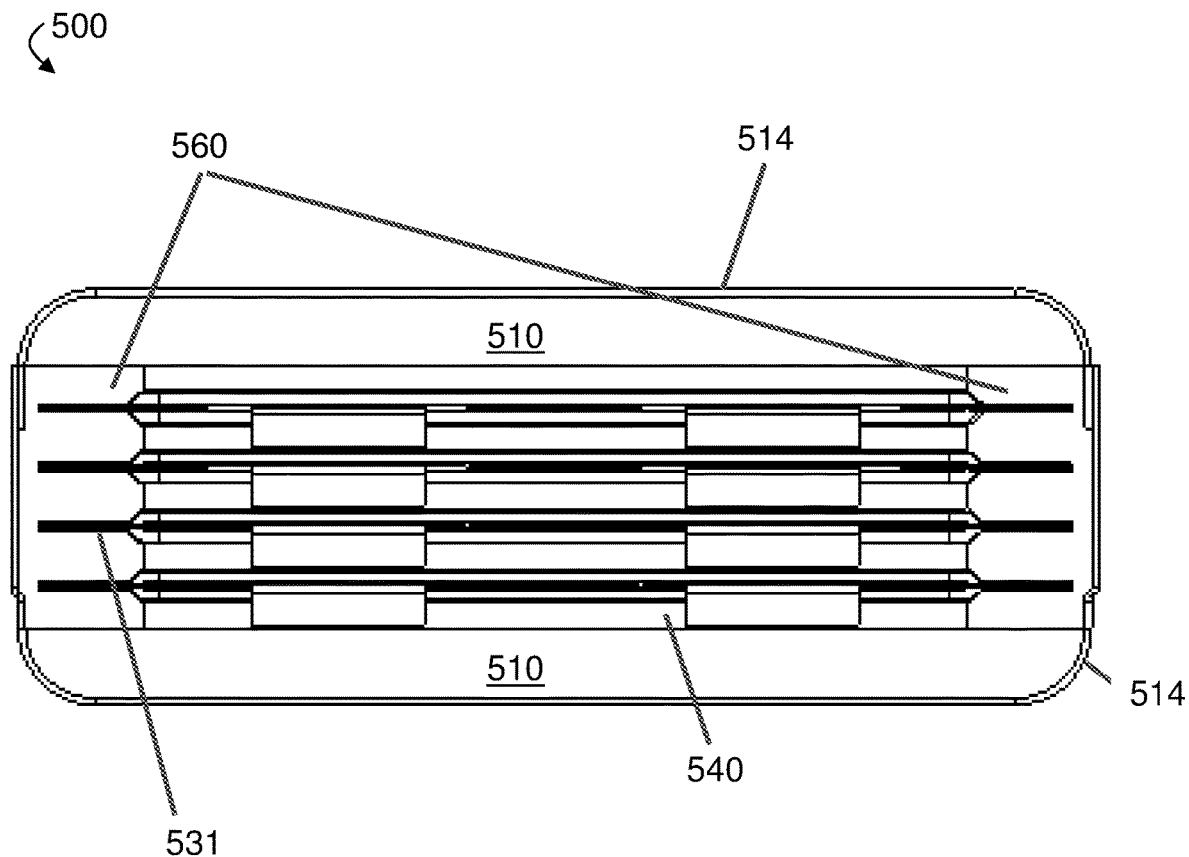
FIG. 42 shows a cross-sectional schematic illustration of an exemplary battery comprising a stack comprising electrochemical cells, thermally conductive solid article portions, thermally insulating compressible solid article portions, and solid plates, phase change material portions, cell tabs, and a housing comprising a first solid housing component and a second solid housing component, according to some embodiments.

FIG. 40 shows a top view schematic illustration of a stack within exemplary battery 500 (comprising a thermally insulating compressible solid article portion), and two phase change material portions 560 in contact with the stack, according to some embodiments. FIG. 41A shows a side view schematic illustration of phase change material portion 560, while FIG. 41B shows perspective view schematic illustrations of two phase change material portions 560 according to some embodiments. As can be seen in FIG. 41B and the cross-sectional schematic illustration in FIG. 42, each phase change material portion 560 can comprise slots (e.g., four slots) for receiving thermally conductive solid article portions 531, according to some embodiments.

Figure 43A:
FIGS. 43A-43C show front view (FIG. 43A), top view (FIG. 43B), and perspective view (FIG. 43C) schematic illustrations of a thermally conductive solid article portion, according to some embodiments.
Figure 43B:
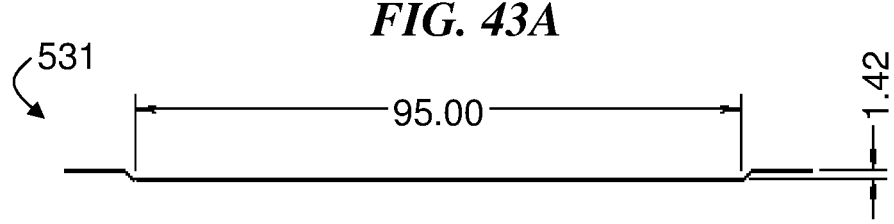
Figure 43C:
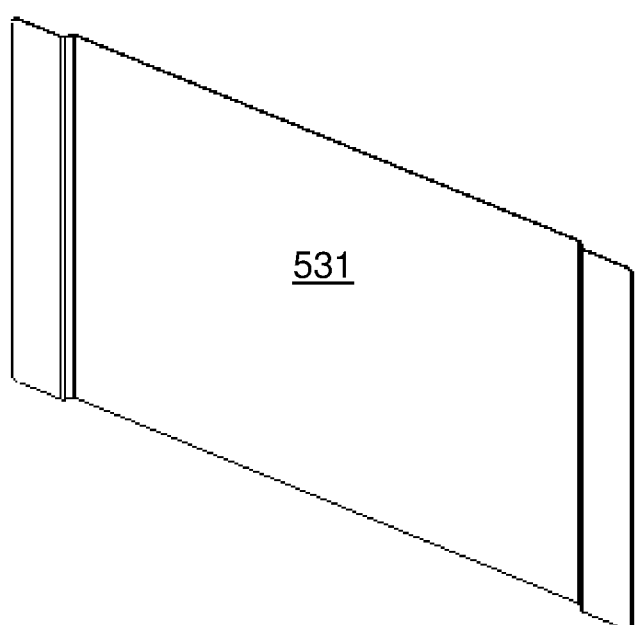

FIGS. 43A-43B shows front view (FIG. 43A), top view (FIG. 43B), and perspective view (FIG. 43C) schematic illustrations of thermally conductive solid article portion 531, which is in the form of an aluminum metal cooling fin, according to some embodiments. The dimensions shown in FIGS. 43A-43B are shown in millimeters.

Figure 44A:
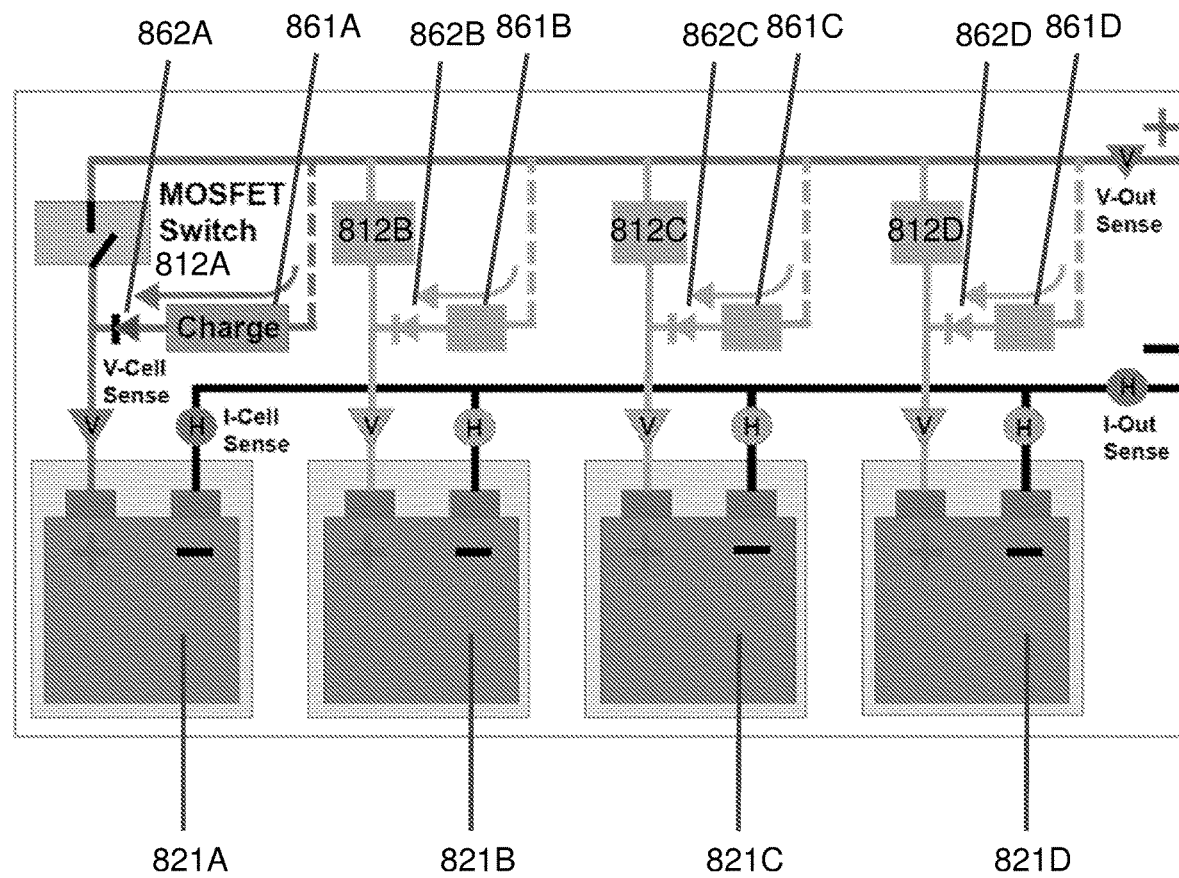
FIG. 44A shows an exemplary battery management system in charge mode, according to some embodiments.

FIG. 44A shows an exemplary battery management system in charge mode. According to some embodiments, four cells may be included in the system, such as 821A, 821B, 821C, and 821D (which in some instances correspond to electrochemical cells 511 described above). According to some embodiments, the system may include MOSFET switches 812A, 812B, 812C, and 812D. According to some embodiments, the system may include charge regulation circuits 861A, 861B, 861C, and 861D. According to some embodiments, the system may include blocking diodes 862A, 862B, 862C, and 862D. In some embodiments, H and V can indicate a location point to measure current and voltage, respectively, such as by a sensor (e.g., 716). For example, hall effect sensor(s) may be used to measure current. According to some embodiments, sensor(s) (such as sensor 716 described herein) can measure individual cell voltages. Additionally, the sensor(s) may measure current as described. Additionally, the sensor(s) may measure one temperature measurement on a given internal cell.

According to some embodiments, when the MOSFET switch for a given cell (e.g., switch 812A for cell 821A) is open and concurrently the positive rail voltage is greater than a charge-threshold (e.g., the charge-threshold may be from 6.0 VDC to 8.5 VDC), charge current can flow from the rail into the cell along the dotted line path shown. In some embodiments, a charge regulation circuit 861A is included in the charge path and a blocking diode 862A may be provided to stop the cell from discharging back into the regulator circuit when not being charged. At this time, the "charge threshold" voltage may be greater than, for example, 8.5 VDC.

According to some embodiments, the charge-threshold voltage on the B+ rail may be used to block each cell's MOSFET switch (e.g., switch 812A for cell 821A, switch 812B for cell 821B, switch 812C for cell 821C, switch 812D for cell 821D, and so on) in the open state. In some embodiments, this safety measure can completely inhibit the controller (e.g., microprocessor) from turning on the MOSFET switch in an error or malfunction state.

According to some embodiments, the cell(s) together have a current limit of 12 amperes in charge or discharge mode. For example, the charge limit may be 3 amperes per cell (which may be a rate of 1 C) but through the block may be 12 amperes (which may be a rate of 1 C) due to a configuration of 4 cells in parallel. Additionally, the discharge pulse current limit may be 12 amperes.

According to some embodiments, if continuous discharging occurs at a rate greater than 4 times the charge rate, then there may be no multiplexing, and current may reach 24 amperes.

According to some embodiments, switching time is programmable. For example, a range of switching times may be 0-30 seconds. According to some embodiments, switching time may vary based on the load.

According to some embodiments, after a single cell pulse discharge, the highest voltage cell is the next to be discharged. According to some embodiments, there is brief direct connections from each depleting cell to the next fresh cell. According to some embodiments, there is an unavoidable momentary discharge relative to cell imbalances: the larger the imbalance, the larger the momentary discharge. Additionally, the momentary discharge may be controlled and may be on the order of a few milliseconds. For example, each momentary inter-cell connection may be less than 10 milliseconds, at which time a discharge from the fresh to depleting cell may occur.

According to some embodiments, the system can use manual on/off switching to prevent unwanted power drain when not operating. In some embodiments, serial port communication is used to broadcast current, cell voltages, temperature, switching action, and so on. In some embodiments, such data may also be logged internally on an SD card. In some embodiments, data may be sampled at least once every second.

According to some embodiments, the system can be on a printed circuit board mounted above a connection printed circuit board containing the switches. For example, upper PCB 507 and lower PCB 508 of battery 500 described above can be configured in such a way.

Figure 44B:
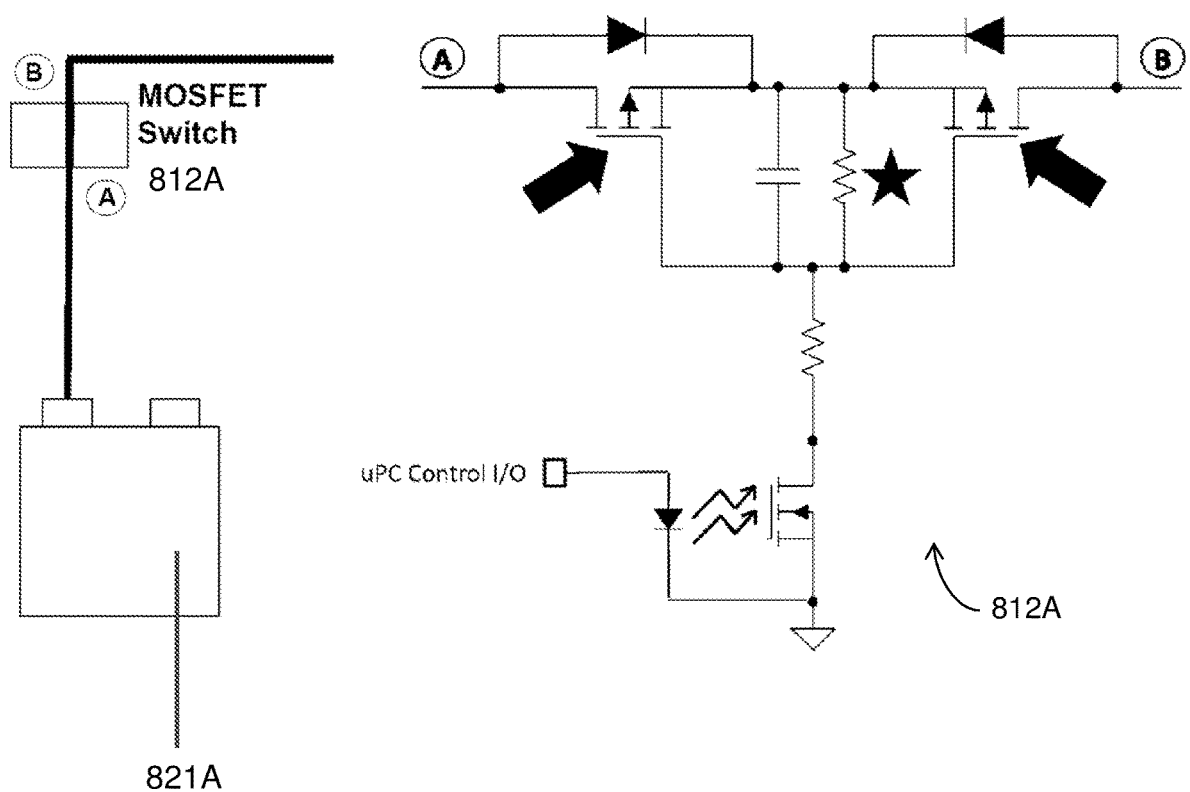
FIG. 44B shows a schematic diagram of an exemplary cell's MOSFET switch, according to some embodiments.

FIG. 44B shows a schematic diagram of an exemplary cell's MOSFET switch 812A. According to some embodiments, the MOSFET switch comprises three active components: two P-channel MOSFET and one opto-isolated MOSFET in the circuit. In some embodiments, there is one complete switch per cell.

According to some embodiments, positive voltage present at either A or B side of the switch can flow through either MOSFET's body diode and through the resistor marked with a star. In some embodiments, the gates of both MOSFETs can be tied together and connected to this resistor. Additionally, the voltage present at the resistor may bias the gate of each MOSFET high, which may turn both P-channel MOSFETs OFF.

According to some embodiments, if the lower (unlabeled) opto-isolated MOSFET switch is triggered ON by logic HIGH from the controller, it pulls the voltage at the upper MOSFET gates down to what is "return voltage" level. For example, this return value may be between −9 VDC and −19 VDC (shown on FIG. 44C). The inventors have recognized and appreciated that even −9 VDC may be sufficient to saturate charge the MOSFET gates.

Figure 44C:
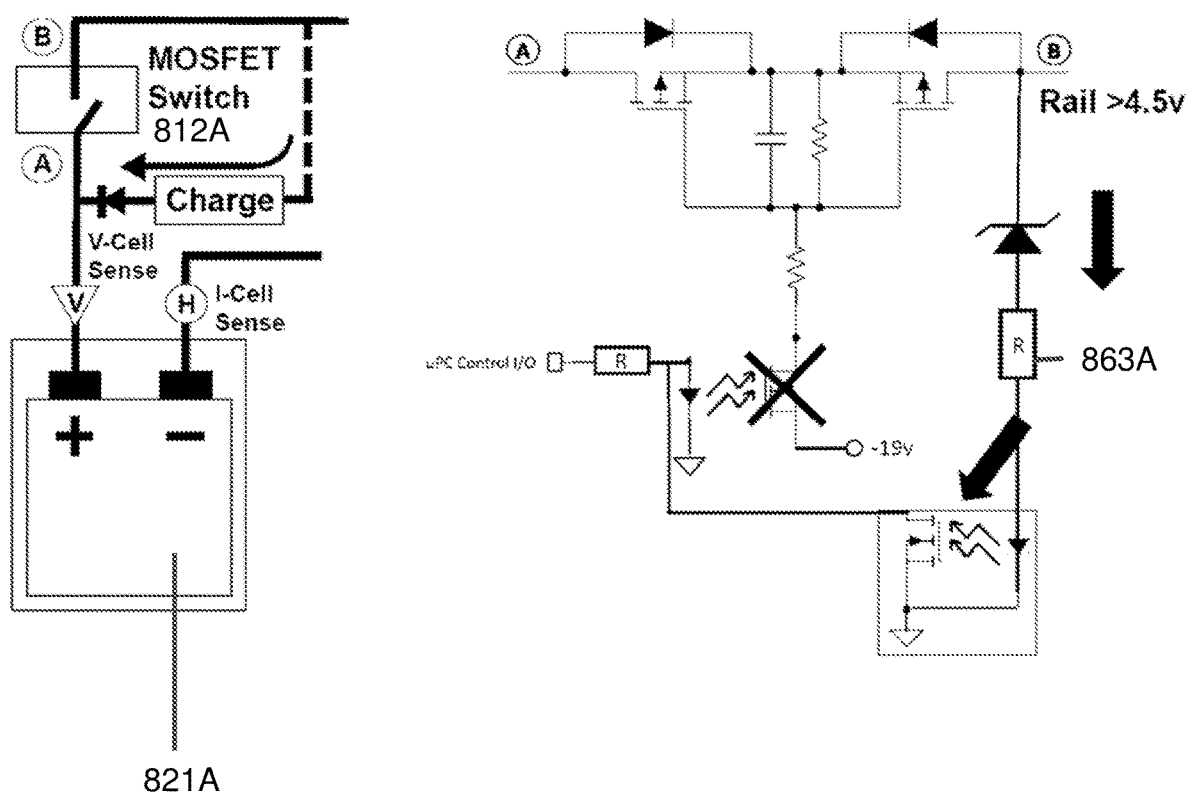
FIG. 44C shows a schematic diagram of an exemplary MOSFET switch, according to some embodiments.

FIG. 44C shows a schematic diagram of an exemplary MOSFET switch 812A where the return value is −19 VDC. According to some embodiments, the included failsafe protection circuit can further inhibit accidental/malfunction triggering of the MOSFET cell switch when the rail voltage is at or above charge-threshold. In some embodiments, this analog circuit acts only as a safety guarantee and may be subordinate to normal controller control. For example, the controller may use current flow direction and positive rail voltage measurements as inputs to switch OFF all cells, paramount to charge mode action.

Additionally, the charging regulator circuits may not be able to operate below the charge-threshold, which may provide a hysteresis deadband between cell "top of charge" voltage and charge-threshold where essentially no cell current can flow in either direction.

Accordingly to some embodiments, when the rail is above threshold voltage, current can flow through the Zener diode and current limiting resistor 863A, triggering the associated opto-isolated switch ON. In some embodiments, if a logic HIGH voltage were present at the controller control point, it could not trigger the opto-isolated switch (depicted behind the X) because the logic voltage may shunt to ground through the aforementioned opto-isolator—thus, the main MOSFET switch may not be able to turn on in such a situation.

Figure 44D:
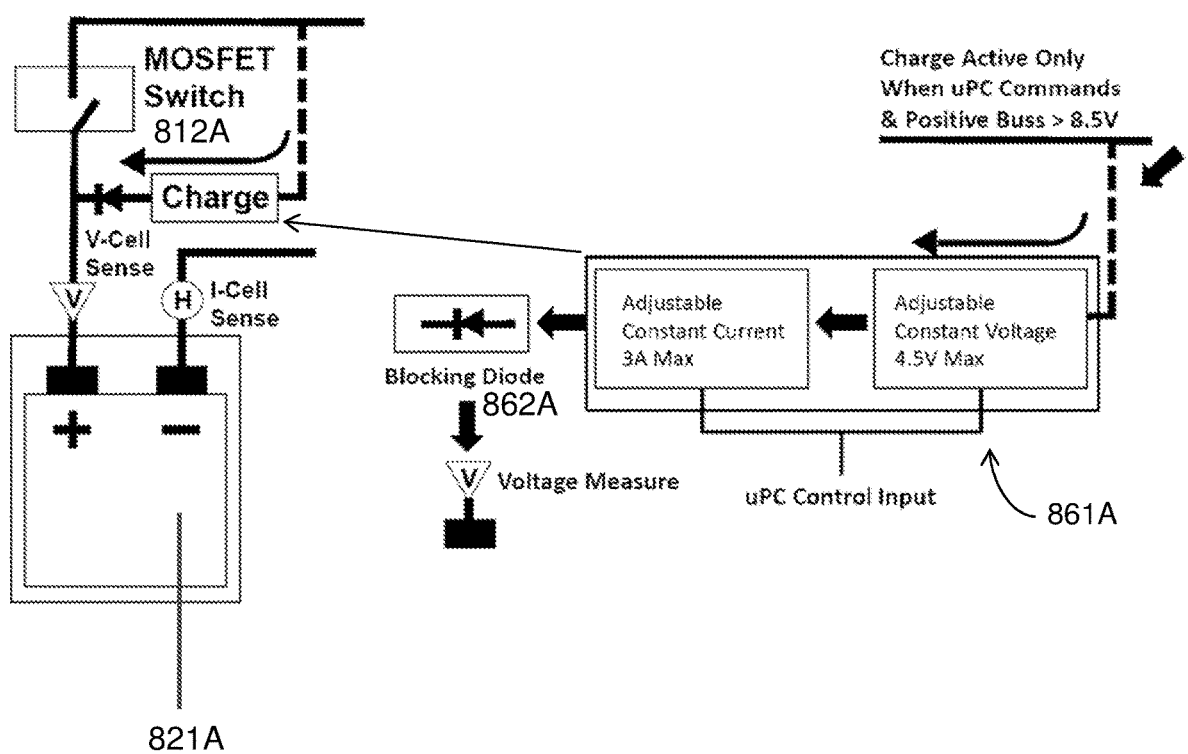
FIG. 44D shows a schematic diagram of an exemplary charge regulation circuit, according to some embodiments.

FIG. 44D shows a schematic diagram of an exemplary charge regulation circuit 861A. According to some embodiments, MOSFET switch (e.g., 812A) can be switched off by the controller (e.g., 714), the circuit's GO threshold (and buss) may be greater than 8.5 volts, the controller may then enable the charging circuit, each cell may be independently monitored, and at "top of charge" the charge current may fade and voltage may be capped at the "top of charge" value. The circuit's GO threshold may be the minimum voltage level applied externally to the rail of the circuit that initiates cell charging. In some embodiments, the circuit's GO threshold ranges from 6.0 VDC to 8.5 VDC.

It should be understood that the exemplary battery management system, switches, and circuits described in FIGS. 44A-44D can be implemented in any of the batteries described in this disclosure, including exemplary battery 500 described in FIGS. 17A-24.

Figure 45A:
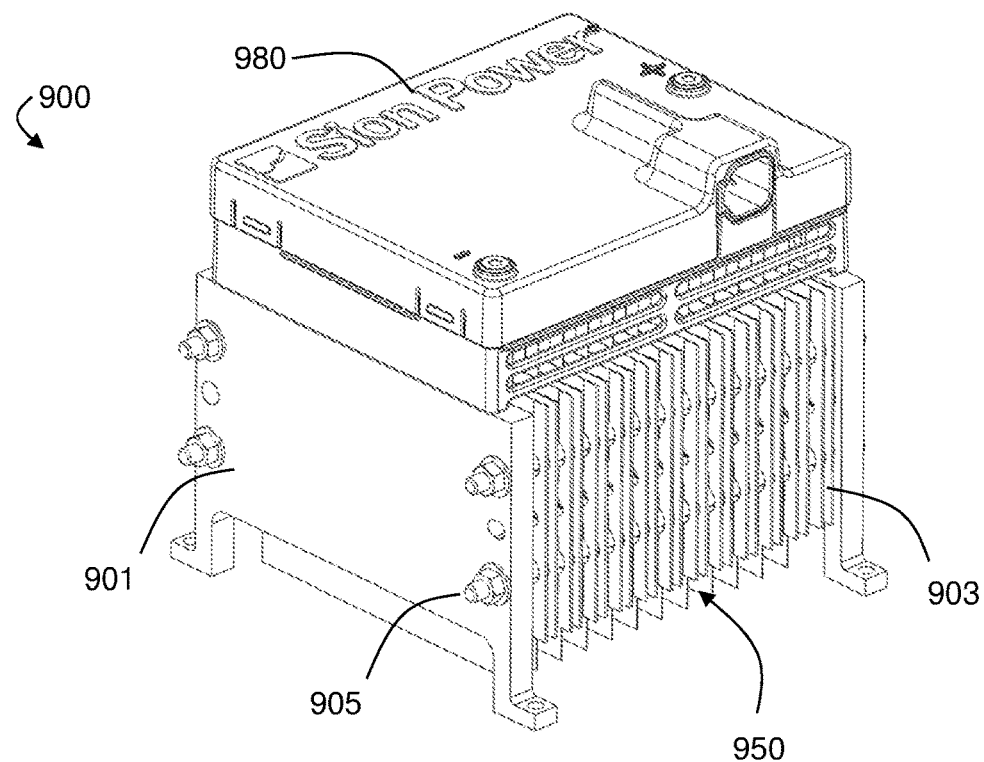
FIGS. 45A-45B show perspective schematic illustrations of an exemplary battery comprising electrochemical cells, according to some embodiments.
Figure 45B:
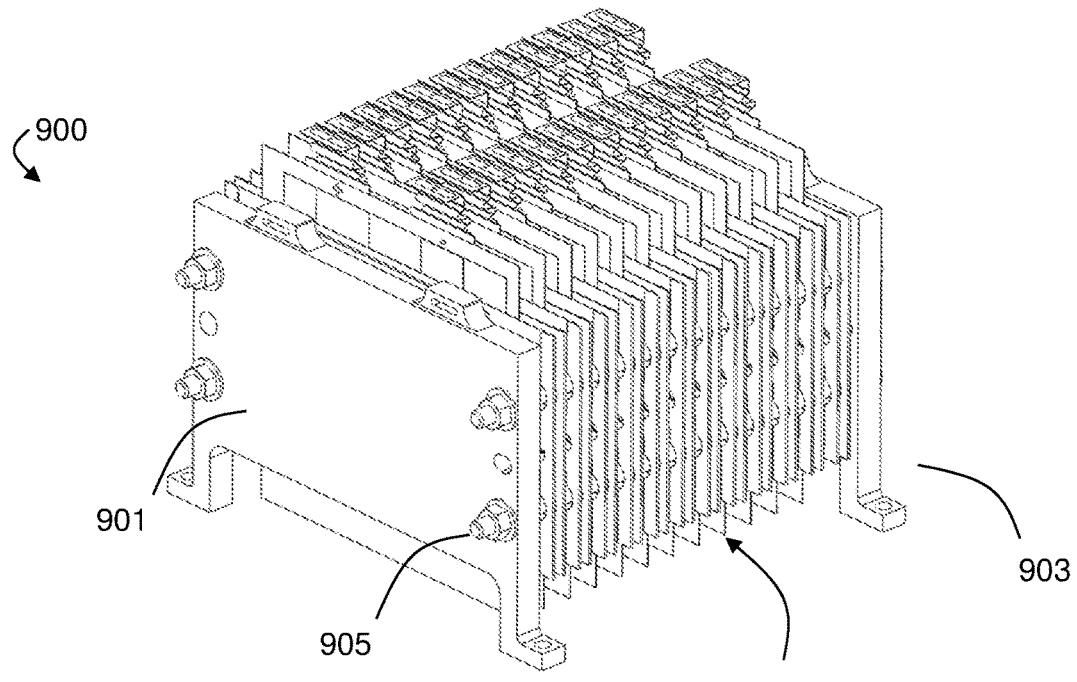
Figure 46:
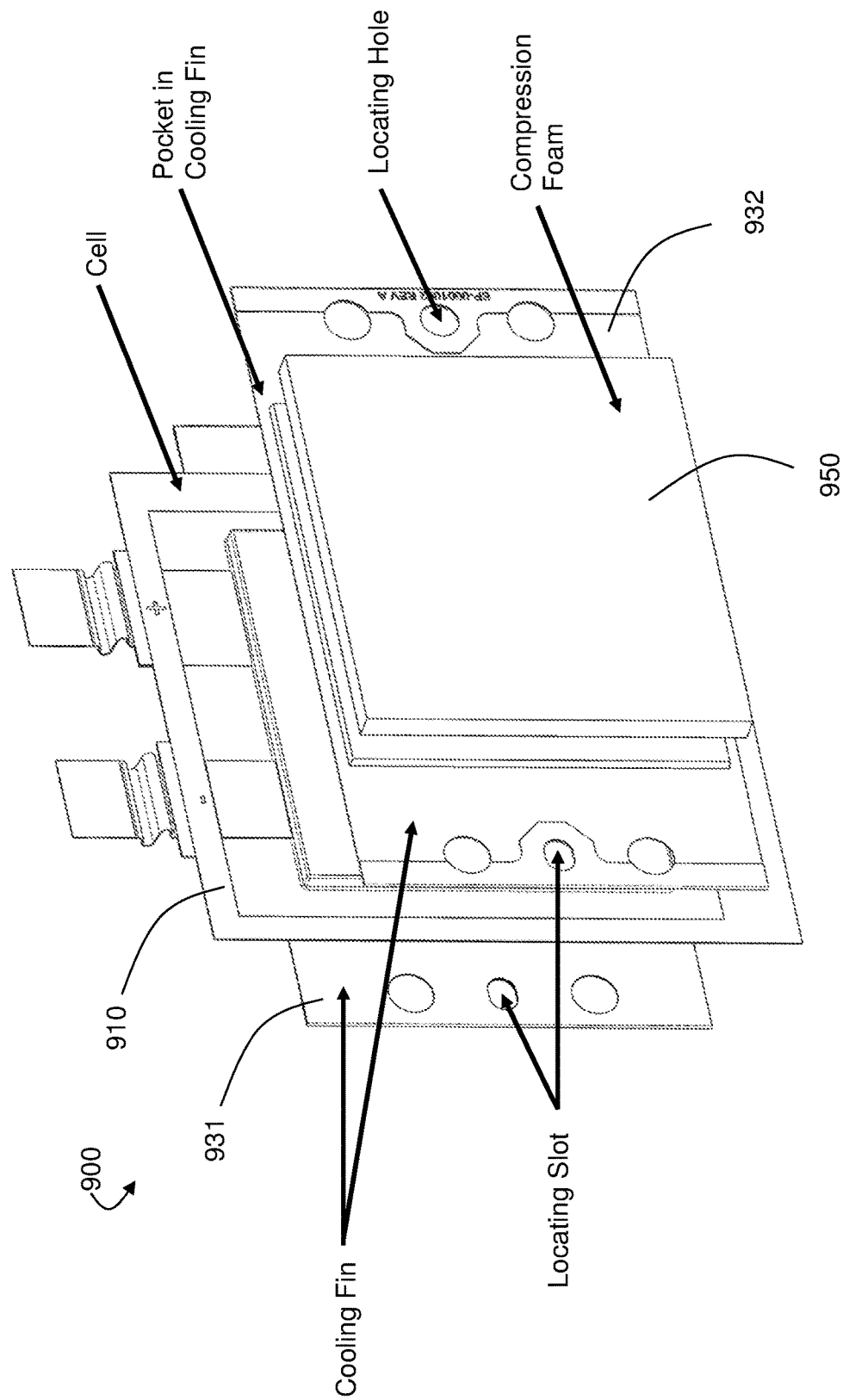
FIG. 46 shows a perspective schematic illustration of an exemplary battery comprising electrochemical cells, thermally conductive solid article portions comprising alignment features, and a thermally insulating compressible solid article portion, according to some embodiments.

FIGS. 45A-45B show perspective view schematic illustrations of battery 900, according to certain embodiments. Battery 900 shown in FIGS. 45A-45B comprises a plurality of electrochemical cells arranged in stack 950. FIG. 46 shows an exploded perspective view schematic illustration of a repeating unit of components in battery 900 according to certain embodiments, comprising electrochemical cell 910 between first thermally conductive solid article portion 931 and second thermally conductive solid article portion 932 (shown as aluminum cooling fins with locating holes and locating slots for alignment) and thermally insulating compressible solid article portion 940 shown as a compression foam comprising microcellular elastomeric foam. Battery 900 in FIGS. 45A-45B also comprises carbon fiber endplates 901 and 903 connected by compression rods 905. Exemplary battery 900 can also include a power bus and battery management system 980, as shown on the top of battery 900 in FIG. 45A. The electrochemical cells may comprise lithium metal anodes (e.g., vapor-deposited lithium metal) and lithium metal oxide intercalation cathodes (e.g., nickel-cobalt manganese intercalation cathodes).

Figure 47A:
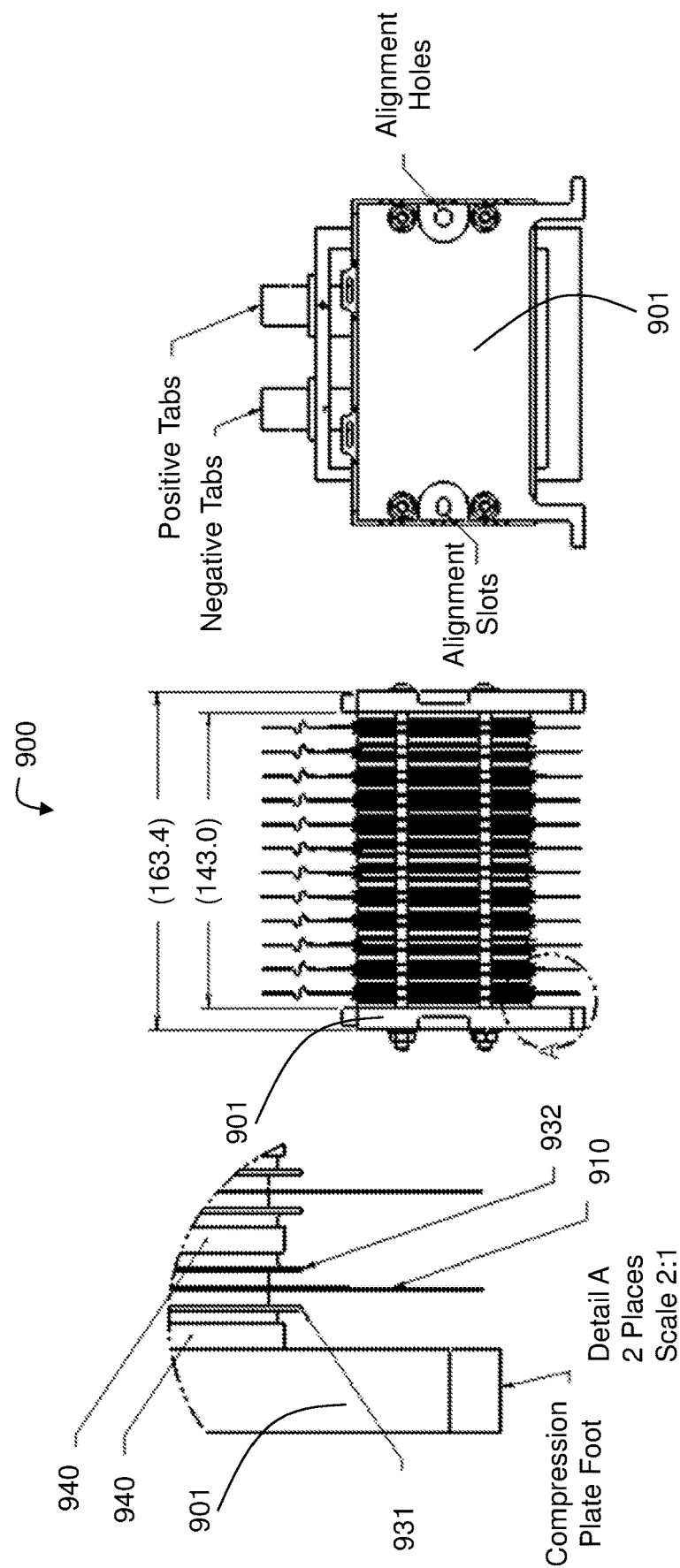
FIGS. 47A-47E show schematic diagrams of components of an exemplary battery, according to some embodiments.
Figure 47B:
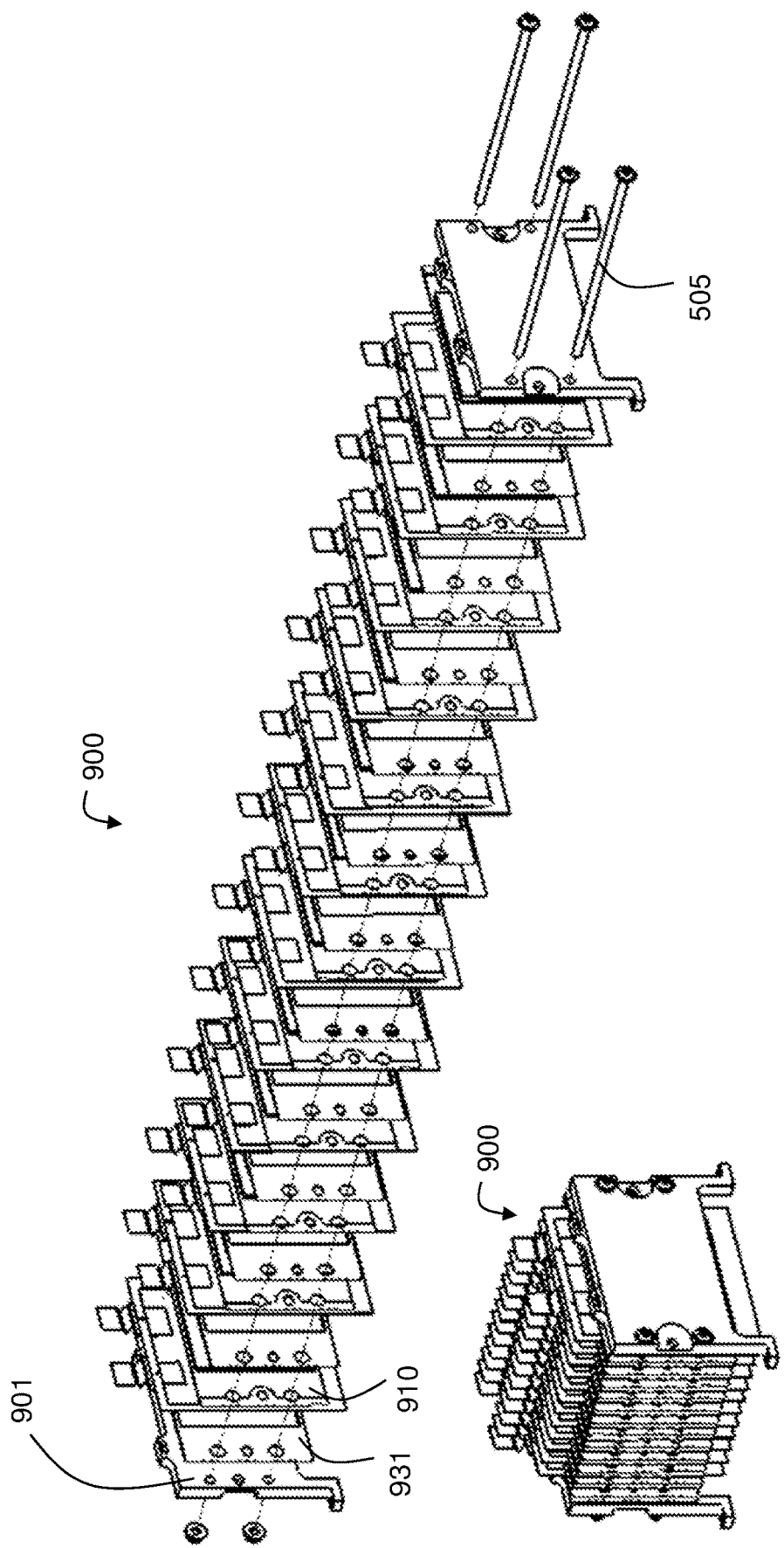
Figure 47C:
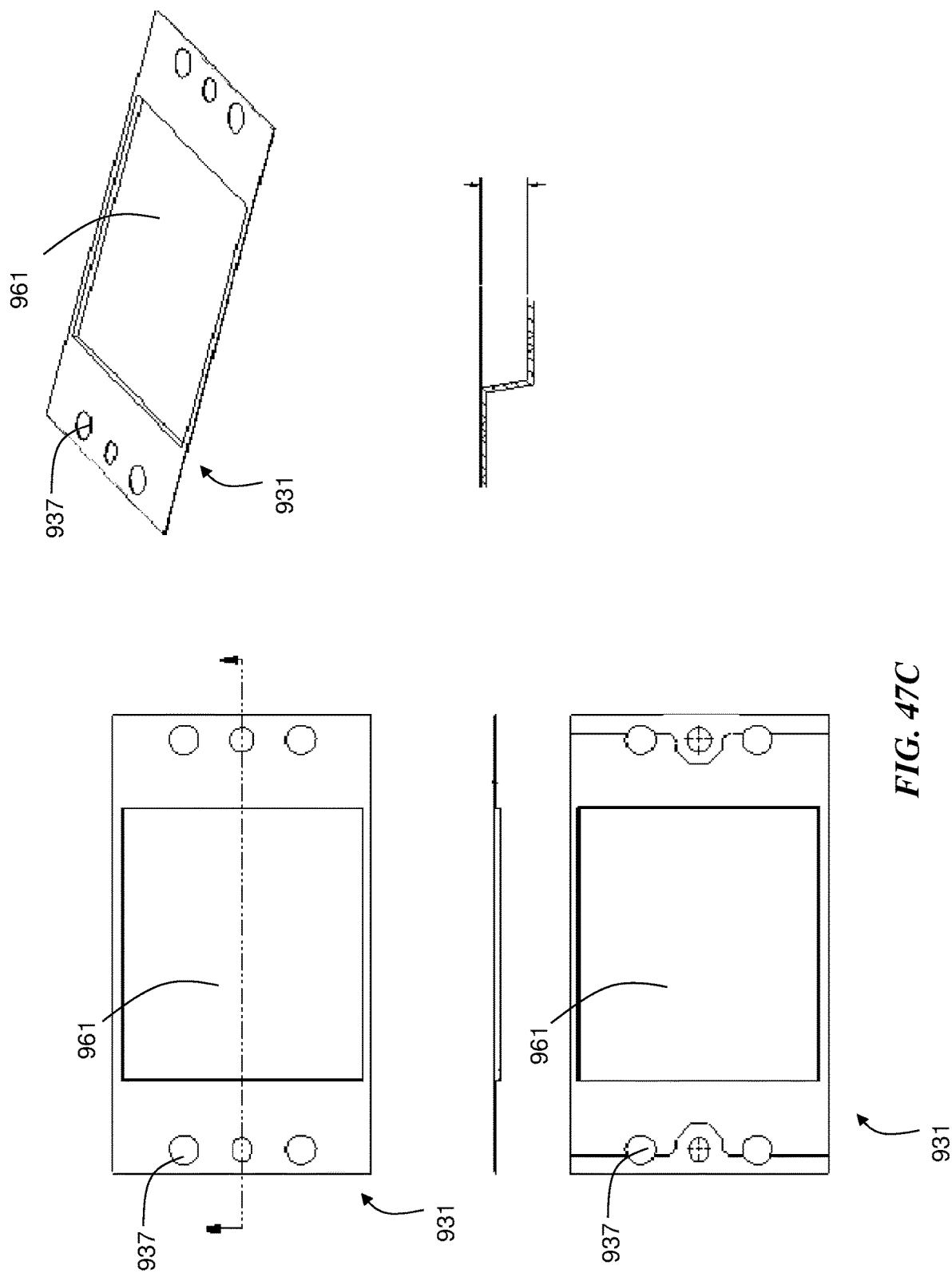
Figure 47D:
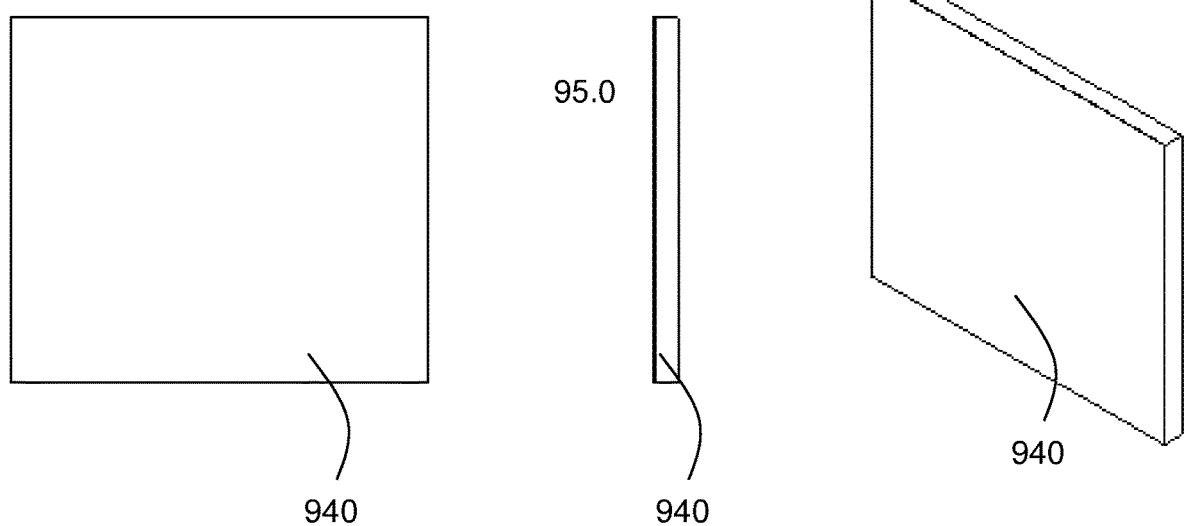
Figure 47E:
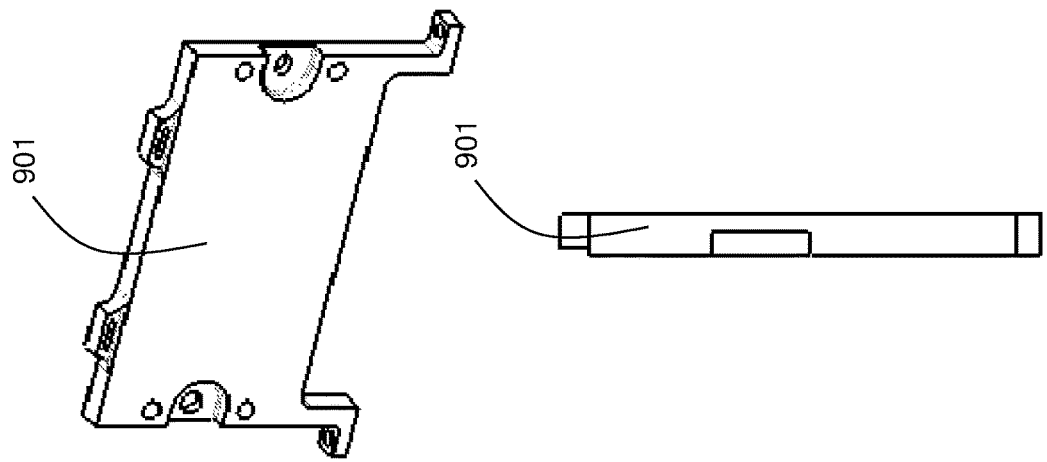
Figure 47E:
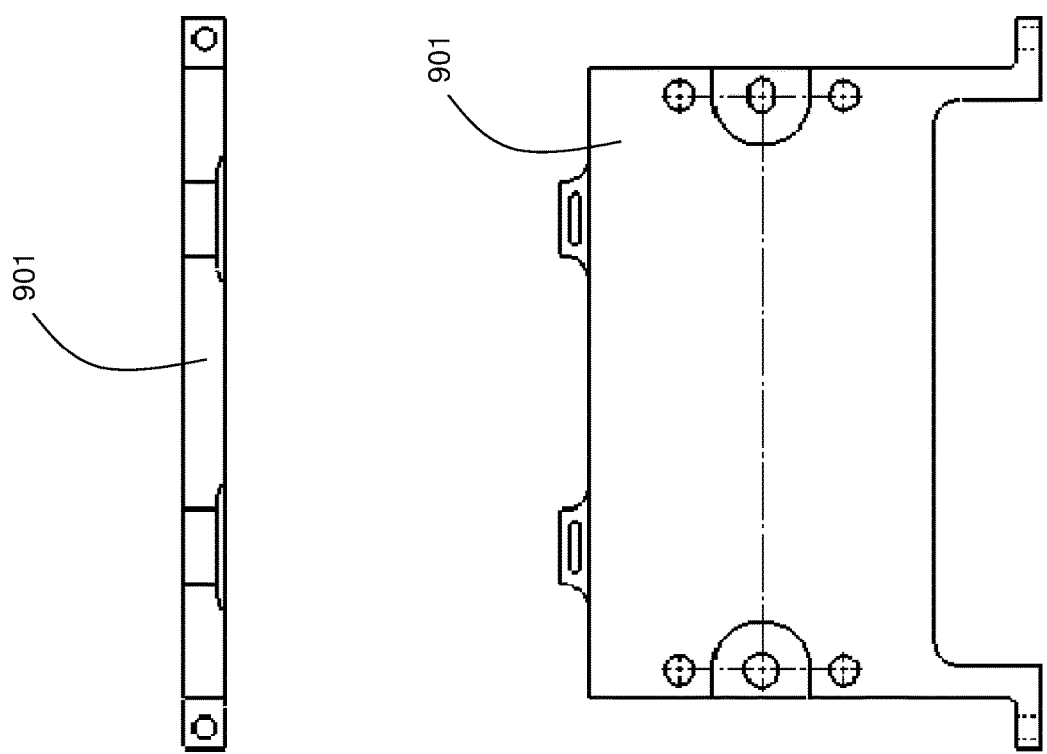

FIGS. 47A-47E show schematic diagrams of components of exemplary battery 900. FIG. 47A shows side view (center of FIG. 47A) and end view (right side of FIG. 47A) schematic illustrations of battery 900, including an inset (left side of FIG. 47A). FIG. 47A depicts arrangements of endplate 901, electrochemical cell 910 between first thermally conductive solid article portion 931 and second thermally conductive solid article portion 932 (shown as aluminum cooling fins with locating holes and locating slots for alignment) and thermally insulating compressible solid article portion 940 shown as a compression foam comprising microcellular elastomeric foam. FIG. 47B shows an exploded schematic illustration (top) and a perspective view schematic illustration (bottom) of battery 900, according to certain embodiments, including a solid plate in the form of endplate 901, a coupling comprising compression rods 905, electrochemical cell 910, and thermally conductive solid article portion 931. FIG. 47C shows schematic illustrations of exemplary thermally conductive solid article portion 931 in the form of a metal cooling fin comprising alignment feature 937 in the form of hole and non-planarity 961 in the form of a recessed pocket to couple to the electrochemical cells (e.g., electrochemical cell 910). FIG. 47D shows schematic illustrations of exemplary thermally insulating compressible solid article portion 940 in the form of a microcellular elastomeric foam. FIG. 47E shows schematic illustrations of exemplary endplate 901 to be used in the housing of exemplary battery 900, endplate 901 being in the form of a laminate carbon fiber endplate, according to certain embodiments. The following applications are incorporated herein by reference, in their entirety, for all purposes: U.S. Publication No. US-2007-0221265-A1 published on Sep. 27, 2007, filed as U.S. application Ser. No. 11/400,781 on Apr. 6, 2006, and entitled "RECHARGEABLE LITHIUM/WATER, LITHIUM/AIR BATTERIES"; U.S. Publication No. US-2009-0035646-A1, published on Feb. 5, 2009, filed as U.S. application Ser. No. 11/888,339 on Jul. 31, 2007, and entitled "SWELLING INHIBITION IN BATTERIES"; U.S. Publication No. US-2010-0129699-A1 published on May 17, 2010, filed as U.S. application Ser. No. 12/312,764 on Feb. 2, 2010; patented as U.S. Pat. No. 8,617,748 on Dec. 31, 2013, and entitled "SEPARATION OF ELECTROLYTES"; U.S. Publication No. US-2010-0291442-A1 published on Nov. 18, 2010, filed as U.S. application Ser. No. 12/682,011 on Jul. 30, 2010, patented as U.S. Pat. No. 8,871,387 on Oct. 28, 2014, and entitled "PRIMER FOR BATTERY ELECTRODE"; U.S. Publication No. US-2009-0200986-A1 published on Aug. 13, 2009, filed as U.S. application Ser. No. 12/069,335 on Feb. 8, 2008, patented as U.S. Pat. No. 8,264,205 on Sep. 11, 2012, and entitled "CIRCUIT FOR CHARGE AND/OR DISCHARGE PROTECTION IN AN ENERGY-STORAGE DEVICE"; U.S. Publication No. US-2007-0224502-A1 published on Sep. 27, 2007, filed as U.S. application Ser. No. 11/400,025 on Apr. 6, 2006, patented as U.S. Pat. No. 7,771,870 on Aug. 10, 2010, and entitled "ELECTRODE PROTECTION IN BOTH AQUEOUS AND NON-AQUEOUS ELECTROCHEMICAL CELLS, INCLUDING RECHARGEABLE LITHIUM BATTERIES"; U.S. Publication No. US-2008-0318128-A1 published on Dec. 25, 2008, filed as U.S. application Ser. No. 11/821,576 on Jun. 22, 2007, and entitled "LITHIUM ALLOY/SULFUR BATTERIES"; U.S. Publication No. US-2002-0055040-A1 published on May 9, 2002, filed as U.S. application Ser. No. 09/795,915 on Feb. 27, 2001, patented as U.S. Pat. No. 7,939,198 on May 10, 2011, and entitled "NOVEL COMPOSITE CATHODES, ELECTROCHEMICAL CELLS COMPRISING NOVEL COMPOSITE CATHODES, AND PROCESSES FOR FABRICATING SAME"; U.S. Publication No. US-2006-0238203-A1 published on Oct. 26, 2006, filed as U.S. application Ser. No. 11/111,262 on Apr. 20, 2005, patented as U.S. Pat. No. 7,688,075 on Mar. 30, 2010, and entitled "LITHIUM SULFUR RECHARGEABLE BATTERY FUEL GAUGE SYSTEMS AND METHODS"; U.S. Publication No. US-2008-0187663-A1 published on Aug. 7, 2008, filed as U.S. application Ser. No. 11/728,197 on Mar. 23, 2007, patented as U.S. Pat. No. 8,084,102 on Dec. 27, 2011, and entitled "METHODS FOR CO-FLASH EVAPORATION OF POLYMERIZABLE MONOMERS AND NON-POLYMERIZABLE CARRIER SOLVENT/SALT MIXTURES/SOLUTIONS"; U.S. Publication No. US-2011-0006738-A1 published on Jan. 13, 2011, filed as U.S. application Ser. No. 12/679,371 on Sep. 23, 2010, and entitled "ELECTROLYTE ADDITIVES FOR LITHIUM BATTERIES AND RELATED METHODS"; U.S. Publication No. US-2011-0008531-A1 published on Jan. 13, 2011, filed as U.S. application Ser. No. 12/811,576 on Sep. 23, 2010, patented as U.S. Pat. No. 9,034,421 on May 19, 2015, and entitled "METHODS OF FORMING ELECTRODES COMPRISING SULFUR AND POROUS MATERIAL COMPRISING CARBON"; U.S. Publication No. US-2010-0035128-A1 published on Feb. 11, 2010, filed as U.S. application Ser. No. 12/535,328 on Aug. 4, 2009, patented as U.S. Pat. No. 9,105,938 on Aug. 11, 2015, and entitled "APPLICATION OF FORCE IN ELECTROCHEMICAL CELLS"; U.S. Publication No. US-2011-0165471-A9 published on Jul. 15, 2011, filed as U.S. application Ser. No. 12/180,379 on Jul. 25, 2008, and entitled "PROTECTION OF ANODES FOR ELECTROCHEMICAL CELLS"; U.S. Publication No. US-2006-0222954-A1 published on Oct. 5, 2006, filed as U.S. application Ser. No. 11/452,445 on Jun. 13, 2006, patented as U.S. Pat. No. 8,415,054 on Apr. 9, 2013, and entitled "LITHIUM ANODES FOR ELECTROCHEMICAL CELLS"; U.S. Publication No. US-2010-0239914-A1 published on Sep. 23, 2010, filed as U.S. application Ser. No. 12/727,862 on Mar. 19, 2010, and entitled "CATHODE FOR LITHIUM BATTERY"; U.S. Publication No. US-2010-0294049-A1 published on Nov. 25, 2010, filed as U.S. application Ser. No. 12/471,095 on May 22, 2009, patented as U.S. Pat. No. 8,087,309 on Jan. 3, 2012, and entitled "HERMETIC SAMPLE HOLDER AND METHOD FOR PERFORMING MICROANALYSIS UNDER CONTROLLED ATMOSPHERE ENVIRONMENT"; U.S. Publication No. US-2011-0076560-A1 published on Mar. 31, 2011, filed as U.S. application Ser. No. 12/862,581 on Aug. 24, 2010, and entitled "ELECTROCHEMICAL CELLS COMPRISING POROUS STRUCTURES COMPRISING SULFUR"; U.S. Publication No. US-2011-0068001-A1 published on Mar. 24, 2011, filed as U.S. application Ser. No. 12/862,513 on Aug. 24, 2010, and entitled "RELEASE SYSTEM FOR ELECTROCHEMICAL CELLS"; U.S. Publication No. US-2012-0048729-A1 published on Mar. 1, 2012, filed as U.S. application Ser. No. 13/216,559 on Aug. 24, 2011, and entitled "ELECTRICALLY NON-CONDUCTIVE MATERIALS FOR ELECTROCHEMICAL CELLS"; U.S. Publication No. US-2011-0177398-A1 published on Jul. 21, 2011, filed as U.S. application Ser. No. 12/862,528 on Aug. 24, 2010, patented as U.S. Pat. No. 10,629,947 on Apr. 21, 2020, and entitled "ELECTROCHEMICAL CELL"; U.S. Publication No. US-2011-0070494-A1 published on Mar. 24, 2011, filed as U.S. application Ser. No. 12/862,563 on Aug. 24, 2010, and entitled "ELECTROCHEMICAL CELLS COMPRISING POROUS STRUCTURES COMPRISING SULFUR"; U.S.

Publication No. US-2011-0070491-A1 published on Mar. 24, 2011, filed as U.S. application Ser. No. 12/862,551 on Aug. 24, 2010, and entitled "ELECTROCHEMICAL CELLS COMPRISING POROUS STRUCTURES COMPRISING SULFUR"; U.S. Publication No. US-2011-0059361-A1 published on Mar. 10, 2011, filed as U.S. application Ser. No. 12/862,576 on Aug. 24, 2010, patented as U.S. Pat. No. 9,005,809 on Apr. 14, 2015, and entitled "ELECTROCHEMICAL CELLS COMPRISING POROUS STRUCTURES COMPRISING SULFUR"; U.S. Publication No. US-2012-0052339-A1 published on Mar. 1, 2012, filed as U.S. application Ser. No. 13/216,579 on Aug. 24, 2011, and entitled "ELECTROLYTE MATERIALS FOR USE IN ELECTROCHEMICAL CELLS"; U.S. Publication No. US-2012-0070746-A1 published on Mar. 22, 2012, filed as U.S. application Ser. No. 13/240,113 on Sep. 22, 2011, and entitled "LOW ELECTROLYTE ELECTROCHEMICAL CELLS"; U.S. Publication No. US-2011-0206992-A1 published on Aug. 25, 2011, filed as U.S. application Ser. No. 13/033,419 on Feb. 23, 2011, and entitled "POROUS STRUCTURES FOR ENERGY STORAGE DEVICES"; U.S. Publication No. US-2012-0082872-A1 published on Apr. 5, 2012, filed as U.S. application Ser. No. 13/249,605 on Sep. 30, 2011, and entitled "ADDITIVE FOR ELECTROLYTES"; U.S. Publication No. US-2012-0082901-A1 published on Apr. 5, 2012, filed as U.S. application Ser. No. 13/249,632 on Sep. 30, 2011, and entitled "LITHIUM-BASED ANODE WITH IONIC LIQUID POLYMER GEL"; U.S. Publication No. US-2013-0164635-A1 published on Jun. 27, 2013, filed as U.S. application Ser. No. 13/700,696 on Mar. 6, 2013, patented as U.S. Pat. No. 9,577,243 on Feb. 21, 2017, and entitled "USE OF EXPANDED GRAPHITE IN LITHIUM/SULPHUR BATTERIES"; U.S. Publication No. US-2013-0017441-A1 published on Jan. 17, 2013, filed as U.S. application Ser. No. 13/524,662 on Jun. 15, 2012, patented as U.S. Pat. No. 9,548,492 on Jan. 17, 2017, and entitled "PLATING TECHNIQUE FOR ELECTRODE"; U.S. Publication No. US-2013-0224601-A1 published on Aug. 29, 2013, filed as U.S. application Ser. No. 13/766,862 on Feb. 14, 2013, patented as U.S. Pat. No. 9,077,041 on Jul. 7, 2015, and entitled "ELECTRODE STRUCTURE FOR ELECTROCHEMICAL CELL"; U.S. Publication No. US-2013-0252103-A1 published on Sep. 26, 2013, filed as U.S. application Ser. No. 13/789,783 on Mar. 8, 2013, patented as U.S. Pat. No. 9,214,678 on Dec. 15, 2015, and entitled "POROUS SUPPORT STRUCTURES, ELECTRODES CONTAINING SAME, AND ASSOCIATED METHODS"; U.S. Publication No. US-2015-0287998-A1 published on Oct. 8, 2015, filed as U.S. application Ser. No. 14/743,304 on Jun. 18, 2015, patented as U.S. Pat. No. 9,577,267 on Feb. 21, 2017, and entitled "ELECTRODE STRUCTURE AND METHOD FOR MAKING SAME"; U.S. Publication No. US-2013-0095380-A1 published on Apr. 18, 2013, filed as U.S. application Ser. No. 13/644,933 on Oct. 4, 2012, patented as U.S. Pat. No. 8,936,870 on Jan. 20, 2015, and entitled "ELECTRODE STRUCTURE AND METHOD FOR MAKING THE SAME"; U.S. Publication No. US-2012-0052397-A1 published on Mar. 1, 2012, filed as U.S. application Ser. No. 13/216,538 on Aug. 24, 2011, patented as U.S. Pat. No. 9,853,287 on Dec. 26, 2017, and entitled "ELECTROLYTE MATERIALS FOR USE IN ELECTROCHEMICAL CELLS"; U.S. Publication No. US-2014-0123477-A1 published on May 8, 2014, filed as U.S. application Ser. No. 14/069,698 on Nov. 1, 2013, patented as U.S. Pat. No. 9,005,311 on Apr. 14, 2015, and entitled "ELECTRODE ACTIVE SURFACE PRETREATMENT"; U.S. Publication No. US-2014-0193723-A1 published on Jul. 10, 2014, filed as U.S. application Ser. No. 14/150,156 on Jan. 8, 2014, patented as U.S. Pat. No. 9,559,348 on Jan. 31, 2017, and entitled "CONDUCTIVITY CONTROL IN ELECTROCHEMICAL CELLS"; U.S. Publication No. US-2014-0255780-A1 published on Sep. 11, 2014, filed as U.S. application Ser. No. 14/197,782 on Mar. 5, 2014, patented as U.S. Pat. No. 9,490,478 on Nov. 8, 2016, and entitled "ELECTROCHEMICAL CELLS COMPRISING FIBRIL MATERIALS"; U.S. Publication No. US-2014-0272594-A1 published on Sep. 18, 2014, filed as U.S. application Ser. No. 13/833,377 on Mar. 15, 2013, and entitled "PROTECTIVE STRUCTURES FOR ELECTRODES"; U.S. Publication No. US-2014-0272597-A1 published on Sep. 18, 2014, filed as U.S. application Ser. No. 14/209,274 on Mar. 13, 2014, patented as U.S. Pat. No. 9,728,768 on Aug. 8, 2017, and entitled "PROTECTED ELECTRODE STRUCTURES AND METHODS"; U.S. Publication No. US-2015-0280277-A1 published on Oct. 1, 2015, filed as U.S. application Ser. No. 14/668,102 on Mar. 25, 2015, patented as U.S. Pat. No. 9,755,268 on Sep. 5, 2017, and entitled "GEL ELECTROLYTES AND ELECTRODES"; U.S. Publication No. US-2015-0180037-A1 published on Jun. 25, 2015, filed as U.S. application Ser. No. 14/576,570 on Dec. 19, 2014, patented as U.S. Pat. No. 10,020,512 on Jul. 10, 2018, and entitled "POLYMER FOR USE AS PROTECTIVE LAYERS AND OTHER COMPONENTS IN ELECTROCHEMICAL CELLS"; U.S. Publication No. US-2015-0349310-A1 published on Dec. 3, 2015, filed as U.S. application Ser. No. 14/723,132 on May 27, 2015, patented as U.S. Pat. No. 9,735,411 on Aug. 15, 2017, and entitled "POLYMER FOR USE AS PROTECTIVE LAYERS AND OTHER COMPONENTS IN ELECTROCHEMICAL CELLS"; U.S. Publication No. US-2014-0272595-A1 published on Sep. 18, 2014, filed as U.S. application Ser. No. 14/203,802 on Mar. 11, 2014, and entitled "COMPOSITIONS FOR USE AS PROTECTIVE LAYERS AND OTHER COMPONENTS IN ELECTROCHEMICAL CELLS"; U.S. Publication No. US-2019-0006699-A1 published on Jan. 3, 2019, filed as U.S. application Ser. No. 15/727,438 on Oct. 6, 2017, and entitled "PRESSURE AND/OR TEMPERATURE MANAGEMENT IN ELECTROCHEMICAL SYSTEMS"; U.S. Publication No. US-2014-0193713-A1 published on Jul. 10, 2014, filed as U.S. application Ser. No. 14/150,196 on Jan. 8, 2014, patented as U.S. Pat. No. 9,531,009 on Dec. 27, 2016, and entitled "PASSIVATION OF ELECTRODES IN ELECTROCHEMICAL CELLS"; U.S. Publication No. US-2014-0127577-A1 published on May 8, 2014, filed as U.S. application Ser. No. 14/068,333 on Oct. 31, 2013, patented as U.S. Pat. No. 10,243,202 on Mar. 26, 2019, and entitled "POLYMERS FOR USE AS PROTECTIVE LAYERS AND OTHER COMPONENTS IN ELECTROCHEMICAL CELLS"; U.S. Publication No. US-2015-0318539-A1 published on Nov. 5, 2015, filed as U.S. application Ser. No. 14/700,258 on Apr. 30, 2015, patented as U.S. Pat. No. 9,711,784 on Jul. 18, 2017, and entitled "ELECTRODE FABRICATION METHODS AND ASSOCIATED SYSTEMS AND ARTICLES"; U.S. Publication No. US-2014-0272565-A1 published on Sep. 18, 2014, filed as U.S. application Ser. No. 14/209,396 on Mar. 13, 2014, and entitled "PROTECTED ELECTRODE STRUCTURES"; U.S. Publication No. US-2015-0010804-A1 published on Jan. 8, 2015, filed as U.S. application Ser. No. 14/323,269 on Jul. 3, 2014, patented as U.S. Pat. No. 9,994,959 on Jun. 12, 2018, and entitled "CERAMIC/POLYMER MATRIX FOR ELECTRODE PROTECTION IN ELECTROCHEMICAL CELLS, INCLUDING RECHARGEABLE LITHIUM BATTERIES"; U.S. Publication No. US-2015-0162586-A1 published on Jun. 11, 2015, filed as U.S. application Ser. No. 14/561,305 on Dec. 5, 2014, and entitled "NEW SEPARATOR"; U.S. Publication No. US-2015-0044517-A1 published on Feb. 12, 2015, filed as U.S. application Ser. No. 14/455,230 on Aug. 8, 2014, patented as U.S. Pat. No. 10,020,479 on Jul. 10, 2018, and entitled "SELF-HEALING ELECTRODE PROTECTION IN ELECTROCHEMICAL CELLS"; U.S. Publication No. US-2015-0236322-A1 published on Aug. 20, 2015, filed as U.S. application Ser. No. 14/184,037 on Feb. 19, 2014, patented as U.S. Pat. No. 10,490,796 on Nov. 26, 2019, and entitled "ELECTRODE PROTECTION USING ELECTROLYTE-INHIBITING ION CONDUCTOR"; U.S. Publication No. US-2015-0236320-A1 published on Aug. 20, 2015, filed as U.S. Application Ser. No. 14/624,641 on Feb. 18, 2015, patented as U.S. Pat. No. 9,653,750 on May 16, 2017, and entitled "ELECTRODE PROTECTION USING A COMPOSITE COMPRISING AN ELECTROLYTE-INHIBITING ION CONDUCTOR"; U.S. Publication No. US-2016-0118638-A1 published on Apr. 28, 2016, filed as U.S. application Ser. No. 14/921,381 on Oct. 23, 2015, and entitled "COMPOSITIONS FOR USE AS PROTECTIVE LAYERS AND OTHER COMPONENTS IN ELECTROCHEMICAL CELLS"; U.S. Publication No. US-2016-0118651-A1 published on Apr. 28, 2016, filed as U.S. application Ser. No. 14/918,672 on Oct. 21, 2015, and entitled "ION-CONDUCTIVE COMPOSITE FOR ELECTROCHEMICAL CELLS"; U.S. Publication No. US-2016-0072132-A1 published on Mar. 10, 2016, filed as U.S. Application Ser. No. 14/848,659 on Sep. 9, 2015, and entitled "PROTECTIVE LAYERS IN LITHIUM-ION ELECTROCHEMICAL CELLS AND ASSOCIATED ELECTRODES AND METHODS"; U.S. Publication No. US-2018-0138542-A1 published on May 17, 2018, filed as U.S. application Ser. No. 15/567,534 on Oct. 18, 2017, and entitled "GLASS-CERAMIC ELECTROLYTES FOR LITHIUM-SULFUR BATTERIES"; U.S. Publication No. US-2016-0344067-A1 published on Nov. 24, 2016, filed as U.S. application Ser. No. 15/160,191 on May 20, 2016, patented as U.S. Pat. No. 10,461,372 on Oct. 29, 2019, and entitled "PROTECTIVE LAYERS FOR ELECTROCHEMICAL CELLS"; U.S. Publication No. US-2020-0099108-A1 published on Mar. 26, 2020, filed as U.S. application Ser. No. 16/587,939 on Sep. 30, 2019, and entitled "PROTECTIVE LAYERS FOR ELECTROCHEMICAL CELLS"; U.S. Publication No. US-2017-0141385-A1 published on May 18, 2017, filed as U.S. application Ser. No. 15/343,890 on Nov. 4, 2016, and entitled "LAYER COMPOSITE AND ELECTRODE HAVING A SMOOTH SURFACE, AND ASSOCIATED METHODS"; U.S. Publication No. US-2017-0141442-A1 published on May 18, 2017, filed as U.S. application Ser. No. 15/349,140 on Nov. 11, 2016, and entitled "ADDITIVES FOR ELECTROCHEMICAL CELLS"; patented as U.S. patent Ser. No. 10/320,031 on Jun. 11, 2019, and entitled "ADDITIVES FOR ELECTROCHEMICAL CELLS"; U.S. Publication No. US-2017-0149086-A1 published on May 25, 2017, filed as U.S. application Ser. No. 15/343,635 on Nov. 4, 2016, patented as U.S. Pat. No. 9,825,328 on Nov. 21, 2017, and entitled "IONICALLY CONDUCTIVE COMPOUNDS AND RELATED USES"; U.S. Publication No. US-2018-0337406-A1 published on Nov. 22, 2018, filed as U.S. application Ser. No. 15/983,352 on May 18, 2018, and entitled "PASSIVATING AGENTS FOR ELECTROCHEMICAL CELLS"; U.S. Publication No. US-2018-0261820-A1 published on Sep. 13, 2018, filed as U.S. application Ser. No. 15/916,588 on Mar. 9, 2018, and entitled "ELECTROCHEMICAL CELLS COMPRISING SHORT-CIRCUIT RESISTANT ELECTRONICALLY INSULATING REGIONS"; U.S. Publication No. US-2020-0243824-A1 published on Jul. 30, 2020, filed as U.S. application Ser. No. 16/098,654 on Nov. 2, 2018, and entitled "COATINGS FOR COMPONENTS OF ELECTROCHEMICAL CELLS"; U.S. Publication No. US-2018-0351158-A1 published on Dec. 6, 2018, filed as U.S. application Ser. No. 15/983,363 on May 18, 2018, and entitled "PASSIVATING AGENTS FOR ELECTROCHEMICAL CELLS"; U.S. Publication No. US-2018-0277850-A1, published on Sep. 27, 2018, filed as U.S. application Ser. No. 15/923,342 on Mar. 16, 2018, and patented as U.S. Pat. No. 10,720,648 on Jul. 21, 2020, and entitled "ELECTRODE EDGE PROTECTION IN ELECTROCHEMICAL CELLS"; U.S. Publication No. US-2018-0358651-A1, published on Dec. 13, 2018, filed as U.S. application Ser. No. 16/002,097 on Jun. 7, 2018, and patented as U.S. Pat. No. 10,608,278 on Mar. 31, 2020, and entitled "IN SITU CURRENT COLLECTOR"; U.S. Publication No. US-2017-0338475-A1, published on Nov. 23, 2017, filed as U.S. application Ser. No. 15/599,595 on May 19, 2017, and entitled "PROTECTIVE LAYERS FOR ELECTRODES AND ELECTROCHEMICAL CELLS"; U.S. Publication No. US-2019-0088958-A1, published on Mar. 21, 2019, filed as U.S. application Ser. No. 16/124,384 on Sep. 7, 2018, and entitled "PROTECTIVE MEMBRANE FOR ELECTROCHEMICAL CELLS"; U.S. Publication No. US-2019-0348672-A1, published on Nov. 14, 2019, filed as U.S. application Ser. No. 16/470,708 on Jun. 18, 2019, and entitled "PROTECTIVE LAYERS COMPRISING METALS FOR ELECTROCHEMICAL CELLS"; U.S. Publication No. US-2017-0200975-A1, published Jul. 13, 2017, filed as U.S. Application Ser. No. 15/429,439 on Feb. 10, 2017, and patented as U.S. Pat. No. 10,050,308 on Aug. 14, 2018, and entitled "LITHIUM-ION ELECTROCHEMICAL CELL, COMPONENTS THEREOF, AND METHODS OF MAKING AND USING SAME"; U.S. Publication No. US-2018-0351148-A1, published Dec. 6, 2018, filed as U.S. application Ser. No. 15/988,182 on May 24, 2018, and entitled "IONICALLY CONDUCTIVE COMPOUNDS AND RELATED USES"; U.S. Publication No. US-2018-0254516-A1, published Sep. 6, 2018, filed as U.S. application Ser. No. 15/765,362 on Apr. 2, 2018, and entitled "NON-AQUEOUS ELECTROLYTES FOR HIGH ENERGY LITHIUM-ION BATTERIES"; U.S. Publication No. US-2020-0044460-A1, published Feb. 6, 2020, filed as U.S. Application No. 16,527,903 on Jul. 31, 2019, and entitled "MULTIPLEXED CHARGE DISCHARGE BATTERY MANAGEMENT SYSTEM"; U.S. Publication No. US-2020-0220146-A1, published Jul. 9, 2020, filed as U.S. application Ser. No. 16/724,586 on Dec. 23, 2019, and entitled "ISOLATABLE ELECTRODES AND ASSOCIATED ARTICLES AND METHODS"; U.S. Publication No. US-2020-0220149-A1, published Jul. 9, 2020, filed as U.S. application Ser. No. 16/724,596 on Dec. 23, 2019, and entitled "ELECTRODES, HEATERS, SENSORS, AND ASSOCIATED ARTICLES AND METHODS"; U.S. Publication No. US-2020-0220197-A1, published Jul. 9, 2020, filed as U.S. application Ser. No. 16/724,612 on Dec. 23, 2019, and entitled "FOLDED ELECTROCHEMICAL DEVICES AND ASSOCIATED METHODS AND SYSTEMS"; International Patent Application Publication No. WO2020/237014, filed as International Application No. PCT/US2020/033938 on May 21, 2020, and entitled "ELECTRICALLY COUPLED ELECTRODES, AND ASSOCIATED ARTICLES AND METHODS"; International Patent Application Publication No. WO2020/257414, filed as International Patent Application No. PCT/US2020/038375 on Jun. 18, 2020, and entitled "METHODS, SYSTEMS, AND DEVICES FOR APPLYING FORCES TO ELECTROCHEMICAL DEVICES," U.S. Publication No. US-2021-0151839, published May 20, 2021, filed as U.S. application Ser. No. 16/952,177 on Nov. 19, 2020, and entitled "BATTERIES, AND ASSOCIATED SYSTEMS AND METHODS," U.S. Publication No. US-2021-0151830-A1 published on May 20, 2021, filed as U.S. application Ser. No. 16/952,235 on Nov. 19, 2020, and entitled "BATTERIES WITH COMPONENTS INCLUDING CARBON FIBER, AND ASSOCIATED SYSTEMS AND METHODS"; U.S. Publication No. US-2021-0151817-A1 published on May 20, 2021, filed as U.S. application Ser. No. 16/952,228 on Nov. 19, 2020, and entitled "BATTERY ALIGNMENT, AND ASSOCIATED SYSTEMS AND METHODS"; U.S. Publication No. US-2021-0151841-A1 published on May 20, 2021, filed as U.S. application Ser. No. 16/952,240 on Nov. 19, 2020, and entitled "SYSTEMS AND METHODS FOR APPLYING AND MAINTAINING COMPRESSION PRESSURE ON ELECTROCHEMICAL CELLS"; U.S. Publication No. US-2021-0151816-A1 published on May 20, 2021, filed as U.S. application Ser. No. 16/952,223 on Nov. 19, 2020, and entitled "THERMALLY INSULATING COMPRESSIBLE COMPONENTS FOR BATTERY PACKS"; U.S. Publication No. US-2021-0151840-A1 published on May 20, 2021, filed as U.S. application Ser. No. 16/952,187 on Nov. 19, 2020, and entitled "COMPRESSION SYSTEMS FOR BATTERIES"; U.S. Publication No. US-2021-0193984-A1 published on Jun. 24, 2021, filed as U.S. application Ser. No. 17/125,124 on Dec. 17, 2020, and entitled "SYSTEMS AND METHODS FOR FABRICATING LITHIUM METAL ELECTRODES"; U.S. Publication No. US-2021-0193985-A1 published on Jun. 24, 2021, filed as U.S. application Ser. No. 17/125,110 on Dec. 17, 2020, and entitled "LITHIUM METAL ELECTRODES AND METHODS"; U.S. Publication No. US-2021-0193996-A1 published on Jun. 24, 2021, filed as U.S. application Ser. No. 17/125,070 on Dec. 17, 2020, and entitled "LITHIUM METAL ELECTRODES"; and U.S. Publication No. US-2021-0194069-A1 published on Jun. 24, 2021, filed as U.S. application Ser. No. 17/126,390 on Dec. 18, 2020, and entitled "SYSTEMS AND METHODS FOR PROVIDING, ASSEMBLING, AND MANAGING INTEGRATED POWER BUS FOR RECHARGEABLE ELECTROCHEMICAL CELL OR BATTERY"; U.S. Publication No. US-2021-0218243 published on Jul. 15, 2021, filed as U.S. application Ser. No. 17/126,424 on Dec. 18, 2020, and entitled "SYSTEMS AND METHODS FOR PROTECTING A CIRCUIT, RECHARGEABLE ELECTROCHEMICAL CELL, OR BATTERY"; U.S. Publication No. 2022-0069593 published on Mar. 3, 2022, filed as U.S. application Ser. No. 17/463,467 filed on Aug. 31, 2021, and entitled "Multiplexed Battery Management System"; U.S. Publication No. 2022-0048121 published on Feb. 17, 2022, filed as U.S. application Ser. No. 17/397,114 filed on Aug. 9, 2021, and entitled "Ultrasonic Blade for Cutting a Metal", U.S. Publication No. 2022-0115715 published on Apr. 14, 2022, filed as U.S. application Ser. No. 17/479,299 filed on Sep. 20, 2021 and entitled "Electrolytes for Reduced Gassing".

U.S. Provisional Patent Application No. 63/166,549, filed Mar. 26, 2021 and entitled, "Battery Pack and Related Components and Methods," and U.S. Provisional Patent Application No. 63/223,663, filed Jul. 20, 2021 and entitled, "Battery Pack and Related Components and Methods," are each incorporated herein by reference in its entirety for all purposes. U.S. Provisional patent application Ser. No. 17/702,971, filed Mar. 24, 2022 and entitled, "Battery Pack and Related Components and Methods," is incorporated herein by reference in its entirety for all purposes.

U.S. Provisional Patent Application No. 63/224,930, filed Jul. 23, 2021, and entitled, "Battery Module with Multiplexing and Associated Systems and Methods," is incorporated herein by reference in its entirety for all purposes.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery, comprising:
   a housing at least partially enclosing an electrochemical cell; and
   a phase change material portion;
   wherein:
      the phase change material portion has a melting point, at 1 atm of pressure, of greater than or equal to 30° C. and less than or equal to 80° C. and a latent heat of fusion, at 1 atm of pressure, of greater than or equal to 100,000 J kg$^{-1}$;
      the housing is configured to apply, during at least one period of time during charge and/or discharge of the electrochemical cell, an anisotropic force with a component normal to an electrode active surface of the electrochemical cell defining a pressure of at least 10 kg$_f$/cm$^2$; and
      the phase change material portion is located such that during at least some of the at least one period of time during which the housing applies the anisotropic force, some or all of the phase change material portion experiences a pressure defined by the anisotropic force that is zero or at least 50% lower than an average pressure defined by the anisotropic force experienced by the electrode active surface.

2. The battery of claim 1, wherein the electrochemical cell is a first electrochemical cell, and the first electrochemical cell is part of a stack comprising a second electrochemical cell and a thermally conductive solid article portion at least partially between the first electrochemical cell and the second electrochemical cell and adjacent to the phase change material portion, the stack at least partially enclosed by the housing.

3. The battery of claim 2, wherein the stack has a first end, a second end, and a side, and the housing comprises:
   a first solid housing component covering at least a portion of the first end of the stack and having a portion along at least some of the side of the stack;
   a second solid housing component covering at least a portion of the second end of the stack and having a portion along at least some of the side of the stack; and
   a point of attachment between the first solid housing component and the second solid housing component at a region of overlap between the first solid housing component and the second solid housing component along the side of the stack.

4. The battery of claim 2, wherein the stack is arranged such that heat can dissipate from the first electrochemical cell, through at least a portion of the thermally conductive solid article, and to the phase change material portion.

5. The battery of claim 1, wherein the phase change material portion is in thermal communication with the electrochemical cell.

6. The battery of claim 1, wherein the phase change material portion is lateral to all portions of the electrochemical cell that experience the anisotropic force.

7. The battery of claim 3, wherein the phase change material portion is in thermal communication with the first solid housing component and/or the second solid housing component.

8. The battery of claim 1, wherein the phase change material portion has a specific heat capacity, in its solid form, of greater than or equal to 1,000 J kg$^{-1}$ K$^{-1}$ at 25° C.

9. The battery of claim 1, wherein the phase change material portion comprises a paraffin wax, a salt hydrate, and/or a fatty acid.

10. The battery of claim 2, wherein the thermally conductive solid article portion has an effective thermal conductivity of greater than or equal to 10 W m$^{-1}$ K$^{-1}$ in an in-plane direction at a temperature of 25° C.

11. The battery of claim 3, wherein the stack further comprises a first solid plate between the first solid housing component and the first electrochemical cell.

12. The battery of claim 11, wherein the thermally conductive solid article portion is a first thermally conductive solid article portion, the phase change material portion is a first phase change material portion, and the stack comprises the following, in order:

the first solid plate;
a first thermally insulating compressible solid article portion;
a second thermally conductive solid article portion in thermal communication with a second phase change material portion;
the first electrochemical cell;
a second thermally insulating compressible solid article portion;
the first thermally conductive solid article portion in thermal communication with the first phase change material portion;
the second electrochemical cell;
a third thermally insulating compressible solid article portion;
a third thermally conductive solid article portion in thermal communication with a third phase change material portion;
a third electrochemical cell;
a fourth thermally insulating compressible solid article portion;
a fourth thermally conductive solid article portion in thermal communication with a fourth phase change material portion;
a fourth electrochemical cell;
a fifth thermally insulating compressible solid article portion; and
a second solid plate.

13. The battery of claim 1, wherein the electrochemical cell of the battery comprises lithium metal and/or a lithium alloy as an electrode active material during at least a portion of a charging and/or discharging process of the electrochemical cell.

14. The battery of claim 1, wherein the battery is a rechargeable battery.

15. The battery of claim 2, further comprising a multiplexing switch apparatus connected to the first electrochemical cell and the second electrochemical cell.

16. The battery of claim 15, further comprising at least one controller configured to use the multiplexing switch apparatus to selectively discharge the first electrochemical cell and/or the second electrochemical cell.

17. The battery of claim 15, wherein the multiplexing switch apparatus comprises at least one switch connected to each of the first electrochemical cell and the second electrochemical cell.

18. The battery of claim 1, wherein at least 50 volume percent of the phase change material portion is lateral to all portions of the electrochemical cell that experience the anisotropic force.

19. The battery of claim 1, wherein at least a portion of the phase change material portion is lateral to the electrode active surface of the electrochemical cell.

20. The battery of claim 2, wherein the thermally conductive solid article portion is in thermal communication with the phase change material portion.

21. The battery of claim 2, wherein at least a portion of the phase change material portion is lateral to all electrode active surfaces of the stack.

22. An electric vehicle, comprising the battery of claim 1.

23. A method, comprising applying, during at least one period of time during charge and/or discharge of the first electrochemical cell and/or the second electrochemical cell of the battery of claim 2, an anisotropic force with a component normal to a first electrode active surface of the first electrochemical cell and/or a second electrode active surface of the second electrochemical cell defining a pressure of at least 10 $kg_f/cm^2$.

24. A method comprising transferring heat at a flux of at least 100 W $m^{-2}$, during at least one period of charge and/or discharge of the first electrochemical cell and/or the second electrochemical cell of the battery of claim 2, from the first electrochemical cell, through the thermally conductive solid article portion, to the phase change material portion.

* * * * *